(12) United States Patent
Miyake et al.

(10) Patent No.: US 10,753,031 B2
(45) Date of Patent: Aug. 25, 2020

(54) WASHING MACHINE MOTOR AND WASHING MACHINE HAVING SAME

(71) Applicant: Samsung Electronics Co., Ltd, Gyeonggi-do (KR)

(72) Inventors: Hiroyuki Miyake, Kanagawa (JP);
Yukinori Nakagawa, Kanagawa (JP);
Kenji Kitajima, Kanagawa (JP);
Toshihiro Kamii, Kanagawa (JP);
Hidekazu Funakoshi, Kanagawa (JP);
Nobuharu Nishikoori, Kanagawa (JP);
Yasumasa Nagasaki, Kanagawa (JP);
Takehiro Nakanishi, Kanagawa (JP);
Hiroshi Katsumoto, Kanagawa (JP);
Minoru Yoshida, Kanagawa (JP);
Yasuyuki Sonoda, Kanagawa (JP);
Masaki Oshige, Kanagawa (JP);
Tomoyuki Okuno, Kanagawa (JP);
Katsuyuki Shimakage, Kanagawa (JP);
Hiroshi Wanatabe, Kanagawa (JP);
Yuji Akita, Kanagawa (JP); Yoshinori Takashima, Kanagawa (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 342 days.

(21) Appl. No.: 15/746,802

(22) PCT Filed: Jul. 8, 2016

(86) PCT No.: PCT/KR2016/007406
§ 371 (c)(1),
(2) Date: Jan. 22, 2018

(87) PCT Pub. No.: WO2017/014461
PCT Pub. Date: Jan. 26, 2017

(65) Prior Publication Data
US 2020/0080246 A1 Mar. 12, 2020

(51) Int. Cl.
*D06F 37/40* (2006.01)
*D06F 37/30* (2020.01)
(Continued)

(52) U.S. Cl.
CPC .............. *D06F 37/40* (2013.01); *D06F 37/30* (2013.01); *D06F 37/304* (2013.01); *H02K 16/02* (2013.01);
(Continued)

(58) Field of Classification Search
CPC .......... D06F 37/12; D06F 37/24; D06F 37/30; D06F 37/304; D06F 37/40; D06F 23/04; D06F 2204/065; H02K 16/02
See application file for complete search history.

(56) References Cited

U.S. PATENT DOCUMENTS

| 6,049,152 A | 4/2000 | Nakano |
| 6,211,597 B1 | 4/2001 | Nakano |
| (Continued) | | |

FOREIGN PATENT DOCUMENTS

| EP | 0947622 A2 | 10/1999 |
| EP | 1490951 A1 | 12/2004 |
| (Continued) | | |

OTHER PUBLICATIONS

Supplementary European Search Report dated May 28, 2018 in connection with European Patent Application No. 16 82 7965.
(Continued)

*Primary Examiner* — Joseph L. Perrin

(57) ABSTRACT

Provided is a washing machine motor capable of efficiently generating torque by improving a winding factor of coils with a relatively simple configuration. The washing machine motor (12) has an outer rotor (20), an inner rotor (30), and a stator (60). The outer rotor (20) and the inner rotor (30) share coils (63) of the stator (60), and a composite current
(Continued)

is supplied to the coils (63) such that the outer rotor (20) and the inner rotor (30) are independently driven. The outer rotor (20) has forty eight outer magnets (24) arranged such that the N and S poles thereof are continuously and alternately aligned in the circumferential direction thereof. The inner rotor (30) has forty-two inner magnets (34) arranged such that the N and S poles thereof are continuously and alternately aligned in the circumferential direction thereof. The stator (60) has thirty-six I-shaped cores (61) and the coils (63).

18 Claims, 83 Drawing Sheets

(51) Int. Cl.
*H02K 16/02* (2006.01)
*D06F 23/04* (2006.01)
*D06F 37/12* (2006.01)
*D06F 37/24* (2006.01)

(52) U.S. Cl.
CPC ............... *D06F 23/04* (2013.01); *D06F 37/12* (2013.01); *D06F 37/24* (2013.01); *D06F 2204/065* (2013.01)

(56) References Cited

U.S. PATENT DOCUMENTS

| | | |
|---|---|---|
| 6,257,027 B1 | 7/2001 | Imai |
| 6,992,419 B2 | 1/2006 | Kim et al. |
| 7,017,377 B2 | 3/2006 | Hosoito et al. |
| 7,107,798 B2 | 9/2006 | Vaidhyanathan et al. |
| 7,263,089 B1 | 8/2007 | Hans et al. |
| 7,454,929 B2 | 11/2008 | Cho et al. |
| 7,579,798 B2 | 8/2009 | Hosoito et al. |
| 7,960,893 B2 | 6/2011 | Kim et al. |
| 8,207,648 B2 | 6/2012 | Li et al. |
| 8,616,028 B2 | 12/2013 | Kim et al. |
| 8,970,080 B2 | 3/2015 | Li et al. |
| 9,080,279 B2 | 7/2015 | Jun et al. |
| 2004/0119373 A1* | 6/2004 | Akatsu ............... H02K 1/276 310/266 |
| 2009/0064727 A1 | 3/2009 | Choi et al. |
| 2010/0058817 A1* | 3/2010 | Yoshikawa ........... D06F 37/304 68/139 |
| 2013/0009513 A1 | 1/2013 | Jang et al. |
| 2013/0055771 A1 | 3/2013 | Tashiro et al. |
| 2013/0061640 A1 | 3/2013 | Kim et al. |
| 2014/0049124 A1 | 2/2014 | Gandhi et al. |
| 2014/0069145 A1 | 3/2014 | Chupka et al. |
| 2014/0091662 A1 | 4/2014 | Kim |
| 2015/0207371 A1 | 7/2015 | Duncan et al. |
| 2015/0252507 A1* | 9/2015 | Kim ....................... D06F 17/08 68/23.6 |
| 2015/0256056 A1 | 9/2015 | Kim et al. |
| 2016/0201246 A1* | 7/2016 | Song ...................... D06F 37/40 8/137 |
| 2016/0376741 A1* | 12/2016 | Kim ........................ H02K 21/12 310/90 |

FOREIGN PATENT DOCUMENTS

| | | |
|---|---|---|
| EP | 1843447 A1 | 10/2007 |
| EP | 1339160 B1 | 4/2008 |
| EP | 1942571 A1 | 7/2008 |
| EP | 2048768 A2 | 4/2009 |
| JP | S59-46639 B2 | 11/1984 |
| JP | H05-130761 A | 5/1993 |
| JP | H09-290089 A | 11/1997 |
| JP | 2001029684 A | 2/2001 |
| JP | 3178263 B2 | 6/2001 |
| JP | 3480300 B2 | 12/2003 |
| JP | 3480301 B2 | 12/2003 |
| JP | 3480302 B2 | 12/2003 |
| JP | 2006115685 A | 4/2004 |
| JP | 3524376 B2 | 5/2004 |
| JP | 2004321636 | 11/2004 |
| JP | 3651595 B2 | 5/2005 |
| JP | 2005168208 A | 6/2005 |
| JP | 2005521378 A | 7/2005 |
| JP | 2005253567 A | 9/2005 |
| JP | 2006043153 A | 2/2006 |
| JP | 2006158488 A | 6/2006 |
| JP | 2006174637 A | 6/2006 |
| JP | 2006517126 A | 7/2006 |
| JP | 3813511 B2 | 8/2006 |
| JP | 2006203970 A | 8/2006 |
| JP | 3937630 B2 | 6/2007 |
| JP | 2008206737 A | 9/2008 |
| JP | 2009033952 A | 2/2009 |
| JP | 2009050349 A | 3/2009 |
| JP | 2009106330 A | 5/2009 |
| JP | 2009247722 A | 10/2009 |
| JP | 2009278862 A | 11/2009 |
| JP | 2010148314 A | 7/2010 |
| JP | 2012191758 A | 10/2012 |
| JP | 5176662 B2 | 4/2013 |
| JP | 2014530741 A | 11/2014 |
| JP | 2015089240 A | 5/2015 |
| KR | 10-2001-0097203 A | 11/2001 |
| KR | 20060088238 A | 8/2006 |
| KR | 100890891 B1 | 4/2009 |
| KR | 20140079699 A | 6/2014 |
| WO | 2010044231 A1 | 4/2010 |
| WO | 2012/011274 A1 | 1/2012 |
| WO | 2014/098473 A1 | 6/2014 |

OTHER PUBLICATIONS

International Search Report dated Oct. 24, 2016 in connection with International Patent Application No. PCT/KR2016/007406.
Written Opinion of the International Searching Authority dated Oct. 24, 2016 in connection with International Patent Application No. PCT/KR2016/007406.

* cited by examiner

FIG. 7

| Teeth No. | (TOTAL 36) | 1 | 2 | 3 | 4 | 5 | 6 | 7 | 8 | 9 | 10 | 11 | 12 |
|---|---|---|---|---|---|---|---|---|---|---|---|---|---|
| POSITION FOR 3 NOZZLE ANGLE 30°C | JUMPER WIRE UPPER | Oa CW | Oa CCW | Ob CW | Ob CCW | Oc CW | Oc CCW | | | | | | |
| | JUMPER WIRE LOWER | | | | | | | Od CW | Od CCW | Oe CW | Oe CCW | Of CW | Of CCW |
| stator 3 PHASE SIDE | U PHASE | U | U | | | | | U | U | | | | |
| | V PHASE | | | | | V | V | | | V | | | V |
| | W PHASE | | | W | W | | | | | W | W | | |
| stator 6 PHASE SIDE | A | A | A | | | | | | | | | | |
| | B | | | B | B | | | | | | | | |
| | C | | | | | C | C | | | | | | |
| | D | | | | | | | D | D | | | | |
| | E | | | | | | | | | E | E | | |
| | F | | | | | | | | | | | F | F |
| rotor | OUTER 6 PHASE (48P) | | | | | | | | | | | | |
| rotor | INNER 3 PHASE (42P) | | | | | | | | | | | | |

FIG. 10

CONVENTIONAL WINDING
FACTOR (FUNDAMENTAL WAVE)
Slot : P1 : P2 = 6 : 4 : 2

|       | 3 PHASE   | 6 PHASE   |
|-------|-----------|-----------|
| 4Pole | Kp=0.87   | Kp=0.87   |
|       | Kd=1      | Kd=0      |
|       | Kw=0.87   | Kw=0      |
| 2Pole | Kp=0.5    | Kp=0.5    |
|       | Kd=0      | Kd=1      |
|       | Kw=0      | Kw=0.5    |

FIG. 11

WINDING FACTOR ACCORDING TO
THE PRESENT EMBODIMENT
(FUNDAMENTAL WAVE)
Slot : P1 : P2 = 6 : 7 : 8

|  | 3 PHASE | 6 PHASE |
|---|---|---|
| 7Pole | Kp=0.97 | Kp=0.97 |
|  | Kd=0.97 | Kd=0 |
|  | Kw=0.93 | Kw=0 |
| 8Pole | Kp=0.87 | Kp=0.87 |
|  | Kd=0 | Kd=0.87 |
|  | Kw=0 | Kw=0.75 |

FIG. 16

COMPARISON OF SHORT PITCH FACTOR

| Kp | | 3 ORDER | 5 ORDER | 7 ORDER |
|---|---|---|---|---|
| CONVENTIONAL | 6 PHASE | 1 | 0.5 | 0.5 |
| | 3 PHASE | 0 | 0.87 | 0.87 |
| PRESENT EMBODIMENT | 6 PHASE | 0 | 0.87 | 0.87 |
| | 3 PHASE | 0.71 | 0.26 | 0.26 |

WASHING MACHINE MOTOR AND WASHING MACHINE HAVING SAME

CROSS-REFERENCE TO RELATED APPLICATIONS

The present application is a National Stage of International Application No. PCT/KR2016/007406 filed Jul. 8, 2016, which claims the benefit of Japanese Patent Application Nos. 2015-143829 filed Jul. 21, 2015; 2015-150366 filed Jul. 30, 2015; 2015-194604 filed Sep. 30, 2015; 2015-212474 filed Oct. 29, 2015; 2015-217670 filed Nov. 5, 2015; 2015-228660 filed Nov. 24, 2015; 2015-235657 filed Dec. 2, 2015; 2015-247407 filed Dec. 18, 2015; 2015-252475 filed Dec. 24, 2015; 2016-000683 filed Jan. 5, 2016; 2016-079089 filed Apr. 11, 2016 and Korean Patent Application No. 10-2016-0073834 filed Jun. 14, 2016, the contents of which are incorporated herein by reference.

TECHNICAL FIELD

The present invention relates to a washing machine motor and a washing machine having the same.

BACKGROUND

The techniques related to the first to tenth embodiments of the present disclosure are disclosed in the following Patent Documents 1 to 4.
<Patent Document 1>
Patent Document 1 discloses a dual rotor type motor. Patent Document 1 discloses a technique of independently driving an inner rotor and an outer rotor by a composite current that combines currents corresponding to the respective rotors. However, the motor of Patent Document 1 is for an automobile, and a stator of the motor is constituted by the number of independent cores that are larger than the number of poles of the inner rotor and the outer rotor.
<Patent Document 2>
Patent Document 2 discloses a motor for rotating and driving a drum and a pulsator of a washing machine in a direct-drive type (a type in which the drum and the pulsator are directly driven by a motor without passing through a complicated transmission mechanism).

The motor of this washing machine has a structure in which an outer rotor type washing motor (to drive the pulsator) and an inner rotor type dewatering motor (to drive the drum) are disposed inside and outside. Two stators for the washing motor and the dewatering motor are provided in a stator unit disposed between the rotors of the two motors.

During the washing operation in which the washing process and the rinsing process are performed, a large amount of water is filled in the drum, so that the motor is required to have a high torque at a low speed. On the other hand, during the dewatering operation, since the water in the drum is removed, the motor can be driven at a low torque, but a high-speed rotation is required for the motor. Therefore, the washing machine motor is required to have a specific output performance corresponding to the low speed-high torque and the high speed-low torque.

Accordingly, in this washing machine, the dewatering motor which does not require a high torque is arranged in the form of an inner motor, and the washing motor is arranged in an outer rotor shape in which the outer diameter of the rotor is large and high torque is obtained, thereby realizing the appropriate output performance.

During the washing process and the rinsing process requiring high torque, the washing machine controls the pulsator to rotate while reversing forward and reverse in a state in which the drum is kept from rotating in the same manner as in the conventional control.

During the dewatering process, rotations of the washing motor and the dewatering motor are shifted from each other. When the rotational speeds of the two motors are different from each other by a predetermined speed or more, the motor having the smaller rotational speed is controlled to become similar to the rotational speed of the other motor.

In the dewatering process, the washing motor and the dewatering motor are synchronously operated, and at the timing when the washing motor reaches the predetermined rotational speed, only the dewatering motor is driven and the supply of current to the washing motor is stopped so that the washing motor is in the rotation-free state.
<Patent Document 3>
Patent Document 3 discloses a method of manufacturing a stator of a dual rotor type motor.

Specifically, eighteen stator cores wound with coils are formed by winding a coil on a prismatic stator core having insulator members (insulating materials) mounted on both ends thereof. In the state where the eighteen stator cores wound with the coils are arranged in the circumferential direction, the both ends of the stator cores are sandwiched between a pair of annularly shaped gallery plates and the gallery plates are fixed with bolts or nuts while performing insulation measures, thereby forming a stator skeleton structure.

In order to fix the stator core to an appropriate position, convex portions extending in the axial direction are formed on the inner and outer surfaces of the stator core. When these convex portions are fitted in the concave portions provided in the stator molding container, the stator skeleton structure is inserted into the stator molding container. Thereafter, when the space between the stator molding container and the stator skeleton structure is filled with resin, a resin molded product is formed.

Since the convex portions remain in the resin molded product, when the convex portions are mechanically removed, the stator is completed.
<Patent Document 4>
Patent Document 4 discloses a vertical type washing machine in which a drum is rotated during a washing process or a rinsing process. In this washing machine, since both the drum and the pulsator are driven by a single motor, during the washing process or the rinsing process, in contrast to the conventional control, only the drum is rotated while reversing the forward and backward directions in a state in which the pulsator is fixed and is not rotated. Further, during dewatering process, the pulsator is released from the fixation, the drum is rotated at a high speed in a state in which the pulsator is rotatable.

PATENT DOCUMENT

Patent Document 1: Japanese Patent Publication No. H11-275826 (Japanese Patent No. 3480300)
Patent Document 2: Japanese Patent Publication No. H11-276777 (Japanese Patent No. 3524376)
Patent Document 3: Japanese Patent Publication No. 2006-174637
Patent Document 4: Japanese Patent Publication No. 2004-321636

DISCLOSURE

Technical Problem

First Embodiment

In the motor of Patent Document 1, the number of rotating magnetic fields generated by the stator is set to be the same as the number of magnetic fields of the rotor. However, for example, when the outer rotor is three-phase driven and the inner rotor is six-phase driven, the winding factor of the outer rotor is 0.87 and the winding factor of the inner rotor is reduced to 0.5. Therefore, it is difficult to generate a predetermined torque during low-speed rotation.

Here, in order to obtain a high torque at the time of low-speed rotation, it may be considered that the outer rotor is three-phase driven and the inner rotor is nine- or twelve-phase driven. However, in such a case, since the number of driving devices such as IGBT, MOSFET, or the like increases to 18 or 24, there is a problem that the manufacturing cost increases.

Thus, the first embodiment relates to a motor which can generate a torque efficiently by improving the winding factor of a coil with a relatively simple structure.

Second Embodiment

In many vertical type washing machines, a drum having a plurality of water holes is accommodated in a tub, and a pulsator (stirring blade) is disposed on the bottom of the drum. A motor is disposed in the lower part of the tub, and the drum and the pulsator 13 are rotationally driven by this motor. In recent years, a type in which a motor directly drives the drum and the pulsator without passing through a complicated transmission mechanism is becoming common (direct drive type).

During the washing or rinsing process in which the pulsator is driven to rotate, a large amount of water is filled in the drum, so that the motor requires a low-speed but high-torque output. On the other hand, during the dewatering operation, since the water in the drum is removed, the motor may be driven at a low torque, but require a high-speed rotation output. For this reason, the washing machine motor is required to have a specific output performance corresponding to the low speed-high torque and high speed-low torque.

Accordingly, in the washing machine of Patent Document 2, the dewatering motor which does not require a high torque is arranged in an inner rotor shape, and the washing motor is arranged in an outer rotor shape in which the outer diameter of the rotor is large and high torque is obtained, thereby realizing the appropriate output performance.

In recent years, however, the operation control becomes complicated, and in some cases, not only the pulsator but also the drum may be required to rotate during the washing process or the rinsing process. In this case, a high torque is required for the rotation of the drum, but the motor of the washing machine of Patent Document 2 is difficult to obtain the high torque due to its structure. When the outer diameter of the rotor of the dewatering motor is increased, the high torque may be obtained, but in this case, the size of the whole motor becomes large.

In the case of the dual rotor type motor as in Patent Document 1, since the number of stator is one, the outer diameter of the inner rotor may be increased correspondingly, so that it is possible to increase the torque of the dewatering motor while avoiding the whole motor becoming large.

However, in the case of the dual rotor type motor, when the number of independent cores of the stator is larger than the number of poles of the inner rotor and the outer rotor, as in the motor of Patent Document 1, large cogging torque or large mutual ripples are generated. As a result, unpleasant noise and vibration are generated, and the product value as the washing machine is deteriorated.

Thus, the second embodiment relates to a dual rotor type motor capable of reducing cogging torque and mutual ripple, and suppressing noise to a level that is comparable to a conventional washing machine.

Third Embodiment

As described above, in the case of the dual rotor type motor as in Patent Document 1, it is possible to increase the torque of the dewatering motor while avoiding an increase in the size of the entire motor.

However, in the case of the washing machine motor, since the number of poles of the stator is large (usually 20 or more), there is a problem in that productivity is reduced due to an increase in the number of man-hours in the manufacturing method of individually forming and assembling the stator cores wound with coils as in Patent Document 3, Further, in the manufacturing method of Patent Document 3, since the number of poles of the stator increases, there is a lot of work to increase the amount of work or the degree of difficulty, such as to appropriately arrange the stator cores wound with the coils and then to sandwich them between the pair of the gallery plates, to fasten a plurality of bolts and nuts that require attention to insulation and tightness, to remove the convex portions requiring high precision, and the like. Therefore, not only the productivity is decreased but also the quality is hardly secured.

Thus, the third embodiment relates to the practical use of the washing machine motor that can cope with various operation controls by efficiently manufacturing the stator of the dual rotor type motor having a large number of poles.

Fourth Embodiment

In the washing machine as in Patent Document 2, when there is a difference in rotational speed between the drum and the pulsator in the deceleration process of decelerating the drum and the pulsator after dewatering, the laundry may be pulled between the drum and the pulsator, resulting in damage to the fabric. In order to prevent this, it is necessary to perform synchronous control so that the rotational speeds of the drum (dewatering motor) and the pulsator (washing motor) are the same as or similar to each other in the deceleration process.

In the case of independently rotating the drum and the pulsator using two motors as in the washing machine of Patent Document 2, the regenerative electric power based on the torque of the motor is larger than that in the case of one motor. Therefore, when the rotational speed of the drum and the pulsator are suddenly decreased, the regenerative electric power from the motor may not be consumed much, and the regenerative electric power may flow back to the electric power source, thereby damaging the electric power source. Therefore, in order to prevent this, it is necessary to gently decelerate the drum and the pulsator so that the regenerative electric power is appropriately consumed.

As described above, in order to appropriately consume the regenerative electric power while executing the synchronous control, it is preferable to adjust the rotational speed to the side having a lower deceleration rate, that is, the side having a higher rotational speed. However, if the rotational speed is set to the side having the higher rotational speed, it takes a long time to stop the drum and the pulsator.

Thus, the fourth embodiment relates to shortening the deceleration time when decelerating while performing synchronous control of the drum and the pulsator while appropriately consuming the regenerative electric power of the motor.

Fifth Embodiment

Clothes such as sweaters and the like tend to be damaged. Therefore, in order to appropriately wash such delicate laundry, it is necessary to perform washing or rinsing with a soft touch while appropriately dispersing the laundry in water. On the contrary, some laundry, such as stained laundry that is not easily erased, or large laundry, is difficult to wash properly with a weak water stream.

For this reason, it is necessary to generate a water stream having a variety of directions and flow rates in the drum. However, as in the washing machines of Patent Documents 2 and 4, the washing machine which rotates only one of the pulsator and the drum is insufficient for appropriately washing various types of laundry.

Thus, the fifth embodiment relates to a washing machine capable of processing a wide variety of laundry in a wide range.

Sixth Embodiment

In the washing machine of Patent Document 2, the pulsator alternately rotates in the other direction (hereinafter referred to as the reciprocal rotation), thereby generating a force that twists water in the drum to prevent the laundry from not being washed evenly.

In addition, when the drum is rotated simultaneously with the pulsator, an improvement in the washing effect may be further expected. For example, it is possible to consider a mode in which the drum is rotated in the clockwise direction and simultaneously the pulsator is rotated in the counter-clockwise direction, and a mode in which the drum is rotated in the counter-clockwise direction and simultaneously the pulsator is rotated in the clockwise direction. When these modes are alternately executed, the direction of the water stream may be switched and the laundry may be released.

However, when switching the direction of the reciprocal rotation, a relatively large starting load is applied to the motor (dewatering motor and washing motor) in order to reverse the rotational directions of the drum and the pulsator. In particular, the drum is a large component in the washing machine, and when the drum is rotated, a relatively large inertia force is applied to the drum in the rotational direction. Therefore, when reversing the rotational direction of the drum, an excessive starting load is applied to the motor (particularly, the dewatering motor) as compared with a configuration in which the drum is fixed or a configuration in which the drum is freely rotatable. The motor may cause a starting failure due to this excessive starting load.

Thus, the sixth embodiment relates to reducing the load applied to the motor when reversing the rotational direction of the drum and the pulsator, thereby preventing the starting failure of the motor.

Seventh Embodiment

In the washing machine of Patent Document 2, since the rotation of the washing motor and the rotation of the dewatering motor are shifted in the dewatering process, it is expected that the position of the laundry is changed. However, simply changing the position of the laundry may change its position to increase the unbalance amount, so that it is not always possible to surely prevent unbalance from occurring.

Thus, the seventh embodiment relates to providing a washing machine capable of preventing the occurrence of unbalance more stably, having a low vibration, and capable of shortening the dewatering time.

Eighth Embodiment

When the motor having the smaller rotational speed is controlled to approach the rotational speed of the other motor in the dewatering process as in the washing machine of Patent Document 2, the positional deviation between the drum and the pulsator becomes relatively large due to the accumulation of the speed difference, so that damage to the cloth may not be sufficiently prevented.

Specifically, when the rotational speed of the washing motor is large, the rotational speed of the dewatering motor is accelerated to be close to the rotational speed of the washing motor. At this time, the rotational speed of the dewatering motor may be overshot, thereby exceeding the rotational speed of the washing motor. In this case, it is necessary to control so that the rotational speed of the washing motor is accelerated to approach the rotational speed of the dewatering motor. In this manner, since the motor having the large rotational speed is changed in a random cycle, the control may become unstable. Therefore, the positional deviation between the drum and the pulsator may become relatively large.

Thus, the eighth embodiment relates to a washing machine that can perform the dewatering operation capable of reducing damage to clothes of laundry.

Ninth Embodiment

The appropriate timing to set the washing motor to the rotation free-state may be variously changed depending on the weight, state, kind, etc. of the laundry. For this reason, as in the invention of Patent Document 2, if the rotational speed of the washing motor when the washing motor is set in the rotation free-state in the dewatering process is fixed, the washing motor may not be made into the rotation free-state at an appropriate timing.

For example, when the washing motor is rotated in a free-state earlier than the appropriate timing, the laundry rotated with the drum rubs against the pulsator that is in the rotation free-state, and causes the pulsator to rotate together, so that the laundry may be damaged. On the other hand, when the washing motor is set in the rotation free-state later than the appropriate timing, the time for supplying power to the washing motor becomes long, so that the power consumption increases.

Thus, the ninth embodiment relates to a washing machine capable of reducing the damage to cloth of laundry and performing the dewatering operation while saving electricity.

Tenth Embodiment

In the washing machine of Patent Document 2, even when the washing motor is set in the rotation free-state during the dewatering operation, for example, since the clothes press the rotating tub and the stirring body by gravity, the stirring body may be rotated along with the rotation of the dewatering motor.

In other words, the washing motor may follows the dewatering motor to be rotated. In this case, a resistance force due to the counter electromotive force (a force in a direction for preventing the rotation of the dewatering motor) may be generated, which makes it impossible to perform high-speed rotation. The out of phase or control failure may occur. In order to avoid such a phenomenon, it is conceivable to drive both the washing motor and the dewatering motor simultaneously in the same direction. However, since this method requires energy to rotate two motors, the efficiency may be lowered.

Thus, the tenth embodiment relates to a washing machine capable of increasing the energy efficiency during the dewatering operation.

SUMMARY

First Embodiment

The first embodiment relates to a motor that includes a ring-shaped stator and first and second rotors having different constants of the drive system and in which the drive constant of the first rotor is larger than the drive constant of the second rotor, and takes the following solution.

In other words, the stator has coils that generate respective rotating magnetic fields for independently driving the first and second rotors by being supplied with a composite current in which the currents corresponding to the first and second rotors are overlapped with each other. The number of rotating magnetic fields generated by the stator is different from the number of magnetic poles of the first and second rotors. Also, the winding factor of the coil with respect to the fundamental wave of the magnetic flux distribution of the rotor is larger than 0.5 in both the first rotor and the second rotor.

In the first embodiment, the number of rotating magnetic fields generated by the stator is different from the number of magnetic poles of the first rotor and the second rotor, and the winding factor of the coil with respect to the fundamental wave of the magnetic flux distribution of the rotor is greater than 0.5.

Accordingly, the torque may be efficiently generated by improving the winding factor of the coil. In particular, it is possible to obtain a high torque at low speed rotation.

The number of slots of the stator S, the number of poles of any one of the first rotor and the second rotor P1, and the number of poles of the other rotor P2 may be set to satisfy the following conditions.

$S=12n$ $P1=(6\pm1)\cdot2n$ $P2=(6\pm2)\cdot2n$ when n is an integer of 1 or more.

In this case, the number of slots of the stator, the number of poles of the first rotor, and the number of poles of the second rotor are set to satisfy the above-described conditions. This makes it possible to obtain a motor in which the winding factor of the coil with respect to the fundamental wave of the magnetic flux distribution of the rotor is greater than 0.5.

The winding factor of the coil with respect to the fundamental wave of the magnetic flux distribution of the rotor may be 0.7 or more in both the first rotor and the second rotor.

In this case, a high torque may be generated by setting the winding factor of the coil with respect to the fundamental wave of the magnetic flux distribution of the rotor to 0.7 or more.

The short pitch factor of the coil with respect to the harmonic of the magnetic flux distribution of the rotor may be set so that any one of the first rotor and the second rotor is less than one (1).

In this case, by setting the short pitch factor of the coil with respect to the harmonic of the magnetic flux distribution of the rotor to be less than one (1), the torque ripple may be reduced, thereby suppressing vibration and noise.

A washing machine may be configured to include a motor having at least one of the features described above, a drum that is connected to an inner rotor constituted by one of the first rotor and the second rotor and receives laundry, and a pulsator that is connected to an outer rotor constituted by the other one of the first rotor and the second rotor and stirs the laundry in the drum.

Then, the washing machine motor according to the first embodiment may be applied as a motor for independently driving the drum and the pulsator.

Second Embodiment

The second embodiment relates to a dual rotor type motor that is provided with an inner rotor and an outer rotor inside and outside a stator, and in which the stator is commonly used by the inner rotor and the outer rotor.

The stator includes a plurality of core elements arranged independently at regular intervals in the circumferential direction and a plurality of coils formed by winding wires around the core elements. The core element includes an inner tooth facing the inner rotor and an outer tooth facing the outer rotor. The inner rotor and the outer rotor have different numbers of poles. The number of core elements is smaller than the number of poles of any one of the inner rotor and the outer rotor.

In any one of the inner teeth and the outer teeth facing one rotor having a large number of poles among the inner rotor and the outer rotor, a tooth opening angle of the teeth may be set within a range of 180°/Nc to 257°/Nc (Nc is the number of core elements).

In other words, the motor is a dual rotor type motor in which one stator is shared between the inner rotor and the outer rotor having different numbers of poles, and the stator is provided with a plurality of independent core elements in the circumferential direction with a number less than the number of poles of these rotors. The tooth opening angle of the teeth of the core elements facing the rotor having a large number of poles is set within a range of 180°/Nc to 257°/Nc (Nc is the number of core elements).

By setting the tooth opening angle of the teeth of the core elements facing the rotor having a large number of poles within a predetermined range in this manner, as described later, in the dual rotor type motor, the cogging torque may be reduced and noise and the like may be suppressed to a level that is not inferior to that of the conventional washing machine.

Further, in the other one of the inner teeth and the outer teeth facing one rotor having a small number of poles among the inner rotor and the outer rotor, the tooth opening angle of the teeth may be set within a range of 96°/Nc to 342°/Nc (Nc is the number of core elements).

In this way, as described later, in the dual rotor type motor, mutual ripples may be reduced to a level that is not inferior to that of the conventional washing machine, so that noise and the like may be further suppressed.

Specifically, the present disclosure may be applied to a motor that satisfies the following conditions when the number of poles of one rotor having a small number of poles among the inner rotor and the outer rotor is P1 and the number of poles of the other rotor having a large number of poles is P2.

$$Nc=12n$$

$$P1=(6\pm1)\cdot 2n$$

$$P2=(6\pm 2)\cdot 2n$$

(n is an integer of 1 or more)

$$Nc=6n$$

$$P1=6n\pm 2$$

$$P2=6n\pm 4$$

(n is an integer of 2 or more)

$$Nc=6n$$

$$P1=6n\pm 4$$

$$P2=6n\pm 8$$

(n is an integer of 2 or more)

When the motor satisfies these conditions, cogging torque and mutual ripple may be effectively reduced.

Such a dual rotor type motor is suitable for a washing machine. In other words, in a washing machine including such a motor, a drum rotatably provided inside a tub, and a pulsator rotatably provided inside the drum, the drum may be connected to one of the inner rotor and the outer rotor and the pulsator may be connected to the other one of the inner rotor and the outer rotor.

In this way, it is possible to realize a washing machine capable of generating high torque in both the drum and the pulsator while suppressing noise and vibration.

In this case, the inner rotor may be connected to the drum, and the outer rotor may be connected to the pulsator.

This is more efficient because the pulsator, which requires a relatively high torque by the structure, can generate a relatively high torque.

Third Embodiment

One of the third embodiments relates to a washing machine motor that individually rotatably drives two shafts around a rotating shaft.

The motor includes an inner rotor rotatably connected to one of the shafts, an outer rotor rotatably connected to the other one of the shafts and disposed on an outer circumferential side of the inner rotor, and a stator disposed between the inner rotor and the outer rotor and commonly used in the inner rotor and the outer rotor. The stator includes a plurality of core elements, each of which is disposed separately and independently, a plurality of coils formed by winding wires around the core elements through insulators, and a resin molded body in which the core elements, the coils, and the insulators are embedded. The insulator is formed by a pair of annular connecting bodies which are axially connected to each other in a state where the plurality of core elements are sandwiched therebetween. At least one of the annular connecting bodies is a main connecting body integrally formed, and the main connecting body is provided with a plurality of core inserting portions into which the core elements are inserted at substantially equal intervals in the circumferential direction.

In other words, according to this motor, the insulator interposed between the plurality of core elements and the plurality of coils is constituted by a pair of annular connecting bodies which are axially connected to each other, and at least one of them is formed as a main connecting body integrally formed. Since the main connecting body is provided with the plurality of core inserting portions into which the core elements are interested at equal intervals in the circumferential direction, the plurality of core elements may be arranged at appropriate positions by repeating a simple operation of inserting the core elements into the core inserting portions one by one. Therefore, even a stator a dual rotor type motor having a large number of poles may be manufactured efficiently.

The other one of the annular connecting bodies may be configured by a subsidiary connecting body formed by connecting a plurality of arc-shaped connecting elements.

When the annular connecting body connected to the main connecting body is integrally formed, it is difficult to connect the annular connecting body because the annular connecting body cannot be inserted unless the core inserting portions of the annular connecting body match the positions of all the core elements. However, when the annular connecting body is formed as the subsidiary connecting body divided into the plurality of connecting elements, the connection becomes easy, so that it is possible to work efficiently.

In this case, the subsidiary connecting body may be provided with a terminal portion to which the end portion of the wire led out form the coil is connected.

By doing so, since the stable main connecting body is positioned at the lower side and the terminal portion disposed at the subsidiary connecting body is located at the upper side, the connecting process may be easily performed.

The main connecting body may be formed of an insulating resin and CFRP (carbon fiber reinforced plastic).

Then, since the rigidity of the main connecting body may further strengthened, deformation and breakage of the main connecting body may be suppressed, and handling may be further facilitated.

In this case, the resin constituting the CFRP may be made of the same kind of resin as the insulating resin.

By doing so, the integrity of the CFRP and the insulating resin is improved, so that the rigidity of the main connecting body may be further improved.

The plurality of coils may be formed by, for example, winding each of the six wires in a predetermined order around the plurality of core elements, flange portions protruding in the axial direction are provided on both edge portions of the outer periphery of a core holding structure formed by connecting the pair of annular connecting bodies, and three jumper leads of the wires may be arranged along each of the flange portions.

The height of the insulator and the stator in the axial direction may be reduced by arranging the three jumper leads on both flange portions for preventing the winding of the wires from collapsing. Therefore, the size of the motor may be reduced.

Inner core surface portions and outer core surface portions are formed on the inner circumferential surface and the outer circumferential surface of the core holding structure formed by connecting the pair of annular connecting bodies by exposing the core elements. The inner core surface portions are located inside the inner circumferential surface of the insulator and the outer core surface portions are located outside the outer circumferential surface of the insulator.

By doing so, since the inner core surface portions and the outer core surface portions are brought into contact with the mold when molding, the core elements may be precisely positioned in the radial direction and the roundness of the stator may be increased. As a result, the gap between the inner rotor and the outer rotor may be reduced, and the motor performance may be improved.

Two edge portions of any one of the inner peripheral side and the outer peripheral side of the adjacent core inserting portions may be connected by a connecting wall. The thickness of the central portion of the connecting wall portion may be thicker that both ends of the connecting wall portion when viewed in the axial direction.

By doing so, the rigidity of the main connecting body may be improved.

Further, both annular connecting bodies may be formed by a plurality of divided connecting bodies without using the integral main connecting body. Specifically, both the annular connecting bodies are formed by connecting a plurality of arc-shaped connecting elements in which the plurality of core inserting portions into which the plurality of core elements are inserted are provided at substantially equal intervals in the circumferential direction. Connecting portions between the connecting elements in one of the annular connecting bodies and connecting portions between the connecting elements in the other one of the annular connecting bodies are shifted in the circumferential direction.

In this case, since the connecting portions of the upper and lower annular connecting bodies are at different positions, even when both annular connecting bodies are composed of the plurality of connecting elements, they may be integrated and stably supported. Since the mold may be made smaller than the mold for molding the integral main connecting body, the cost of the mold may be greatly reduced.

Further, the number of connecting elements of one of the annular connecting bodies may be smaller than the number of connecting elements of the other one of the annular connecting bodies, and a terminal portion to which an end portion of the wire led out from the coil is connected may be disposed on the annular connecting body having a large number of the connecting elements.

In this way, by handling the terminal portion as the upper side, the annular connecting body having a small number of divisions and higher strength becomes the lower side, so that it may be stably supported and connecting process may be performed easily.

Another aspect of the third embodiment relates to a washing machine.

The washing machine includes a pulsator that is rotationally driven during washing, a drum that is rotationally driven during washing and dewatering, and the above-described motor. One of the shafts is connected to the drum, and the other one of the shafts is connected to the pulsator.

In the motor described above, the stator of the dual rotor type motor having a large number of pole may be efficiently produced, and a comparatively high torque may be obtained on the side of the inner rotor to which the drum is connected while avoiding the increase in the size of the motor, so that a washing machine capable of coping with various operation controls may be provided at low cost.

Another aspect of the third embodiment relates to the above-described method for manufacturing the washing machine motor.

The manufacturing method may include a first operation of forming a core holding structure by connecting the other one of the annular connecting bodies to the main connecting body after inserting the plurality of core elements into the core inserting portions, respectively, a second operation of forming a winding body by winding wires around the core elements covered with the insulator after setting the core holding structure on a winding machine, and a third operation of setting the winding body on a metal mold and molding using a thermosetting resin.

In other words, according to this manufacturing method, the core holding structure formed by a simple operation may be mechanically wound by a winding machine to form the winding body, and the winding body may be set on the metal mold and molded. Therefore, the motor may be manufactured relatively easily, and the productivity is excellent.

In the second operation, for example, the process for winding three wires simultaneously in the same operation is performed twice. The jumper wires of the three wires to be processed in the first time may be wired along one flange portion of the pair of flange portions protruding in the axial direction from both edge portions of the outer periphery of the core holding structure, and the jumper wires of the three wires to be processed in the second time may be wired along the other one of the flange portions.

By doing so, the jump wires generated at each winding processing may be efficiently wired, and the wiring structure of the wires may be simplified, so that the processing efficiency of the winding machine may be improved.

The main connecting body may be removably provided with, for example, an annular supporting portion connecting the plurality of core inserting portions, and a fourth operation of removing the annular supporting portion may be further included after the third operation.

In this way, since the rigidity of the main connecting body may be enhanced by the annular supporting portion, handling of the core holding structure and the winding body becomes easier during the winding process and the molding process. Further, the mold may be molded in a state in which deformation of the core holding structure and the like is suppressed, so that the motor quality may be improved.

A positioning structure may be provided between at least one of the inner circumferential surface and the outer circumferential surface of the winding body and the opposing surface of the metal mold facing the circumferential surface. The winding body may be molded in a state in which the winding body is positioned in the circumferential direction with respect to the metal mold by the positioning structure.

The positioning structure may include a concave portion formed on the core elements exposed on the circumferential surface and a convex portion formed on the metal mold to be coupled to the concave portion. Alternatively, the positioning structure may include a plurality of slot opening formed on the circumferential surface and an engaging protrusion formed on the metal mold to engage with the slot openings. In particular, the positioning structure may be provided between the inner circumferential surface of the winding body and the opposing surface of the metal mold facing the inner circumferential surface.

In this way, the winding body may be precisely positioned in the circumferential direction with respect to the metal mold.

A supporting structure may be provided in one of the inner circumferential surface and the outer circumferential surface of the core holding structure. The winding of the wires (or winding process) may be performed in a state in which the supporting portion is inserted.

The supporting structure may be formed by a groove portion formed in the core elements exposed at the circumferential surface, or may be formed as both edge portions of the core elements protruded from the circumferential surface.

By doing so, the core holding structure may be strongly supported, and the winding process may be performed stably.

Further, in the third operation, the winding body may be set in the metal mold so that the insulator facing the outer circumferential side of the winding body is in contact with the metal mold.

By doing so, the closeness between the inner circumferential surface of the winding body and the metal mold may be enhanced, thereby improving the roundness of the inner circumferential surface of the winding body.

Fourth Embodiment

The fourth embodiment relates to a motor controller of a washing machine including a rotatable drum for containing laundry, a pulsator that is provided concentrically with the rotation axis of the drum and stirs the laundry inside the drum, and a motor for independently rotating the drum and the pulsator.

A drum side inverter circuit connected to the motor and for rotationally driving the drum, a pulsator side inverter circuit connected to the motor and for rotationally driving the pulsator, a rotational speed detector for detecting rotational speeds of the drum and the pulsator respectively, and a controller for performing an operation control of the motor through the drum side inverter circuit and the pulsator side inverter circuit by a PWM-controlled electric signal using a command signal and a carrier wave may be further provided.

The drum side inverter circuit and the pulsator side inverter circuit are configured by connecting in parallel a plurality of inverters including upper-arm-side switching elements and lower-arm-side switching elements connected in series to each other.

The controller is configured to execute the synchronous control for substantially equalizing the detected rotational speeds of the drum and the pulsator, which are respectively detected by the rotational speed detector, the upper arm side short brake control in which all the upper-arm-side switching elements are turned on and all the lower-arm-side switching elements are turned off to apply the short brake to the motor, the lower arm side short brake control in which all the upper-arm-side switching elements are turned off and all the lower-arm-side switching elements are turned on to apply the short brake to the motor, and the lower arm side short brake period extension control in which the upper arm side short brake period for executing the upper arm side short brake control is shortened and the lower arm side short brake period for executing the lower arm side short brake control is extended without changing the length of the synchronous control period which is set by the PWM control based on the detected rotational speed every one cycle of the carrier wave and during which the synchronous control is performed in the deceleration process after the end of the dewatering process in which the drum and the pulsator are rotated in the same direction.

According to this configuration, the deceleration time when the drum and the pulsator are synchronously controlled to decelerate may be shortened.

In other words, one cycle of the carrier wave used for the PWM control includes the synchronous control period in which the synchronous control is performed according to the electric signal which is set by the PWM control based on the detected rotational speeds of the drum and the pulsator and the rotational speeds of the drum and the pulsator (specifically, motor) are adjusted, the upper arm side short brake period in which the short brake is applied to the motor by shorting the upper arm side of the inverter circuit, and the lower arm side short brake period in which the short brake is applied to the motor by shorting the lower arm side of the inverter circuit.

The controller performs the lower arm side short brake period extension control for shortening the upper arm side short brake period and extending the lower arm side short brake period without changing the length of the synchronous control period for these three periods.

Generally, since the upper arm side short brake is influenced by the power supply voltage, the brake effect is lower than that of the lower arm side short brake. Thus, by performing the lower arm side short brake period extension control, it is possible to extend the period for applying the lower arm side short brake having a large brake effect to the motor, and at the same time, perform the synchronous control appropriately.

As a result, the deceleration time when the drum and the pulsator are synchronously controlled and decelerated may be shortened.

In addition, by shortening the upper arm side short brake period, the risk that the regenerative current from the motor flows to the power supply and damages the power supply may be reduced.

In an embodiment of the motor controller of the washing machine, the carrier wave is a triangular wave, and the controller may be configured to extend the lower arm side short brake period by shifting a threshold for turning on the upper-arm-side switching elements, which is set by the command signal and the carrier wave in the PWM control, on the apex side of the triangular wave by the same magnitude.

In other words, by shifting the threshold value for the turning on the upper-arm-side switching elements by the same magnitude on the apex side of the carrier wave, the length of the synchronous control period in which a part of the upper-arm-side switching elements and a part of the lower-arm-side switching elements are turned on and the rotational speeds of the drum and the pulsator are made to be substantially equal to each other may be prevented from being changed, and the lower arm side short brake period extension control in which all the upper-arm-side switching elements are turned off and all the lower-arm-side switching elements are turned on may be extended.

As a result, the length of the synchronous control period is not changed, and the lower arm side short brake period may be extended.

In the motor controller of the washing machine, the controller may be configured to determine the length of the lower arm side short brake period based on the duty ratio of the upper-arm-side switching element having the smallest duty ratio in the PWM control among the upper-arm-side switching elements.

In other words, in the lower arm side short brake control, the duty ratio in the PWM control of the upper-arm-side switching elements is reduced because the period for turning on the upper-arm-side switching elements is shortened.

Therefore, the maximum length of the lower arm side short brake period that can be extended is until the duty ratio of the upper-arm-side switching element having the smallest duty ratio in the PWM control among the upper-arm-side switching elements is set to the duty ratio of 0%.

In the motor controller of the washing machine, the controller may be configured to determine the length of the lower arm side short brake period based on a difference between the detected rotational speeds of the drum and the pulsator and a predetermined target rotational speed.

According to this configuration, since the drum and the pulsator may be decelerated while comparing the detected rotational speeds of the drum and the pulsator with the predetermined target rotational speed, the drum and the pulsator may be quickly and accurately decelerated and stopped.

Further, when the detected rotational speed is higher than the target rotational speed and there is a possibility that the regenerative electric power from the motor is not completely consumed, the regenerative electric power from the motor may be appropriately consumed by lengthening the lower arm side short brake period.

In the motor controller of the washing machine, the drum side inverter circuit and the pulsator side inverter circuit are connected in parallel to each other, a voltage detector for detecting a DC voltage applied to the drum side inverter circuit and the pulsator side inverter circuit is provided, and the controller may be configured to lengthen the lower arm side short brake period as the detected voltage detected by the voltage detector becomes higher than the predetermined target voltage.

In other words, when all the regenerative electric power from the motor is not consumed, the electric potential on the motor becomes higher than the electric potential of the DC power supply, and the detected voltage detected by the voltage detector becomes high. Thus, as the detected voltage becomes higher than the target voltage, the regenerative electric power may be consumed by lengthening the lower arm side short brake period. As a result, the drum and the pulsator may be decelerated while appropriately consuming the regenerative electric power.

Fifth Embodiment

The fifth embodiment relates to a vertical type washing machine including a drum rotatably provided inside a tub, a pulsator rotatably provided on a bottom portion of the drum, a motor for individually driving the drum and the pulsator, and a controller for controlling the motor. The controller includes a double rotation control portion that independently rotates both the drum and the pulsator at the same time in any one of the washing process and the rinsing process.

In other words, according to the washing machine, since both the drum and the pulsator are synchronously independently rotated in the washing process or the rinsing process, water stream having various directions and flow rates may be generated in the drum, so that washing and rinsing may be effectively performed on various kinds of laundry while appropriately dispersing the laundry in water.

Specifically, the double rotation control portion may rotate the drum and the pulsator at different rotational speeds in the same direction.

In this way, the laundry may be smoothly moved to the outside or inside of the drum while rotating the washing machine, and washing and rinsing may be performed with a soft touch while appropriately dispersing the laundry in water.

In this case, only the drum between the drum and the pulsator is rotationally driven by the motor, and the pulsator may be rotated in conjunction with the rotation of the drum.

By doing so, while suppressing the power consumption, the pulsator may be rotated at a lower rotational speed in the same direction as the drum while accompanying the rotation of the drum.

Further, the double rotation control portion may rotate the drum and the pulsator while reversing the drum and the pulsator at different periods.

Even in this case, washing and rinsing may be effectively performed on various types of laundry while appropriately dispersing the laundry in water.

The double rotation control portion may rotate the pulsator while reversing the pulsator in a state in which the drum is rotated in the same direction.

By doing so, washing and rinsing may be effectively performed on various types of laundry while appropriately dispersing the laundry in water, and the washing process and the rinsing process may be efficiently performed with a small amount of water.

Further, the double rotation control portion may make at least one of the starting time until the reaching the target rotational speed and the ending time until stopping from the target rotational speed different between the drum and the pulsator.

By doing so, the starting may be efficiently performed according to the inertia force of the drum or the pulsator, so that power consumption may be reduced.

In this case, the double rotation control portion may make the timing for starting the drive according to the motor different between the drum and the pulsator.

By doing so, the driving times by the motor in the drum and the pulsator are made equal to each other, so that even when there is a difference in the period during which the drum and the pulsator rotate simultaneously at the target rotational speed, the period may be optimized by matching the timing at which the drum and the pulsator reach the target rotational speed.

In this case, the double rotation control portion may make at least one of the driving period and the driving stop period according to the motor different between the drum and the pulsator.

By doing so, the length and timing of the rotation period and the stop period may be matched with each other in the drum and the pulsator, and the washing process and the rinsing process may be performed efficiently.

Further, the double rotation control portion may intermittently rotate the drum and the pulsator in opposite directions to each other, and at the same time, may make at least one of the rotation periods of rotations which are performed intermittently and the stop periods between these rotation periods different in at least one of the drum and the pulsator.

When the drum and the pulsator are intermittently rotated in opposite directions to each other, there is a tendency that a water stream stagnates inside the drum, thereby causing laundry to be stagnated. However, by varying the lengths of the respective rotation periods and the stop periods in this manner, it is possible to prevent a state in which the water stream stagnates inside the drum, and the laundry may be entirely moved.

Further, the double rotation control portion may intermittently rotate the drum and the pulsator in opposite directions to each other, and at the same time, may make the rotational speeds of the rotations to be intermittently performed different in at least one of the drum and the pulsator.

Even in this case, the same effect as the case where the lengths of the respective rotation periods and the respective stop periods are different may be obtained.

Sixth Embodiment

The sixth embodiment relates to a washing machine including a rotatable drum for accommodating laundry, a pulsator that is provided concentrically with the rotation axis of the drum and stirs the laundry inside the drum, a motor for independently rotating the drum and the pulsator, and an inverter for driving the motor.

The washing machine includes a load detector for detecting a load applied to the motor when the motor is operated and a controller for controlling the operation of the drum and the pulsator by applying an electric signal to the motor through the inverter based on the detected load detected by the load detector.

The controller is configured to alternately execute the first opposite drive mode in which the drum is rotated forward and the pulsator is rotated in reverse and the second opposite drive mode in which the drum is rotated in reverse and the pulsator is rotated forward while the stop period is interposed therebetween, and at the same time, to execute the load reduction adjustment control for controlling the timing of at least one of ON and OFF of at least one of the drum and the pulsator so that the detected load becomes equal to or less than a predetermined target load.

According to this configuration, the load applied to the motor may be reduced by using the inertia force of the laundry inside the drum.

Specifically, when the first or second opposite drive mode is turned on and the drum and the pulsator rotates in the opposite direction, the laundry inside the drum is rotated according to either the drum or the pulsator. As a result, an inertia force is generated in the laundry in the drum. Then, when switching to the first or second opposite drive mode, the timing of turning on or off the drum or the pulsator is controlled to reverse the rotational direction of the drum or the pulsator by using the inertia force of the laundry.

For example, when the laundry is rotating along the rotational direction of the pulsator, the rotational direction of the drum may be reversed by using the inertia force of the laundry by turning on the drum faster than the pulsator and reversing the rotational direction. As a result, when the rotational direction of the drum or the pulsator is reversed, the load applied to the motor is reduced.

In the washing machine, the load reduction adjustment control may be performed such that, after the stop period has elapsed, when the first opposite drive mode or the second opposite drive mode is turned on, any one of the drum and the pulsator is turned on, and the other one of the drum and the pulsator is turned on after a first predetermined time has elapsed.

According to this configuration, when the first or second opposite drive mode is turned on, one of the drum and the pulsator may be turned on earlier than the other. Thus, either the drum or the pulsator may be reversed by using the inertia force of the laundry. For example, when the laundry follows the pulsator and is rotated in the rotational direction of the pulsator, by turning on the drum earlier than the pulsator and reversing the rotational direction, the rotational direction of the drum may be reversed before the rotational direction of the laundry is reversed by the pulsator.

Therefore, when reversing the rotational direction of the drum, the inertia force of the laundry may be used, which is directed in the same direction as the rotational direction of the drum after the drum is reversed. As a result, when the rotational direction of the drum or the pulsator is reversed, the load applied to the motor may be more efficiently reduced.

In addition, in the washing machine, the load reduction adjustment control may be performed such that, when the first opposite drive mode or the second opposite drive mode is turned off before entering the stop period, any one of the drum and the pulsator is turned off, and the other one of the drum and the pulsator is turned off after a second predetermined time has elapsed.

According to this configuration, when the first or second opposite drive mode is turned off, one of the drum and the pulsator is turned off later than the other one, in other words, one of the drum and the pulsator is rotated longer than the other one, so that the laundry may have a stronger inertia force.

For example, in a case where the laundry follows and is rotated with the pulsator, when the pulsator is turned off later than the drum, a large inertia force is left in the laundry in the same direction as the rotational direction of the pulsator. Therefore, when the rotational direction of the drum is reversed, the larger inertia force of the laundry is left in the same direction as the rotational direction of the drum after the drum is reversed. Thus, the rotational direction of the drum may be reversed by using the inertia force of the laundry. In this manner, when the rotational direction of the drum or the pulsator is reversed, the load applied to the motor may be more effectively reduced.

In the washing machine, the controller may be configured to execute the load reduction adjustment control when the stop period is shorter than a predetermined reference time.

In other words, when the time period (hereinafter referred to as the reference time) is set so long as the inertia force of the drum and the pulsator is sufficiently reduced as the stop period, the load applied to the motor when reversing the rotational directions of the drum and the pulsator does not increase to such an extent that faulty starting of the motor occurs. Therefore, only when the stop period is shorter than the reference time, the load reduction adjustment control is executed so that the load reduction adjustment control may be executed appropriately.

In the washing machine, when the laundry contained in the drum rotates in the same direction as the rotational direction of the drum, the rotation of the drum is decelerated to stop during the stop period, and after the stop, the first opposite drive mode or the second opposite drive mode may be turned on.

In other words, when the laundry is stuck to the drum, the laundry may rotate along the rotational direction of the drum. However, in this case, since the inertia force of the laundry is applied to the drum in addition to the inertia force of the drum itself, an excessive load is applied to the motor when reversing the rotational direction of the drum.

Thus, when the laundry is rotating in the same direction as the rotational direction of the drum, the rotation of the drum is decelerated to stop in the stop period between the first opposite drive mode and the second opposite drive mode, and after the stop, the next first opposite drive mode or the next second opposite drive mode is turned on. As a result, the rotational direction of the drum is reversed in a state in which there is no inertia force on the drum, so that an excessive load may be prevented from being applied to the motor.

The washing machine is configured so that one of the drum and the pulsator is turned on, and after the first predetermined time has elapsed, the other one of the drum and the pulsator is turned on when the first opposite drive mode or the second opposite drive mode is turned on. The washing machine further includes a vibration detector for detecting vibration applied to the washing machine. The controller may be configured to shorten the first predetermined time when the detected vibration detected by the vibration detector is larger than a predetermined vibration.

In other words, in a case where only one of the drum and the pulsator rotates in the same direction as the rotational direction of the laundry during the first predetermined time, when the laundry is bunched, a strong vibration may be applied to the washing machine due to the centrifugal force of the laundry during the first predetermined time.

Therefore, when a vibration larger than the predetermined vibration is detected by the vibration detector, the first predetermined time is shortened so that the water stream is generated in a direction opposite to the rotational direction of the laundry early, the rotation of the laundry is decelerated by the water stream, and the centrifugal force acting on the washing machine from the laundry is reduced. As a result, vibration may be prevented from being applied to the washing machine.

In addition, the washing machine is configured so that one of the drum and the pulsator is turned off, and after the second predetermined time has elapsed, the other one of the drum and the pulsator is turned off when the first opposite drive mode or the second opposite drive mode is turned off. The washing machine further includes a vibration detector for detecting vibration applied to the washing machine. The controller may be configured to shorten the second predetermined time when the detected vibration detected by the vibration detector is larger than the predetermined vibration.

In other words, in a case where one of the drum and the pulsator is rotated longer the other one to generate a larger inertia force in the laundry during the second predetermined time, when the laundry is bunched, a strong vibration may be applied to the washing machine due to the centrifugal force of the laundry during the second predetermined time. Therefore, when a vibration larger than the predetermined vibration is detected by the vibration detector, the second predetermined time is shortened, thereby reducing the centrifugal force due to the rotation of the laundry. As a result, the vibration of the washing machine may be reduced.

Another aspect of the sixth embodiment relates to a washing machine including a rotatable drum for accommodating laundry, a pulsator that is provided concentrically with the rotation axis of the drum and stirs the laundry inside the drum, a motor for independently rotating the drum and the pulsator, and an inverter for driving the motor.

The washing machine further includes a load detector for detecting a load applied to the motor when the motor is operated and a controller for controlling the operation of the drum and the pulsator by applying an electric signal to the motor through the inverter based on the detected load detected by the load detector.

The controller is configured to alternately execute the first opposite drive mode in which the drum is rotated forward and the pulsator is rotated in reverse and the second opposite drive mode in which the drum is rotated in reverse and the pulsator is rotated forward while the stop period is interposed therebetween, and at the same time, when the laundry contained in the drum rotates in the same direction as the rotational direction of the drum, to decelerate and stop the rotation of the drum during the stop period, and after the stop, to turn on the next first opposite drive mode or the next second opposite drive mode.

In other words, when the laundry is stuck to the drum, the laundry may rotate along the rotational direction of the drum. However, in this case, since the inertia force of the laundry is applied to the drum in addition to the inertia force of the drum itself, an excessive load is applied to the motor when reversing the rotational direction of the drum.

Thus, when the laundry is rotating in the same direction as the rotational direction of the drum, the rotation of the drum is decelerated to stop in the stop period between the first opposite drive mode and the second opposite drive mode, and after the stop, the next first opposite drive mode or the next second opposite drive mode is turned on. As a result, the rotational direction of the drum is reversed in a state in which there is no inertia force on the drum, so that an excessive load may be prevented from being applied to the motor.

Seventh Embodiment

In the washing machine according to the seventh embodiment, the unbalance amount is periodically changed by intentionally giving a predetermined speed difference between the drum and the pulsator during the dewatering operation of the drum, and thereafter, when the unbalance amount becomes minimum, the rotation control is performed so that the speeds of the drum and the pulsator are the same.

In other words, the washing machine includes a rotatable drum for accommodating laundry, a pulsator that is provided concentrically with the rotation axis of the drum and stirs the laundry inside the drum, and a motor for independently rotating the drum and the pulsator.

The motor includes a first rotor for rotating the pulsator, a second rotor for rotating the drum, an unbalance detector for detecting an unbalance amount of at least one of the drum and the pulsator during rotation, and a controller for controlling the rotational operation of the first and second rotors based on the detected value of the unbalance amount. The controller periodically changes the unbalance amount by giving a predetermined rotational speed difference between the drum and the pulsator during the dewatering operation of the laundry, and when the unbalance amount becomes minimum, performs the rotation control so that the speeds of the drum and the pulsator are equal to each other.

According to this washing machine, the controller periodically changes the unbalance amount by giving a predetermined speed difference between the drum and the pulsator, and performs the speed control so that the speeds of the drum and the pulsator are equal to each other at the timing when the unbalance amount is minimized. As a result, the drum and the pulsator may be rotated at the same speed with minimum unbalance. In other words, the occurrence of unbalance may be prevented. In addition, since the rotation of the drum or the pulsator is not stopped and the occurrence of unbalance may be prevented, the dewatering time may be greatly shortened.

The unbalance detector is configured to detect an unbalance amount of the drum and the pulsator while the drum and the pulsator are rotating at the same speed. The controller may be configured to perform the rotation control when the detected value of the unbalance amount of at least one of the drum and the pulsator is larger than a predetermined value and the difference between the unbalance moment of the drum and the unbalance moment of the pulsator calculated on the basis of the detected value of the unbalance amount is equal to or smaller than a predetermined value.

In such a case, whether to perform the rotation control is determined based on the unbalance amount and the unbalance moment. By providing such a determination criterion, the rotation control may be performed under conditions where the suitability and the degree of necessity are higher, so that the occurrence of unbalance may be prevented more effectively.

The unbalance detector may be configured to detect an unbalance amount of the drum and the pulsator while the drum and the pulsator rotate at the same speed, and the controller may be configured to selectively change the method of removing unbalance according to the detected value of the unbalance amount.

In such a case, the unbalance removing method having higher suitability and higher necessity may be applied for the controller to selectively change the unbalance removing method according to the detected value of the unbalance amount. As a result, a method that can prevent unbalance more effectively may be selected, and the dewatering time may be further shortened.

The controller may be configured to increase the rotational speeds of the drum and the pulsator while maintaining the rotational speeds of the drum and the pulsator at the same value without performing the rotation control when the detected values of the unbalance amounts of both the drum and the pulsator are lower than the predetermined value.

By doing so, when the unbalance amount is equal to or less than the predetermined reference value, the rotational speeds of the drum and the pulsator are accelerated without performing the rotation control, so that the dewatering time may be shortened.

Further, the controller may be configured to change the unbalance state by giving a predetermined speed variation to one of the drum and the pulsator having a large unbalance moment when the detected value of the unbalance amount of any one of the drum and the pulsator is larger than the predetermined value and the difference between the unbalance moment of the drum and the unbalance moment of the pulsator calculated on the basis of the detected value of the unbalance amount is larger than the predetermined value.

By doing so, the controller applies a predetermined speed control to the drum or the pulsator based on the difference in unbalance moment, so that the unbalance may be removed in a short time without stopping the drum or the pulsator. As a result, the dewatering time may be greatly shortened.

Another aspect of the seventh embodiment relates to a control method of a washing machine including a rotatable drum for accommodating laundry, a pulsator that is provided concentrically with the rotation axis of the drum and stirs the laundry inside the drum, and a motor for independently rotating the drum and the pulsator.

The control method includes operations of periodically changing an unbalance amount by applying a predetermined speed difference between the drum and the pulsator during the dewatering operation of the laundry, detecting an unbalance amount of at least one of the drum and the pulsator during the relative rotation period, and making the speeds of the drum and the pulsator equal when the detected value of the unbalance amount becomes minimum.

According to this control method, the drum and the pulsator may be rotated at the same speed with the detected value of the unbalance being the minimum. In other words, the occurrence of unbalance may be prevented. In addition, since the rotation of the drum or the pulsator is not stopped and the occurrence of unbalance may be prevented, the dewatering time may be greatly shortened.

Eighth Embodiment

In the eighth embodiment, the following solution is devised for a washing machine including a drum for accommodating laundry, a pulsator for stirring the laundry inside the drum, and a motor for independently rotating the drum and the pulsator.

In other words, the motor includes an annular stator, an outer rotor that is disposed on the outer side of the stator and rotates the pulsator, an inner rotor that is disposed on the inner side of the stator and rotates the drum, a speed detector for detecting the rotational speeds of the inner rotor and the outer rotor, and a controller for controlling rotational operations of the inner rotor and the outer rotor. The controller is configured to control the rotational operation of the outer rotor so that the rotational speed of the outer rotor is substantially coincident with a target speed when the rotational speed of the inner rotor detected by the speed detector is set to the target speed during the dewatering operation of the drum.

In this configuration, during the dewatering operation of the drum, the rotational speed of the inner rotor is set to the target speed, and the rotational speed of the outer rotor is made to coincide with the target speed. In this way, during the dewatering operation, the outer rotor and the inner rotor are operated in synchronism with each other to suppress the speed fluctuation, thereby reducing the damage to the clothes of the laundry.

Specifically, when both the outer rotor and the inner rotor are to be accelerated to the target rotational speed during the dewatering operation, the two motors are controlled to the target rotational speed with different accelerations according to their performance differences. Therefore, it is difficult to increase the rotational speeds of the outer rotor and the inner rotor at the same speed until the target rotational speed is reached.

On the other hand, in this washing machine, the inner rotor is accelerated to the target rotational speed, while the outer rotor is controlled to follow the rotational speed of the reference inner rotor as the target speed. Therefore, the speed difference between the outer rotor and the inner rotor may be reduced. Further, since the outer rotor is followed with the inner rotor as a reference, the control stability may be improved without changing the rotor to be controlled in a random period.

A phase calculator for calculating a phase difference of the outer rotor with respect to the inner rotor based on the rotational speeds of the outer rotor and the inner rotor detected by the speed detector is provided. The controller may be configured to control the rotational operation of the outer rotor so that the phase difference becomes smaller than a predetermined value when the phase difference calculated by the phase calculator is larger than the predetermined value during the dewatering operation of the drum.

In this configuration, when the phase difference of the outer rotor with respect to the inner rotor is larger than the predetermined value, the phase difference may be reduced by controlling the rotational operation of the outer rotor.

Therefore, before the laundry laid across the drum and the pulsator is pulled by the positional deviation between the drum and the pulsator, the positional deviation may be eliminated, thereby reducing the damage to the clothes of the laundry.

Ninth Embodiment

In the ninth embodiment, the following solution is devised for a washing machine including a drum for accommodating laundry, a pulsator for stirring the laundry inside the drum, and a motor for independently rotating the drum and the pulsator.

In other words, the motor includes an annular stator, an outer rotor that is disposed on the outer side of the stator and rotates the pulsator, an inner rotor that is disposed on the inner side of the stator and rotates the drum, a speed detector for detecting the rotational speeds of the inner rotor and the outer rotor, and a controller for controlling rotational operations of the inner rotor and the outer rotor. When the controller identifies that there is no phenomenon that the pulsator follows and is rotated with the drum due to the laundry while the rotational speed is being increased by synchronously operating the outer rotor and the inner rotor during the dewatering operation of the drum, the controller may be configured to stop supplying electric power to the motor for rotating the outer rotor, thereby rotating the pulsator freely.

In this configuration, when it is identified that the following rotation of the pulsator caused by the laundry is lost during the dewatering operation of the drum, the pulsator is made to rotate freely.

As a result, the laundry rotating along with the drum rubs against the pulsator, which rotates freely, to cause the pulsator to be rotated along with the laundry, so that the laundry is not damaged. At the same time, the supply of the electric power to the motor for rotating the outer rotor is stopped to reduce power consumption.

The controller may be configured to identify that the phenomenon that the pulsator follows and is rotated with the drum due to the laundry is lost when the variation of the rotational speed of the outer rotor detected by the speed detector with respect to the set rotational speed of the outer rotor is greater than a predetermined value.

In this configuration, it is identified whether or not there is the following rotation of the pulsator from the fluctuation of the rotational speed of the outer rotor.

As a result, it is possible to easily identify whether or not there is the following rotation of the pulsator.

Further, a current detector for detecting a current being supplied to the motor may be provided. The controller may be configured to identify that when a rotational coordinate system current converted from the current detected by the current detector into the rotational coordinate system becomes smaller than a predetermined amount, the phenomenon that the pulsator follows and is rotated with the drum due to the laundry is eliminated.

In this configuration, it is identified whether or not there is the following rotation of the pulsator from the current to be supplied to the motor.

As a result, it is possible to easily identify whether or not there is the following rotation of the pulsator.

In addition, when the inner rotor is decelerated from the maximum rotational speed to a predetermined rotational speed, the controller may be configured to resume control of the rotational operation of the outer rotor to synchronously operate the outer rotor and the inner rotor, thereby decelerating the rotational speed.

In this configuration, the synchronous operation of the outer rotor and the inner rotor is resumed when the inner rotor for rotating the drum is decelerated to a predetermined rotational speed after the pulsator is rotated freely.

Thus, at the end of the dewatering process, the laundry rotating along with the drum rubs against the pulsator that is rotated freely to cause the pulsator to be rotated along with the laundry, thereby preventing the laundry from being damaged.

In this case, the controller may be configured to use the rotational speed of the outer rotor as the predetermined rotational speed when the controller identifies that the phenomenon that the pulsator follows and is rotated the drum due to the laundry is eliminated.

In this configuration, the pulsator is rotated again at the rotational speed when the pulsator is rotated freely.

Therefore, the pulsator may be rotated at the proper timing according to the weight, condition, kind, etc. of the laundry, and the damage to the clothes of the laundry may be reduced.

Tenth Embodiment

In the washing machine according to the tenth embodiment, the drum and the pulsator are independently rotatable. During the dewatering operation of the laundry, the drum is controlled to rotate while the pulsator is rotated freely. On the other hand, when it is identified that the phenomenon that the pulsator follows and is rotated with the drum due to the laundry occurs, the pulsator is switched from the rotation free state to the torque control mode.

In other words, the washing machine includes a rotatable drum for accommodating laundry, a pulsator that is provided concentrically with the rotation axis of the drum and stirs the laundry inside the drum, a motor for independently rotating the drum and the pulsator, and a controller for controlling the rotation of the motor. The controller controls the drum to rotate in a state in which the pulsator is rotated freely by stopping driving the pulsator in accordance with the motor, and, when it is identified that the phenomenon that the pulsator follows and is rotated with the drum due to the laundry occurs, switches the pulsator from the rotation free state to the torque control mode in which the torque of the pulsator is controlled by giving a torque command value.

According to the washing machine having this configuration, since the controller controls the drum to rotate in a state where the pulsator is rotated freely during the dewatering operation, the consumed energy for driving the pulsator may be greatly reduced.

Further, the controller is configured to switch the pulsator to be positively torque-controlled from the rotation free state when it is identified that the phenomenon that the pulsator follows and is rotated with the drum occurs. When the phenomenon that the pulsator follows and is rotated with the drum occurs, due to the resist force generated when the counter electromotive force on the pulsator side and the control current on the drum side influence each other, the load on the drum side motor is increased and the energy consumption of the washing machine is increased. Therefore, by positively controlling the torque of the pulsator, it is possible to reduce the total energy consumption of the washing machine.

The controller may be configured to perform the weak field control by setting the torque command value according to the torque control to be equal to or less than the driven torque of the pulsator and by applying a predetermined d-axis current.

The controller may be configured to control the torque command value according to the torque control as follows.
torque command value=0

In this way, when the torque command value is set to be equal to or smaller than the driven torque of the pulsator, for example, when the torque command value of the driven torque is given, the rotation of the pulsator being rotated along with the drum may be positively supported, and the load of the following rotation may be reduced.

Thus, the energy consumption of the washing machine as a whole may be reduced. Further, by making the torque command value to be lower than the driven torque of the pulsator, the energy above the consumed energy according to the driven torque is not required, and therefore, the consumed energy is not increased.

In addition, since the weak field control is executed, the counter electromotive force induced by the phenomenon that the pulsator follows and is rotated with the drum (hereinafter simply referred to as following rotation of the pulsator) may be suppressed, so that the motor can be rotated at a higher speed. In other words, a washing machine capable of stable operation up to the high-speed range during the dewatering operation may be realized.

As described above, by setting the torque command value on the pulsator side to "0", the resist force generated when the counter electromotive force on the pulsator side and the control current on the drum side influence each other may be suppressed and the load on the motor (drum side) may be reduced. Therefore, it is possible to reduce the total consumption energy of the washing machine.

A speed detector for detecting the rotational speed of the pulsator may be provided. The controller may be configured to identify that the phenomenon that the pulsator follows and is rotated with the drum occurs when the rotational speed of the pulsator detected by the speed detector reaches a predetermined threshold value.

Further, it is preferable that the predetermined threshold value is as low as possible if it is a rotational speed at which the pulsator can be controlled. For example, when the control is performed using a hall sensor, 10 rpm is set as the predetermined threshold value. However, the predetermined threshold value is not limited to 10 rpm, and the predetermined threshold value may be arbitrarily set.

As described above, by using the speed detector for identifying whether the following rotation of the pulsator occurs or not, it is possible to make an identification based on a more directly detected value.

In this case, after switching the torque control mode, the controller may be configured to cause the pulsator to return to the rotation-free state when the rotational speed of the pulsator detected by the speed detector becomes the predetermined threshold value or less.

According to this configuration, after the controller switches to the torque control mode, for example, when the laundry is released, the following rotation is released, and the rotational speed of the pulsator becomes the predetermined speed or less, the pulsator may be returned to the rotation-free state. Therefore, control instability may be prevented at the extremely low speed.

Advantageous Effects

According to the first embodiment, the torque may be efficiently generated by improving the winding factor of the coil.

According to the second embodiment, the cogging torque and mutual ripple may be reduced, and two shafts may be driven with high torque while effectively suppressing noise and vibration.

According to the third embodiment, even a stator of a dual rotor type motor having a large number of poles may be efficiently manufactured, and a washing machine capable of coping with various operation controls may be provided at low cost.

According to the fourth embodiment, while performing the synchronous control, the regenerative electric power from the motor is appropriately consumed by the lower arm side short brake with a larger brake effect than the upper arm side short brake and the brake is applied to the motor so that the drum and the pulsator may be relatively quickly stopped. As a result, it is possible to shorten the deceleration time when the drum and the pulsator are synchronously controlled to decelerate, while appropriately consuming the regenerative electric power from the motor.

According to the fifth embodiment, various types of laundry may be appropriately and effectively washed.

According to the sixth embodiment, the rotational direction of the drum or the pulsator may be reversed by using the inertia force of the laundry inside the drum. Therefore, when the rotational direction of the drum or the pulsator is reversed, the load applied to the motor is reduced. As a result, the starting failure of the motor may be prevented.

According to the seventh embodiment, the unbalance is controlled by the rotation control of the drum and the pulsator, whereby the occurrence of unbalance may be prevented more stably.

According to the eighth embodiment, the outer rotor and the inner rotor are synchronously operated during the dewatering operation, thereby suppressing the speed fluctuation. Therefore, the damage to clothes of the laundry may be reduced.

According to the ninth embodiment, when it is identified that the phenomenon of the following rotation of the pulsator is lost during the dewatering operation of the drum, the pulsator is made rotationally free. Therefore, the dewatering operation may be performed while reducing the damage to clothes of the laundry and saving the electric power.

According to the tenth embodiment, when it is identified that the following rotation of the pulsator occurs during the dewatering operation of the washing machine, the pulsator is switched from the rotation-free state to the torque control mode. Therefore, the energy efficiency during the dewatering operation may be increased and the control safety may be improved in the high speed region.

BRIEF DESCRIPTION OF THE DRAWINGS

FIG. 7 is a diagram illustrating a relationship between constants, the number of slots and the number of poles of a motor according to the first embodiment.

FIG. 10 is a diagram illustrating a winding factor of a conventional motor with respect to a fundamental wave of the magnetic flux distribution of a rotor.

FIG. 11 is a diagram illustrating a winding factor of the motor according to the present embodiment with respect to a fundamental wave of the magnetic flux distribution of a rotor in the motor according to the first embodiment.

FIG. 16 is a diagram comparing the short pitch factors with respect to the harmonics of the magnetic flux distribution of the rotor.

DETAILED DESCRIPTION

Hereinafter, embodiments of the present invention will be described in detail with reference to the drawings. However, the following description is merely exemplary in nature and is not intended to limit the invention, its application, or its use.

First, the configuration of a washing machine and a motor common to first to tenth embodiments will be described. Thereafter, each of the first to tenth embodiments will be individually described.

(Overall Configuration of Washing Machine)

Figure 1:
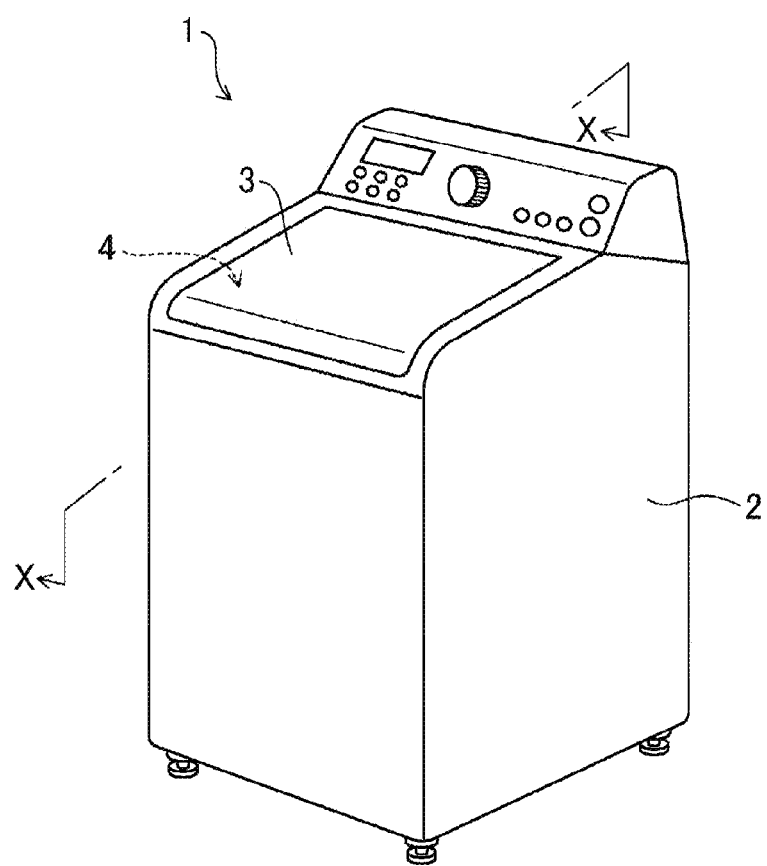
FIG. 1 is a perspective view schematically illustrating a washing machine.

FIG. 1 illustrates a washing machine 1 of the present embodiment. The washing machine 1 is a fully automatic washing machine in which processes of washing, rinsing, and dewatering are performed by automatic control. The washing machine 1 has a vertically long rectangular boxshaped main body 2 and a loading inlet 4 which is formed at a top portion of the main body 2 and is opened and closed by a lid 3. The loading and unloading of the laundry is carried out through the loading inlet 4 (so-called vertical type washing machine). At the rear of the loading inlet 4, there are provided various switches operated by the user and a display portion.

Figure 2:
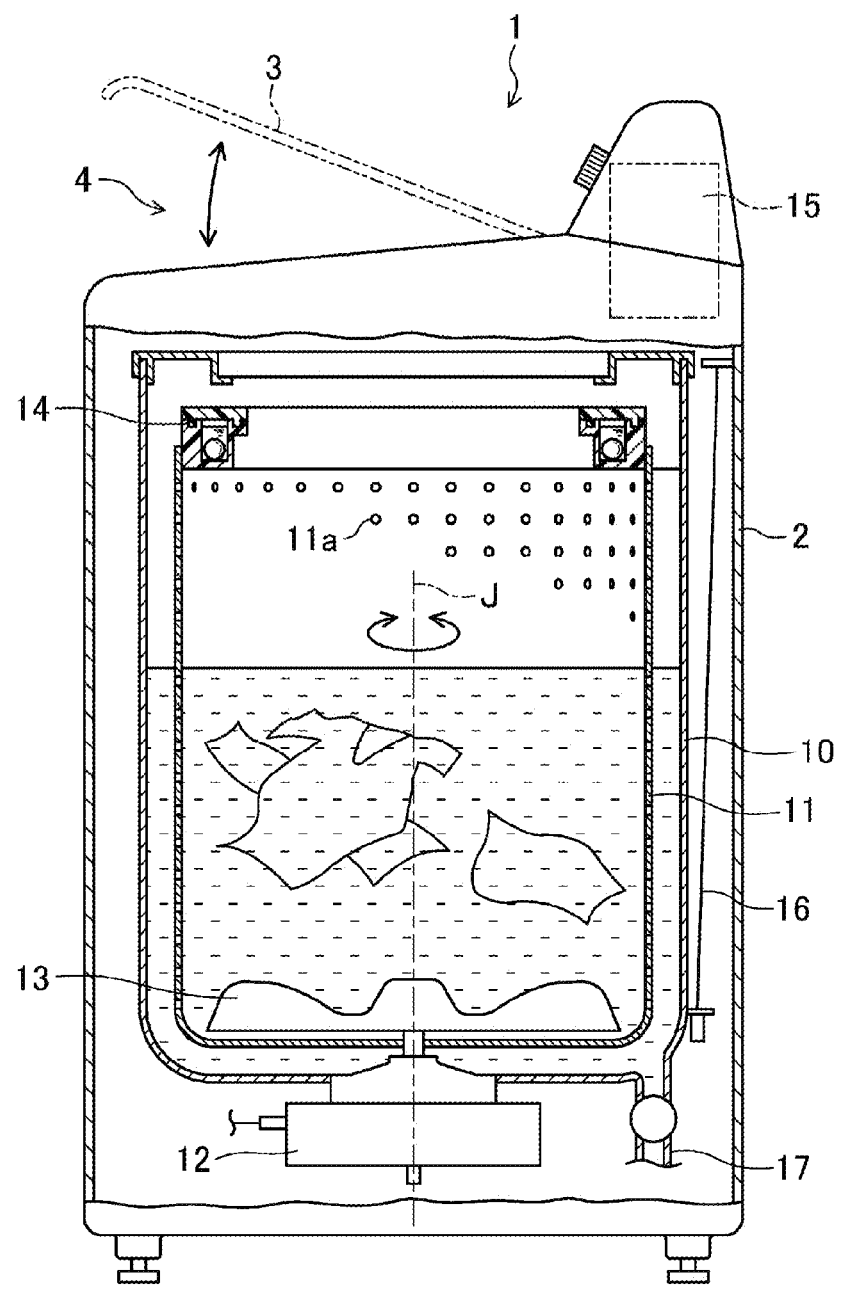
FIG. 2 is a schematic cross-sectional view taken along a line X-X in FIG. 1.

As illustrated in FIG. 2, a tub 10, a drum 11, a motor 12, a pulsator 13, a balancer 14, a controller 15, or the like are provided inside the main body 2. Particularly, in the washing machine 1, the motor 12 is being studied, and is formed in a compact size to exhibit an appropriate performance according to each process of the washing machine 1. The motor will be described in detail below.

The tub 10 is a cylindrical container having a bottom which is capable of storing water and is suspended inside the main body 2 by a plurality of suspension members 16 in a state in which an opening faces the upper loading inlet 4. Water can be supplied to the tub 10 through a water supply mechanism (not illustrated). A drain pipe 17, which is controlled to be opened and closed by a valve, is connected to a lower portion of the tub 10. Unnecessary water is drained to the outside of the washing machine 1 through the drain pipe 17.

The drum 11 is a cylindrical container having a bottom for accommodating laundry, which is one step smaller than the tub 10. The drum 11 is accommodated in the tub 10 so that an opening of the drum 11 faces the loading inlet 4 and the drum 11 can rotate around a vertical axis J extending in the vertical direction. The entire process of the laundry is performed inside the drum 11. In the circumferential wall of the cylindrical drum 11, a plurality of water discharge holes 11a are formed over the entire surface (only partially shown in FIG. 2). A balancer 14 is provided in the opening of the drum 11. The balancer 14 is an annular member having a plurality of balls or viscous fluid therein, and adjusts the imbalance in weight balance caused by the bias of the laundry when the drum 11 is rotated. A disk-shaped pulsator 13 having stirring blades is rotatably disposed on the top surface of the bottom of the drum 11.

The controller 15 is composed of hardware such as a CPU, a ROM, etc., and software such as control program, etc. and comprehensively controls the processes performed in the washing machine 1. The controller 15 is electrically connected to various switches, the motor 12, the valve, and the like. According to the user's instruction, the control program performs a washing or a dewatering operation to execute washing, rinsing, and dewatering processes.

For example, generally, in the washing or rinsing process, the motor 12 rotationally drives the pulsator 13 while reversing the pulsator 13 at predetermined intervals, thereby stirring the laundry together with water or a detergent. In the dewatering process, the motor 12 drives the drum 11 to rotate at a high speed in a predetermined direction so that the laundry is pushed against the circumferential wall and dewatered by the action of the centrifugal force.

However, in the washing machine 1, the drum 11 is rotatably driven together with the pulsator 13 during the washing or rinsing process in order to perform a more advanced operation control.

(Motor)

The motor 12 has a flat cylindrical outer appearance whose diameter is smaller than the tub 10, and is assembled on the lower side of the tub 10 so that the vertical axis J passes through the center thereof.

Figure 3:
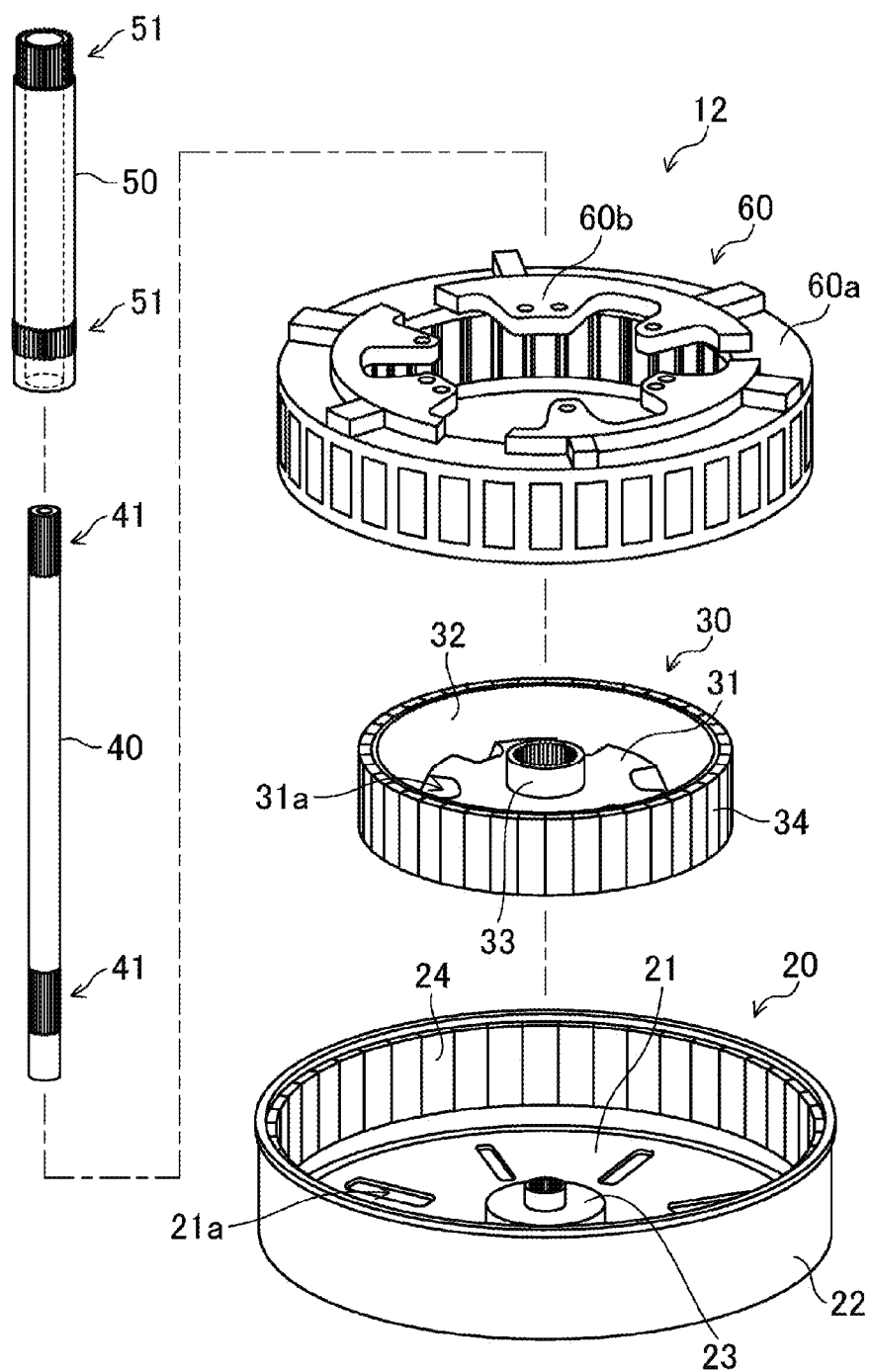
FIG. 3 is an exploded perspective view illustrating a main part of a motor.
Figure 4:
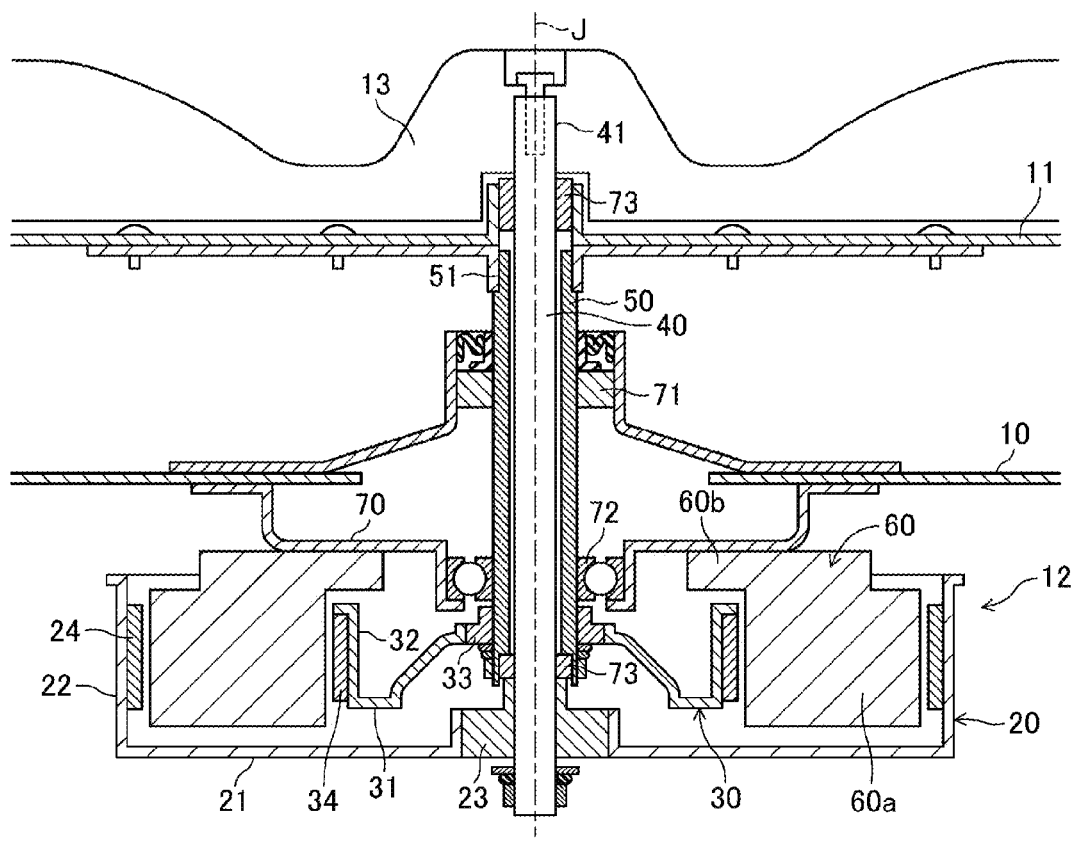
FIG. 4 is a schematic longitudinal sectional view illustrating an assembly structure of a motor.

As illustrated in FIGS. 3 and 4, the motor 12 may include an outer rotor 20, an inner rotor 30, an inner shaft 40, an outer shaft 50, a stator 60, and the like. In other words, the motor 12 is provided with two rotors 20 and 30 (dual rotor) inside and outside one stator 60, and these rotors 20 and 30 are configured to be connected to the pulsator 13 and the drum 11 without interposing a clutch, an accelerating/decelerating device, etc., and to directly drive them (direct drive). The rotors 20 and 30 share the coils 63 of the stator 60. The controlled composite current is supplied to these coils 63 so that the motor 12 can independently drive each of the rotors 20 and 30.

The outer rotor 20 is a cylindrical member with a flat bottom and includes a disk-shaped bottom wall part 21 whose a central portion is opened, a cylindrical peripheral wall part 22 provided on the periphery of the bottom wall part 21, a boss part 23 integrated with the central portion of the bottom wall part 21, and a plurality of outer magnets 24. The bottom wall part 21 and the peripheral wall part 22 are formed by press-working an iron plate to function as a back yoke, and the boss part 23 is formed of a sintered alloy or the like. A shaft hole is formed in the center of the boss part 23 and an inner peripheral surface of the shaft hole has sawteeth formed by serration machining.

Figure 5:
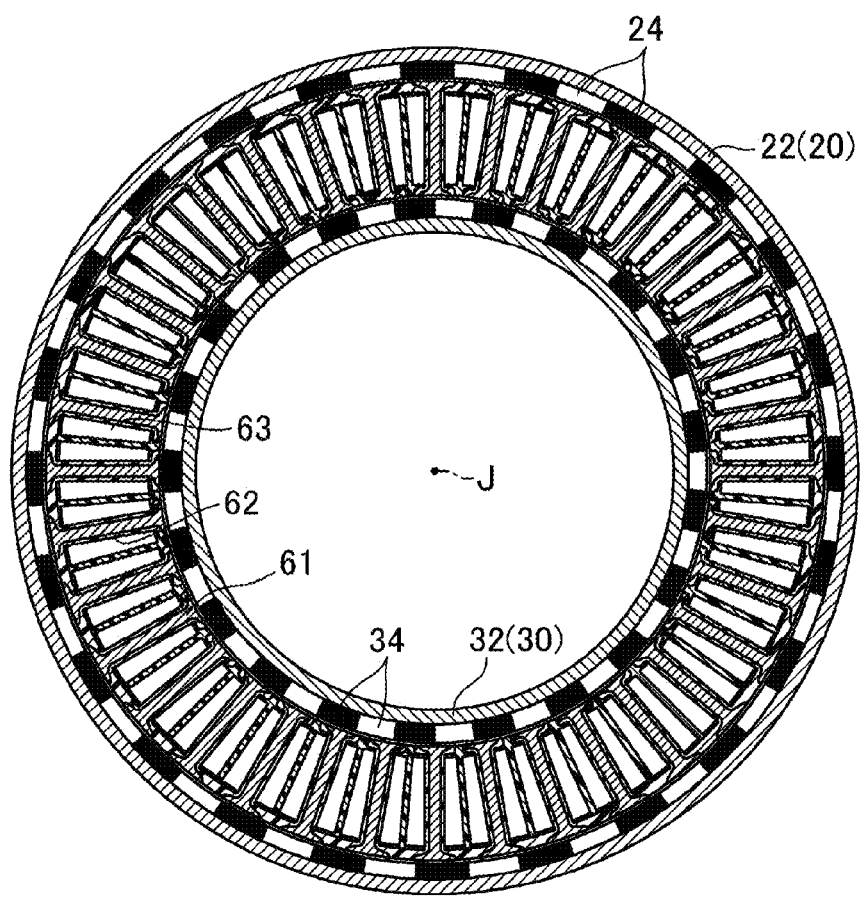
FIG. 5 is a schematic cross-sectional view illustrating an assembly structure of a motor.

The bottom wall part 21 is provided with a plurality of slits 21a for performing heat radiation. Each of the outer magnets 24 is formed of a rectangular plate-shaped or tile-shaped permanent magnet and fixed to the inner surface of the peripheral wall part 22. In the present embodiment, as illustrated in FIG. 5, 48 outer magnets 24 are arranged so that N poles and S poles are alternately arranged in the circumferential direction continuously.

The inner rotor 30 is a cylindrical member with a flat bottom and has an outer diameter smaller than that of the outer rotor 20. The inner rotor 30 includes an inner bottom wall part 31 with a trapezoidal shape whose a central portion is opened, an inner peripheral wall part 32 provided on the periphery of the inner bottom wall part 31 and having a cylindrical shape, an inner boss part 33 integrated with the central portion of the inner bottom wall part 31, and a plurality of inner magnets 34. The inner bottom wall part 31 and the inner peripheral wall part 32 are formed by pressing an iron plate, and the inner boss part 33 is formed of a sintered alloy or the like in the same manner as the outer rotor 20. A shaft hole is formed in the center of the inner boss part 33 and has an inner diameter larger than that of the boss part 23. Serrations are formed on an inner peripheral surface of the shaft hole.

A plurality of working openings 31a for fastening the stator 60 to the tub 10 are formed in the inner bottom wall part 31. Each of the inner magnets 34 is formed of a rectangular plate-shaped or tile-shaped permanent magnet and fixed to the outer surface of the inner peripheral wall part 32. In the present embodiment, as illustrated in FIG. 5, 42 inner magnets 34 are arranged so that N poles and S poles are alternately arranged in the circumferential direction continuously.

The inner shaft 40 is an elongated cylindrical shaft member, and the upper and lower ends thereof are provided with mounting portions 41 and 41 having coupling portions whose outer circumferential surfaces are formed as serrations. The lower mounting portion 41 is fixed to the boss part 23 by fixing the coupling portion to the shaft hole by press fitting or bolting so that the lower end portion of the inner shaft 40 is fixed to the outer rotor 20.

The outer shaft 50 is an elongated cylindrical shaft member which is shorter than the inner shaft 40 and has an inner diameter larger than the outer diameter of the inner shaft 40. The upper and lower end portions of the outer shaft 50 are also provided with mounting portions 51 and 51 having coupling portions whose outer circumferential surfaces are formed as serrations. The lower mounting portion 51 is fixed to the inner boss part 33 by fixing the coupling portion to the shaft hole by press fitting or bolting so that the lower end portion of the outer shaft 50 is fixed to the inner rotor 20.

The stator 60 includes an annular body part 60a having an outer diameter smaller than the inner diameter of the outer rotor 20 and an inner diameter larger than the outer diameter of the inner rotor 30 and a flange part 60b projecting toward the center from the inner peripheral edge of the upper portion of the annual body part 60a, and is formed by resin molding. The detailed structure of the stator 60 will be described later.

(Assembly of Motor)

As illustrated in FIG. 4, the stator 60 is disposed by fastening the flange part 60b to a motor bracket 70 provided on the bottom surface of the tub 10. The outer shaft 50 to which the inner rotor 30 is connected is rotatably supported by the motor bracket 70 through a bearing 71 and a ball bearing 72. The upper end of the outer shaft 50 is fixed to the drum 11 by disposing a bracket fixed to the drum 11 in the upper mounting portion 51 protruding into the tub 10.

The inner shaft 40 to which the outer rotor 20 is connected is inserted into the lower end of the outer shaft 50 so that the upper end of the inner shaft 40 protrudes into the drum 11. The inner shaft 40 is rotatably supported by the drum 11 and the outer shaft 50 through upper and lower inner bearings 73 and 73. The upper end portion of the inner shaft 40 is fixed to the pulsator 13 by coupling and fastening the coupling portion of the upper mounting portion 41 to the mounting hole formed at the central portion of the pulsator 13.

The stator 60, the inner rotor 30, and the outer rotor 20 are assembled so that the inner rotor 30 and the outer rotor 20 face the stator 60 with a slight gap therebetween. In this motor 12, a controlled composite current is supplied to the stator 60, so that a magnetic field periodically changing in each of coils 63 is formed.

In the case of this motor 12, a composite current composed of three phases and six phases is supplied. The inner rotor 30 having a small number of poles is driven in three phases, and the outer rotor 20 having a large number of poles is driven in six phases.

The periodic change of the magnetic field acts on the inner magnets 34 and the outer magnets 24 so that the integral structure formed by the inner rotor 30, the outer shaft 50, and the drum 11 and the integral structure formed by the outer rotor 20, the inner shaft 40, and the pulsator 13 are rotationally driven individually about the vertical axis J.

(Detailed Structure of Stator)

Figure 6:
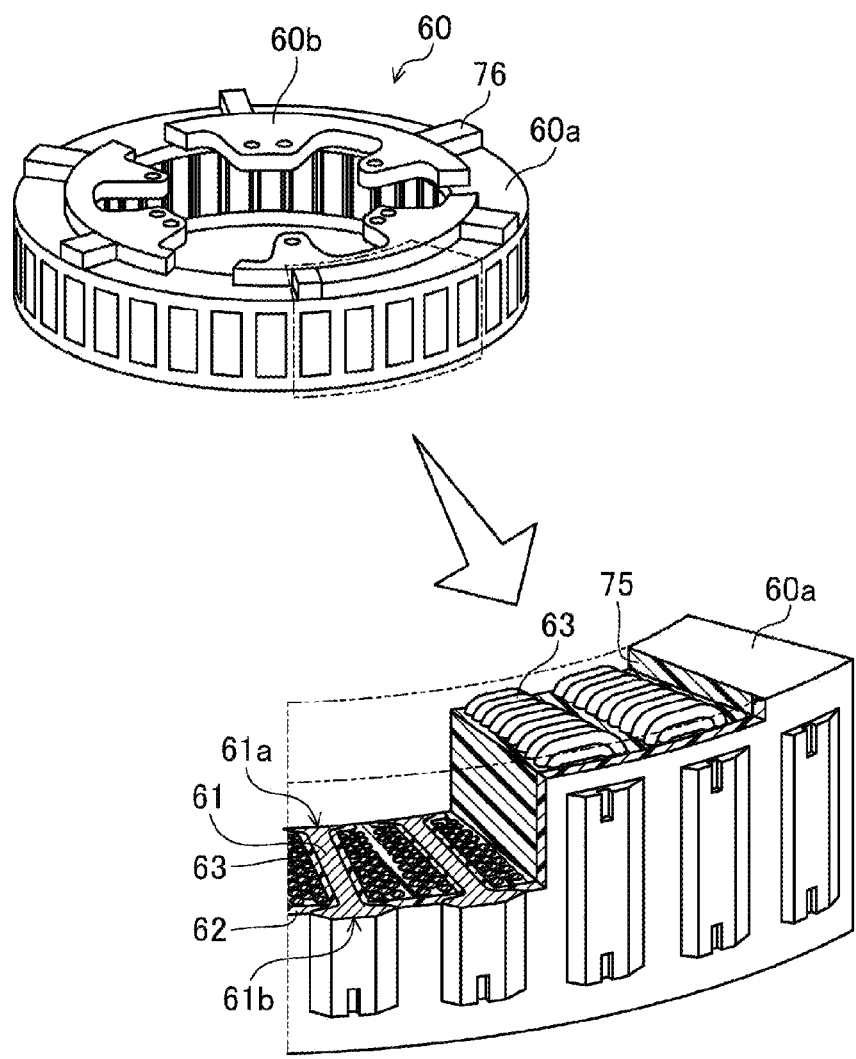
FIG. 6 is a schematic view illustrating a structure of a stator.

As illustrated in FIG. 6, the body part 60a, which is a main body portion of the stator 60, includes a plurality of I-type cores (core elements) 61, an insulator 62, a plurality of coils 63, a resin molded body 75 and the like. The stator 60 according to the present embodiment is provided with 36 I-type cores 61 and coils 63 as illustrated in FIG. 5.

Figure 26:
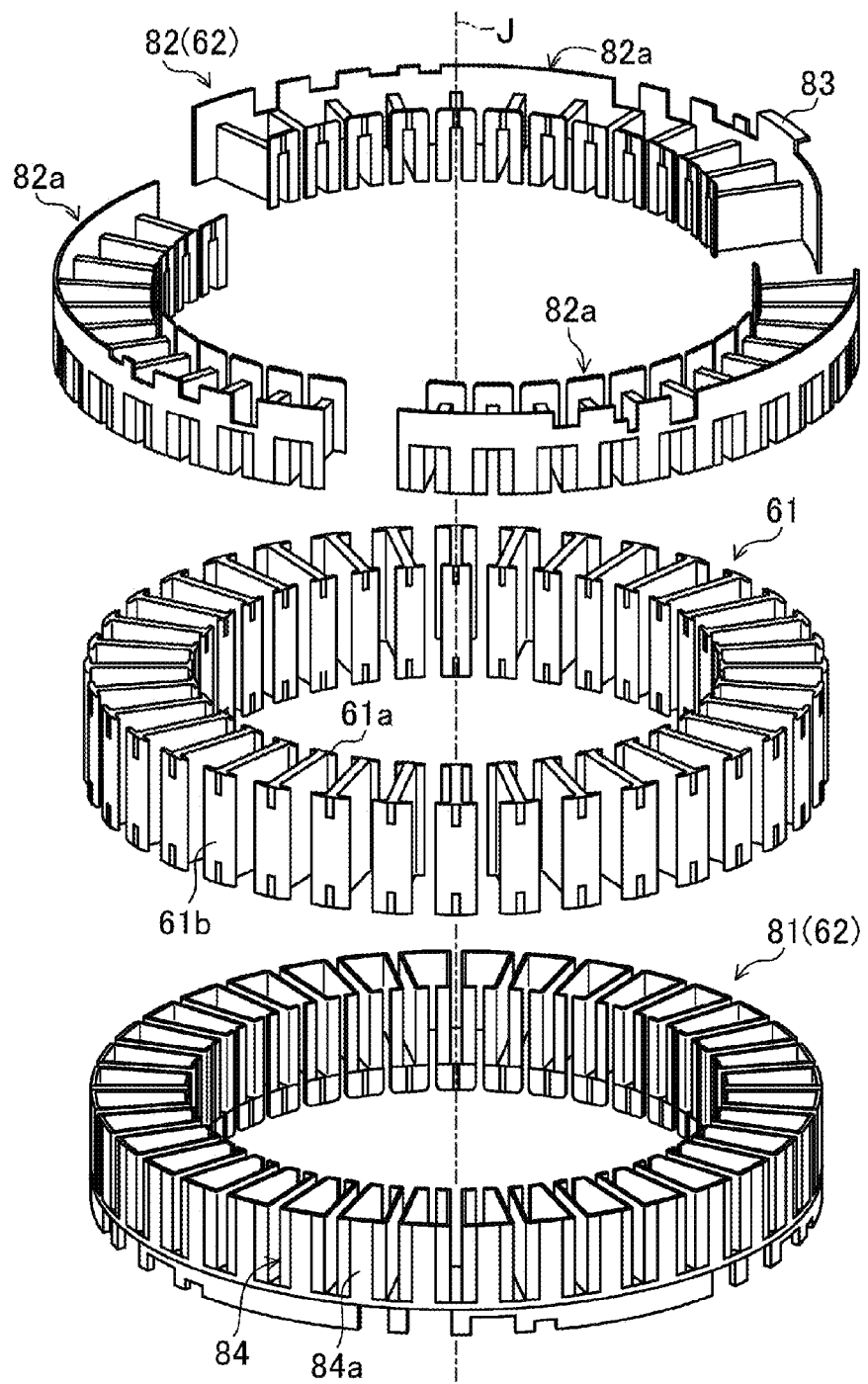
FIG. 26 is an exploded perspective view schematically illustrating a core holding structure in a motor according to a third embodiment.
Figure 29:
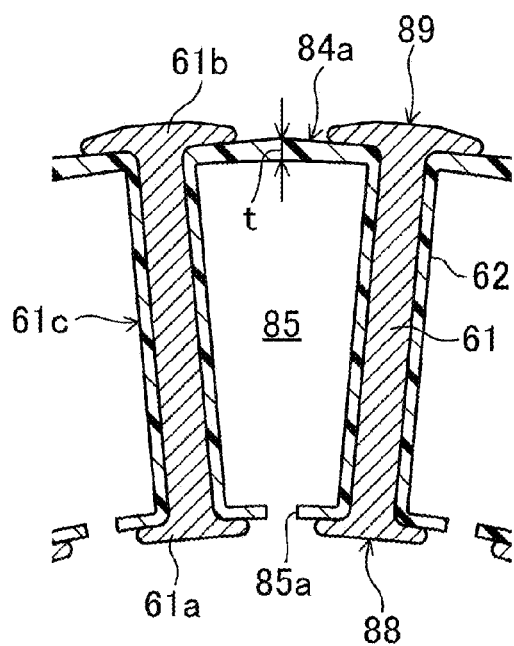
FIG. 29 is a cross-sectional view schematically illustrating a part of the core holding structure in the motor according to the third embodiment.

As illustrated in FIGS. 26 and 29, the I-type core 61 is a thin plate-shaped iron metal member having an I-shaped cross-section as viewed in the axial direction. At both ends of the inner peripheral side of the I-shaped core 61, both corner portions protrude in a circumferential direction in a blade-like shape, so that the inner tooth 61a is vertically long and wide in width. In addition, at both ends of the outer peripheral side of the I-shaped core 61, both corner portions of the I-shaped core 61 protrude in the circumferential direction in a blade-like shape, so that outer tooth 61b are vertically long and wide in width. These I-shaped cores are radially arranged at regular intervals on the entire circumference of the body part 60a, and are arranged to be separated from each other.

The coil 63 is formed on each of the I-shaped cores 61 by continuously winding wires W (conductive wires covered with an insulating material) around each of the I-shaped cores 61 with the insulator 62 interposed between the I-shaped core 61 and the wire W in a predetermined sequence and in a predetermined configuration. The I-shaped cores 61, the insulator 62, and the coils 63 are embedded in the resin molded body 75 molded into an annular shape by the molding process, and the end portion of each of the inner teeth 61a and the outer teeth 61b is exposed on the inner circumferential surface and the outer circumferential surface of the resin molded body 75. On the upper portion of the body part 60a, there is provided a connector 76 to which electric wiring of a controller or a power source is connected.

First Embodiment

The first embodiment relates to a washing machine motor suitable for a washing machine.

(Relationship Between the Number of Slots and the Number of Poles of the Rotor)

As illustrated in FIG. 7, the first embodiment is directed to a motor 12 that drives the inner rotor 30 in three phases and the outer rotor 20 in six phases. In other words, the outer rotor 20 is the first rotor, and the inner rotor 30 is the second rotor. Then, the winding is formed into a fractional slot winding. The coils 63 of the stator 60 are supplied with a composite current in which currents corresponding to the outer rotor 20 and the inner rotor 30 are superimposed on each other. As a result, the coil 63 generates a separate rotating magnetic field for independently driving the outer rotor 20 and the inner rotor 30.

Figure 12:
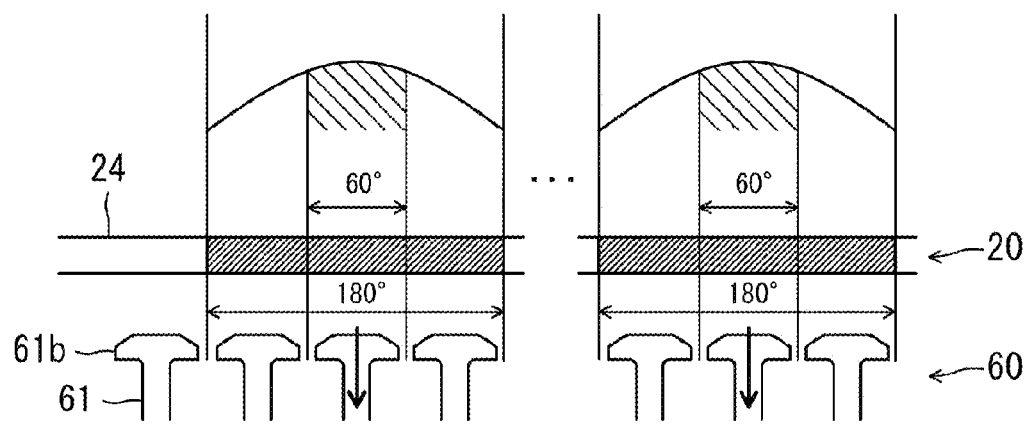
FIG. 12 is a diagram for explaining magnetic fluxes that the teeth of a conventional motor receive.

In this motor 12, the number of rotating magnetic fields generated by the stator 60 is different from the number of magnetic poles of the outer rotor 20 and the inner rotor 30. Specifically, since the number of slots S of the stator 60 is 36, the number of poles P1 of the inner rotor 30 is 42, and the number of poles P2 of the outer rotor 20 is 48, the ratio thereof is S:P1:P2=6:7:8 (see FIG. 5). At this time, the width of the tooth of the core element 61 inserted into the slot of the stator 60 may be larger than the width of the magnet of the rotor. Specifically, the inner rotor 30 includes a plurality of inner magnets 34 disposed circumferentially to face the inner circumferential surface of the stator 60, and the width of each of the teeth (inner teeth) 61a of the core elements 61 of the stator 60 facing the inner rotor 30 is greater than ½ of the width of each of the plurality of inner magnets 34. As another example, the width of each of the teeth 61a of the core elements 61 of the stator 60 facing the inner rotor 30 may be larger than the width of each of the plurality of inner magnets 34. Also, the outer rotor 20 includes a plurality of outer magnets 24 arranged circumferentially to face the outer circumferential surface of the stator 60, and the width of each of the teeth (outer teeth) 61b of the core elements 61 of the stator 60 facing the outer rotor 20 is greater than ½ of the width of each of the plurality of outer magnets 24. As another example, as illustrated in FIG. 12, the width of each of the teeth 61b of the core elements 61 of the stator 60 facing the outer rotor 20 may be larger than the width of each of the plurality of outer magnets 24.

Figure 8:
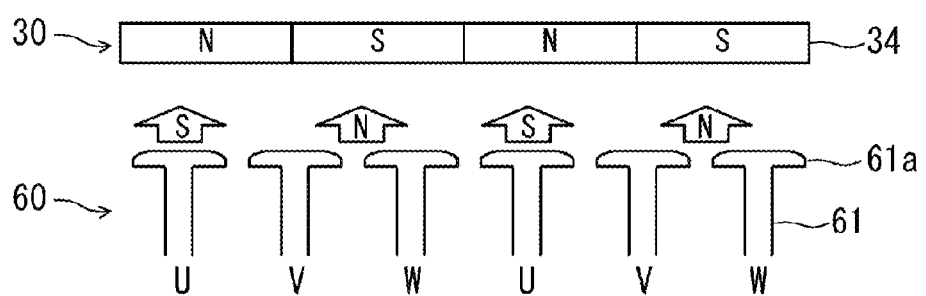
FIG. 8 is a view illustrating a relationship between the number of rotating magnetic fields generated by a stator and the number of magnetic poles of an inner rotor in a conventional motor.

FIG. 8 is a diagram illustrating the relationship between the number of rotating magnetic fields generated by a stator and the number of magnetic poles of an inner rotor in the conventional motor. As illustrated in FIG. 8, the conventional motor is a motor configured to be S:P1:P2=6:4:2. In the thus configured motor, the number of rotating magnetic fields generated by the stator 60 is the same as the number of magnetic poles of the inner rotor 30. Also, although not illustrated, the number of the rotating magnetic fields generated by the stator 60 is the same as the number of magnetic poles of the outer rotor.

Figure 9:
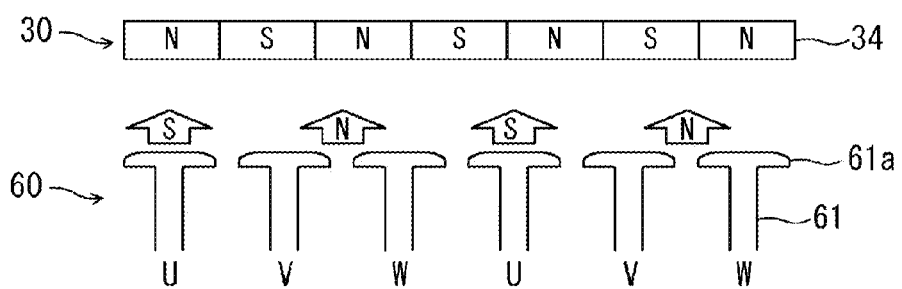
FIG. 9 is a view illustrating a relationship between the number of rotating magnetic fields generated by a stator and the number of magnetic poles of an inner rotor in a motor according to a first embodiment.

FIG. 9 is a view illustrating a relationship between the number of rotating magnetic fields generated by a stator and the number of magnetic poles of an inner rotor in the motor according to the present embodiment. As illustrated in FIG. 9, in the motor 12 according to the present embodiment, the number of rotating magnetic fields generated by the stator 60 is different from the number of the magnetic poles of the inner rotor 30. Also, although not illustrated, the number of the rotating magnetic fields generated by the stator 60 is different from the number of magnetic poles of the outer rotor 20.

(Winding Factor)

Hereinafter, the winding factor of the motor 12 according to the present embodiment will be described in comparison with the winding factor of the conventional motor. FIG. 10 is a table illustrating the winding factor of a conventional motor. FIG. 11 is a table illustrating the winding factor of the motor according to the present embodiment. On the other hand, if the short pitch factor is Kp, the distribution factor is Kd, and the winding factor is Kw, Kw=Kp·Kd.

As illustrated in FIG. 10, when driving the inner side (4 Pole in FIG. 10) in the conventional motor, Kp=0.87, Kd=1, and Kw=0.87 in three phases so that the inner side can be driven. In six phases, Kp=0.87, Kd=0, and Kw=0, so that the inner side cannot be driven.

On the other hand, when driving the outer side (2 Pole in FIG. 10), Kp=0.5, Kd=0, and Kw=0 in three phases so that the outer side cannot be driven. In six phases, Kp=0.5, Kd=1, and Kw=0.5, so that the outer side can be driven.

In other words, the three-phase drive affects only the inner side, and does not affect the outer side. The six-phase drive affects only the outer side, and does not affect the inner side.

As illustrated in FIG. 11, when driving the inner side (7 Pole in FIG. 11) in the motor 12 according to the present embodiment, Kp=0.97, Kd=0.97 and Kw=0.93 in three phases so that the inner side can be driven. In six phases, Kp=0.97, Kd=0, and Kw=0, so that the inner side cannot be driven.

On the other hand, when driving the outer side (8 Pole in FIG. 11), Kp=0.87 Kd=0, and Kw=0 in three phases so that the inner side cannot be driven. In six phases, Kp=0.87, Kd=0.87, and Kw=0.75, so that the outer side can be driven.

In other words, the three-phase drive affects only the inner side, and does not affect the outer side. The six-phase drive affects only the outer side, and does not affect the inner side.

As described above, in the motor 12 according to the present embodiment, the winding factor of the coil 63 with respect to the fundamental wave of the magnetic flux distribution of the rotor is larger than that of the conventional motor. Particularly, in the outer rotor 20, the winding factor Kw of the motor 12 according to the present embodiment is 0.75 (Kw=0.75), while the winding factor Kw of the conventional motor is 0.5 (Kw=0.5), so that the winding factor is improved by 50%. As a result, it is possible to efficiently generate the torque by improving the winding factor.

Hereinafter, with reference to FIGS. 12 to 15, the principle that the torque can be efficiently generated when the configuration of the motor 12 according to the present embodiment is adopted will be described.

As illustrated in FIG. 12, in the conventional motor, three outer teeth 61b face a single outer magnet 24 of the outer rotor 20. Thus, the tooth 61b at the center position may receive a magnetic flux equivalent to 60° (degrees) of the magnetic flux waveform including the central portion of the outer magnet 24. Because of this, 50% of the total magnetic flux of the one outer magnet 24 is available, so Kp=0.5.

Here, when the tooth 61b at the center position is the A-phase, the next A-phase tooth 61b may also use 50% of the total magnetic flux of the one outer magnets 24, and Kp=0.5.

In addition, the general formula of Kp may be expressed as follows.

$Kp=\sin(\beta/2)$, $\beta$ is the slot width(electrical angle).

Figure 13:
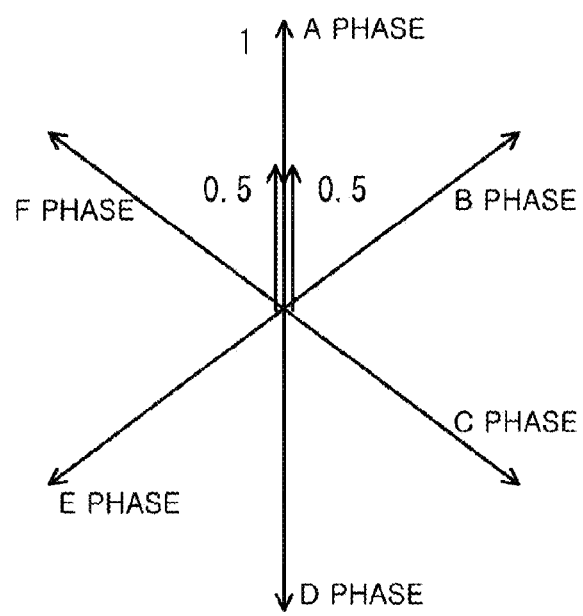
FIG. 13 is a diagram illustrating a case where magnetic fluxes that two teeth of a conventional motor receive are synthesized.

Then, as illustrated in the vector diagram of each phase in FIG. 13, when the magnetic fluxes received by the two teeth 61b of the A-phase are synthesized, 0.5 cos 0°+0.5 cos 0°=1. In other words, since each of the magnetic flux vectors of the two teeth 61b with respect to the A-phase is 0.5 in size and has the same phase as the A-phase, the size becomes 1 when synthesized. Since the deviation of 0° with respect to the A-phase is Kd, in the conventional motor, Kd=cos 0°=1.

Figure 14:
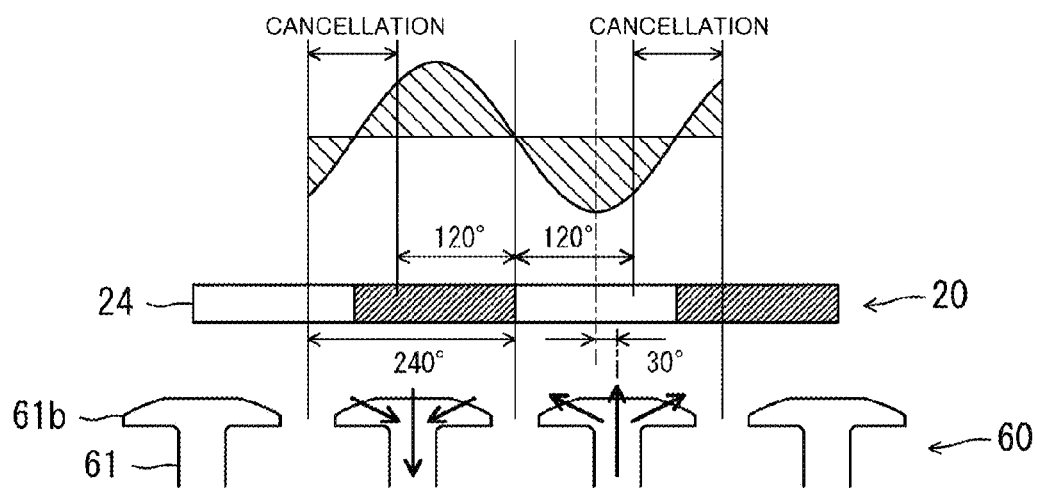
FIG. 14 is a diagram for explaining magnetic fluxes that the teeth of a motor according to the first embodiment receive.

On the other hand, as illustrated in FIG. 14, in the motor 12 according to the present embodiment, the center portion of the tooth 61b faces the position shifted by 30° from the center of one outer magnet 24 of the outer rotor 20. The tooth 61b may receive a magnetic flux equivalent to 120° of the magnetic flux waveform except for the magnetic flux canceled by the N pole and the S pole of the adjacent outer magnets 24. Because of this, 87% of the total magnetic flux of the one outer magnet 24 is available, so Kp=0.87.

Here, when the above-described tooth 61b is the A-phase, the next A-phase tooth 61b may also use 87% of the total magnetic flux of the one outer magnet 24, so Kp=0.87.

Figure 15:
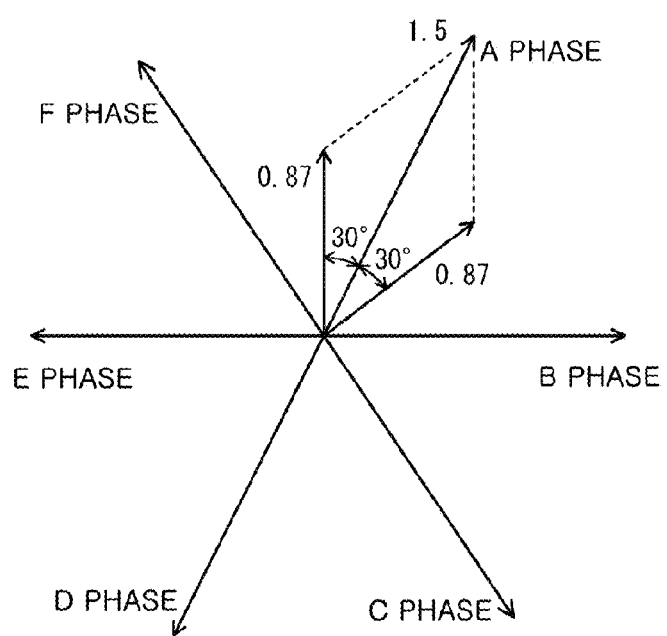
FIG. 15 is a diagram illustrating a case where magnetic fluxes that two outer teeth of a motor according to the first embodiment receive are synthesized.

Therefore, as illustrated in the vector diagram of each phase in FIG. 15, when the magnetic fluxes received by the two teeth 61b of the A-phase are synthesized, 0.87 cos 30°+0.87 cos 30°=1.5. In other words, since the magnetic flux vectors of the two teeth 61b with respect to the A-phase are 0.87 in size and are 30° (degrees) ahead or slower, respectively, the size becomes 1.5 in the A-phase when synthesized. Since the deviation of 30° with respect to the A-phase is Kd, in the motor 12 according to the present embodiment, Kd=cos 30°=0.87.

As described above, the use of the configuration of the motor 12 according to the present embodiment may make it possible to utilize more magnetic flux and generate the torque efficiently as compared with the configuration of the conventional motor.

In the present embodiment, the magnetic fluxes are compared with respect to the A-phase, but since the magnetic fluxes of the B-phase to F-phase are the same as the magnetic flux of the A-phase, detailed descriptions thereof are omitted.

(Short Pitch Factor with Respect to the Harmonics of the Magnetic Flux Distribution of the Rotor)

FIG. 16 is a diagram comparing the short pitch factors with respect to the harmonics of the magnetic flux distribution of the rotor.

As illustrated in FIG. 16, in the conventional motor, the maximum of the short pitch factors for the third order, fifth order, and seventh order harmonics is Kp=1 at the third order of the six-phases. On the other hand, in the motor 12 according to the present embodiment, the maximum of the short pitch factors for the third order, fifth order, and seventh order harmonics is Kp=0.87 at the fifth order and seventh order of the six-phases. In other words, in the present embodiment, the short pitch factor for the harmonics may be less than 1.

Figure 17:
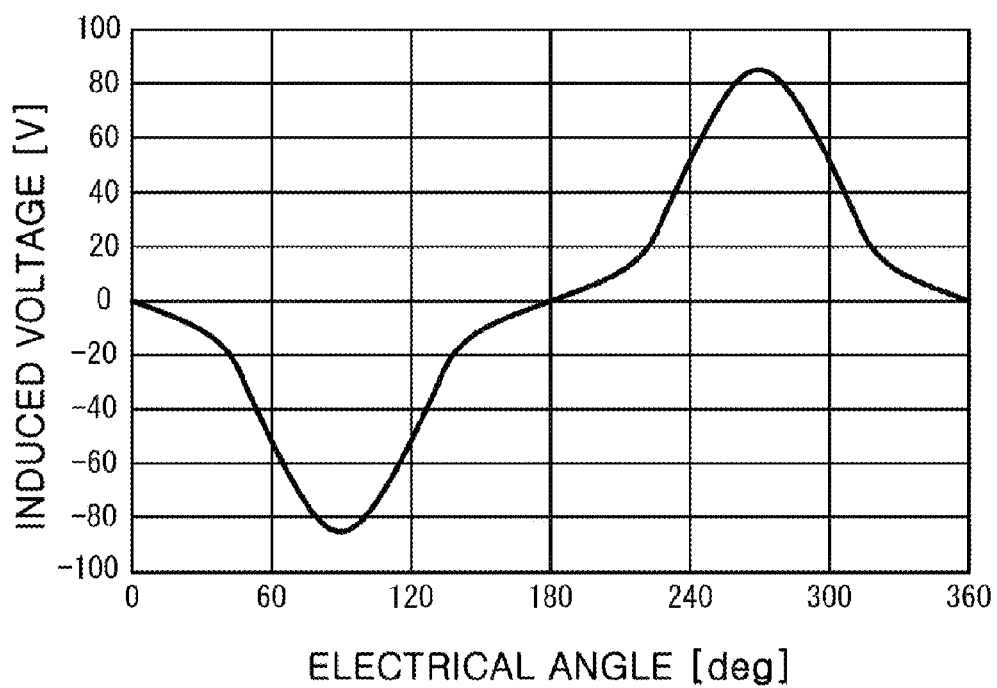
FIG. 17 is a graph illustrating a waveform of an induced voltage in a conventional motor.
Figure 18:
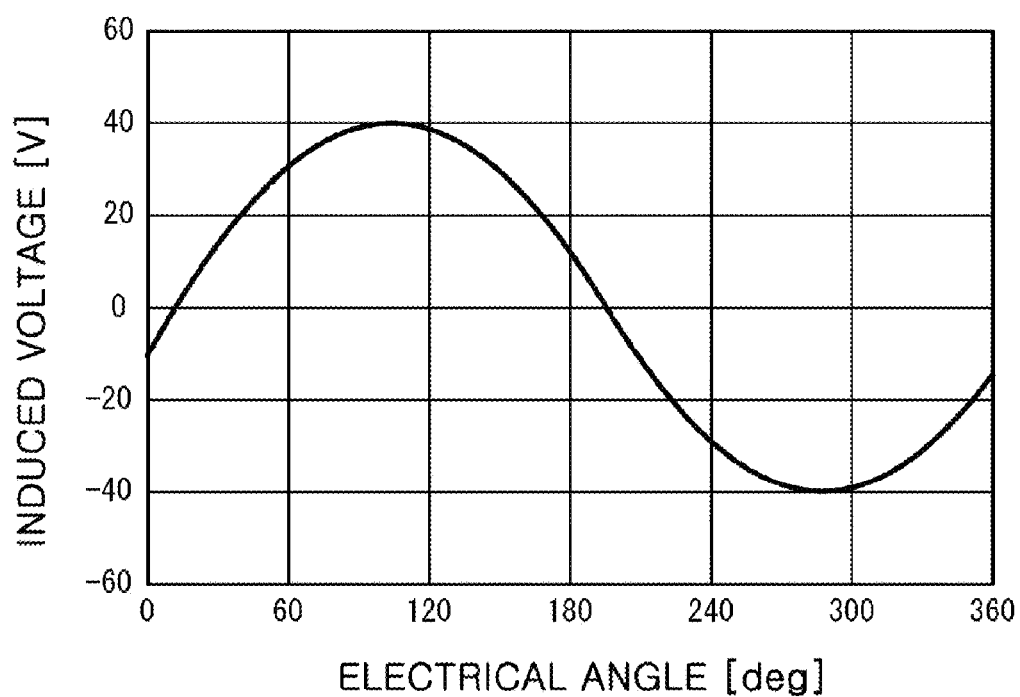
FIG. 18 is a graph illustrating a waveform of an induced voltage in a motor according to the first embodiment.

Here, as illustrated in FIG. 17, in the conventional motor, the waveform of the induced voltage is distorted, and the distortion factor (Klirrfaktor) at this time is about 31%. On the other hand, as illustrated in FIG. 18, in the motor 12 according to the present embodiment, the waveform of the induced voltage is hardly distorted, and the distortion factor at this time is about 4.9%.

As described above, in the motor 12 according to the present embodiment, the short pitch factor of the coil 63 with respect to the harmonics of the magnetic flux distribution of the rotor is smaller than that of the conventional motor. Also, in the motor 12 according to the present embodiment, the distortion factor of the waveform of the induced voltage is lowered by about 84% as compared with the conventional motor. As a result, the torque ripple is reduced so that vibration and noise may be reduced.

(Modifications)

In the present embodiment, the configuration in which the number of slots of the stator 60 is 36, the number of poles of the inner rotor 30 is 42, and the number of poles of the outer rotor 20 is 48 (S:P1:P2=6:7:8) is described. However, the present invention is not limited this embodiment. For example, the configuration in which the number of slots of the stator 60 is 36, the number of poles of the inner rotor 30 is 48, and the number of poles of the outer rotor 20 is 42 (S:P1:P2=6:8:7) is possible.

When the ratio of the number of slots of the stator 60, the number of poles of the inner rotor 30, and the number of poles of the outer rotor 20 as described above is satisfied, the number of slots of the stator and the number of poles of the rotor may be generalized as follows.

$S=12n$ $P1=(6\pm1)\cdot 2n$ $P2=(6\pm2)\cdot 2n$

Here, S is the number of slots of the stator, P1 is the number of poles of one of the first rotor and the second rotor, P2 is the number of poles of the other one of the first rotor and the second rotor, and n is an integer of 1 or more.

In the present embodiment, the motor 12 is described in which the magnets are arranged at equal intervals on the outer circumferential portions of the outer rotor 20 and the inner rotor 30. However, the motor is not limited this configuration. For example, a so-called magnetic flux concentrating type motor in which the magnetic substance and the magnet are disposed on the outer circumferential portions of the outer rotor 20 and the inner rotor 30 alternately in the circumferential direction in close contact with each other may also be used.

Second Embodiment

The second embodiment relates to a dual rotor type motor suitable for a washing machine and having two rotors on the inside and outside of a single stator. In particular, the second embodiment relates to a motor in which the stator core is composed of a plurality of core elements independent from each other and the number of these core elements is less than the number of poles of the two rotors.

(Constitution of the Motor)

In the washing machine 1, since a large cogging torque (torque generated by the magnetic attractive force between the magnet and the core when the rotor is moved in the deenergization state) causes noise or vibration, the cogging torque is preferably small.

In the case of the dual rotor type motor in which a single stator 60 is shared by the inner rotor 30 and the outer rotor 20 like this motor 12, there is a specific problem in that when either the inner rotor 30 or the outer rotor 20 is driven, the torque ripple is generated in the other rotor due to the influence of the magnetic field generated by the driving of the rotor (mutual ripple).

As this mutual ripple increases, it causes noise or vibration like the cogging torque. Therefore, when such a dual rotor type motor is used in the washing machine 1, it is necessary to reduce not only cogging torque but also mutual ripple.

By performing electromagnetic field analysis, the tooth opening angle of the I-type core 61 is examined with respect to the combination (a so-called slot combination) of the number of poles of the inner rotor 30, the number of poles of the outer rotor 20, and the number of slots of the stator 60 (it is the same as the number of I-type cores 61). As a result, a condition that can effectively reduce both the cogging torque and the mutual ripple is found.

Next, the above-described contents will be described in detail by taking the above-described motor 12 as an example. For reference, the slot combination of the motor 12 is the number of poles of inner rotor 30: 42, the number of poles of the outer rotor 20: 48, and the number of slots of the stator 60: 36. The number of the I type cores is smaller than the number of poles of each of the inner rotor 30 and the outer rotor 20, and the number of the outer rotor 20 is larger than the number of the inner rotor 30.

Figure 19:
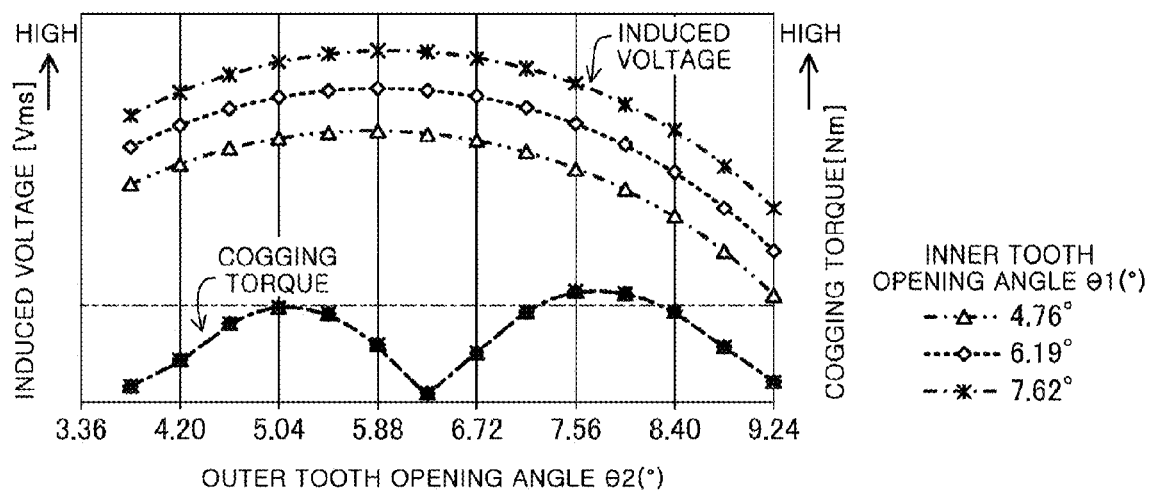
FIG. 19 is a graph illustrating changes in induced voltage and cogging torque generated in an outer rotor driven with no load in a motor according to the second embodiment.

FIG. 19 illustrates the results of examining how the induced voltage and cogging torque generated in the outer rotor 20 change according to the tooth opening angle of the outer teeth 61b for each of the tooth opening angles (4.76°, 6.19°, and 7.62°) of the inner teeth 61a when the outer rotor 20 having a large number of poles is driven with no load.

Figure 20:
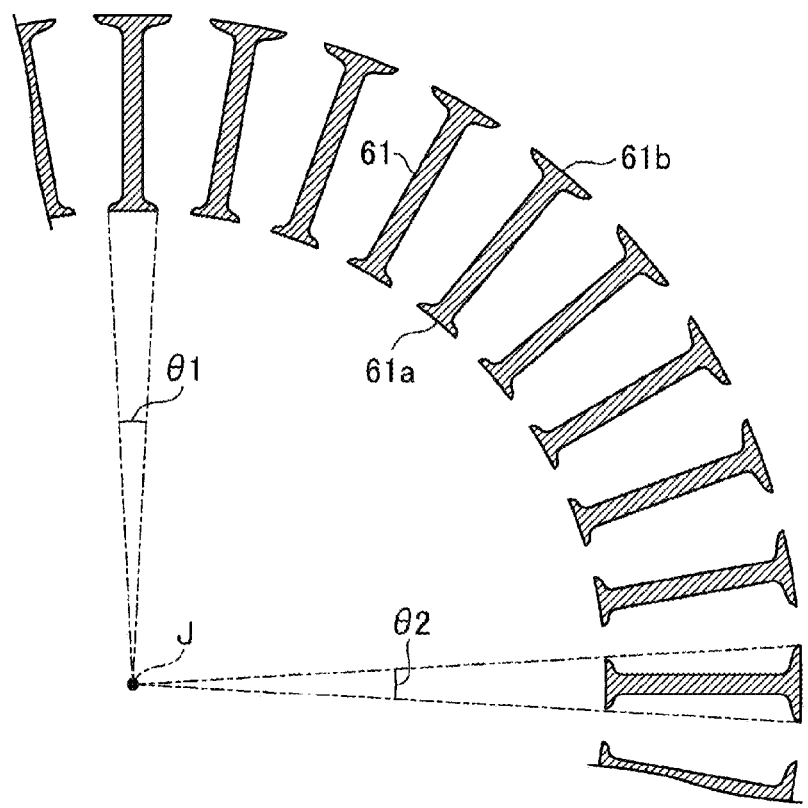
FIG. 20 is a view for explaining a tooth-opening angle of the motor according to the second embodiment.

On the other hand, the tooth opening angle referred to herein is an angle (central angle) formed by lines connecting both ends of the tooth in the circumferential direction and the center J of the stator. FIG. 20 illustrates a tooth opening angle of the inner tooth 61a (inner tooth opening angle θ1) and a tooth opening angle of the outer tooth 61b (outer tooth opening angle θ2).

In the case of the motor 12, since the number of the I type cores 61 is 36, the physical upper limit of the tooth opening angle is 10 degrees (when the gap between adjacent teeth is 0). Therefore, the analysis was performed in the range of about 3° to about 9° of the tooth opening angle.

As illustrated in FIG. 19, the induced voltage generated in the outer rotor 20 changes in a curve shape showing a peak, in which the induced voltage is at the maximum, in the approximately middle of the range of analysis of the outer tooth opening angle θ2 due to the affection by the change in the outer tooth opening angle θ2. In addition, the induced voltage generated in the outer rotor 20 tends to increase as the inner tooth opening angle θ1 increases due to the affection of the inner tooth opening angle θ1.

The cogging torque generated in the outer rotor 20 changes in a curve shape showing two peaks in which the approximately middle of the analysis range of the outer tooth opening angle θ2 is the valley in accordance with the change in the outer tooth opening angle θ2. On the other hand, since the cogging torque generated in the outer rotor 20 does not change as the inner tooth opening angle θ1 changes, the influence of the inner tooth opening angle θ1 is very small.

Figure 21:
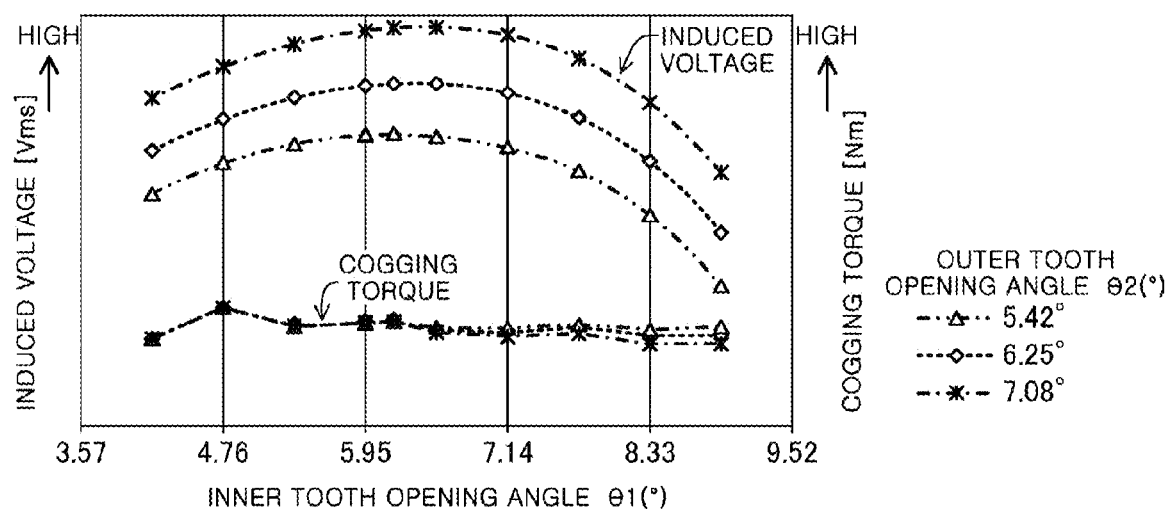
FIG. 21 is a graph illustrating changes in induced voltage and cogging torque generated in an inner rotor driven with no load in a motor according to the second embodiment.

FIG. 21 illustrates the results of examining how the induced voltage and cogging torque generated in the inner rotor 30 change according to the inner tooth opening angle θ1 for each of the outer tooth opening angles θ2 (5.42°, 6.25°, and 7.08°) when the inner rotor 30 having a small number of poles is driven with no load.

As illustrated in FIG. 21, the induced voltage generated in the inner rotor 30 changes in a curve shape showing a peak, in which the induced voltage is at the maximum, in the approximately middle of the analysis range of the inner tooth opening angle θ1 due to the affection by the change in the inner tooth opening angle θ1. In addition, the induced voltage generated in the inner rotor 30 tends to increase as the outer tooth opening angle θ2 increases due to the affection of the outer tooth opening angle θ2.

The cogging torque generated in the inner rotor 30 is very small as compared with the cogging torque generated in the outer rotor 20 and does not change even when the inner tooth opening angle θ1 changes, so that the influence of the inner tooth opening angle θ1 is very small. In addition, since the cogging torque generated in the inner rotor 30 does not change as the outer tooth opening angle θ2 changes, the influence of the outer tooth opening angle θ2 is also very small.

Therefore, regarding the cogging torque, the outer rotor 20 may be a problem and the inner rotor 30 may be ignored. However, in the case of the present motor 12, since the mutual ripple occurs in the inner rotor 30 due to the driving of the outer rotor 20, the mutual ripple may be a problem. So, we examined this mutual ripple.

Figure 22:
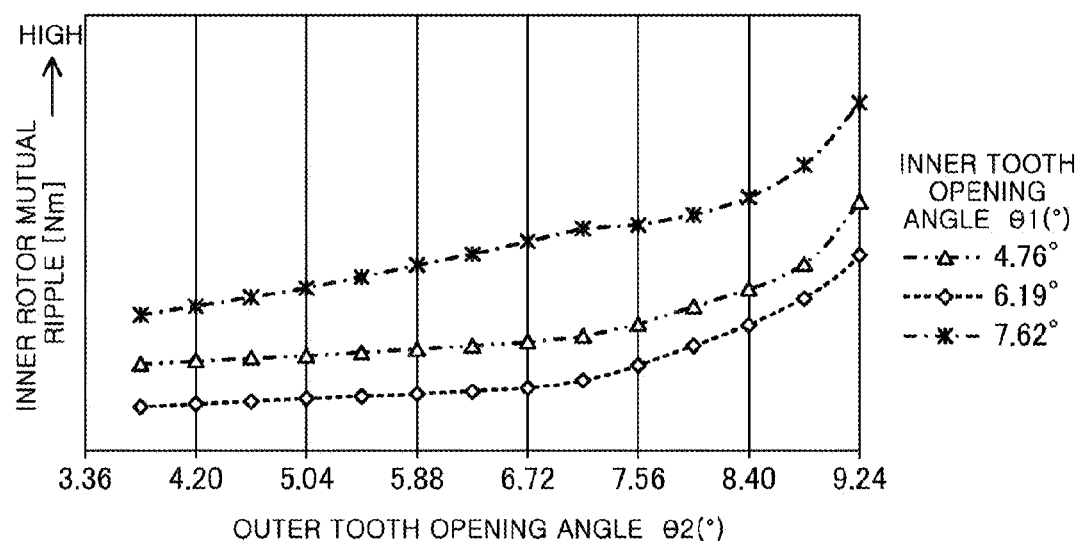
FIG. 22 is a graph illustrating a change in mutual ripple occurring in the inner rotor when the outer rotor is driven in the motor according to the second embodiment.

FIG. 22 illustrates the results of examining how the mutual ripple generated in the inner rotor 30 changes according to the outer tooth opening angle θ2 for each of the inner tooth opening angles θ1 (4.76°, 6.19°, and 7.62°) when the outer rotor 20 is driven. As a result, the mutual ripple generated in the inner rotor 30 tends to increase as the outer tooth opening angle θ2 increases due to the influence of the outer tooth opening angle θ2.

Figure 23:
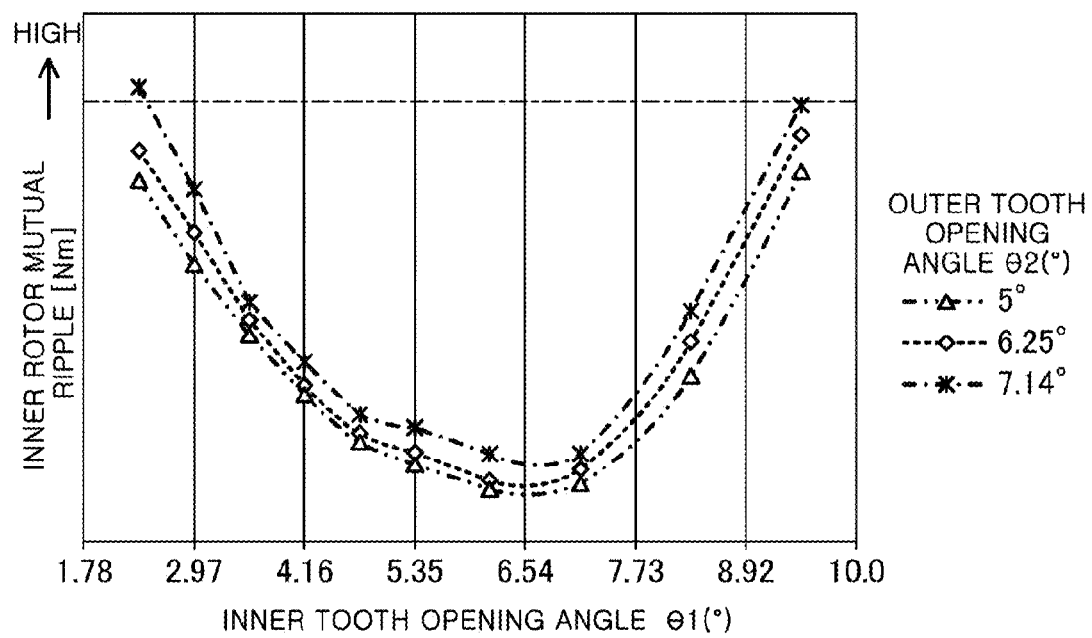
FIG. 23 is a graph illustrating a change in mutual ripple generated in the inner rotor due to the inner tooth opening angle for each of outer tooth opening angles in the motor according to the second embodiment.

FIG. 23 illustrates the results of examining how the mutual ripple generated in the inner rotor 30 changes according to the inner tooth opening angle θ1 for each of the outer tooth opening angles θ2 (5.00°, 6.25°, and 7.14°) in this case. The mutual ripple generated in the inner rotor 30 changes in a curve shape that becomes the minimum in the approximately middle of the analysis range of the inner tooth opening angle θ1 due to the influence of the inner tooth opening angle θ1.

In FIG. 19, the current reference value is indicated by a one-dot chain line. It can be seen that the outer tooth opening angle θ2 may be set in the range of 5.0° to 7.14° in order to suppress the cogging torque generated in the outer rotor 20 to be less than the current reference value while obtaining a high induced voltage. In this range, the mutual ripple generated in the inner rotor 30 may also be suppressed as illustrated in FIG. 22.

Also, in FIG. 23, the current reference value is indicated by a one-dot chain line. Since the mutual ripple generated in the inner rotor 30 may exceed the current reference value, it is preferable to suppress the mutual ripple below the reference value. It can be seen that the inner tooth opening angle θ1 may be set in the range of 2.67° to 9.5° in order to suppress the mutual ripple generated in the inner rotor 30 to be equal to or lower than the reference value.

In the case of the motor 12, since the number of poles of the outer rotor 20 is larger than that of the inner rotor 30, the relationship between the inner tooth opening angle θ1 and the outer tooth opening angle θ2 is as described above. However, when the number of poles of the outer rotor 20 and the number of poles of the inner rotor 30 are opposite, that is, when the number of poles of the inner rotor 30 is larger than that of the outer rotor 20, the above-described relationship is reversed.

Since the ranges of the inner tooth opening angle θ1 and the outer tooth opening angle θ2 are determined by the number of I-type cores 61 (the number of core elements), the ranges may be generalized based on the number of core elements.

In other words, for the range of 5.0° to 7.14° of the outer tooth opening angle θ2 as described above, in any one of the inner teeth 61a and the outer teeth 61b, which faces the rotor having the large number of poles among the inner rotor 30 and the outer rotor 20, the tooth opening angle of the teeth may be generalized to a range of 180°/Nc to 257°/Nc (Nc is the number of core elements).

Then, for the range of 2.67° to 9.5° of the inner tooth opening angle θ1 as described above, in the other one of the inner teeth 61a and the outer teeth 61b, which faces the rotor having the small number of poles among the inner rotor 30 and the outer rotor 20, the tooth opening angle of the teeth may be generalized to a range of 96°/Nc to 342°/Nc (Nc is the number of core elements).

In addition, the above-described relationship is not limited to the slot combination of the motor 12 (the number of poles of the inner rotor 30: 42, the number of poles of the outer rotor 20: 48, and the number of slots of the stator 60: 36), but may also be established for a certain slot combination.

Specifically, when the number of poles of the rotor having the small number of poles among the inner rotor 30 and the outer rotor 20 is P1 and the number of poles of the rotor having the large number of poles is P2, the above-described relationship may be established for a slot combination that satisfies the following conditions.

$$Nc=12n$$

$$P1=(6\pm1)\cdot 2n$$

$$P2=(6\pm2)\cdot 2n$$

(n is an integer of 1 or more)

Further, although the effect is weak compared with the above-described slot combination, it may be established for a slot combination satisfying the following conditions.

$$Nc=6n$$

$$P1=6n\pm2$$

$$P2=6n\pm4$$

(n is an integer of 2 or more)

Figure 24:
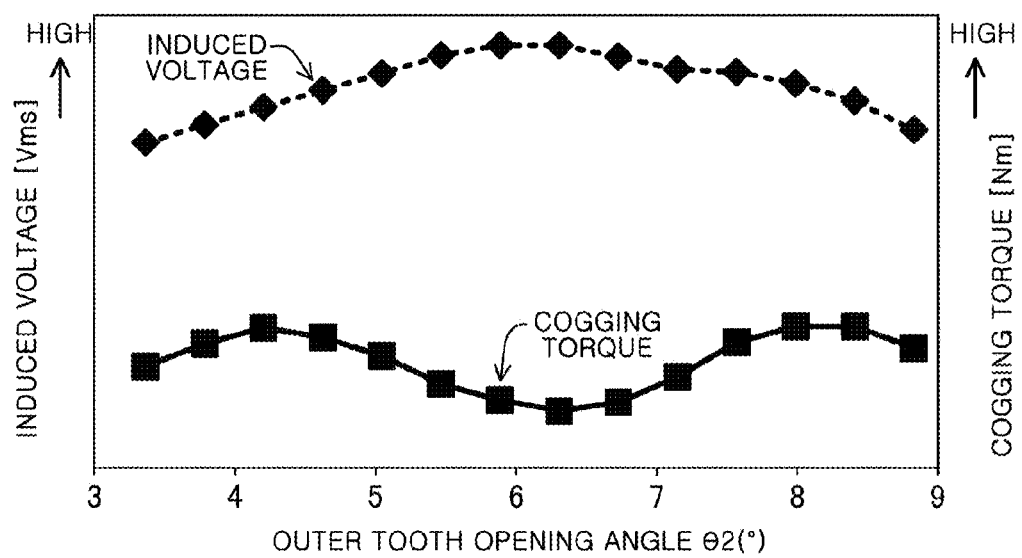
FIG. 24 is a graph corresponding to FIG. 19 in another slot combination according to the second embodiment.

FIG. 24 shows an example of electromagnetic field analysis results corresponding to FIG. 19 in this slot combination.

Similarly, it may be established for a slot combination satisfying the following conditions.

$$Nc=6n$$

$$P1=6n\pm4$$

$$P2=6n\pm8$$

(n is an integer of 2 or more)

Figure 25:
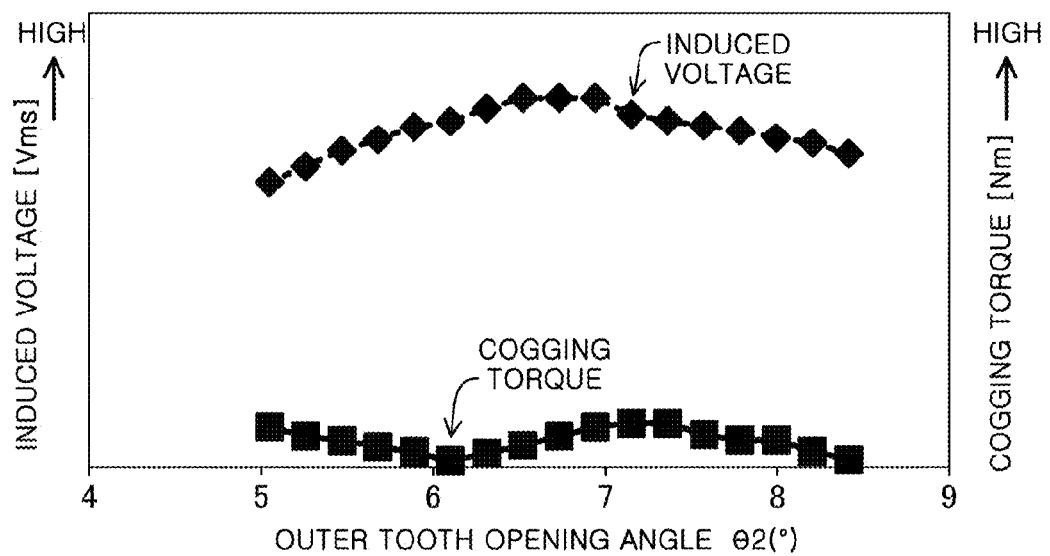
FIG. 25 is a graph corresponding to FIG. 19 in another slot combination according to the second embodiment.

FIG. 25 shows an example of electromagnetic field analysis results corresponding to FIG. 19 in this slot combination.

As described above, according to the motor of the second embodiment, since the cogging torque and the mutual ripple may be effectively reduced, when used in a washing machine, the drum and the pulsator may be driven at a high torque while effectively suppressing noise and vibration.

Third Embodiment

The third embodiment relates to a dual rotor type motor for rotationally driving a drum or the like of a washing machine in a direct drive type, and more particularly to a structure of a stator formed by molding.

(Details of the Insulator and the Like, and Manufacturing Method of the Stator)

The manufacture of the stator 60 requires not only a large number of man hours but also a high degree of difficulty in operation, for example, a plurality of I-type cores 61 formed separately and independently need to be disposed accurately at predetermined positions. Thus, an insulator 62 and the lie which may be manufactured efficiently while having a high quality have been researched. Hereinafter, the method of manufacturing the stator 60 will be described, and the structure of the insulator 62 will be described in detail.

FIG. 26 illustrates an exploded perspective view of the I-type cores 61 and the insulator 62. The insulator 62 is a structure in which thin walls are connected, and is formed by resin injection molding or the like. The insulator 62 is constituted by a pair of annular connecting bodies 81 and 82 connected to each other while being in contact with each other in the axial direction with all the I-type cores 61 sandwiched therebetween.

In the case of the insulator 62 of the present embodiment, a lower annular connecting body 81 is formed in a single body formed in a circular annular shape (main connecting body 81). An upper annular connecting body 82 is composed of a plurality of (three in the present embodiment) connecting elements 82a having an arc shape, and is formed in an annular shape having a vertically symmetrical shape with the main connecting body 81 by connecting them (subsidiary connecting body 82). However, the subsidiary connecting body 82 is provided with a terminal portion 83 constituting a connector 76 differently from the main connecting body 81. All the ends of the wires W led out from the coils 63 are connected to the terminal portion 83.

36 core inserting portions 84 into which the I-type cores 61 are inserted are provided at regular intervals in the circumferential direction in the main connecting body 81. The core inserting portion 84 is formed in a shape corresponding to the outer shape of the I-type core 61 with a wall having a thin thickness and accommodating approximately half of the lower side of the I-type core 61. The core inserting portions 84 are connected to each other by the wall portions (connecting wall portions 84a) between the both edge portions on the outer peripheral side of the core inserting portion 84.

The basic structure of each connecting elements 82a is the same as that of the main connecting body 81 and the twelve core inserting portions 84 into which the I-type cores 61 are inserted are equally spaced in the circumferential direction. The core inserting portion 84 is formed in a shape corresponding to the outer shape of the I-type core 61 with a wall having a thin thickness and accommodating approximately half of the upper side of the I-type core 61. The wall portions (connecting wall portions 84a) on the outer peripheral side of core inserting portions 84 are arranged so that core inserting portions 84 are connected to each other.

The main connecting body 81 and the subsidiary connecting body 82 which are the insulator 62 are required to secure the insulation between the I-type cores 61 and the coil 63. Therefore, the main connecting body 81 and the subsidiary connecting body 82 are formed of an insulating resin (resin having excellent insulation). Particularly, the main connecting body 81 may be formed of insulating resin and CFRP (carbon fiber reinforced plastic). Thus, the rigidity is further strengthened, and deformation or breakage of the main connecting body 81 may be suppressed, thereby facilitating handling.

However, since the CFRP is low insulation, in the present embodiment, the main connecting body 81 is formed in a double structure in which portions of the main connecting body 81 on which the coil 63 is not wound, for example, such as the connecting wall portions 84a, are made of CFRP, and the peripheral portions of the I-type cores 61 on which the coil 63 is wound are made of an insulating resin. As another example, instead of dividing the CFRP and the insulating resin into sections, the CFRP may be molded to be covered with the insulating resin so that the entire main connecting body 81 may be made of CFRP and the insulating resin.

As the base resin constituting the CFRP, it is preferable to use the same kind of resin as the insulating resin. By making the base resin the same as that of the insulating resin, the integral of the CFRP and the insulating resin by the double molding may be improved and the rigidity may be further improved.

(First Step)

At the time of manufacturing, first, the main connecting body 81 is stably supported on a workbench or the like, and then one I-type core 61 is inserted into each of the core inserting portions 84 of the main connecting body 81. Since it is a repetition a simple operation, the insertion operation may be simply performed, and automated. The I-type cores 61 may be disposed at appropriate positions only by inserting them into the core inserting portions 84.

A core holding structure C1 (the structure in which the I-type cores 61 are embedded in the pair of connected annular connecting bodies 81 and 82) is formed by connecting the main connecting body 81 and the subsidiary connecting body 82 in a state in which the main connecting body 81 and the subsidiary connecting body 82 are in contact with each other. At this time, if both the annular connecting bodies 81 and 82 are integrally formed, it is difficult to connect them because they cannot be inserted unless the positions of all the I-type cores 61 and the core inserting portions 84 are matched with each other. However, in the case of the present embodiment, since the subsidiary connecting body 82 to be connected later is divided into the plurality of connecting elements 82a, the connection may be made relatively easy. Further, since the main connecting body 81 formed integrally and having excellent rigidity is handled downward, the core holding structure C1 may be stably handled.

Figure 27:
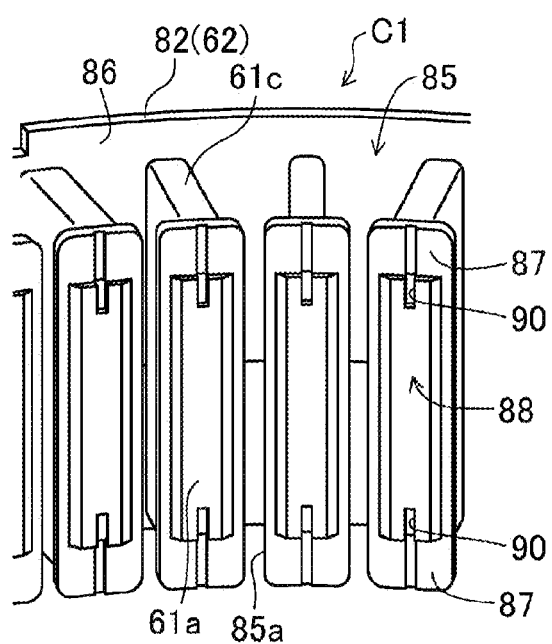
FIG. 27 is a perspective view schematically illustrating a part of the core holding structure in the motor according to the third embodiment when viewed from the center side.
Figure 28:
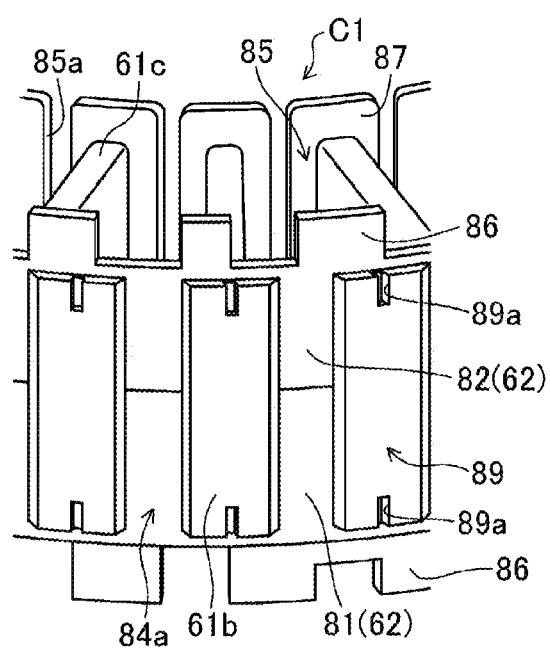
FIG. 28 is a perspective view schematically illustrating a part of the core holding structure in the motor according to the third embodiment when viewed from the outer peripheral side.

FIGS. 27, 28, and 29 show the core holding structure C1. The core holding structure C1 is provided with 36 tooth bodies 61c and 36 slots 85. The tooth body 61c is a portion where the I-type core 61 is covered with the insulator 62 and the wire W is wound thereon. The slot 85 is a space penetrating in the axial direction between the tooth bodies 61c and 61c which are adjacent to each other, the wound wire W is accommodated therein.

Outer flange portions 86 and 86 protruding in the axial direction are provided on both edge portions on the outer peripheral side of the core holding structure C1. Likewise, inner flange portions 87 and 87 protruding in the axial direction are provided on both edge portions on the inner peripheral side of the core holding structure C1. The outer flange portions 86 and the inner flange portions 87 prevent the winding of the wound wire W from being broken and are formed to be slightly higher than the height of the coil 63 in the axial direction.

On the inner circumferential surface of the core holding structure C1, 36 slot openings 85a in fluid communication with the each slots 85 are opened in a slit shape. The I-type cores 61 are exposed on the inner and outer circumferential surfaces of the core holding structure C1 to form inner core surface portions 88 and outer core surface portions 89.

As illustrated in FIG. 29, when viewed in the axial direction, the thickness t of the central portion of the connecting wall portion 84a is formed thicker than opposite ends thereof. Thus, the rigidity of the main connecting body 81 or the core holding structure C1 may be improved.

Likewise, as viewed in the axial direction, the inner core surface portions 88 are located inside the inner circumferential surface of the insulator 62, and the outer core surface portions 89 are located outside the outer circumferential surface of the insulator 62. With this configuration, since the inner core surface portions 88 and the outer core surface portions 89 are brought into contact with the mold D when molding, the I-type cores 61 may be positioned with high accuracy in the radial direction and the roundness of the stator 60 may be increased. As a result, since the gap between the inner rotor 30 and the outer rotor 20 may be reduced, the performance of the motor may be improved.

(Second Step)

The core holding structure C1 is mechanically subjected to a winding process for winding the wire W on each of the I-type cores 61 set on the winding machine M and covered with the insulator 62 to form the coil 63. Thus, a structure (a winding body C2) in which the coil 63 is provided in the core holding structure C1 is formed.

Figure 30:
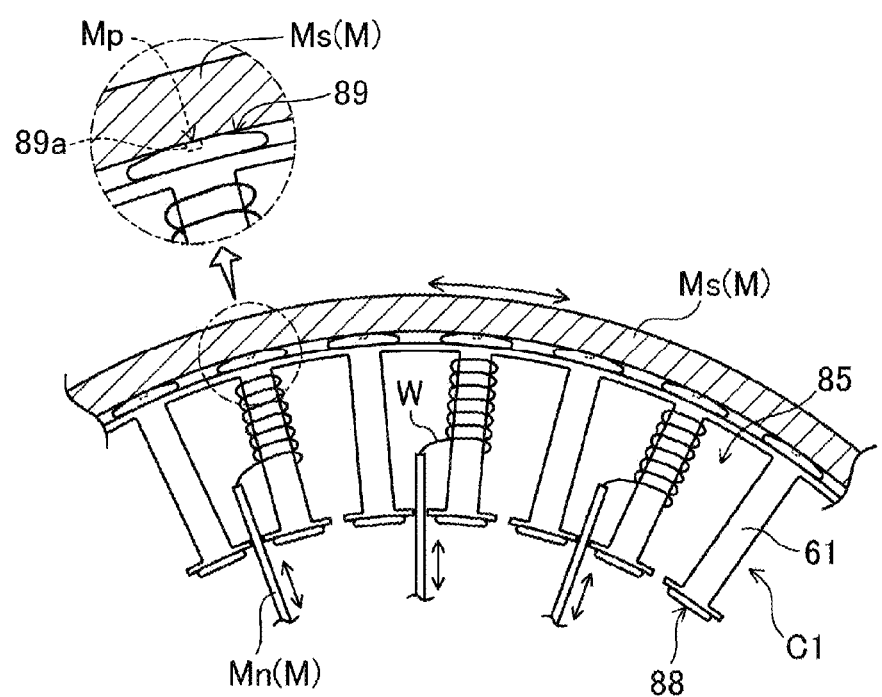
FIG. 30 is a view for explaining the winding process in relation to the motor according to the third embodiment.

As illustrated in FIG. 30, the winding machine M is provided with a supporting member Ms that rotatably and controllably supports the core holding structure C1 and three nozzles Mn that are displaceable in the axial direction with respect to the core holding structure C1 and let out the wire W from the leading end thereof. The winding machine M performs the winding process by controlling displacement of the three nozzles Mn in synchronization in the inner circumferential side of the core holding structure C1 while controlling the rotation of the supporting member Ms supporting the outer circumferential side of the core holding structure C1.

In order to firmly support the core holding structure C1 in the supporting member Ms, as illustrated in FIG. 28, the upper and lower portions of the outer core surface portions 89 are provided with grooves 89a (an example of a supporting structure) extending in the axial direction. As illustrated in FIG. 30, the supporting member Ms is provided with a supporting mechanism Mp to be inserted into the grooves 89a. Therefore, during the winding process, the supporting mechanism Mp is inserted into each of the grooves 89a so that the core holding structure C1 is firmly supported on the supporting member Ms, and the winding process may be performed stably.

When the edge portions on both sides (circumferential direction) of the outer core surface portions 89 protrude from the outer surface of the insulator 62, the supporting mechanism Mp is not inserted into the grooves 89a, but the edge portions on both sides (circumferential direction) of the outer core surface portions 89 may be inserted into the supporting mechanism Mp.

In order to drive the inner rotor 30 and the outer rotor 20 individually by supplying the composite current, each of the coils 63 has a six-phase configuration corresponding to both the three-phases and the six-phases (A to F phase). Specifically, each of the coils 63 is formed by winding six wires W on each of the 36 I-type cores 61 in a predetermined order. In the winding process, the process of winding three wires W by the same operation at the same time is performed twice by synchronously controlling displacement of the three nozzles Mn. Accordingly, since the coil 63 may be formed with a small man-hour, the productivity is excellent.

Figure 31:
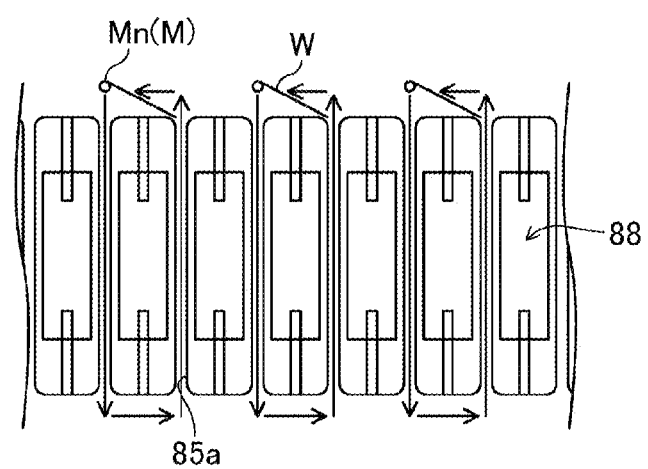
FIG. 31 is a view for explaining the winding process in relation to the motor according to the third embodiment.

When the winding process is started, the winding machine M is controlled so that the wire W is wound around predetermined tooth bodies 61c, and a three-phase coil group is automatically formed in a predetermined winding pattern. In detail, after each of the nozzles Mn is positioned with respect to the predetermined tooth body 61c of each phase, winding of the wire W is started. Thus, as illustrated by arrows in FIGS. 30 and 31, the wires W drawn out from the nozzles Mn are wound around the tooth bodies 61c by displacing the nozzles Mn in the radial direction while alternately repeating the axial displacement of each of the nozzles Mn and the rotation of the core holding structure C1 in a predetermined order.

Figure 32:
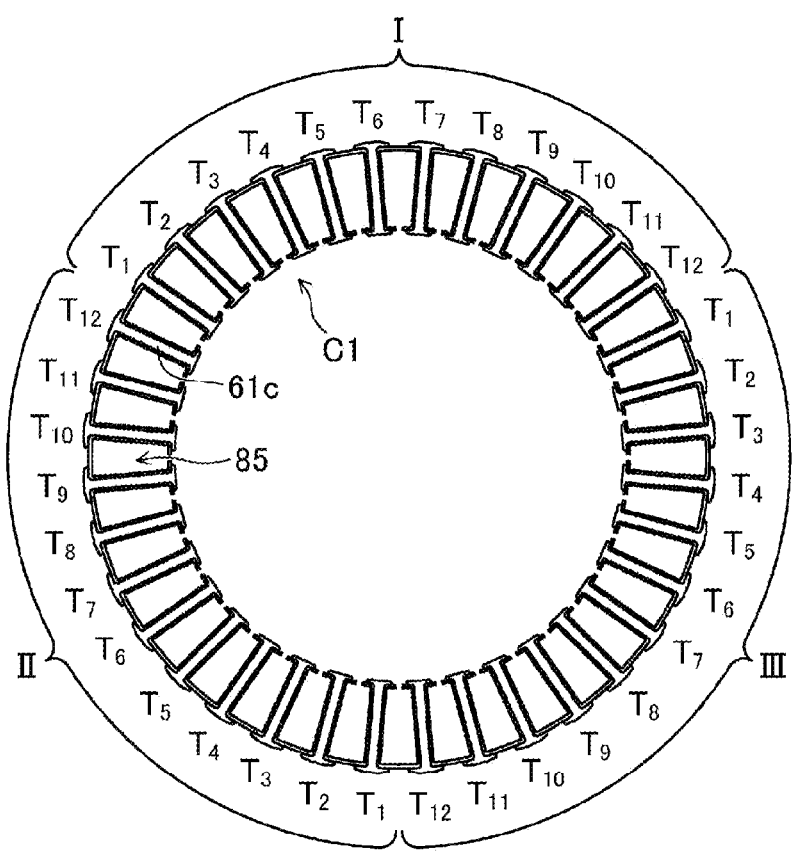
FIG. 32 is a view for explaining the winding pattern in relation to the motor according to the third embodiment.

The winding pattern will be described with reference to FIGS. 32 and 33. The core holding structure C1 may be divided into three sections I to III having the same winding pattern. One section includes twelve tooth bodies 61c. In FIG. 32, the tooth bodies 61c are numbered 1 to 12 in a clockwise direction to distinguish them.

Figure 33:
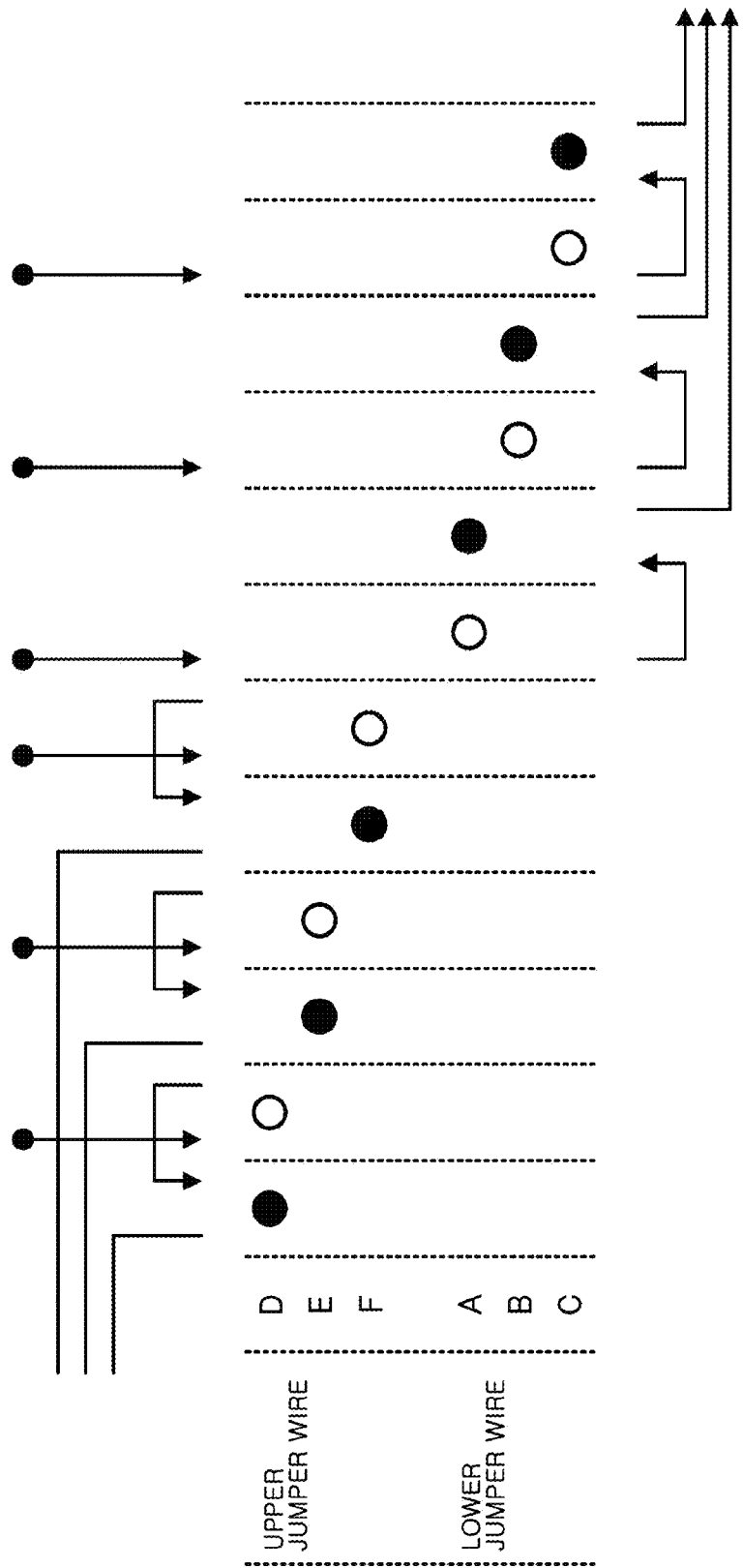
FIG. 33 is a view for explaining the winding pattern in relation to the motor according to the third embodiment.

FIG. 33 illustrates the winding pattern of the section I. The tooth bodies 61c indicated by a white circle indicates that the wire W is wound in the counter-clockwise direction (CCW), and the tooth bodies 61c indicated by a black circle indicates that the wire W is wound in the clockwise direction (CW). For example, in the first winding process, it is assumed that winding of the wire W starts from the tooth bodies 61c of Nos. 2, 4, and 6 of the section I. After the coil 63 is formed by winding the wire W on the tooth bodies 61c in the counter-clockwise direction a predetermined number of turns, the wire W is pulled out upward. Subsequently, the coil 63 is formed by winding the wire W in the clockwise direction a predetermined number of turns on the tooth bodies 61c of Nos. 1, 3, and 5, and the wire W is pulled out upward.

The pulled out wire W is started to be wound from the tooth bodies 61c of Nos. 2, 4, and 6 of the section II, and the winding process is performed in the same manner as the section I. Subsequently, in the section III, the winding process is performed in the same manner as the sections I and II. Thus, 18 coil 63 (D, E, and F) of the same winding pattern are formed in each of the sections I to III.

Next, a new wire W is drawn out from each of the nozzles Mn, and a second winding process is performed.

Winding of the wire W starts from the tooth bodies 61c of Nos. 7, 9, and 11 in the section I, and the wire W is wound on the tooth bodies 61c by a predetermined number of turns in the counter-clockwise direction and is pulled out downward. Subsequently, after the wire W is wound in the clockwise direction a predetermined number of turns on the tooth bodies 61c of Nos. 8, 10, and 12, the wire W is pulled out downward.

The pulled out wire W is moved to the section II, and winding of the wire W is started from the tooth bodies 61c of Nos. 7, 9, and 11 in the section II so that the winding process is performed in the same manner as the section I. Subsequently, the wire W is moved to the section III, and the winding process is performed in the same manner as the sections I and II. Thus, 18 coils 63 (A, B, and C) of the same winding pattern are formed in each of the sections I to III and the winding process is completed.

Figure 34:
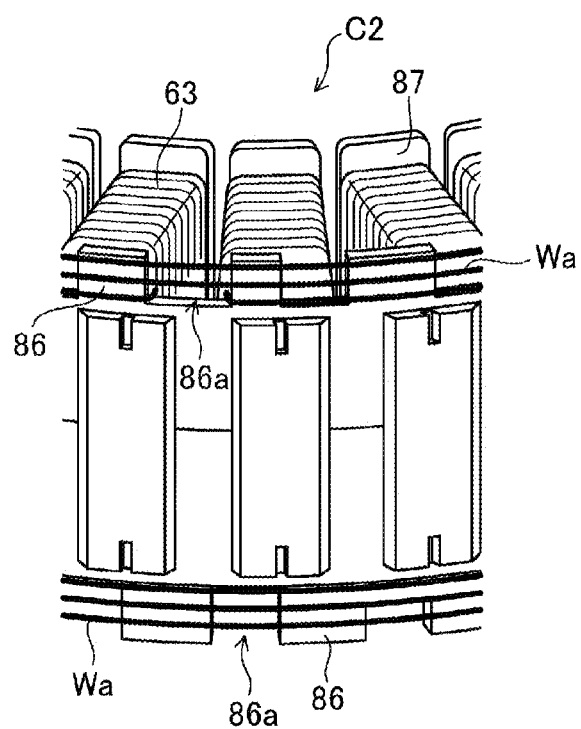
FIG. 34 is a perspective view schematically illustrating a part of a winding body when viewed from the outer peripheral side in relation to the motor according to the third embodiment.

As illustrated in FIG. 34, during the winding process, the jumper wires Wa (portions between the sections) of the three wires W to be processed at the first time are arranged along the outer surface of the outer flange portions 86 located on the upper side, and the jumper wires Wa of the three wires W to be processed at the second time are arranged along the outer surface of the outer flange portions 86 located on the lower side. Since notches 86a are formed at predetermined portions of the outer flange portions 86, the wire W may be pulled out to the outer surface side of the outer flange portions 86 through the notches 86a.

As described above, since the height of the insulator 62 and further the stator 60 in the axial direction may be suppressed by arranging the jumper wires Wa in the upper and lower portions of the outer flange portions 86 in three by three, the size of the motor 12 may be reduced. Since the jumper wires Wa are arranged on the outer flange portions 86 on the same side every winding process, the arrangement structure of the wire W is simplified and the processing efficiency of the winding machine M may be improved.

After the winding process is completed, the winding body C2 is removed from the winding machine M and then placed on a work table. The start end and the final end of each of the wires W are connected to a predetermined terminal of the terminal portion 83. At this time, since the winding body C2 is handled in a state in which the main connecting body 81 is located on the lower side and the terminal portion 83 disposed on the subsidiary connecting body 82 is located on the upper side, the connection process may be easily performed.

(Third Step)

The winding body C2 is set on the mold D, and molding is performed using the thermosetting resin.

Figure 35:
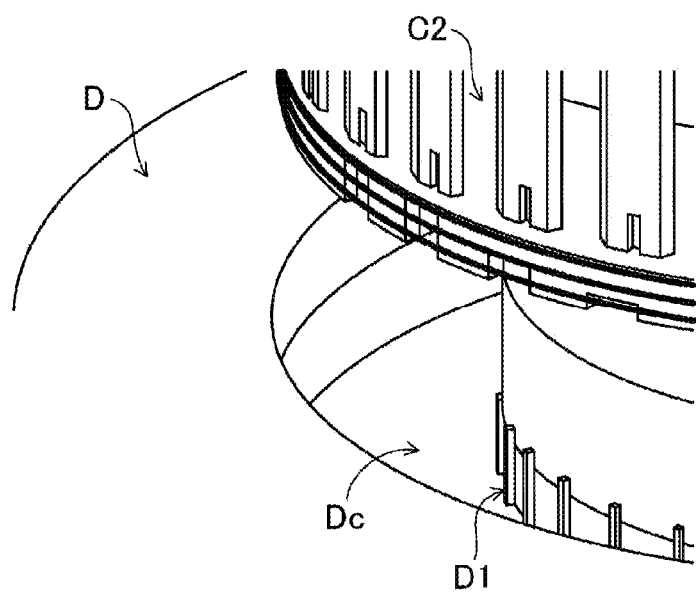
FIG. 35 is a view for explaining a positioning structure in relation to the motor according to the third embodiment.

As illustrated in FIG. 35, the mold D is constituted by a pair of upper and lower molds in contact with each other in the axial direction, and a cavity Dc having a circular ring shape in which the winding body C2 is accommodated is formed inside the mold D. The dimension of the cavity Dc is set such that the inner core surface portions 88 are in surface contact with the inner circumferential surface of the cavity Dc and the outer core surface portions 89 are in surface contact with the outer circumferential surface of the cavity Dc in order for the inner core surface portions 88 and the outer core surface portions 89 to be exposed from the resin molded body 75.

Since the inner circumferential surface of the winding body C2 is divided into a plurality of parts by the slot openings 85a, position deviation and deformation are liable to occur due to the winding process. In addition, in the motor 12, the inner circumferential side of the stator 60 is rotated at a high speed, and noise is liable to be generated. Accordingly, when the roundness of the inner circumferential side and the accuracy of the arrangement of the magnetic poles of the winding body C2 are low, there is a possibility that noise becomes high.

Thus, a positioning structure is provided between the inner circumferential surface of the winding body C2 and the opposing surface of the mold D facing thereto. The molding is performed in a state in which the winding body C2 is positioned in the circumferential direction with respect to the mold D by the positioning structure.

Specifically, as illustrated in FIG. 27, in the inner circumferential surface of the winding body C2, a plurality of recesses 90 extending in the axial direction from each of the upper edge and the lower edge are formed on the inner core surface portions 88 and the insulator 62. As illustrated in FIG. 35, a plurality of protruding portions D1 to be inserted into the recesses 90 are formed on opposed surfaces of the upper and lower molds. The winding body C2 is positioned with respect to the mold D in the circumferential direction with high accuracy by inserting the protruding portions D1 into the recesses 90 and mounting the winding body C2 to the upper and lower molds.

Figure 36:
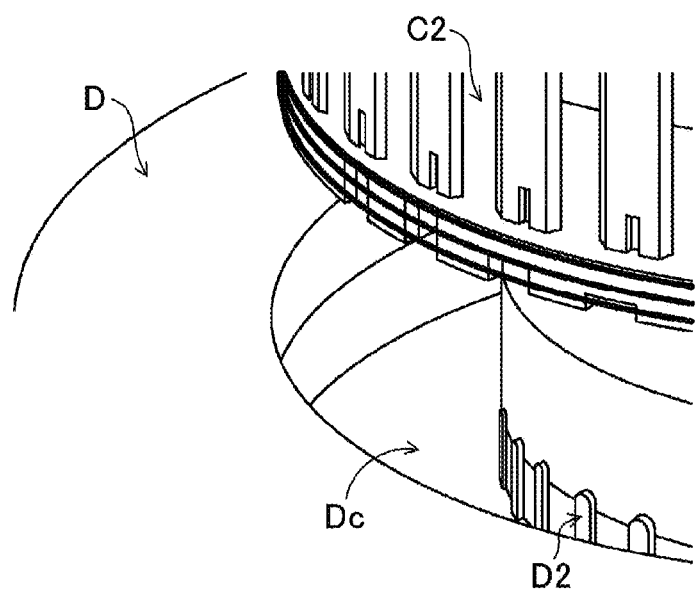
FIG. 36 is a view for explaining a modification of a positioning structure in relation to the motor according to the third embodiment.

It is also possible to provide a positioning structure by using the plurality of slot openings 85a formed in the inner circumferential surface of the winding body C2. In other words, as illustrated in FIG. 36, a plurality of engaging protrusions D2 are provided in the mold D to fit into the slot openings 85a. So, the engaging protrusions D2 are inserted into the slot openings 85a and the winding body C2 is mounted to the upper and lower molds. Thus, the winding body C2 may be positioned in the circumferential direction with high accuracy with respect to the mold D.

At this time, a dimension may be set such that a portion of the entire circumference of the insulator 62 forming the outer circumferential side of the winding body C2 comes into contact with the outer circumferential surface of the mold D and presses the winding body C2 toward the inner circumferential side. This enhances the closeness between the inner circumferential surface of the winding body C2 and the mold D, thereby improving the roundness of the inner circumferential side of the winding body C2. After the winding body C2 is set on the mold D as described above, the molding is performed. Thus, the resin molded body 75 is formed and the stator 60 having the structure as illustrated in FIG. 6 is formed.

(Modifications)

Figure 37:
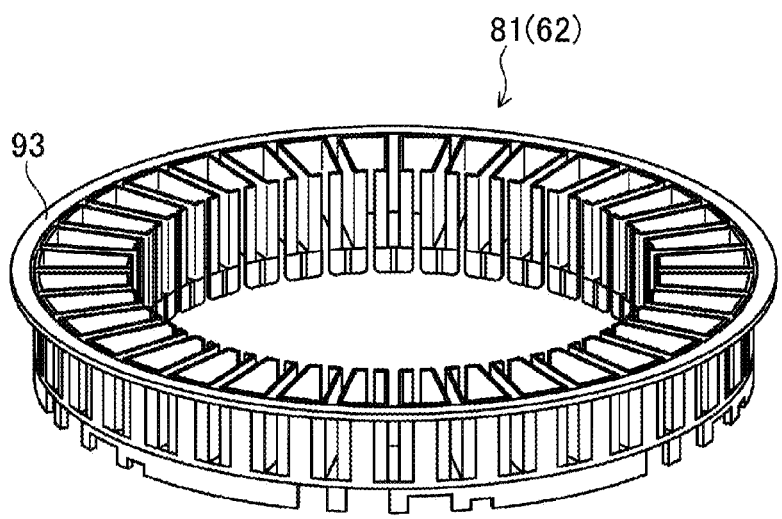
FIG. 37 is a view for explaining a modification of a method of manufacturing the motor according to the third embodiment.
Figure 38:
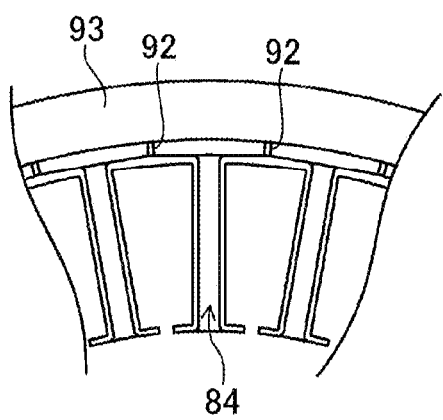
FIG. 38 is a view for explaining a modification of a method of manufacturing the motor according to the third embodiment.

For example, as illustrated in FIGS. 37 and 38, an annular supporting portion 93, which connects the plurality of core inserting portions 84 via a plurality of temporary connecting portions 92 having a small rod shape may be provided around the connecting portion of the main connecting body 81 to be in contact with the subsidiary connecting body 82. In this case, after the third step, a fourth step of cutting the temporary connecting portions 92 and removing the annular supporting portion 93 may be further included.

This makes it possible to enhance the rigidity of the main connecting body 81 with the annular supporting portion 93 so that handling of the core holding structure C1 and the winding body C2 gets easier. In addition, since the molding is performed in a state in which the deformation of the core holding structure C1 is suppressed, the quality of the motor may be improved.

Figure 39:
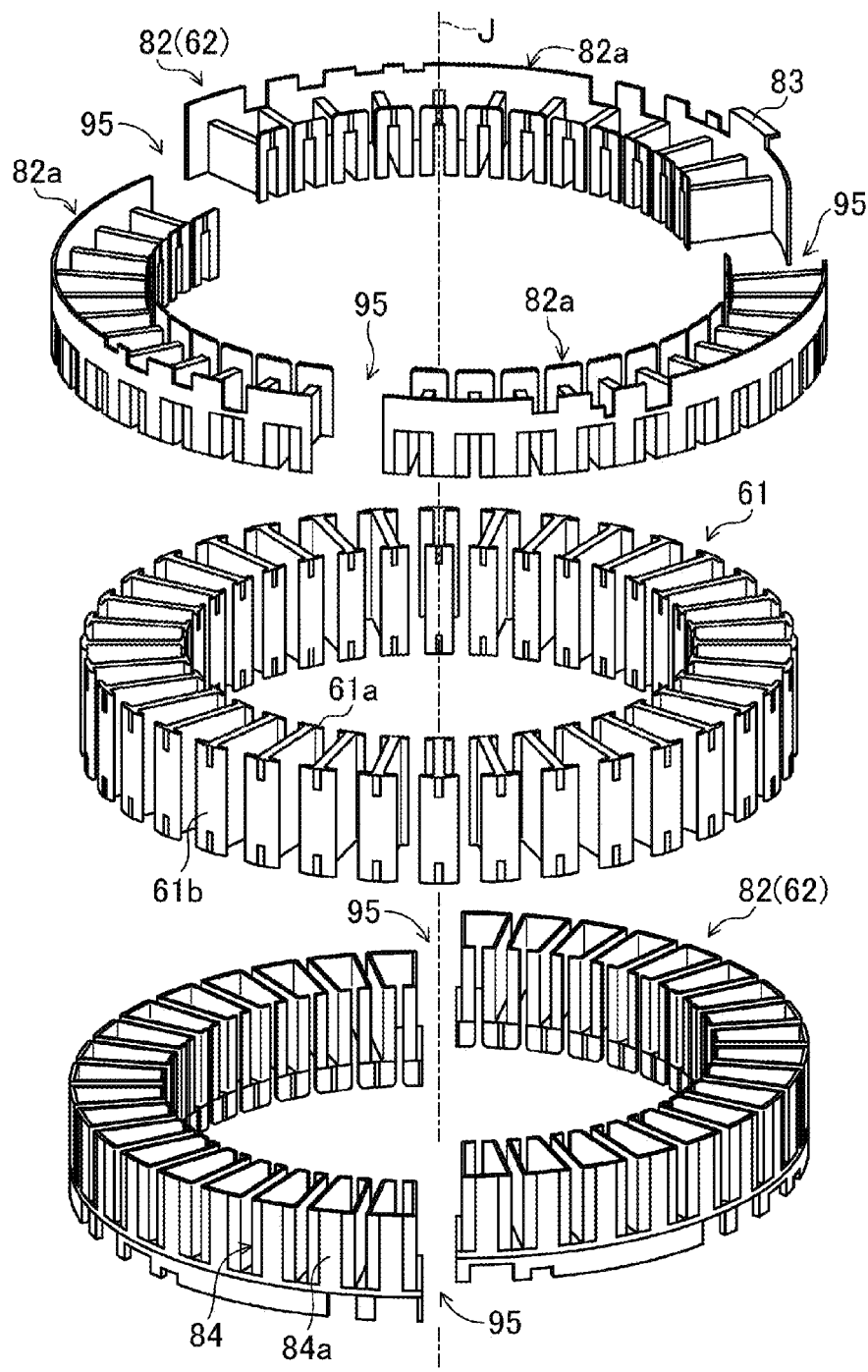
FIG. 39 is a view corresponding to FIG. 26 illustrating a modification of the motor according to the third embodiment.

As illustrated in FIG. 39, both of the annular connecting bodies may be constituted by the subsidiary connecting body 82 divided into a plurality of parts without using the main connecting body 81. In this case, the connecting portions 95 between the plurality of connecting elements 82a of one subsidiary connecting body 82 and the connecting portions 95 between the connecting elements 82a of the other subsidiary connecting body 82 are shifted in the circumferential direction and do not coincide with each other (do not overlap vertically). As described above, even when the two annular connecting bodies are constituted by the plurality of connecting elements, they may be integrated and stably supported. Compared with the mold for molding the integral main connecting body 81, since the mold may be made smaller as it is divided, there is an advantage that the cost of the mold may be largely reduced.

Particularly, as illustrated in FIG. 39, the number of the subsidiary connecting bodies 82 corresponding to the main connecting body 81 may be larger than the number of the upper subsidiary connecting bodies 82 on which the terminal portion 83 is disposed. In this way, the connecting portions 95 may be easily moved, and the subsidiary connecting body 82 having a small number of divisions and a high strength is positioned at the lower side so that the supporting may be stable and the connection process may be made easy.

The slot openings 85*a* of the stator 60 may be provided on the outer circumferential side. The number of poles of the stator 60, the inner rotor 30, and the outer rotor 20 may be appropriately changed according to the specifications. The current for driving the motor 12 is not limited the composite current.

Fourth Embodiment

The fourth embodiment relates to a motor controller used in a washing machine 1.
(Control of the Rotational Motion of the Motor)

Figure 40:
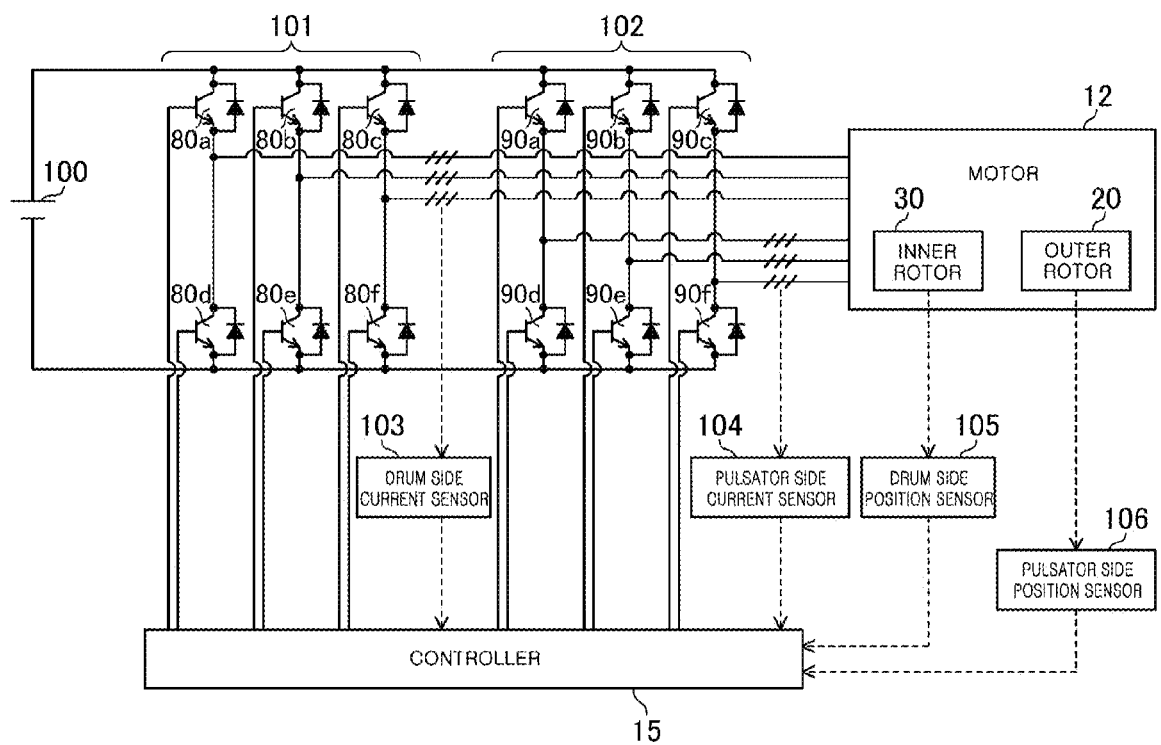
FIG. 40 is a schematic view illustrating a structure of a motor, a drum-side inverter circuit, a pulsator-side inverter circuit, and a controller of a washing machine according to the fourth embodiment.

As illustrated in FIG. 40, the controller 15 provided in the washing machine 1 and the inner rotor 30 are connected to each other through a drum side inverter circuit 101. The controller 15 and the outer rotor 20 are connected to each other through a pulsator side inverter circuit 102. The inverter circuits 101 and 102 are connected in parallel with each other and connected to a common DC power supply 100.

The controller 15 inputs electric signals subjected to the pulse width modulation control (PWM control) to the drum side and the pulsator side inverter circuits 101 and 102 by using a predetermined command signal and a carrier wave composed of a triangular wave and applies the DC voltage to the motor 12.

The drum side inverter circuit 101 is a three-phase inverter circuit, three upper arm side switching elements (hereinafter, referred to as upper-arm-side SW elements 80*a*, 80*b*, and 80*c* are provided in the upper arm side, which is the high potential side, and three lower arm side switching elements (hereinafter, referred to as lower-arm-side SW elements) 80*d*, 80*e*, and 80*f* are provided in the lower arm side, which is the low potential side, so that the drum side inverter circuit 101 has six SW elements in total.

The upper-arm-side SW element 80*a* and the lower-arm-side SW element 80*d* are connected in series to form an inverter. Likewise, the upper-arm-side SW element 80*b* and the lower-arm-side SW element 80*e*, and the upper-arm-side SW element 80*c* and the lower-arm-side SW element 80*f* are also connected in series to form an inverter. The three inverters are connected in parallel to constitute the drum side inverter circuit 101.

Each of the SW elements 80*a* to 80*f* is controlled to be on or off based on the electric signal from the controller 15. The electric power supplied to the motor 12 is controlled by the combination of on and off. As a result, the rotational speed of the inner rotor 30, that is, the rotational speed of the drum 11 is controlled. Each of the SW elements 80*a* to 80*f* is an IGBT in the present embodiment.

The drum side inverter circuit 101 is connected to a drum side current sensor 103 for detecting a current supplied from the drum side inverter circuit 101 to the motor 12. The detection current detected by the drum side current sensor 103 is transmitted to the controller 15.

On the other hand, similarly to the drum side inverter circuit 101, the pulsator side inverter circuit 102 is a three-phase inverter circuit, three upper-arm-side SW elements 90*a*, 90*b*, and 90*c* are provided in the upper arm side, which is the high potential side, and three lower-arm-side SW elements 90*d*, 90*e*, and 90*f* are provided in the lower arm side, which is the low potential side so that the pulsator side inverter circuit 102 has six SW elements in total. The upper-arm-side SW element 90*a* and the lower-arm-side SW element 90*d* are connected in series to form an inverter. Likewise, the upper-arm-side SW element 90*b* and the lower-arm-side SW element 90*e*, and the upper-arm-side SW element 90*c* and the lower-arm-side SW element 90*f* are also connected in series to form an inverter.

The three inverters are connected in parallel to constitute the pulsator side inverter circuit 102. In the same manner as the drum side inverter circuit 101, each of the SW elements 90*a* to 90*f* are controlled to be on or off based on the electric signal from the controller 15, and the electric power supplied to the motor 12 is controlled by the combination of on and off so that the rotational speed of the outer rotor 20, that is, the rotational speed of the pulsator 13 is controlled. Each of the SW elements 90*a* to 90*f* is an IGBT in the present embodiment.

The pulsator side inverter circuit 102 is connected to a pulsator side current sensor 104 for detecting a current supplied from the pulsator side inverter circuit 102 to the motor 12. The detection current detected by the pulsator side current sensor 104 is transmitted to the controller 15.

Also, the washing machine 1 includes a drum side position sensor 105 for detecting the number of rotations of the inner rotor 30 and a pulsator side position sensor 106 for detecting the number of rotations of the outer rotor 20. The drum side position sensor 105 detects the rotational speed of the drum 11 by detecting the actual rotational speed of the inner rotor 30, and the pulsator side position sensor 106 detects the rotational speed of the pulsator 13 by detecting the actual rotational speed of the outer rotor 20. The detected rotational speeds detected by the position sensors 105 and 106 are transmitted to the controller 15.

The controller 15 adjusts the electric signal to be input to the drum side and pulsator side inverter circuits 101 and 102 based on the calculated rotational speeds of the drum 11 and the pulsator 13 calculated from the detected currents detected from the drum side and pulsator side current sensors 103 and 104 or the detected rotational speeds detected from the drum side and pulsator side position sensors 105 and 106 so that the drum 11 and the pulsator 13 have desired rotational speeds.

As a result, the rotational speeds of the drum 11 and pulsator 13 are controlled. Thus, the drum side and pulsator side current sensors 103 and 104 and the drum side and pulsator side position sensors 105 and 106 constitute rotational speed detectors.

Here, the controller 15 controls the drum 11 and the pulsator 13 to rotate at a high speed in the same direction in the dewatering process, and executes a deceleration process for decelerating and stopping the drum 11 and the pulsator 13 from the high-speed rotation after the completion of the dewatering process. When the difference in the rotational speed between the drum 11 and the pulsator 13 occurs in the deceleration process, the laundry is turned in the slower direction and the laundry is drawn between the drum 11 and the pulsator 13, thereby causing damage to the fabric.

In the case in which the inner rotor 30 and the outer rotor 20 are provided and the drum 11 and the pulsator 13 are independently rotated as in the present embodiment, the regenerative electric power based on the torque acting on each of the inner rotor 30 and the outer rotor 20 is generated, so that the regenerative electric power is almost twice as large as that in the case of one rotor.

Therefore, when the drum 11 and the pulsator 13 (specifically, the inner rotor 30 and the outer rotor 20) are suddenly decelerated, the regenerative electric power cannot be consumed much and the regenerative electric power may act on the DC power supply 100, thereby damaging the DC power supply 100. In order to prevent this, it is necessary to smoothly decelerate the drum 11 and the pulsator 13 to properly process the regenerative electric power.

As described above, when it is necessary to smoothly decelerate the drum 11 and the pulsator 13 while executing the synchronous control, it is preferable to adjust the rotational speed to the side having a lower deceleration rate, that is, the side having the higher rotational speed. However, when the rotational speed is adjusted to the side where the rotational speed is higher, it takes time to stop the drum 11 and the pulsator 13.

In an embodiment 1, therefore, in the synchronous control for making the detection rotational speeds of the drum 11 and the pulsator 13 detected by the drum side and pulsator side position sensors 105 and 106 substantially equal to each other, the upper arm side short brake control in which all of the upper-arm-side SW elements are turned on and all of the lower-arm-side SW elements are turned off to apply a short-circuit brake, and the lower arm side short brake control in which all of the upper-arm-side SW elements are turned off and all of the lower-arm-side SW elements are turned on to apply a short-circuit brake executed by the controller 15 every one cycle of the carrier wave used for the PWM control, the lower arm side short brake period extension control, in which the upper arm side short brake period for executing the upper arm side short brake control is shortened and the lower arm side short brake period for executing the lower arm side short brake control is extended without changing the length of the synchronous control period which is set by the PWM control based on the detected rotational speed every one cycle of the carrier wave and during which the synchronous control is performed, is executed.

In the short-circuit brake, since the brake effect is not exhibited unless the regenerative current flows from the motor 12, the brake effect of the lower arm side short brake, which shorts the lower-arm-side SW elements that are connected to the ground side and are not affected by the DC voltage, is larger than that of the upper arm side short brake which shorts the upper-arm-side SW elements affected by the DC voltage from the DC power supply 100. Therefore, by executing the lower arm side short brake period extension control, the deceleration time may be shortened when decelerating the drum 11 and the pulsator 13 while executing the synchronous control.

Hereinafter, the lower arm side short brake period extension control will be described with reference to FIGS. 41 and 42. Since the lower arm side short brake period extension control method is substantially the same in the drum side inverter circuit 101 and the pulsator side inverter circuit 102, only the control for the drum side inverter circuit 101 will be described below.

First, the synchronous control period, the upper arm side short brake period, and the lower arm side short brake period will be described with reference to FIG. 41.

Figure 41:
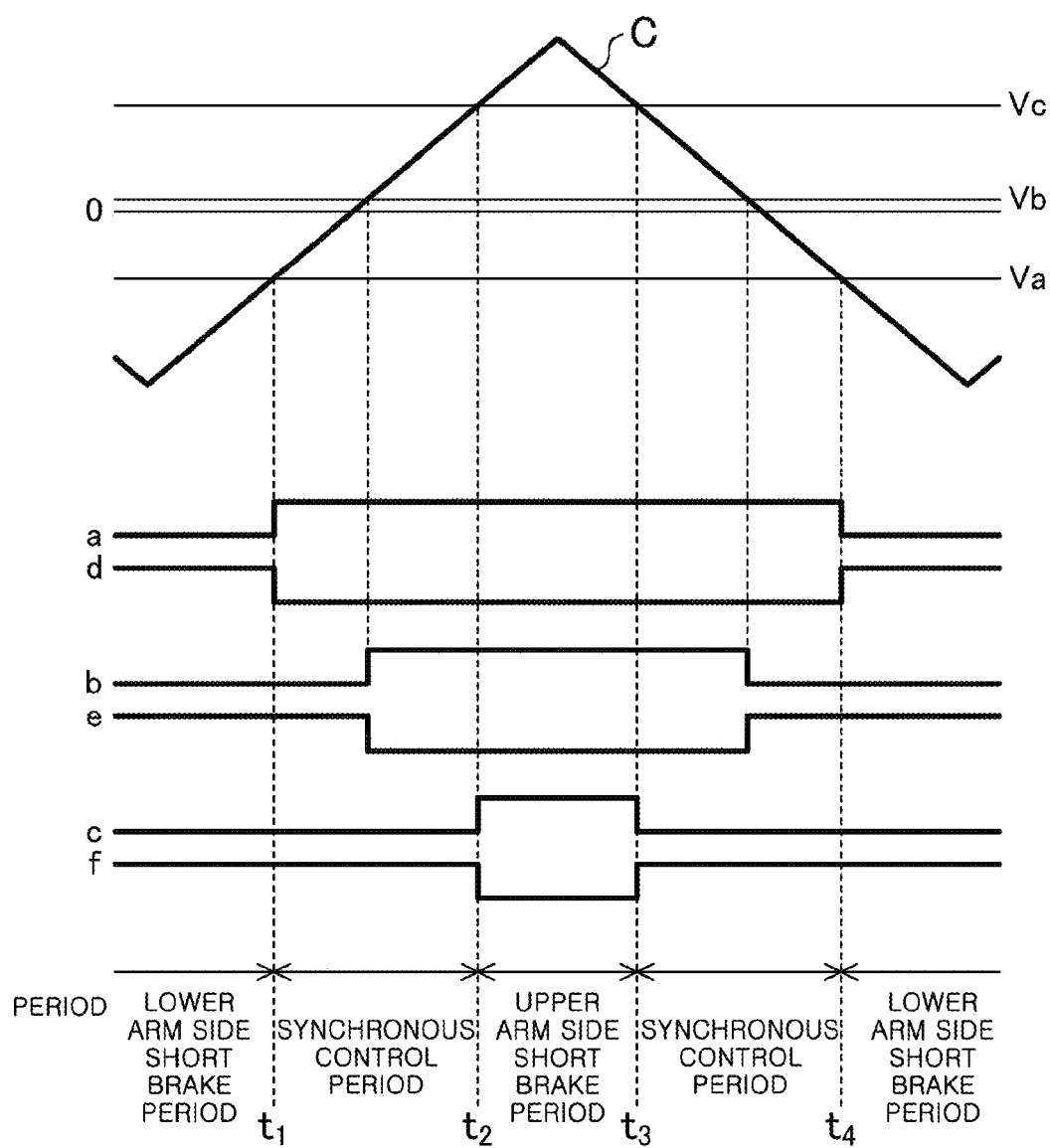
FIG. 41 is a schematic diagram illustrating the relationship between the command signal and the carrier wave, and signals to the upper arm side and lower arm side switching elements based on the command signal and the carrier wave, in relation to the washing machine according to the fourth embodiment.

FIG. 41 shows the relationship between command signals Va, Vb, Vc and the carrier wave C and electric signals to the upper-arm-side and lower-arm-side SW elements 80*a* to 80*f* based on this before the lower arm side short brake period extension control is executed. Also, in the drawing, a, b, c, d, e, and f correspond to each of the SW elements such that, for example, a is an electric signal transmitted to the upper-arm-side SW element 80*a*. In FIG. 41, an arbitrary portion of the electric signal sent to the drum side inverter circuit 101 is missing. The same or different electric signals are sent from the controller 15 to the drum side inverter circuit 101 before and after the period shown in FIG. 41.

The PMW controlled electric signal sent from the controller 15 to the drum side inverter circuit 101 is determined by comparing the command signals Va, Vb, and Vc with the carrier wave C. In detail, in a range where the command signals Va, Vb, and Vc are above the carrier wave C based on points where the command signals Va, Vb, Vc and the carrier wave C intersect with each other, an electric signal for turning off the upper-arm-side SW elements 80*a* to 80*c* and turning on the lower-arm-side SW elements 80*d* to 80*f* is sent. On the other hand, in the range where the command signals Va, Vb, Vc are below the carrier wave C, an electric signal for turning off the upper-arm-side SW elements 80*a* to 80*c* and turning on the lower-arm-side SW elements 80*d* to 80*f* is sent.

The command signals Va, Vb, Vc before execution of the lower arm side short brake period extension control are determined based on the detected rotational speeds of the drum and the pulsator. Further, in order to simplify the explanation, FIG. 41 shows the case where the switching of on and off of the upper-arm-side SW element 80*a* to 80*c* and the switching of on and off of the lower-arm-side SW element 80*d* to 80*f* are performed simultaneously. However, in reality, the switching timings are shifted so that the SW elements forming the inverter (for example, the upper-arm-side SW element 80*a* and the lower-arm-side SW element 80*d*) are not turned on at the same time.

Specifically, in the period to t1, since all the command signals Va, Vb, and Vc are high with respect to the carrier wave C, the controller 15 turns off all the upper-arm-side SW elements 80*a* to 80*c* and turns on all the lower-arm-side SW elements 80*d* to 80*f*. At this time, the regenerative current from the motor 12 is consumed through the lower-arm-side SW element 80*d* to 80*f*, and the short brake is applied to the inner rotor 30 of the motor 12. When the carrier wave C is above the command signals Va from t1, the controller 15 turns on the upper-arm-side SW element 80*a* and turns off the lower-arm-side SW element 80*d*.

As a result, the DC voltage is applied from the DC power supply 100 to the motor 12 to adjust the rotational speed of the inner rotor 30. Thereafter, when the carrier wave C is above the command signal Vb, the controller 15 turns on the upper-arm-side SW element 80*b* and turns off the lower-arm-side SW element 80*e*. When the carrier wave C is above the command signals Vc from t2, the controller 15 turns on the upper-arm-side SW element 80*c* and turns off the lower-arm-side SW element 80*f*, so that all the upper-arm-side SW elements 80*a* to 80*c* are turned on and all the lower-arm-side SW elements 80*d* to 80*f* are turned off.

At this time, all the portions connected to the motor 12 are at the same potential, and the DC voltage is not applied to the motor 12 from the drum side inverter circuit 101. At this time, the regenerative current from the motor 12 is consumed through the upper-arm-side SW elements 80*a* to 80*c*, and the short brake is applied to the inner rotor 30.

When the carrier wave C is below the command signal Vc from the t3 after passing through the peak of the triangular wave as the carrier wave C, the controller 15 turns off the upper-arm-side SW element 80c and turns on the lower-arm-side SW element 80f. As a result, a potential difference is generated again with respect to the motor 12, the DC voltage is applied to the motor 12, so that the rotational speed of the inner rotor 30 is adjusted.

Thereafter, when the carrier wave C is below the command signal Vb, the controller 15 turns off the upper-arm-side SW element 80b and turns on the lower-arm-side SW element 80e. When the carrier wave C is below the command signal Va from t4, the controller 15 turns off the upper-arm-side SW element 80a and turns on the lower-arm-side SW element 80d. As a result, all the upper-arm-side SW elements 80a to 80c and all the lower-arm-side SW elements 80d to 80f are turned on. At this time, the regenerative electric power from the motor 12 is consumed through the lower-arm-side SW elements 80d to 80f, and the short brake is applied to the inner rotor 30.

As described above, in the period of ~t1 and t4~ in FIG. 41, the lower arm side short brake is applied to the inner rotor 30 of the motor 12. In the periods from t1 to t2 and from t3 to t4 in FIG. 41, the DC voltage is applied to the motor 12 to adjust the rotational speed of the motor 12. In the period from t2 to t3 in FIG. 41, the upper arm side short brake is applied to the inner rotor 30 of the motor 12. In other words, the periods of ~t1 and t4~ in FIG. 41 correspond to the lower arm side short brake period, the periods from t1 to t2 and from t3 to t4 in FIG. 41 correspond to the synchronous control period, and the period from t2 to t3 in FIG. 41 corresponds to the upper arm side short brake period.

Next, the lower arm side short brake period extension control will be described with reference to FIG. 42.

Figure 42:
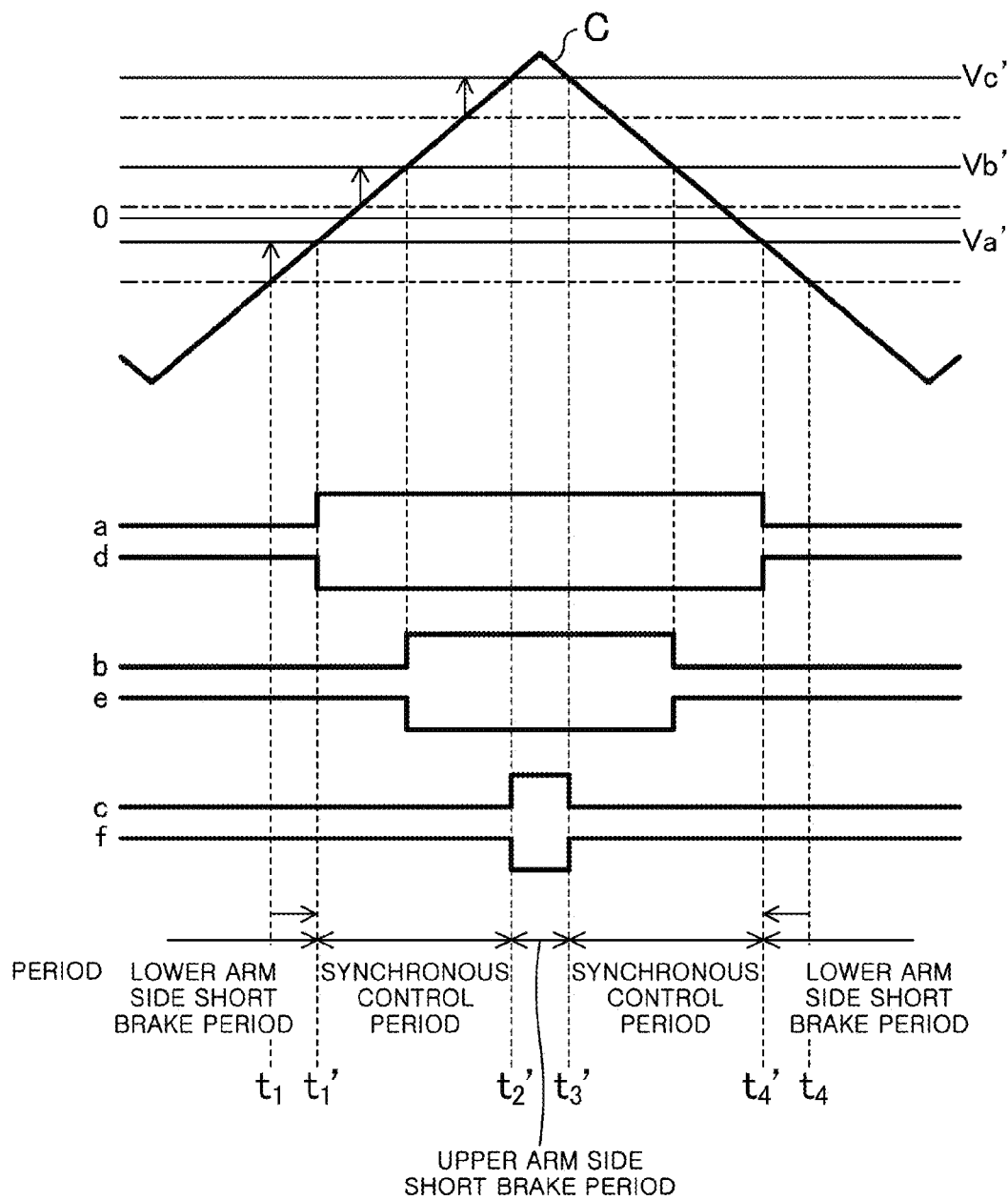
FIG. 42 is a schematic diagram illustrating the relationship between the command signal and the carrier wave, and the signals to the upper arm side and lower arm side switching elements based on the command signal and the carrier wave when the lower arm side short brake period extension control is executed, in relation to the washing machine according to the fourth embodiment.

FIG. 42 shows the relationship between command signals Va', Vb', Vc' and the carrier wave C and electric signals to the upper-arm-side and lower-arm-side SW elements 80a to 80f based on this when the lower arm side short brake period extension control is executed. Also, the virtual lines shown in FIG. 42 correspond to the command signals Va, Vb, and Vc in FIG. 41.

The controller 15 extends the lower arm side short brake period by preventing the length of the synchronous control period from changing when performing the lower arm side short brake period extension control. Specifically, the threshold value at which the upper-arm-side SW element 80a to 80c are turned on and which is set by the command signals Va, Vb, and Vc before adjustment and the carrier wave C in the PWM control is moved by the same magnitude to the peak side of the carrier wave C.

In other words, the command signals Va, Vb, and Vc before adjustment shown by the phantom lines in FIG. 42 are adjusted to be the command signals Va', Vb', and Vc' shown by solid lines in FIG. 42 so that the intersection points of the command signals Va, Vb, and Vc and the carrier wave C is shifted to the peak of the carrier wave C. By making the command signals Va, Vb, and Vc move toward the peak of the carrier wave C and setting the new command signals Va', Vb', and Vc', the period in which the command signals are below the carrier wave C is shortened and the period in which the command signals are above the carrier wave C is extended, so that the upper arm side short brake period in which all the upper-arm-side SW elements 80a to 80c are turned on and all the lower-arm-side SW elements 80d to 80f are turned off is shortened and the lower arm side short brake period in which all the upper-arm-side SW elements 80a to 80c are turned off and all the lower-arm-side SW elements 80d to 80f are turned on is extended (specifically, extended by the period of t1 to t1' and t4' to t4 shown in FIG. 42).

Also, by setting the threshold values of the upper-arm-side SW elements 80a to 80c moving toward the peak to be equal to each other, the timing at which the upper-arm-side SW elements 80a to 80c and the lower-arm-side SW elements 80d to 80f are turned on or off may be changed and the length of the synchronous control period (the period of t1' to t2' and t3' to t4' in FIG. 42) may be maintained. Thus, while maintaining the length of the synchronous control period, the lower arm side short brake period with a large brake effect may be extended.

Here, the controller 15 determines the length of the lower arm side short brake period based on the shortest period among the periods in which the upper-arm-side SW elements 80a to 80c are turned on, that is, the duty ratio of the upper-arm-side SW element (the upper-arm-side SW element 80c in FIGS. 41 and 42) having the smallest duty ratio in PWM control among the upper-arm-side SW elements 80a to 80c. In the lower arm side short brake period extension control, the duty ratio of the upper-arm-side SW elements 80a to 80c becomes smaller since the on-period of the upper-arm-side SW elements 80a to 80c is shortened.

Therefore, the period in which the duty ratio of the upper-arm-side SW element having the smallest duty ratio among the upper-arm-side SW elements 80a to 80c becomes 0% is the longest period of the lower arm side short brake period. Thus, the controller 15 determines the length of the lower arm side short brake period based on the duty ratio of the upper-arm-side SW element having the smallest duty ratio of the PWM control among the upper-arm-side SW elements 80a to 80c. As a result, the lower arm side short brake period may be appropriately extended.

The controller 15 also performs the lower arm side short brake period extension control as described above on the pulsator side inverter circuit 102 to decelerate the outer rotor 20, thereby decelerating the pulsator 13. Also, the lower arm side short brake period extension control method is the same in the drum side and pulsator side inverter circuits 101 and 102, but the length of the lower arm side short brake period is appropriately changed in accordance with the difference between the rotational speeds of the drum 11 and the pulsator 13. Further, the period of the carrier wave may be different in the control of the drum side inverter circuit 101 and the control for the pulsator side inverter circuit 102.

Therefore, in the first embodiment, since the controller 15 is configured to execute the synchronous control for substantially equalizing the detected rotational speeds of the drum 11 and the pulsator 13, which are respectively detected by the drum side and pulsator side position sensors 105 and 106, the upper arm side short brake control in which all the upper-arm-side SW elements 80a to 80c are turned on and all the lower-arm-side SW elements 80d to 80f are turned off to apply the short brake to the motor 12, the lower arm side short brake control in which all the upper-arm-side SW elements 80a to 80c are turned off and all the lower-arm-side SW elements 80d to 80f are turned on to apply the short brake to the motor 12, and the lower arm side short brake period extension control in which the upper arm side short brake period for executing the upper arm side short brake control is shortened and the lower arm side short brake period for executing the lower arm side short brake control is extended without changing the length of the synchronous control period which is set by the PWM control based on the detected rotational speed every one cycle of the carrier wave and during which the synchronous control is performed in the deceleration process after the end of the dewatering process in which the drum 11 and the pulsator 13 are rotated in the same direction, the deceleration time when the drum 11 and the pulsator 13 are synchronously controlled to decelerate may be shortened while the regenerative electric power from the motor 12 is appropriately consumed.

Next, an embodiment (embodiment 2) different from the above-described embodiment (embodiment 1) will be described. The embodiment 2 is similar to the embodiment 1 in the construction of the washing machine 1, and only the contents of the control according to the controller 15 are different from those of the embodiment 1. Accordingly, in the following description, only the contents of the control will be described, and the description of the construction of the washing machine 1 is omitted. Also, in the following description, elements common to those of the embodiment 1 are denoted by the same reference numerals.

The embodiment 2 is different from the embodiment 1 in that a target rotational speed is determined, and when the drum 11 and the pulsator 13 are decelerated, the detected rotational speeds of the drum 11 and the pulsator 13, which are detected by the drum side and pulsator side position sensors 105 and 106 are controlled to be the target rotational speed, particularly, the length of the lower arm side short brake period to be extended is determined based on the difference between the detected rotational speeds and the target rotational speed in the lower arm side short brake period extension control of the embodiment 1.

Thus, by determining the target rotational speed in advance and determining the length of the lower arm side short brake period based on the difference between the detected rotational speed and the target rotational speed, in the deceleration process, the drum 11 and the pulsator 13 may be quickly and accurately decelerated, thereby being stopped.

The control in the embodiment 2 will be described with reference to the graph of FIG. 43. Since the control on the drum 11 and the control on the pulsator 13 are substantially the same as each other, only the control on the drum 11 will be described, and the control on the pulsator 13 is omitted.

Figure 43:
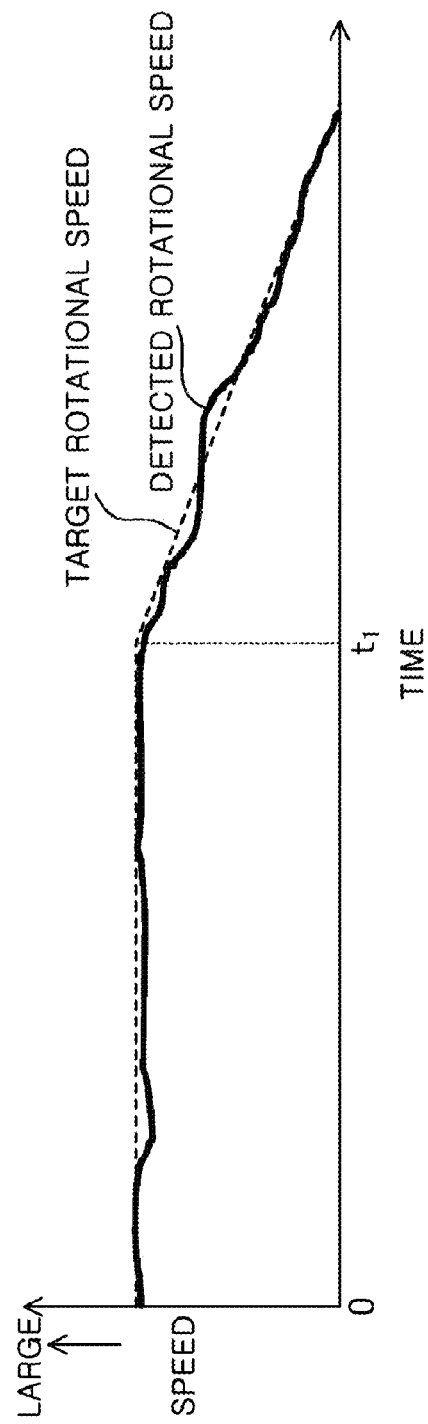
FIG. 43 is a graph illustrating the relationship between the detected rotational speed and the target rotational speed of the drum in the washing machine provided with the motor controller according to the embodiment 2 in relation to the washing machine according to the fourth embodiment.

FIG. 43 is a graph illustrating the relationship between the detected rotational speed and the target rotational speed of the drum 11. The vertical axis is rotational speed, and the horizontal axis is time. The drum 11 is controlled to have a substantially constant speed during the dewatering process (period from 0 to t1 in FIG. 43). When the dewatering process ends at time t1, the deceleration process starts.

In the deceleration process, the controller 15 decelerates the drum 11 while executing the lower arm side short brake period extension control so that the detected rotational speed of the drum 11 becomes the target rotational speed.

The control in the deceleration process will be described in detail. When the detected rotational speed is lower than the target rotational speed and the difference between the detected rotational speed and the target rotational speed is greater than a predetermined value, the controller 15 determines that there may be a difference in rotational speed between the drum 11 and the pulsator 13, and controls to shorten the lower arm side short brake period to be extended in the lower arm side short brake period extension control based on the magnitude of the difference in the rotational speed. As a result, the rotational speed of the drum 11 may be made to be approach the target rotational speed.

On the other hand, when the detected rotational speed is higher than the target rotational speed and the difference between the detected rotational speed and the target rotational speed is greater than the predetermined value, the controller 15 determines that the regenerative electric power from the motor 12 has not been consumed and controls to extend the lower arm side short brake period to be extended based on the magnitude of the difference in the rotational speed. As a result, the regenerative electric power that has not been consumed may be consumed. Further, in the case of extending the lower arm side short brake period to be extended, it is made longer in the range of the longest period of the lower arm side short brake period determined from the duty ratio in the PWM control of the upper-arm-side SW elements 80a to 80c.

Figure 44:
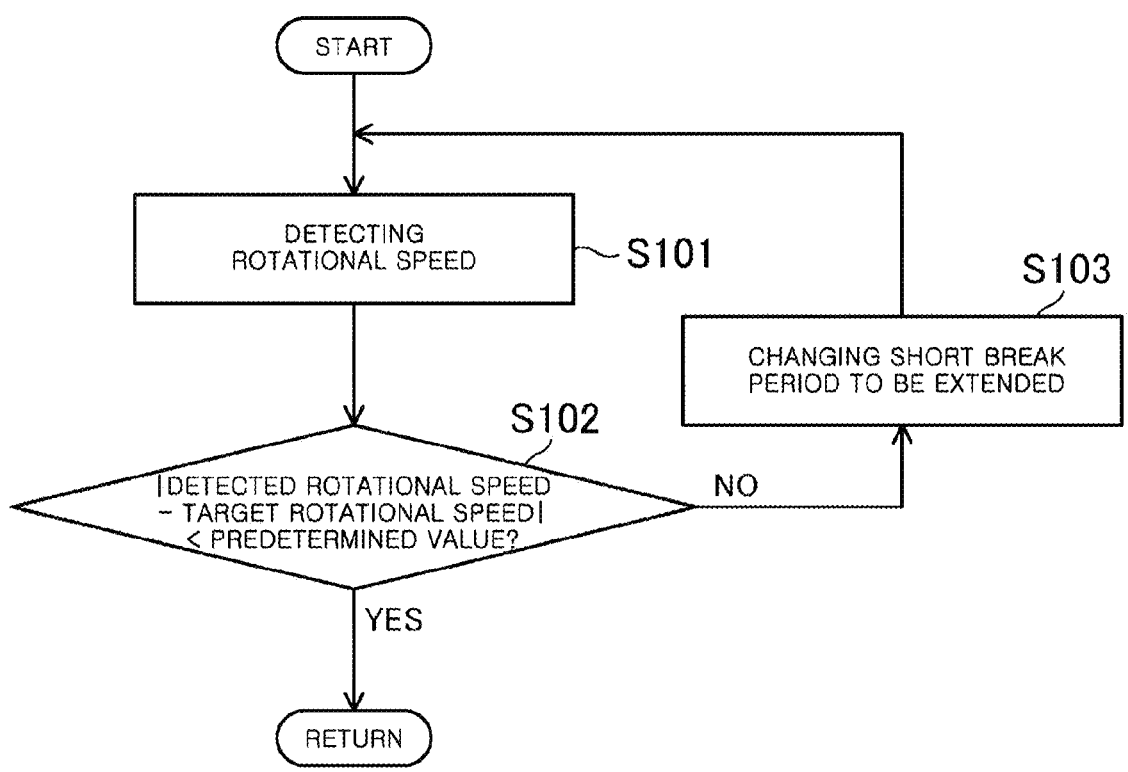
FIG. 44 is a flowchart illustrating the processing operation in the deceleration process by the controller in the washing machine provided with the motor controller according to the embodiment 2 in relation to the washing machine according to the fourth embodiment.

Next, a processing operation of the controller 15 in the deceleration process of the washing machine 1 according to the embodiment 2 will be described with reference to the flowchart of FIG. 44.

In the first operation S101, the rotational speed of the drum 11 (specifically, the inner rotor 30) is detected by the drum side position sensor 105.

Next, in operation S102, it is determined whether the absolute value of the difference between the detected rotational speed detected in the operation S101 and the target rotational speed is smaller than a predetermined value. When the absolute value of the difference of the rotational speeds is NO, which is equal to or larger than the predetermined value, the process proceeds to operation S103. On the other hand, when the absolute value of the difference in the rotational speed is YES, which is smaller than the predetermined value, the process returns.

In operation S103, the lower arm side short brake period to be extended in the lower arm side short brake period extension control is changed. Specifically, when the detected rotational speed is larger than the target rotational speed, the lower arm side short brake period to be extended is lengthened, and when the detected rotational speed is smaller than the target rotational speed, the lower arm side short brake period is shortened. Thereby, the regenerative electric power may be appropriately consumed at the same time while bringing the rotational speed of the drum 11 close to the target rotational speed. After operation S103, the process returns to operation S101 to detect the rotational speed of the drum 11, and the determination is made again in operation S102.

Also, the pulsator side inverter circuit 102 is controlled based on the same flowchart.

Therefore, in the embodiment 2, the target rotational speeds of the drum 11 and the pulsator 13 are set in advance, and the length of the lower arm side short brake period to be extended in the lower arm side short brake period extension control is determined based on the difference between the detected rotational speed and the target rotational speed, so that the same effect as that of the embodiment 1 may be obtained and the drum 11 and the pulsator 13 may be accurately decelerated and stopped.

Another embodiment (embodiment 3) will be described. In the following description, elements common to those of the embodiment 1 are denoted by the same reference numerals.

Figure 45:
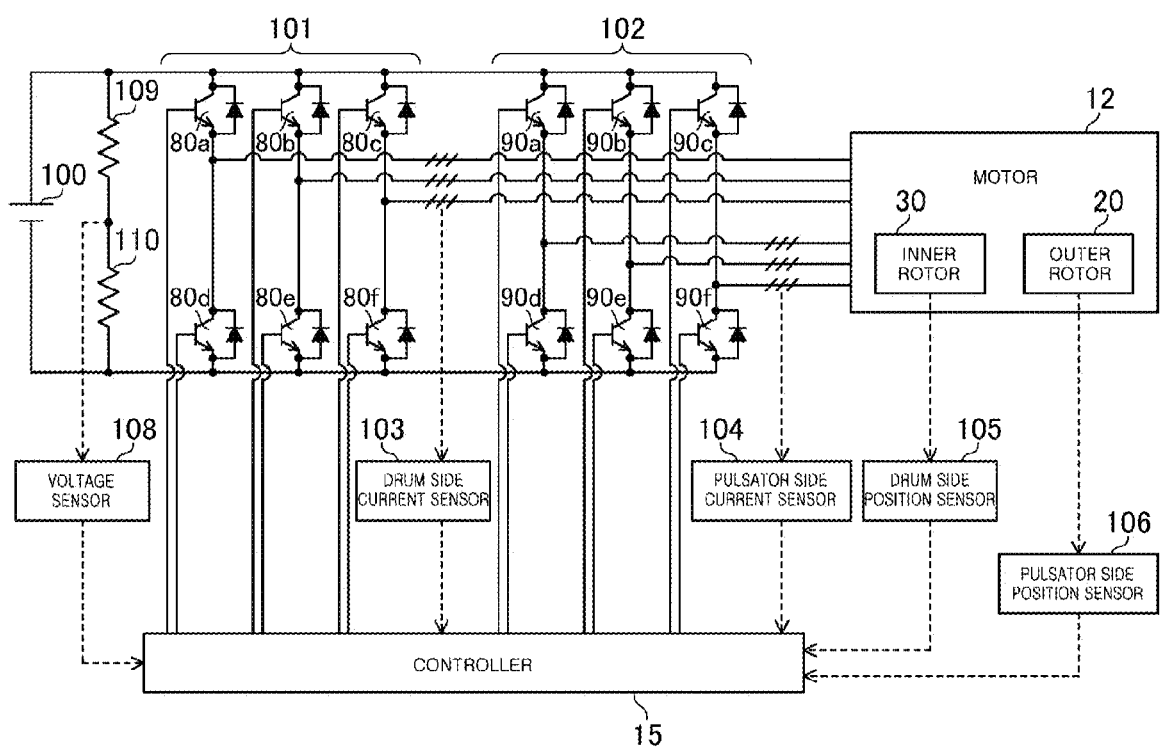
FIG. 45 is a schematic view illustrating a configuration of a motor, a drum-side inverter circuit, a pulsator-side inverter circuit, and a controller in a washing machine provided with a motor controller according to the embodiment 3, in relation to the washing machine according to the fourth embodiment.

The embodiment 3 is different from the embodiments 1 and 2 in that a voltage sensor 108 for detecting a DC voltage applied to the drum side and pulsator side inverter circuits 101 and 102 is provided as illustrated in FIG. 45. The voltage sensor 108 detects the DC voltage applied to the drum side and pulsator side inverter circuits 101 and 102 by measuring resistors 109 and 110 connected in parallel with the drum side and pulsator side inverter circuits 101 and 102 nearer to the DC power supply 100 than the drum side and pulsator side inverter circuits 101 and 102. Other configurations of the washing machine 1 are the same as those of the embodiments 1 and 2.

The embodiment 3 is different from the embodiments 1 and 2 in the method of determining the length of the lower arm side short brake period to be extended. In detail, in the embodiment 3, the length of the lower arm side short brake period is determined based on the difference between the detected voltage detected by the voltage sensor 108 and the predetermined target voltage.

The control in the embodiment 3 will be described with reference to the graph of FIG. 46. Since the control on the drum 11 and the control on the pulsator 13 are substantially the same as each other, only the control on the drum 11 will be described, and the control on the pulsator 13 is omitted.

Figure 46:
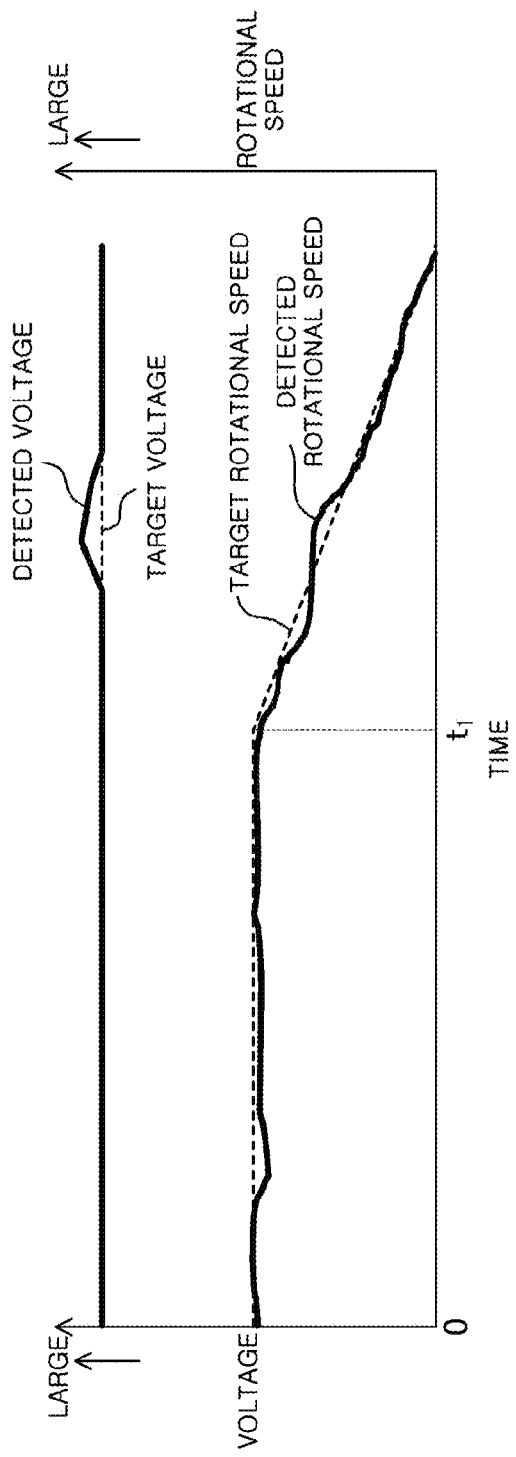
FIG. 46 is a graph illustrating the relationship between the DC voltage applied to the drum-side inverter circuit, the detected rotational speed of the drum, and the target rotational speed, in the washing machine provided with the motor controller according to the embodiment 3 in relation to the washing machine according to the fourth embodiment.

FIG. 46 is a graph illustrating the relationship between the DC voltage applied to the drum side inverter circuit 101, and the detected rotational speed and target rotational speed of the drum 11. In FIG. 46, the vertical axis on the left side is the DC voltage applied to the drum side inverter circuit 101, the vertical axis on the right side is the rotational speed, and the horizontal axis is time. The target voltage is set to a voltage based on the voltage power supply 100. Further, the rotational speed of the drum 11 is detected by the drum side position sensor 105 in the same manner as in the embodiment 2.

The drum 11 is controlled to have a substantially constant speed during the dewatering process (period from 0 to t1 in FIG. 46). At this time, since the power supply voltage is applied from the DC power supply 100 to the drum side inverter circuit 101, the detected voltage becomes equal to the target voltage. When the dewatering process ends at time t1, the deceleration process starts. In the deceleration process, the controller 15 decelerates the drum 11 while executing the lower arm side short brake period extension control so that the detected rotational speed of the drum 11 becomes the target rotational speed.

In the deceleration process, when the detected rotational speed exceeds the target rotational speed, the regenerative electric power from the motor 12 is not consumed and the voltage higher than the voltage of the DC power supply 100 is applied from the motor 12 to the drum side inverter circuit 101. At this time, as illustrated in FIG. 46, the detected voltage detected by the voltage sensor 108 becomes higher than the target voltage.

Thus, when the detected voltage exceeds the target voltage, the controller 15 determines that the regenerative electric power from the motor 12 has not been consumed and controls to lengthen the lower arm side short brake period as much as the detected voltage is higher than the target voltage. As a result, the non-consumed regenerative electric power may be consumed, and the detected rotational speed of the drum 11 may be set to the target rotational speed.

By determining the length of the lower arm side short brake period as described above, the drum and pulsator may be decelerated while appropriately consuming the regenerative electric power. Further, when extending the lower arm side short brake period, it is made longer in the range not exceeding the longest period of the lower arm side short brake period determined from the duty ratio in the PWM control of the upper-arm-side SW elements 80*a* to 80*c*.

Figure 47:
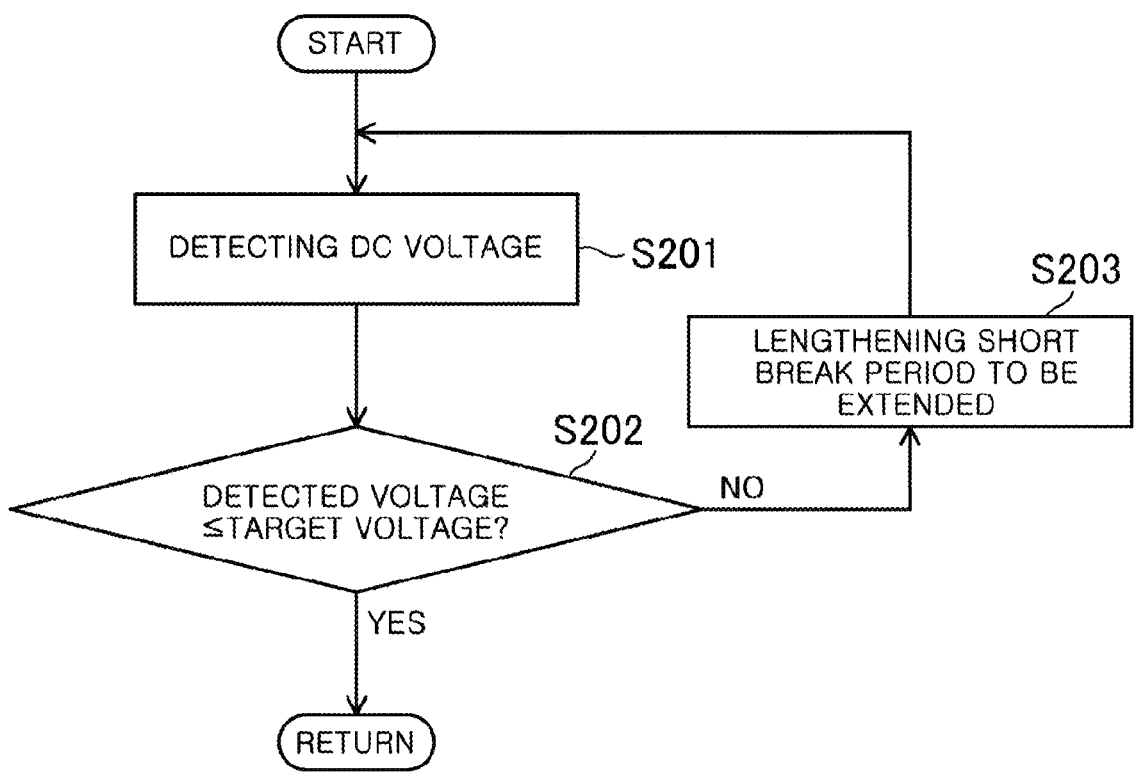
FIG. 47 is a flowchart illustrating the processing operation in the deceleration process by the controller in the washing machine provided with the motor controller according to the embodiment 3 in relation to the washing machine according to the fourth embodiment.

Next, a processing operation of the controller 15 in the deceleration process of the washing machine 1 according to the embodiment 3 will be described with reference to the flowchart of FIG. 47.

In the first operation S201, the voltage applied to the drum side inverter circuit 101 is detected by the voltage sensor 108.

Next, in operation S202, it is determined whether or not the detected voltage detected in operation S201 is greater than a predetermined target voltage. When the determination in operation S202 is NO, the process proceeds to operation S203, and when the determination in operation S202 is YES, the process returns.

In operation S203, the lower arm side short brake period is lengthened. At this time, the lower arm side short brake period is made longer as the detected voltage is higher than the target voltage. As a result, the regenerative electric power from the motor 12 may be appropriately consumed. After operation S203, the process returns to operation S201 to detect the voltage applied to the drum side inverter circuit 101, and the determination is made again in operation S202.

Also, the pulsator side inverter circuit 102 is controlled based on the same flowchart.

Therefore, in the embodiment 3, the voltage sensor 108 for detecting a voltage applied to the drum side and pulsator side inverter circuits 101 and 102 is provided, and the lower arm side short brake period is lengthened as much as the detected voltage detected by the voltage sensor 108 is higher than the predetermined target voltage, so that the same effect as that of the embodiment 1 may be obtained, and the drum 11 and the pulsator 13 may be decelerated while more appropriately consuming the regenerative electric power of the motor 12.

(Modifications)

The detected rotational speeds detected by the drum side and pulsator side position sensors 105 and 106 are used as the detected rotational speeds of the drum 11 and the pulsator 13 used in the lower arm side short brake period extension control. However, the present invention is not limited thereto, and rotational speeds calculated from the detected currents detected by the drum side and pulsator side current sensors 103 and 104 may be used.

Further, the above-described embodiments may be combined for the control for the determining the lower arm side short brake period. For example, the control of the embodiment 2 and the control of the embodiment 3 are combined, so that when detected voltage becomes higher than the target voltage, it is determined whether the drum side inverter circuit 101 or the pulsator side inverter circuit 102 does not consume the regenerative electric power from the motor 12 based on the difference between the detected rotational speed of the drum 11 and the pulsator 13 and the target rotational speed, and only the inverter circuit that does not consume the regenerative electric power may be controlled to lengthen the lower arm side short brake period.

Fifth Embodiment

The fifth embodiment relates to a washing process and a rinsing process, and particularly relates to a rotation control technique of the drum and pulsator in the washing process and the rinsing process.

Figure 48:
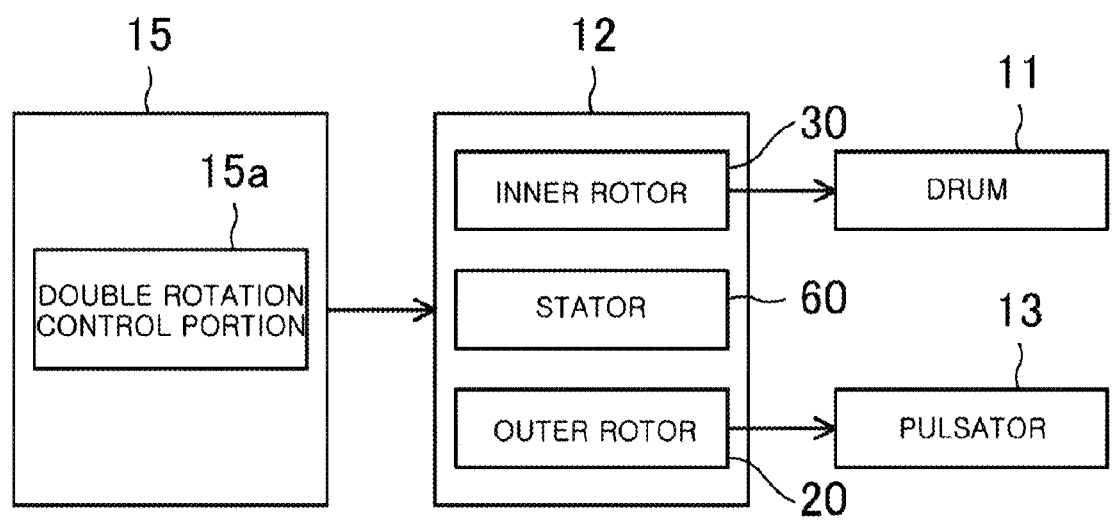
FIG. 48 is a block diagram illustrating the rotation control of the drum and the pulsator in relation to the washing machine according to the fifth embodiment.

In other words, as illustrated in FIG. 48, the controller 15 of the washing machine 1 is provided with a double rotation control portion 15*a* for independently rotating both the drum 11 and the pulsator 13 at the same time at any one of the washing process and the rinsing process. The double rotation control portion 15*a* independently rotates both the drum 11 and the pulsator 13 at the same time so that water streams having various directions and flow rates may be generated inside the drum 11 and washing or rinsing process may be performed with a soft touch while appropriately dispersing the laundry in water.

(Rotation Control of Drum and Pulsator in Washing Process and Rinsing Process)

The washing machine 1 is provided with the dual rotor type motor 12 in which the inner rotor 30 and the outer rotor 20 share one stator 60 as described above. Therefore, both the drum 11 and the pulsator 13 may be driven independently, and the diameter of the inner rotor 30 may be made closer to the outer rotor 20, so that a high torque may be obtained in the inner rotor 30.

In the case of this washing machine 1, since the drum 11 can be stably driven even at a high torque, as illustrated in FIG. 48, the double rotation control portion 15a controls the composite current supplied to the motor 12 so that the rotation of the drum 11 by the inner rotor 30 and the rotation of the pulsator 13 by the outer rotor 20 are independently controlled at the time of the washing process or the rinsing process. Therefore, it is possible to perform a variety of advanced and delicate processes.

(First Control Pattern)

Figure 49:
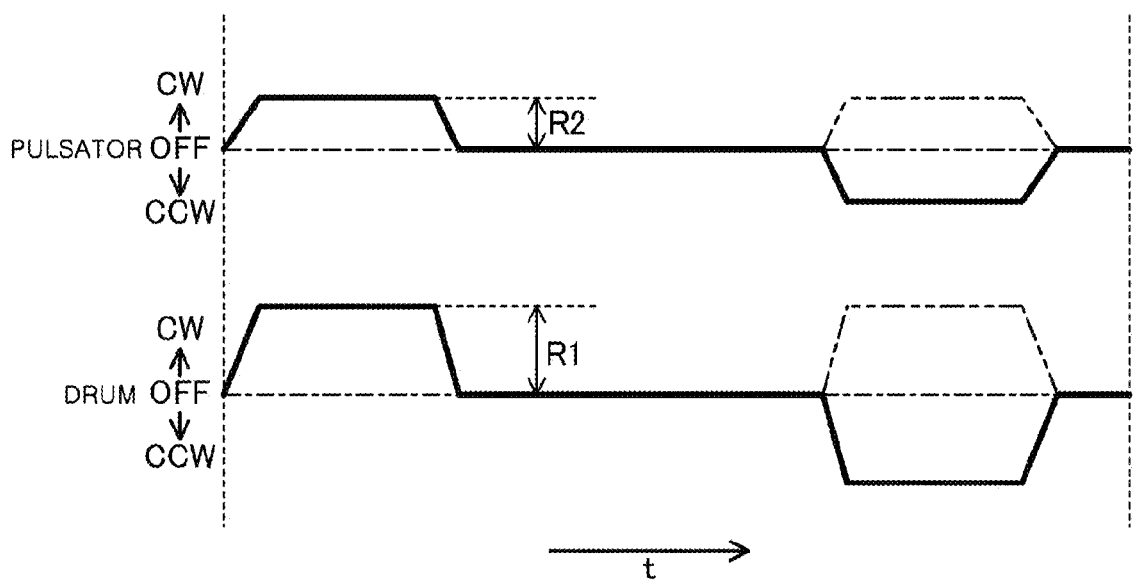
FIG. 49 is a time chart illustrating an example of rotation control of the first control pattern in relation to the washing machine according to the fifth embodiment.

FIG. 49 illustrates an example of rotation control (first control pattern) performed by the double rotation control portion 15a. The first control pattern is a control pattern that drives the drum 11 and the pulsator 13 by the motor 12 and rotates the drum 11 and the pulsator 13 at the different number of rotations in the same direction. In the illustrated first control pattern, the drum 11 and the pulsator 13 are synchronously rotated in the same direction intermittently, and the number of rotations R1 of the drum 11 is set to be larger than the number of rotations R2 of the pulsator 13.

The direction of the drum 11 and the pulsator 13 performed intermittently may be the same direction as indicated by imaginary lines, or may be the reverse direction, that is, reversed. When the drum 11 and the pulsator 13 are rotated in the same direction, the laundry may be smoothly moved to the outside or inside of the drum 11 while being rotated, so that the laundry may be washed or rinsed with a soft touch while being appropriately dispersed in water.

When the number of rotations of the drum 11 is larger than the number of rotations of the pulsator 13 as illustrated, the laundry may be gently moved to the outside of the drum 11. Conversely, when the number of rotations of the drum 11 is smaller than the number of rotations of the pulsator 13, the laundry may be gently moved to the inside of the drum 11.

(Second Control Pattern)

Figure 50:
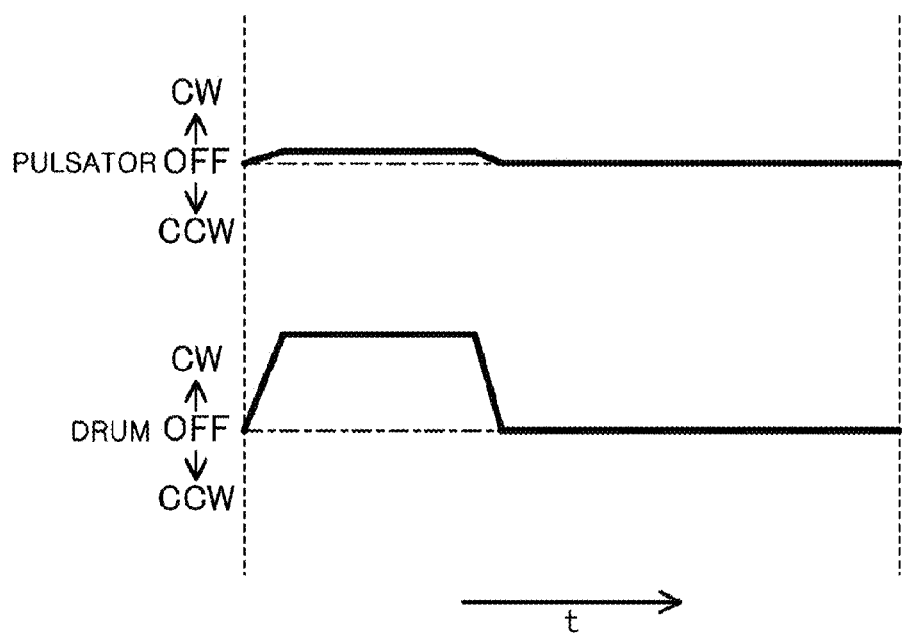
FIG. 50 is a time chart illustrating an example of rotation control of the second control pattern in relation to the washing machine according to the fifth embodiment.

FIG. 50 illustrates an example of another rotation control (second control pattern) performed by the double rotation control portion 15a. The second control pattern is a control pattern in which only the drum 11 among the drum 11 and the pulsator 13 is rotationally driven by the motor 12 and the pulsator 13 is rotated accompanying the rotation of the drum 11. The composite current for driving the inner rotor 30 and the outer rotor 20 is not supplied and a three-phase current for driving only the inner rotor 30 is supplied to the stator 60. Therefore, the power consumption is suppressed and the pulsator 13 may be rotated at a low rotational speed in the same direction as the drum 11 while accompanying the rotation of the drum 11.

The cogging torque (torque generated due to the magnetic attractive force acting between the magnet and the core when the rotor is moved in the non-excited state) acts on the outer rotor 20. Also, in the case of this motor 12, mutual ripples (torque ripples generated in the outer rotor 20 due to the influence of the magnetic field generated by the driving of the inner rotor 30) act on the outer rotor 20. For this reason, a certain braking is applied to the rotation of pulsator 13.

Therefore, the pulsator 13 is rotated at a lower rotational speed than the drum 11, so that the laundry may be smoothly moved to the outside of the drum 11 while being rotated.

(Third Control Pattern)

Figure 51:
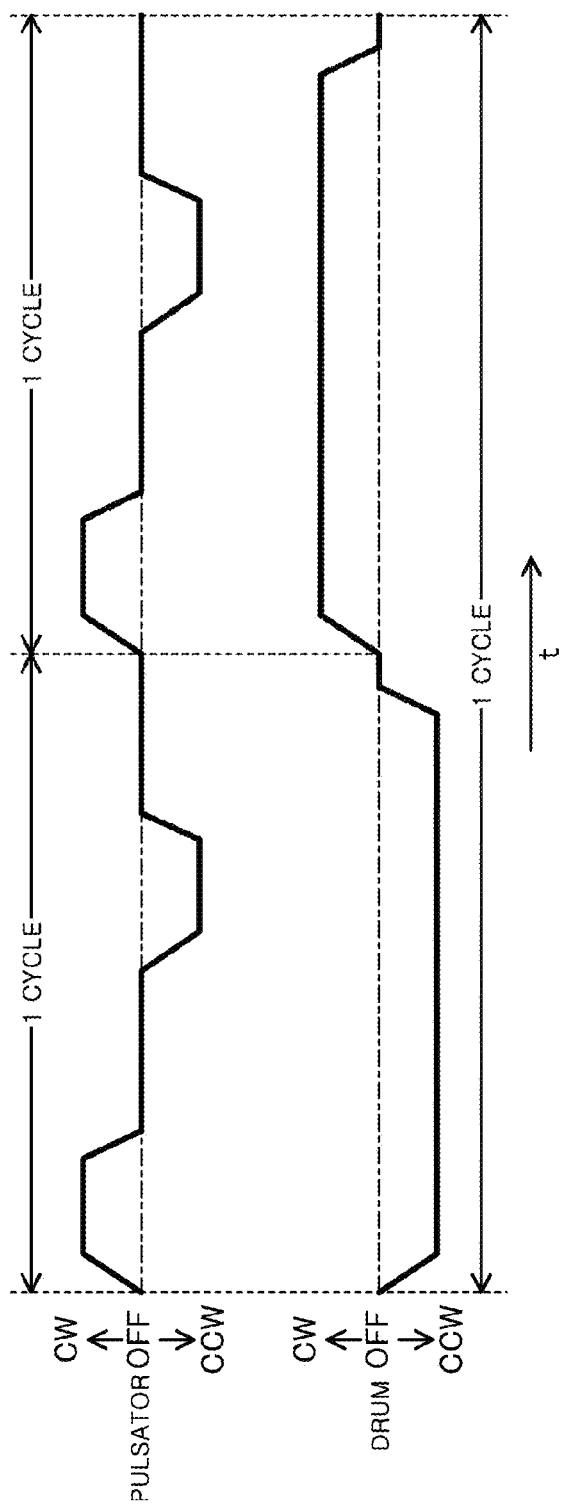
FIG. 51 is a time chart illustrating an example of rotation control of the third control pattern in relation to the washing machine according to the fifth embodiment.

FIG. 51 illustrates an example of another rotation control (third control pattern) performed by the double rotation control portion 15a. The third control pattern is a control pattern for rotating the drum 11 and the pulsator 13 while reversing them at different cycles. In the illustrated third control pattern, the drum 11 and the pulsator 13 are rotated while reversing at regular intervals, and the pulsator 13 is set to perform the processing for two cycles while the processing for one cycle (the period in which the forward rotation, the stop, and the reverse rotation are performed in the example) is performed in the drum 11.

By performing the rotation control in this manner, washing and rinsing may be performed with a soft touch while appropriately dispersing the laundry in water. Further, the respective cycles of the drum 11 and the pulsator 13 may be different and are not limited to a relationship of 1:2.

(Fourth Control Pattern)

Figure 52:
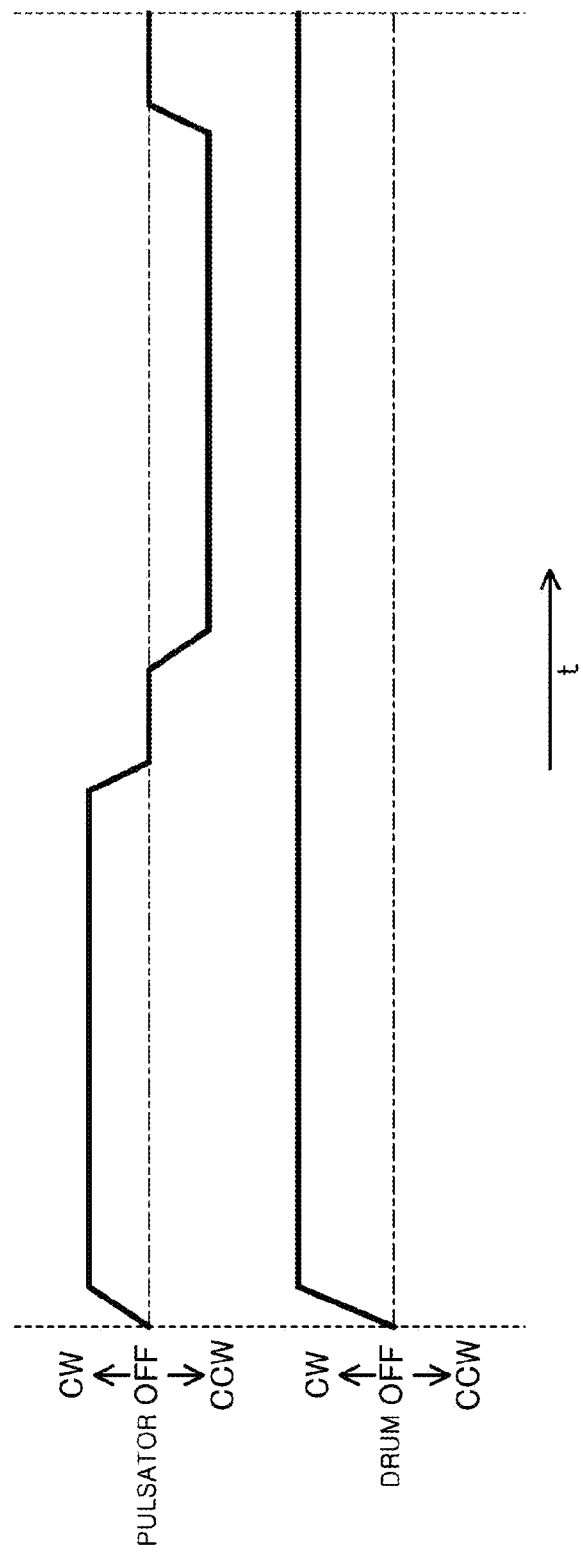
FIG. 52 is a time chart illustrating an example of rotation control of the fourth control pattern in relation to the washing machine according to the fifth embodiment.

FIG. 52 illustrates an example of another rotation control (fourth control pattern) performed by the double rotation control portion 15a. The fourth control pattern is a control pattern for rotating the pulsator 13 while reversing the pulsator 13 in a state in which the drum 11 is rotated in the same direction. In the illustrated fourth control pattern, the drum 11 is maintained in a state of being rotated in the constant number of rotations, and during this time, the pulsator 13 is set to intermittently reverse, thereby repeating forward rotation and reverse rotation.

In this case, the number of rotations of pulsator 13 may be equal to or different from the number of rotations of drum 11. By performing the rotation control in this manner, the centrifugal force acts on the water or the laundry inside the drum 11 by the rotation of the drum 11 so that the water level of the peripheral portion of the drum 11 becomes relatively high and the laundry easily collects in the peripheral portion of the drum 11. Since the pulsator 13 rotates in this state, washing or rinsing may be effectively performed on various types of laundry while appropriately dispersing the laundry in water, and the washing process and the rinsing process may be efficiently performed with a small amount of water.

(Fifth Control Pattern)

Figure 53:
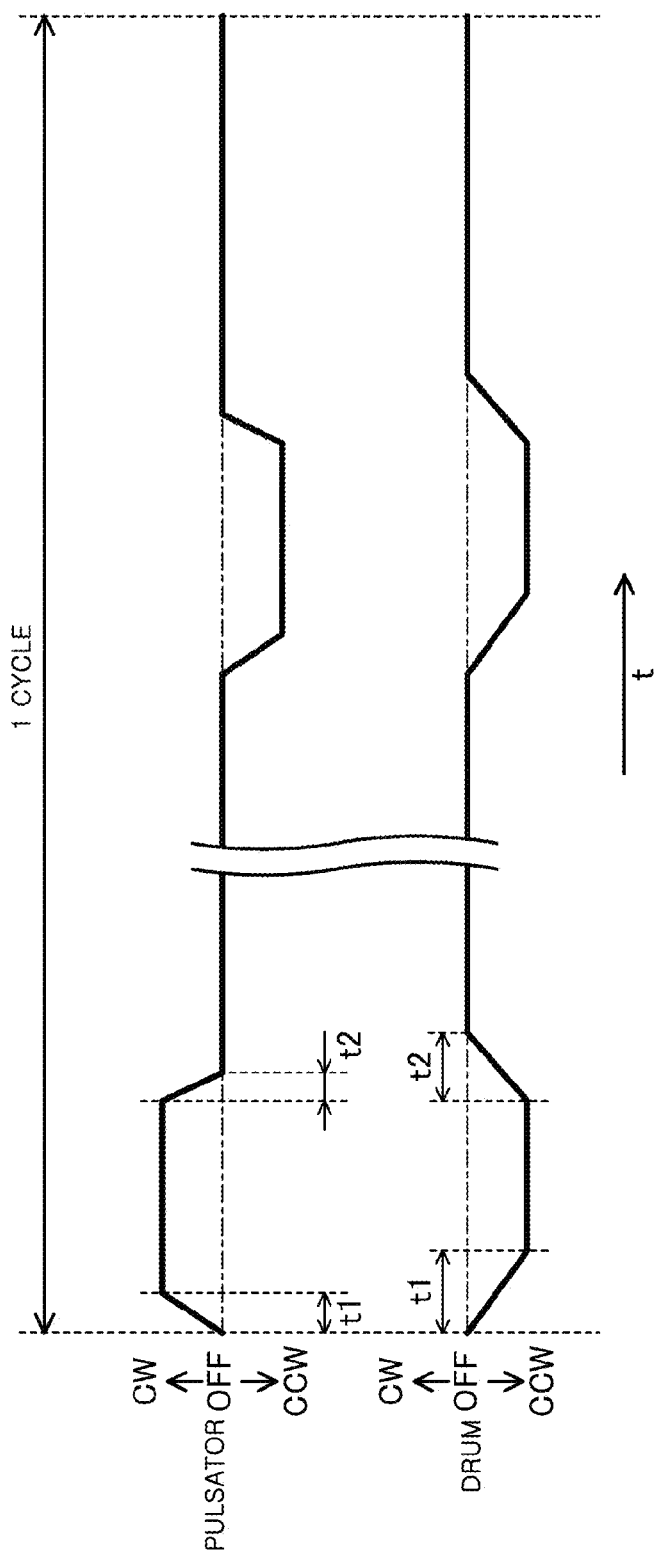
FIG. 53 is a time chart illustrating an example of rotation control of the fifth control pattern in relation to the washing machine according to the fifth embodiment.

FIG. 53 illustrates an example of another rotation control (fifth control pattern) performed by the double rotation control portion 15a. The fifth control pattern is a control pattern in which at least one of the starting time t1 until the rotational speed reaches the target rotational speed and the ending time t2 until the rotation is stopped from the target rotational speed is different between the drum 11 and the pulsator 13.

In this rotation control, the drum 11 having a large inertia force is started at a small speed from a stop state, and is slowly increased to a predetermined target rotational speed. The pulsator 13 having a small inertia force is started at a large speed, and is rapidly increased to a predetermined target rotational speed.

In other words, the starting time t1 of the drum 11 is set to be longer than the starting time t1 of the pulsator 13. By doing so, efficient starting corresponding to the inertia force may be performed, so that power consumption may be reduced.

It is preferable that not only the starting time t1 but also the ending time t2 are set to be different from each other as in the starting time t1. In other words, without performing the braking control, the drum 11 having a large inertia force is decelerated slowly from the target rotational speed to a stop state at a small speed. The pulsator 13 having a small inertia force is decelerated quickly from the target rotational speed to a stop state at a large speed. By doing so, the power consumption may be further reduced.

For the sake of convenience, FIG. 53 illustrates a pattern in which the drum 11 and the pulsator 13 are rotated in the opposite direction in the first half and is rotated in the same direction in the second half. In the second half, the drum 11 and the pulsator 13 may be reversed while being rotated in the opposite direction as in the first half. In the first half, the drum 11 and the pulsator 13 may be reversed while being rotated in the same direction as in the second half. The rotation of the drum 11 and the pulsator 13 may be controlled arbitrarily.

(Sixth Control Pattern)

Figure 54:
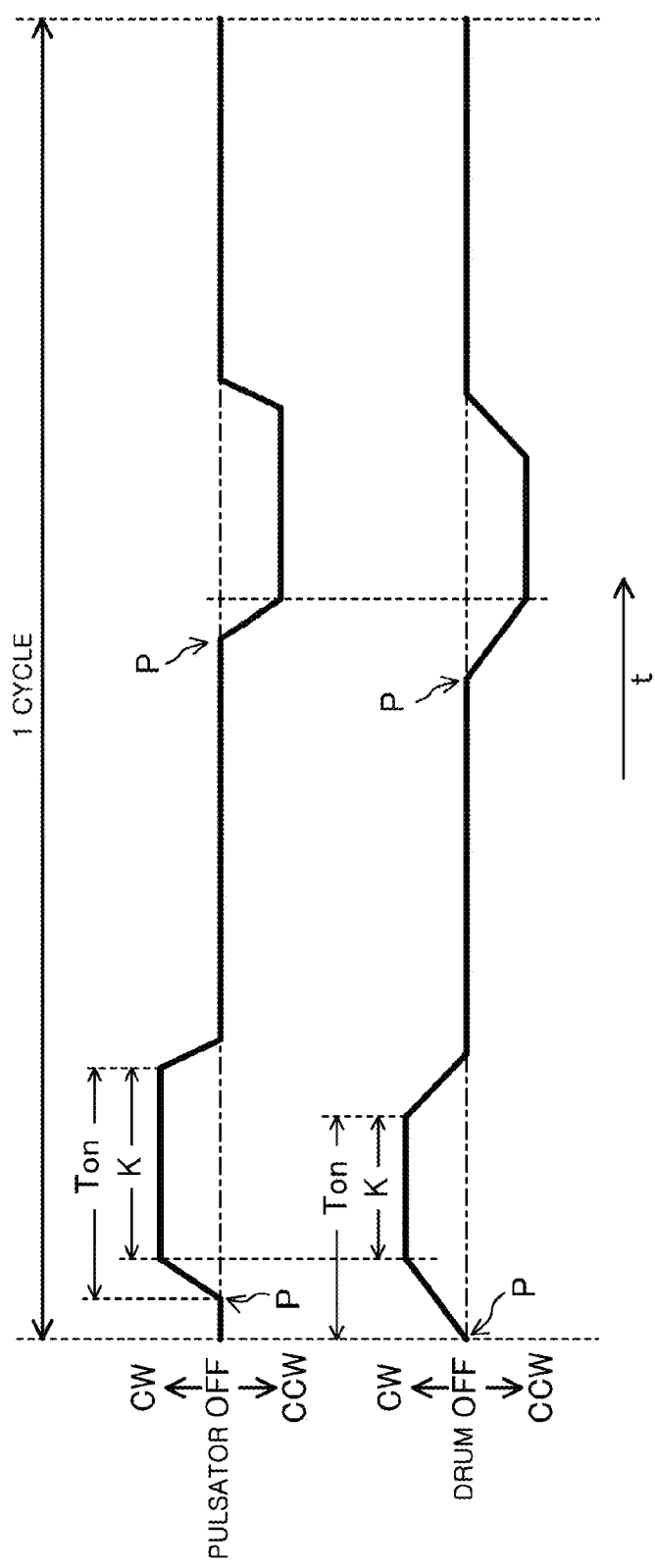
FIG. 54 is a time chart illustrating an example of rotation control of the sixth control pattern in relation to the washing machine according to the fifth embodiment.

FIG. 54 illustrates an example of another rotation control (sixth control pattern) performed by the double rotation control portion 15a. The sixth control pattern is a control pattern in which the start timing P of the driving by the motor 12 is further different between the drum 11 and the pulsator 13 in the fifth control pattern.

Since both the drum 11 and the pulsator 13 are simultaneously rotated at the target rotational speed so that the washing process and the rinsing process are performed efficiently, it is preferable that the appropriate rotation period K is long. However, in the fifth control pattern, since the starting time and the ending time are different between the drum 11 and the pulsator 13, the driving time Ton by the motor 12 is the same in the drum 11 and the pulsator 13 so that there is a difference in the appropriate rotation period K between the drum 11 and the pulsator 13.

Thus, in the illustrated sixth control pattern, the driving start timing P by the motor 12 of the drum 11 is made faster than the driving start timing P by the motor 12 of the pulsator 13, so that the timings at which the drum 11 and the pulsator 13 reach the target rotational speed are matched with each other to realize the optimum combination of the appropriate rotation periods K of both.

(Seventh Control Pattern)

Figure 55:
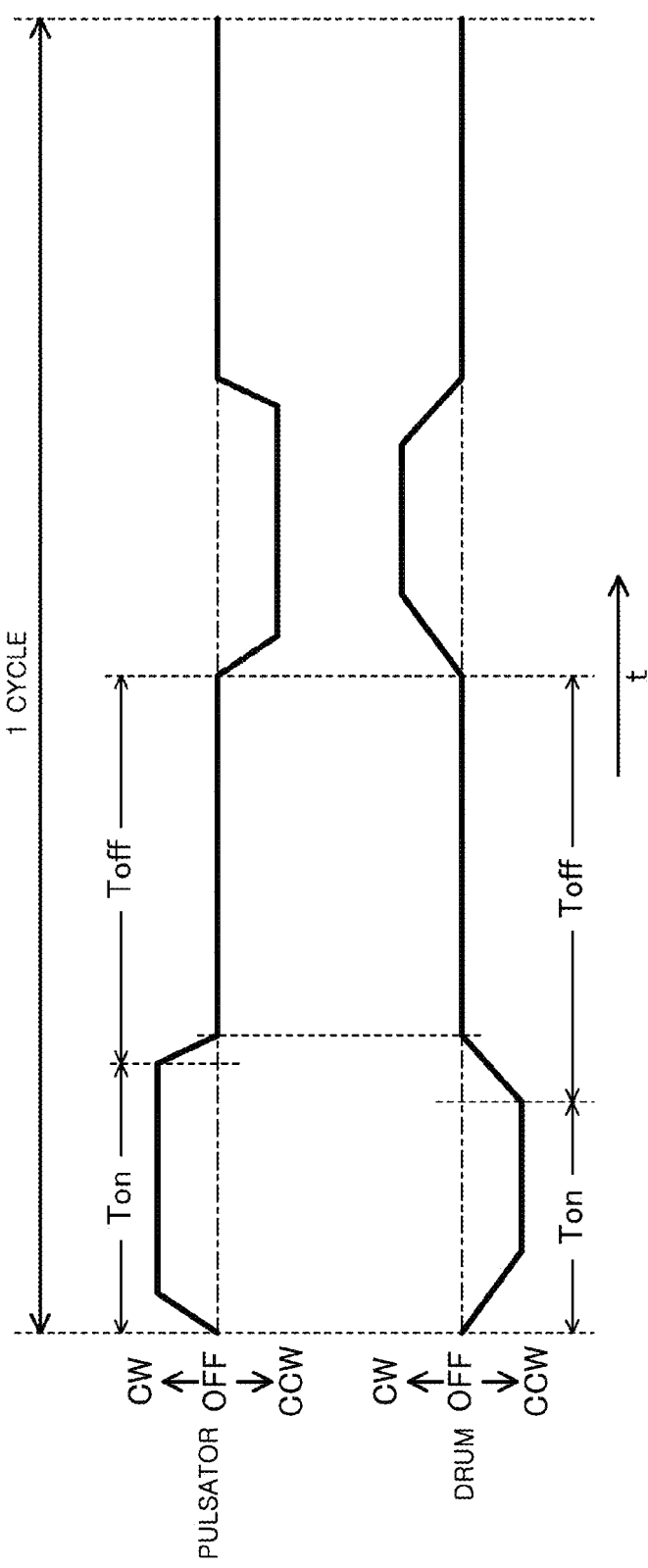
FIG. 55 is a time chart illustrating an example of rotation control of the seventh control pattern in relation to the washing machine according to the fifth embodiment.

FIG. 55 illustrates an example of another rotation control (seventh control pattern) performed by the double rotation control portion 15a. The seventh control pattern is a control pattern in which at least one of the driving period Ton by the motor 12 and the driving stop period Toff is different between the drum 11 and the pulsator 13. The driving period Ton is a power-on period during which the drum or the like is driven by the motor 12, and the driving stop period Toff is a power-off period during which the drum 11 or the like is not driven by the motor 12.

In the fifth control pattern, since the starting time or the ending time are different between the drum 11 and the pulsator 13, there is a difference in the rotation period (rotating period) and the stop period (the period in which the rotation is stopped) between the drum 11 and the pulsator 13.

Thus, in the illustrated seventh control pattern, the driving period Ton and the driving stop period Toff are made different between the drum 11 and the pulsator 13, so that in the drum 11 and the pulsator 13, the length and timing of the rotation period and the stop period coincide with each other. Therefore, the washing process and the rinsing process may be performed efficiently.

(Eighth Control Pattern)

Figure 56:
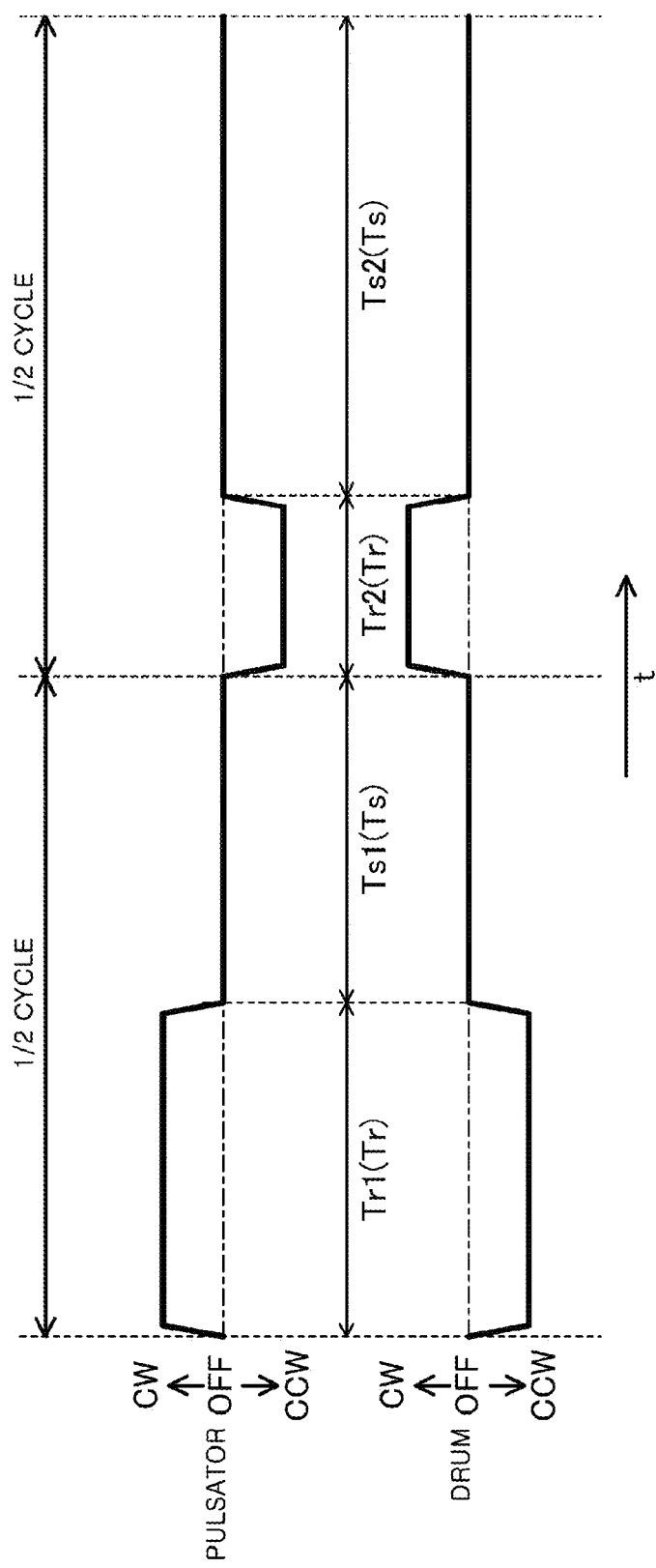
FIG. 56 is a time chart illustrating an example of rotation control of the eighth control pattern in relation to the washing machine according to the fifth embodiment.

FIG. 56 illustrates an example of another rotation control (eighth control pattern) performed by the double rotation control portion 15a. The eighth control pattern is a control pattern in which the drum 11 and the pulsator 13 are intermittently rotated in the opposite direction to each other and the length of at least any one of the rotation periods Tr of the respective rotations intermittently performed in at least one of the drum 11 and the pulsator 13 and the respective stop periods Ts between these rotation periods is made different.

When the drum 11 and the pulsator 13 are intermittently rotated in opposite directions to each other, a state in which the water flow is stagnated inside the drum 11 is generated so that the laundry to be stagnated tends to be generated. Thus, in the illustrated eighth control pattern, the lengths and the timings of the rotation periods Tr and the stop periods Ts of the drum 11 and the pulsator 13 are matched with each other, and the respective lengths of the rotation periods Tr and the stop periods Ts are set to be different from each other.

Specifically, with respect to the rotation period Tr1 during the rotation of the drum 11 and the pulsator 13 in the first half, the rotation period Tr2 during the rotation of the drum 11 and the pulsator 13 in the second half is shortened. The stop period Ts2 of the drum 11 and the pulsator 13 in the second half is longer than the stop period Ts1 of the drum 11 and the pulsator 13 in the first half.

By varying the lengths of the rotation periods Tr and the stop periods Ts as described above, it is possible to prevent the water flow from stagnating inside the drum 11 and to move the laundry as a whole. In addition, the lengths of the rotation period Tr and the stop periods Ts may be appropriately adjusted. The lengths of the rotation periods Tr or the stop periods Ts may be different from each other for either the drum 11 or the pulsator 13. Only one of the rotation period Tr and the stop period Ts may be made different in length.

(Ninth Control Pattern)

Figure 57:
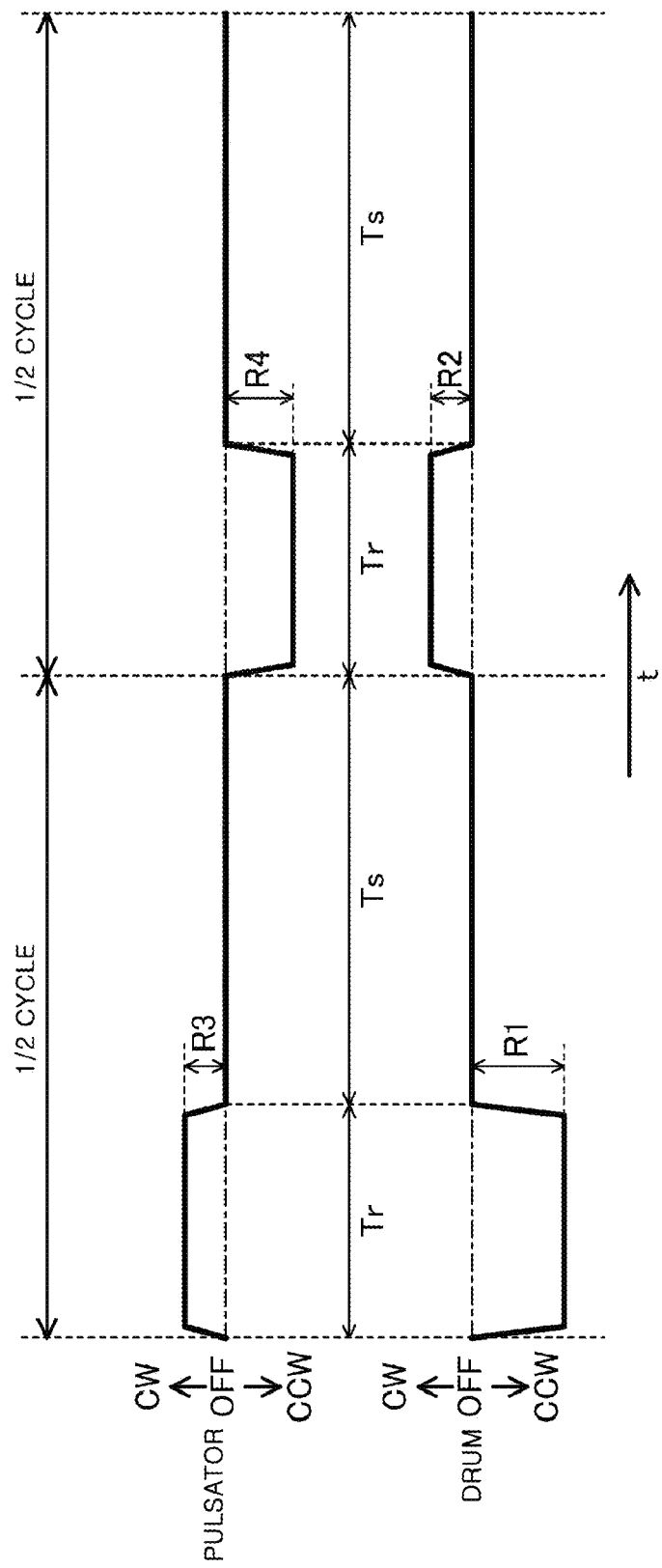
FIG. 57 is a time chart illustrating an example of rotation control of the ninth control pattern in relation to the washing machine according to the fifth embodiment.

FIG. 57 illustrates an example of another rotation control (ninth control pattern) performed by the double rotation control portion 15a. The ninth control pattern is a control pattern in which the drum 11 and the pulsator 13 are intermittently rotated in the opposite direction to each other and at the same time the rotational speeds of the respective rotations intermittently performed in at least one of the drum 11 and the pulsator 13 are made to be different. With this ninth control pattern, the same effect as the eighth control pattern may be obtained.

In the illustrated ninth control pattern, in both of the drum 11 and the pulsator 13, the length and timing of each rotation period Tr and each stop period Ts are coincident with each other and the rotational speed R in each rotation is set to be different.

Specifically, in the drum 11, the rotational speed R2 in the second half rotation is set to be smaller than the rotational speed R1 in the first half rotation. In the pulsator 13, the rotational speed R4 in the second half rotation is set to be larger than the rotational speed R3 in the first half rotation.

In this case, the rotational speed R may be appropriately adjusted. The rotational speed R may be different for either the drum 11 or the pulsator 13. Also, the control patterns of the eighth and ninth control patterns may be combined so that to make the rotational speed R of the respective rotations different and to make the rotation periods Tr and the stop periods Ts different may be combined.

This is not limited to the eighth and ninth control patterns, and the first to ninth control patterns may be performed individually or in combination.

(Modifications)

For example, the type of the motor is not limited to the dual rotor type motor 12 of the present embodiment. A motor having the same structure as in Patent Document 2 may be used. A motor provided with a transmission and the like may be used. In other words, a motor capable of driving the drum and the pulsator separately may be used.

Sixth Embodiment

The sixth embodiment relates to a technique capable of reducing a load applied to the motor when the drum and the pulsator are rotated in opposite directions to each other.

Figure 58:
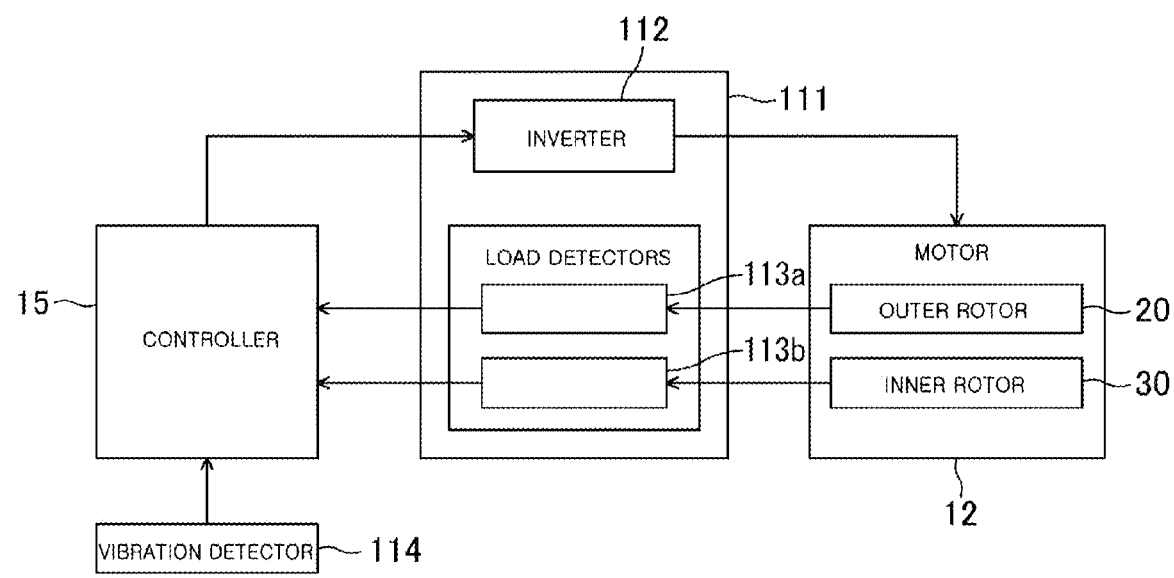
FIG. 58 is a block diagram illustrating the configuration of a motor and a controller in relation to the washing machine according to the sixth embodiment.

As illustrated in FIG. 58, the controller 15 and the motor 12 are connected via an inverter circuit 111. The inverter circuit 111 is provided with an inverter 112 and load detectors 113*a* and 113*b*.

The inverter 112 transmits a driving voltage to the motor 12 based on the electric signal transmitted from the controller 15. The operation of the outer rotor 20 and the inner rotor 30 of the motor 12 is controlled based on the driving voltage transmitted from the inverter 112.

The load detectors 113*a* and 113*b* detect loads applied to the motor 12 when operating the pulsator 13 connected to the outer rotor 20 and the drum 11 connected to the inner rotor 30. The load detectors 113*a* detects a load applied to the motor 12 when driving the pulsator 13, and the load detectors 113*b* detects a load applied to the motor 12 when driving the drum 11.

The load detectors 113*a* and 113*b* are not particularly limited as long as they can detect a load applied to the motor 12 when the drum 11 and the pulsator 13 are operated. For example, the load applied to the motor 12 may be detected by detecting the current flowing through the motor 12 by a current sensor. The load applied to the motor 12 when the motor 12 is operated may be detected by detecting the rotational speeds of the rotors 20 and 30 by the position sensor. The detection load detected by the load detectors 113*a* and 113*b* is transmitted to the controller 15 as a detection signal.

In addition, as illustrated in FIG. 58, the washing machine 1 is provided with a vibration detector 114 for detecting the vibration of the washing machine 1. The vibration detector 114 is arranged, for example, in the water tub 10 outside the drum 11. The vibration detector 114 is not particularly limited as long as it can detect the vibration of the washing machine 1, in particular, the vibration of the drum 11.

For example, the size of the vibration of the washing machine 1 may be detected by measuring the displacement of the washing machine 1 using a displacement sensor. The size of the vibration may be detected by detecting the acceleration of the washing machine 1 vibrating by an acceleration sensor. The load detectors 113*a* and 113*b* may also be used with the vibration detector 114. The detected vibration detected by the vibration detector 114 is transmitted to the controller 15 as a detection signal.

The controller 15 controls the operation of the drum 11 and the pulsator 13 based on the detection load detected by the load detectors 113*a* and 113*b* or the detected vibration detected by the vibration detector 114. Specifically, an electric signal for controlling the motor 12 is transmitted based on the detection load, the detected vibration, or the like. The electric signal transmitted from the controller 15 is input to the inverter 112 and a driving voltage based on the electric signal is given to the motor 12 through the inverter 112.

The operation of the outer rotor 20 and the inner rotor 30 of the motor 12 is controlled by the driving voltage. As described above, the operation of the pulsator 13 connected to the outer rotor 20 and the drum 11 connected to the inner rotor 30 is controlled based on the electric signal transmitted from the controller 15.

(Control of the Rotational Motion of the Motor)

As described above, since the rotors 20 and 30 can be driven independently of each other, the washing machine 1 may realize a different type of operation from the conventional washing machine.

Particularly, in the washing machine 1, at the time of the washing operation, an operation of alternatively repeating a first opposite drive mode in which the inner rotor 30 (drum 11) is rotated in the clockwise direction (hereinafter referred to as forward rotation) and the outer rotor 20 (pulsator 13) is rotated in the counter-clockwise direction (hereinafter referred to as reverse rotation) and a second opposite drive mode in which the inner rotor 30 (drum 11) is rotated in the reverse direction and the outer rotor 20 is rotated in the forward direction while interposing a stop period between the first opposite drive mode and the second opposite drive mode may be provided.

In other words, by rotating the drum 11 and the pulsator 13 in opposite directions to each other, a twisting force may be generated in the water in the drum 11, thereby preventing the washing of laundry from being missed. By alternately repeating the first opposite drive mode and the second opposite drive mode while putting the stop period therebetween, the direction of the water flow may be switched and the laundry may be released. As a result, improvement of the washing may be expected.

Here, when switching from the first opposite drive mode to the second opposite drive mode, or from the second opposite drive mode to the first opposite drive mode, in order to reverse the rotational direction of the drum 11 and the pulsator 13, a relatively large starting load is applied to the motor 12. Particularly, since the drum 11 is a large component in the washing machine 1, when the drum 11 is rotated, a relatively large inertia force is applied to the drum 11 in the rotational direction. Therefore, when the rotational direction of the drum 11 is reversed, an excessive starting load is applied to the motor 12. At this time, the starting failure of the motor 12 may be caused by this excessive starting load.

When the inertia force of the drum 11 and the pulsator 13 described above is greatest during the stop period after being accelerated by the motor 12, the rotational direction is reversed in a state in which the inertia force is largely left as long as the stop period is short. Therefore, the shorter the stop period is, the more likely the starting failure of the motor 12 is likely to occur.

Thus, in embodiment 1, when the stop period is set to a time shorter than the predetermined reference time, a load reduction adjustment control that controls timing of the at least one of On and Off of at least one of the drum 11 and the pulsator 13 in order to cause the detection load detected by the load detectors 113*a* and 113*b* to become a predetermined target load or less is executed.

Specifically, when the detection load becomes larger than the target load, one of a first adjustment control and a second adjustment control, which will be described below, is executed as the load reduction adjustment control to reduce the starting load applied to the motor 12. In addition, the reference time is a length of time such that the inertia forces of the drum 11 and the pulsator 13 are sufficiently lowered. The target load is such a load that the starting failure of the motor 12 does not occur.

Hereinafter, the first adjustment control and the second adjustment control will be described in detail with reference to FIGS. 59 and 60.

Figure 59:
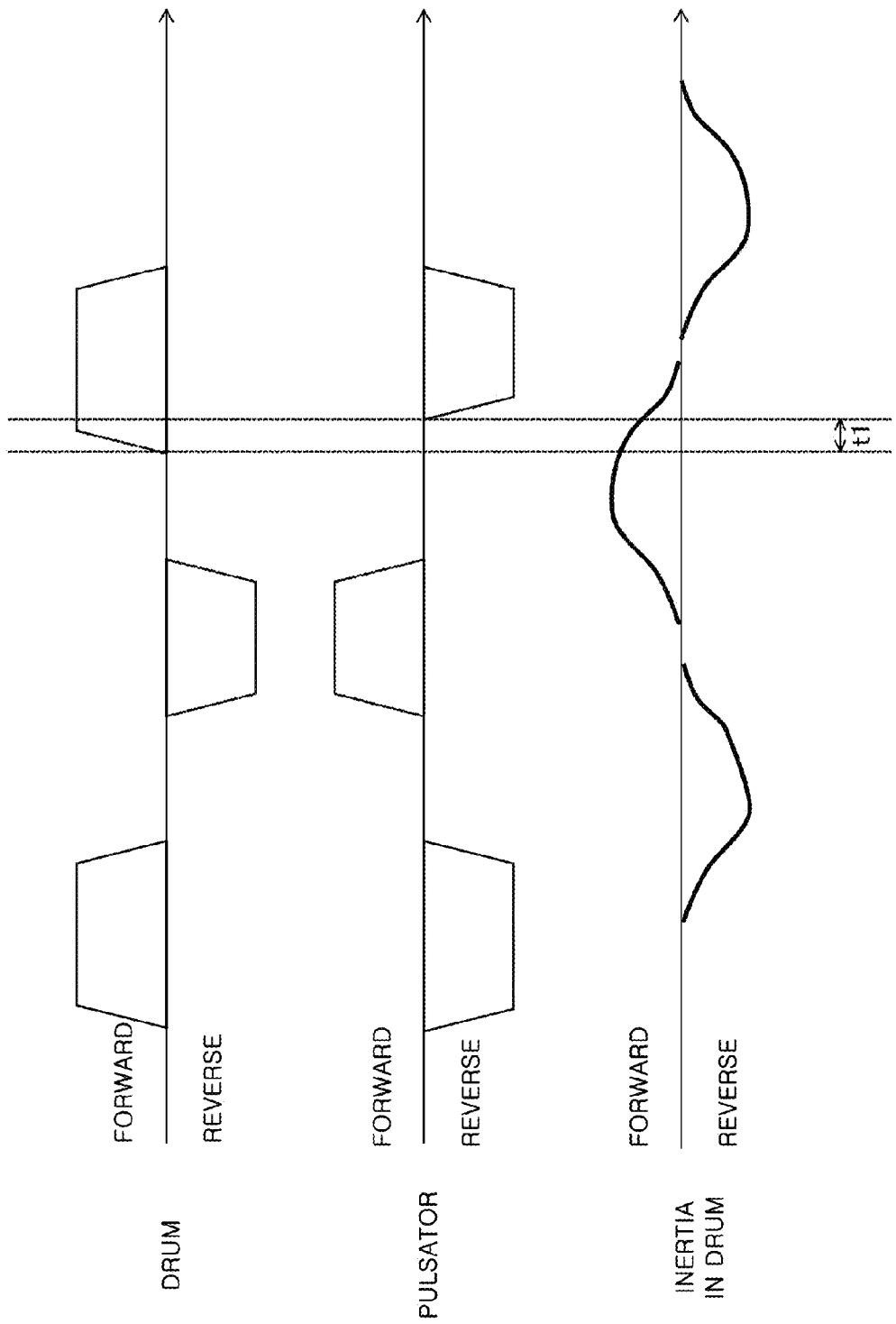
FIG. 59 is a graph illustrating electric signals given to the motor when the drum and pulsator are driven at the time of execution of the first adjustment control in relation to the washing machine according to the sixth embodiment.

FIG. 59 illustrates electric signals given to the motor 12 when the first adjustment control is executed. The first adjustment control is a control configured to turn on one of the drum 11 and the pulsator 13 and to turn on the other of the drum 11 and the pulsator 13 after a predetermined time elapses when the first opposite drive mode or the second opposite drive mode is turned on. Further, FIG. 59 illustrates the electric signals (pulse signals) transmitted to the motor 12 when the pulsator 13 is turned on after the drum 11 is turned on and the first predetermined time (t1 in FIG. 59) elapses.

Here, only the case where the pulsator 13 is turned on after the first predetermined time has elapsed after the drum 11 is turned on will be described in detail based on FIG. 59.

Referring to FIG. 59, first, the controller 15 turns on the first opposite drive mode so that the drum 11 is rotated forward and the pulsator 13 is rotated in reverse. At this time, the laundry in the drum 11 generally rotates in the rotational direction of the pulsator 13.

Next, the first opposite drive mode is turned off, and the motor 12 is stopped for a predetermined time (hereinafter referred to as a stop period). During the stop period, the drum 11 rotates in the forward rotation direction by inertia force, and the pulsator 13 also rotates in the reverse rotation direction by the inertia force.

In addition, as illustrated in FIG. 59, an inertia force is generated in the laundry in the drum 11 by rotating along the rotational direction of the pulsator 13, and the laundry is rotated in the reverse rotation direction same as the rotational direction of the pulsator 13. Since the stop period is shorter than the reference time, the inertia force of the laundry remains until the next second opposite drive mode is turned on.

After the stop period has elapsed, the controller 15 turns on the second opposite drive mode to rotate the drum 11 in reverse and rotate the pulsator 13 forward.

When the second opposite drive mode is turned on, the load detectors 113a and 113b detects a load applied to the motor 12. When the detected load is larger than the target load, the controller 15 determines that there is a possibility that the starting failure of the motor 12 may occur, and executes the first adjustment control when starting the next first opposite drive mode.

Next, the controller 15 turns off the second opposite drive mode and stops the motor 12 during the stop period. During the stop period, as described above, the drum 11 and the pulsator 13 are rotated by the inertia force. At this time, the laundry is rotated in the forward rotation direction same as the rotational direction of the pulsator 13.

Then, when the first opposite drive mode is turned on after the lapse of the stop period, the controller 15 executes the first adjustment control to turn on only the drum 11 and rotate the drum 11 forward. At this point of time, the pulsator 13 does not rotate in reverse, so that the laundry in the drum 11 remains inertia force in the forward rotation direction.

Therefore, the drum is driven by using the inertia force of the laundry. This makes it easier to reverse the rotational direction of the drum 11 in the forward rotation direction and reduces the starting load applied to the motor 12 to rotate the drum 11 forward.

Next, after the drum 11 is turned on and the first predetermined time has elapsed, the controller 15 turns on the pulsator 13 and rotates the pulsator 13 in reverse. The laundry in the drum 11 is turned again in the rotational direction of the pulsator 13 to change the rotational direction from the forward rotation direction to the reverse rotation direction.

As a result, an inertia force in the reverse rotation direction is generated in the laundry in the drum 11 at this time. As a result, when the next second opposite drive mode is started, the first adjustment control is executed again, thereby reducing the starting load applied to the motor 12 to reverse the rotational direction of the drum 11 in the reverse rotation direction.

As described above, by executing the first adjustment control, before the direction of the inertia force generated in the laundry in the drum 11 is switched by the pulsator 13, the rotational direction of the drum 11 is reversed by using the inertia force. Therefore, the starting load applied to the motor 12 is reduced when the rotational direction of the drum 11 is reversed.

Here, for example, due to the laundry sticking to the drum 11 and the like, as opposed to the above, when the laundry is rotated along the rotational direction of the drum 11, the pulsator 13 is turned on earlier than the drum 11. When the laundry is rotated along the rotational direction of the drum 11, the inertia force of the laundry is applied to the drum 11 in addition to the inertia force of the drum 11. Therefore, an excessive load is applied to the motor 12 when the rotational direction of the drum 11 is reversed.

For this reason, the pulsator 13 is rotated first so that the laundry is forced to rotate along the pulsator 13. When the laundry turns along the direction of the pulsator 13, the drum 11 is turned on. Thus, an excessive load is prevented from being applied to the motor 12.

In addition, whether or not the laundry is rotating along the rotational direction of the drum 11 may be identified by the load detectors 113a and 113b. For example, when the laundry is rotating along the rotational direction of the drum 11, the direction of the inertia force before the laundry is reversed is equal to the rotational direction of the pulsator 13 after the pulsator 13 is reversed so that the load of the motor 12 (outer rotor 20) is reduced at the time of reversing the pulsator 13.

As the load becomes smaller, the current detected by the current sensor becomes smaller. As a result, it may be identified that the laundry is rotating along the rotational direction of the drum 11. It is also possible to identify that the laundry is rotating along the rotational direction of the drum 11 by detecting the rotational speeds of the outer rotor 20 and the inner rotor 30 during the stop period by the position sensor.

Figure 60:
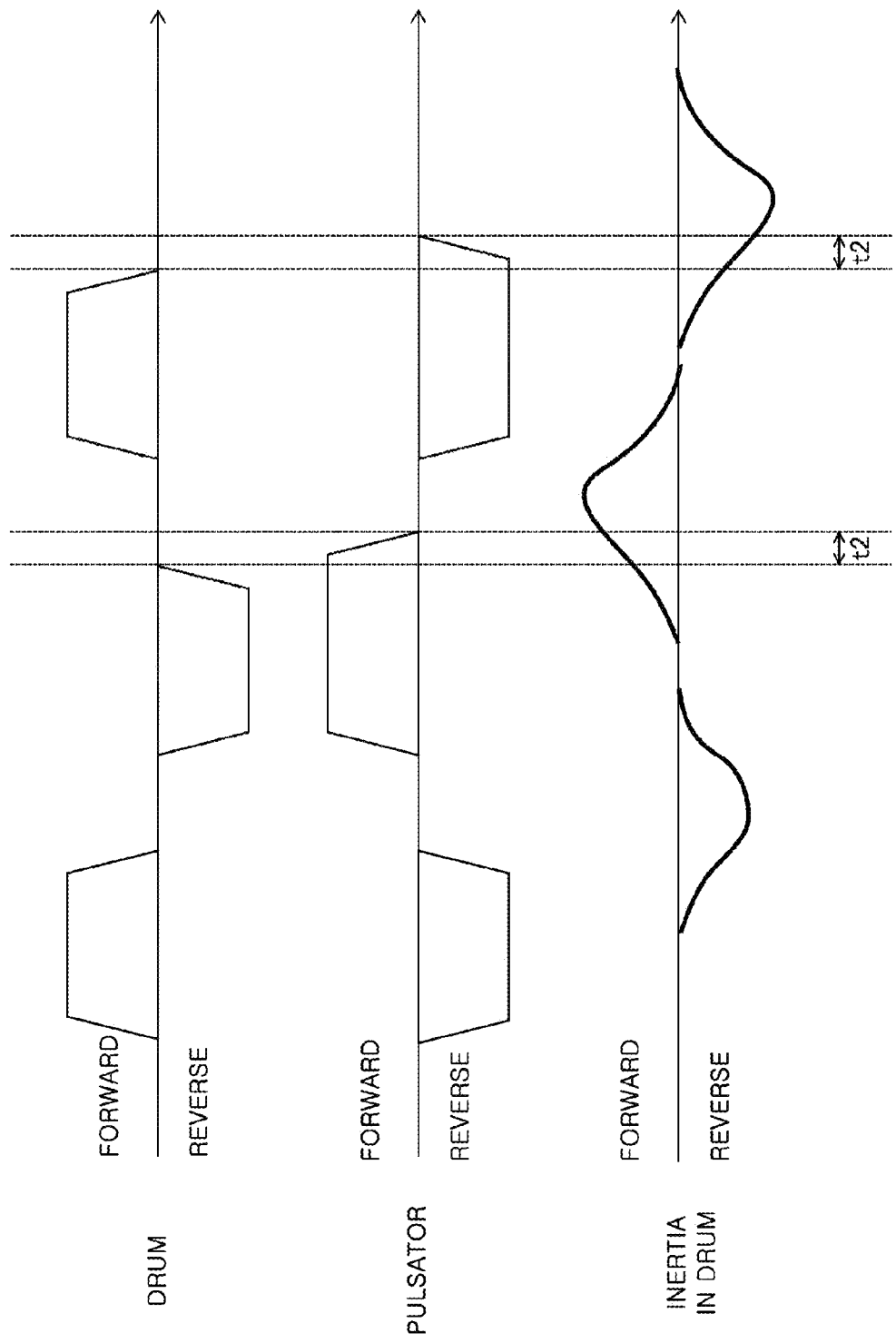
FIG. 60 is a graph illustrating electric signals given to the motor when the drum and pulsator are driven at the time of execution of the second adjustment control in relation to the washing machine according to the sixth embodiment.

FIG. 60 illustrates electric signals given to the motor 12 when the second adjustment control is executed. The second adjustment control is a control configured to turn off one of the drum 11 and the pulsator 13 and to turn off the other of the drum 11 and the pulsator 13 after a second predetermined time elapses when the first opposite drive mode or the second opposite drive mode is turned off. Further, FIG. 59 illustrates the electric signals (pulse signals) transmitted to the motor 12 when the pulsator 13 is turned off after the drum 11 is turned off and the second predetermined time (t2 in FIG. 60) elapses.

Here, only the case where the pulsator 13 is turned off after the drum 11 is turned off will be described in detail based on FIG. 60.

Referring to FIG. 60, first, the controller 15 turns on the first opposite drive mode so that the drum 11 is rotated forward and the pulsator 13 is rotated in reverse. At this time, the laundry in the drum 11 is rotated along the rotational direction of the pulsator 13.

Next, the first opposite drive mode is turned off, and the motor 12 is stopped during the stop period. As described above, during the stop period, the drum 11 and the pulsator 13 are rotated by inertia force. At this time, the laundry is rotated by inertia force in the reverse rotation direction which is the rotational direction of the pulsator 13.

After the stop period has elapsed, the controller 15 turns on the second opposite drive mode so that the drum 11 is rotated in reverse and the pulsator 13 is rotated forward.

When the second opposite drive mode is turned on, the load detectors 113a and 113b detect the load applied to the motor 12. When the detected load is larger than the target load, the controller 15 determines that there is a possibility that the starting failure of the motor 12 may occur, and executes the second adjustment control when turning off the second opposite drive mode.

When executing the second adjustment control, the controller 15 first turns off the drum 11 only. After, the drum 11 is turned off, the drum 11 is rotated in the reverse rotation direction by the inertia force. Then, after the drum 11 is turned off and the second predetermined time has elapsed, the pulsator 13 is turned off.

Since a force is generated in the rotational direction of the pulsator 13 on the laundry in the drum 11 by turning off the pulsator 13 later, that is, by rotating the pulsator 13 long, a large inertia force is left in the laundry in the drum 11 in comparison with the case where the drum 11 and the pulsator 13 are simultaneously turned off. After the pulsator 13 is turned off, the controller 15 stops the motor 12 during the stop period. During this stop period, the laundry in the drum 11 and the pulsator 13 rotate in the forward rotation direction by the inertia force.

Then, after the lapse of the stop period, the controller 15 turns on the next first opposite drive mode to rotate the drum 11 forward and rotate the pulsator 13 in reverse. At this time, the laundry in the drum 11 has a larger inertia force than when the drum 11 and the pulsator 13 are simultaneously turned off. Therefore, the rotational direction of the drum 11 is reversed in the forward rotation direction by using the inertia force of the laundry so that the starting load applied to the motor 12 is reduced.

Further, the rotational direction of the pulsator 13 is reversed in the reverse rotation direction, so that the laundry in the drum 11 is rotated again along the rotational direction of the pulsator 13 to change the rotational direction from the forward rotation direction to the reverse rotation direction. Thus, when the first opposite drive mode is turned off, an inertia force in the reverse rotation direction is generated in the laundry in the drum 11 at this time. As a result, by executing the second opposite drive mode again when the first opposite drive mode is turned off, when the next second opposite drive mode is turned on and the rotational direction of the drum 11 is reversed in the reverse rotation direction, the starting load applied to the motor 12 is reduced.

As described above, by executing the second adjustment control, a large inertia force may be left in the laundry in the drum 11 as compared with the case where the drum 11 and the pulsator 13 are simultaneously turned off. Therefore, the starting load applied to the motor 12 may be reduced by activating the drum 11 using the inertia force.

As described above, by executing either the first or second adjustment control, when the first opposite drive mode and the second opposite drive mode are alternately performed, the load applied to the motor 12 may be reduced. As a result, the starting failure of the motor may be prevented.

When the stop period is set to a time longer than the reference time, the inertia force of the drum 11 and the pulsator 13 is sufficiently lowered during the stop period, so that when the first opposite drive mode is switched to the second opposite drive mode or when the second opposite drive mode is switched to the first opposite drive mode, the load applied to the motor 12 is almost equal to or less than the target load. Therefore, when the stop period is set to a time longer than the reference time, the first or second adjustment control is not executed.

Here, in the first adjustment control described above, the rotational direction of the drum 11 is reversed by using the inertia force of the laundry in the drum 11, so that the rotational direction of the drum 11 is easily reversed. Since the drum 11 rotates in the same direction as the inertia force of the laundry during the first predetermined time when performing the first adjustment control, the rotational force of the drum 11 is added to the laundry in addition to the inertia force.

By combining the inertia force and the rotational force, a centrifugal force due to the rotation of the laundry acts on the washing machine 1 for the first predetermined time. In the case of the second adjustment control described above, the drum 11 is first turned off and only the pulsator 13 is rotated for the second predetermined time, so that the relatively large inertia force in the rotational direction of the pulsator 13 is applied to the laundry in the drum 11. Therefore, during the second predetermined time, a large centrifugal force acts on the washing machine 1 from the laundry compared with the case where the drum 11 and the pulsator 13 are rotated in opposite directions. This is the same when the pulsator 13 is turned on in the first adjustment control or when the drum 11 is turned off later in the second adjustment control.

When the centrifugal force from the laundry is applied to the washing machine 1, the washing machine 1 may vibrate, which may cause noise or the like in the washing process. Particularly, when the laundry is gathered at one place inside the drum 11, the centrifugal force becomes large, and the vibration of the washing machine 1 is also likely to increase.

Thus, the controller 15 detects the vibration of the washing machine 1 by the vibration detector 114. When the detected vibration is larger than the predetermined vibration, the controller 15 performs a vibration reduction control to shorten the length of the first predetermined time in the first adjustment control and the length of the second predetermined time in the second adjustment control. By shortening the first predetermined time, a water flow in the direction opposite to the rotational direction of the laundry is generated by the pulsator 13 at an early state, so that the rotation of the laundry is decelerated by the water flow and the centrifugal force acting on the washing machine 1 from the laundry is reduced.

As a result, the vibration of the washing machine 1 may be reduced. On the other hand, by shortening the second predetermined time, the rotation time of the pulsator 13 is shortened, so that the inertia force in the rotational direction generated in the laundry by the pulsator 13 decreases and the centrifugal force due to the inertia force also decreases. As a result, the vibration of the washing machine 1 may be reduced.

When the detected vibration becomes smaller than the predetermined vibration by shortening the lengths of the first predetermined time and the second predetermined time, the controller 15 may return the lengths of the first predetermined time and the second predetermined time to the original state. For example, in the case where the cause of the vibration is the bunching of the laundry, the laundry may be loosened due to the reciprocal rotation of the drum 11 and the pulsator 13, thereby eliminating the bunching of the laundry.

Conversely, the first predetermined time or the second predetermined time is further shortened when the vibration of the washing machine 1 does not become the predetermined vibration or less even though the first predetermined time or the second predetermined time is shortened. However, when the load of the motor 12 becomes larger than the target load by making the first predetermined time or the second predetermined time shorter, the controller 15 gives priority to the load reduction adjustment control rather than the vibration reduction control, and controls the first predetermined time or the second predetermined time not to be shorter.

With the above-described control, the load of the motor 12 may be reduced and the vibration of the washing machine 1 may be reduced.

Figure 61:
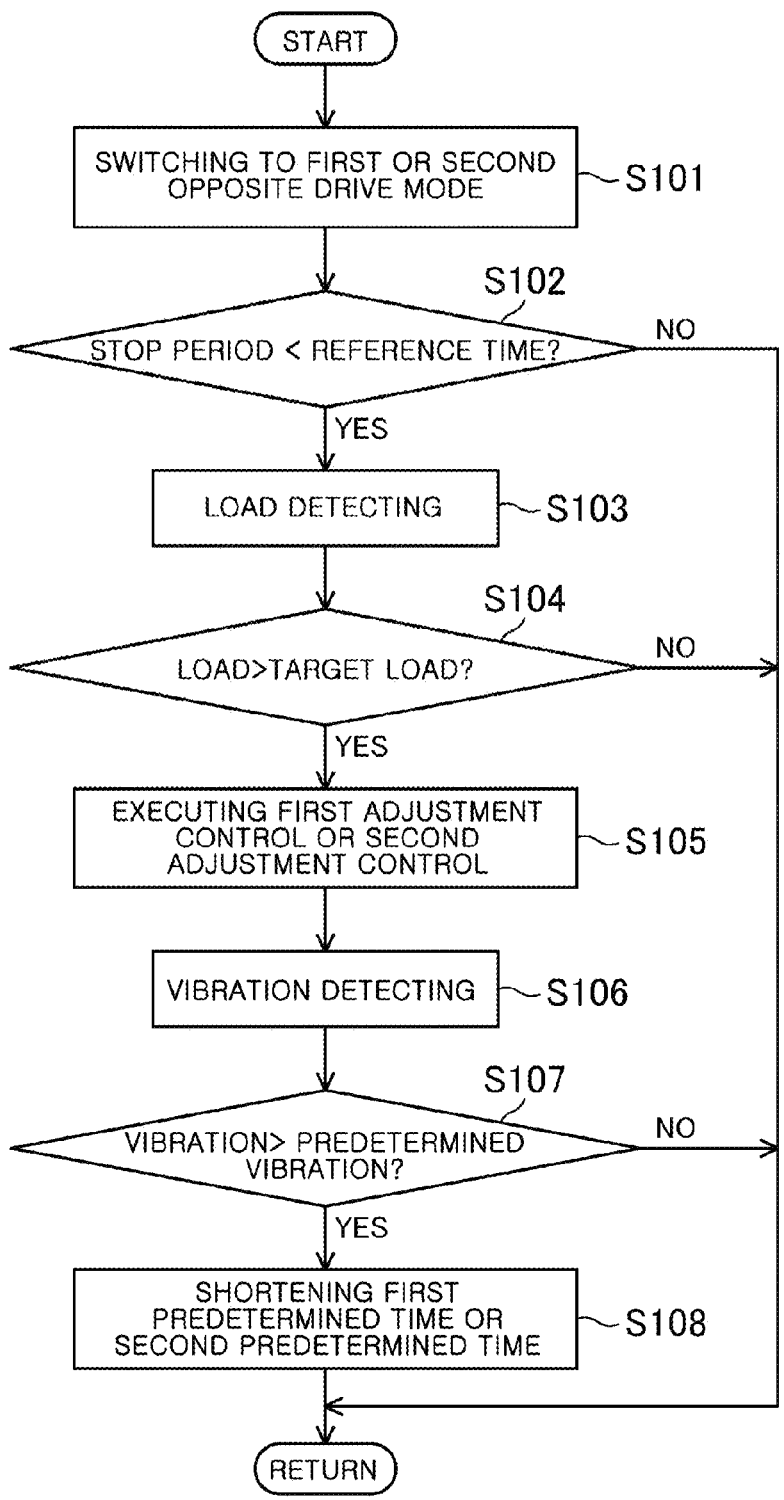
FIG. 61 is a flowchart illustrating a processing operation at the time of operation of the washing machine by the controller in relation to the washing machine according to the sixth embodiment.

Next, the processing operation at the time of executing the load reduction adjustment control of the washing machine 1 by the controller 15 will be described with reference to FIG. 61. FIG. 61 omits operations from the initial state until the stop period is elapsed after the first or second opposite drive mode is executed and illustrates from an operation of switching to the first or second opposite drive mode.

In operation S101, the controller 15 transmits an electric signal to the motor 12 to switch the mode from the first opposite drive mode to the second opposite drive mode or from the second opposite drive mode to the first opposite drive mode.

In the next operation S102, the controller 15 identifies whether or not the stop period is set shorter than the reference time. When the stop period is YES which is shorter than the reference time, the process proceeds to operation S103. On the other hand, in the case of NO where the stop period is equal to or longer than the reference time, the controller 15 identifies that there is a low possibility that the starting failure of the motor 12 is likely to occur, and skips operation S103 and the subsequent operations, and returns it to thereafter.

In operation S103, the load detectors 113a and 113b detects a load applied to the motor 12 when the mode is switched.

In operation S 104, the controller 15 identifies whether the detected load detected in operation S 103 is greater than the target load. In this operation S 104, when the detected load is YES which is larger than the target load, the controller 15 identifies that there is a possibility that the motor 12 causes the starting failure, and proceeds to operation S 105. On the other hand, when the detected load is NO, which is equal to or less than the target load, the return is made to thereafter.

In the operation S 105, the first or the second adjustment control is executed to make the detected load equal to or smaller than the target load. Which is executed may be set in advance by the controller 15 or may be determined by a user at the time of operating the washing machine 1.

In the next operation S 106, the vibration detector 114 detects the vibration of the washing machine 1. After the detection, the process proceeds to operation S 107.

In the operation S 107, it is identified whether or not the detected vibration is larger than the predetermined vibration. In operation S 107, when the detected vibration is YES which is larger than the predetermined vibration, the process proceeds to operation S 108 to execute the vibration reduction control. On the other hand, in the operation S 107, when the detected vibration is NO, which is equal to or smaller than the predetermined vibration, the vibration reduction control is not performed and the process returns to thereafter.

In operation S 108, the first predetermined time or the second predetermined time is shortened as the vibration reduction control. As described above, by shortening the first predetermined time or the second predetermined time, the centrifugal force of the laundry is reduced and the vibration is reduced. After execution of the vibration reduction control, the process returns to thereafter.

Accordingly, the washing machine 1 is provided with the load detectors 113a and 113b for detecting the load of the motor 12 and the controller 15 configured to control the operation of the drum 11 and the pulsator 13 by transmitting an electric signal to the motor 12 via the inverter 112 based on the detected load detected by the load detectors 113a and 113b. The controller 15 is configured to alternately execute the first opposite drive mode in which the drum 11 is rotated forward and the pulsator 13 is rotated in reverse and the second opposite drive mode in which the drum 11 is rotated in reverse and the pulsator 13 is rotated forward while the stop period is interposed therebetween and to execute the first adjustment control or the second adjustment control for controlling the timing of at least one of ON and OFF of at least one of the drum 11 and the pulsator 13 so that the detected load becomes equal to or less than the predetermined target load. Therefore, the rotational direction of the drum 11 or the pulsator 13 may be reversed by using the inertia force of the laundry in the drum 11, so that the load applied to the motor 12 when the first and second opposite drive modes are switched may be reduced. As a result, the starting failure of the motor 12 may be prevented from occurring.

Next, an embodiment (embodiment 2) different from the above-described embodiment will be described. On the other hand, the construction of the washing machine 1 is common to the above-described embodiment, and the control by the controller 15 is different. Therefore, the different constructions will be described, and the same reference numerals are given to the common constructions and description thereof is omitted.

The embodiment 2 differs from the embodiment 1 in the content of the load reduction adjustment control for reducing the load of the motor 12 in particular. Specifically, when the laundry contained in the drum 11 is rotating in the same direction as the rotational direction of the drum 11, the controller 15 decelerates and stops the rotation of the drum 11 during the stop period, and executes the first opposite drive mode or the second opposite drive mode after the stop.

In other words, in the embodiment 1, the timing for turning on or off the drum 11 or the pulsator 13 is adjusted by the first or the second adjustment control, so that the load applied to the motor 12 is reduced. However, in the embodiment 2, by a third adjustment control as the load reduction adjustment control, the drum is stopped by decelerating the rotation of the drum 11 during the stop period and after the stop, the next first opposite drive mode or the next second opposite drive mode is turned on so that the load applied to the motor 12 is reduced.

Hereinafter, the third adjustment control will be described in detail with reference to FIG. 62.

Figure 62:
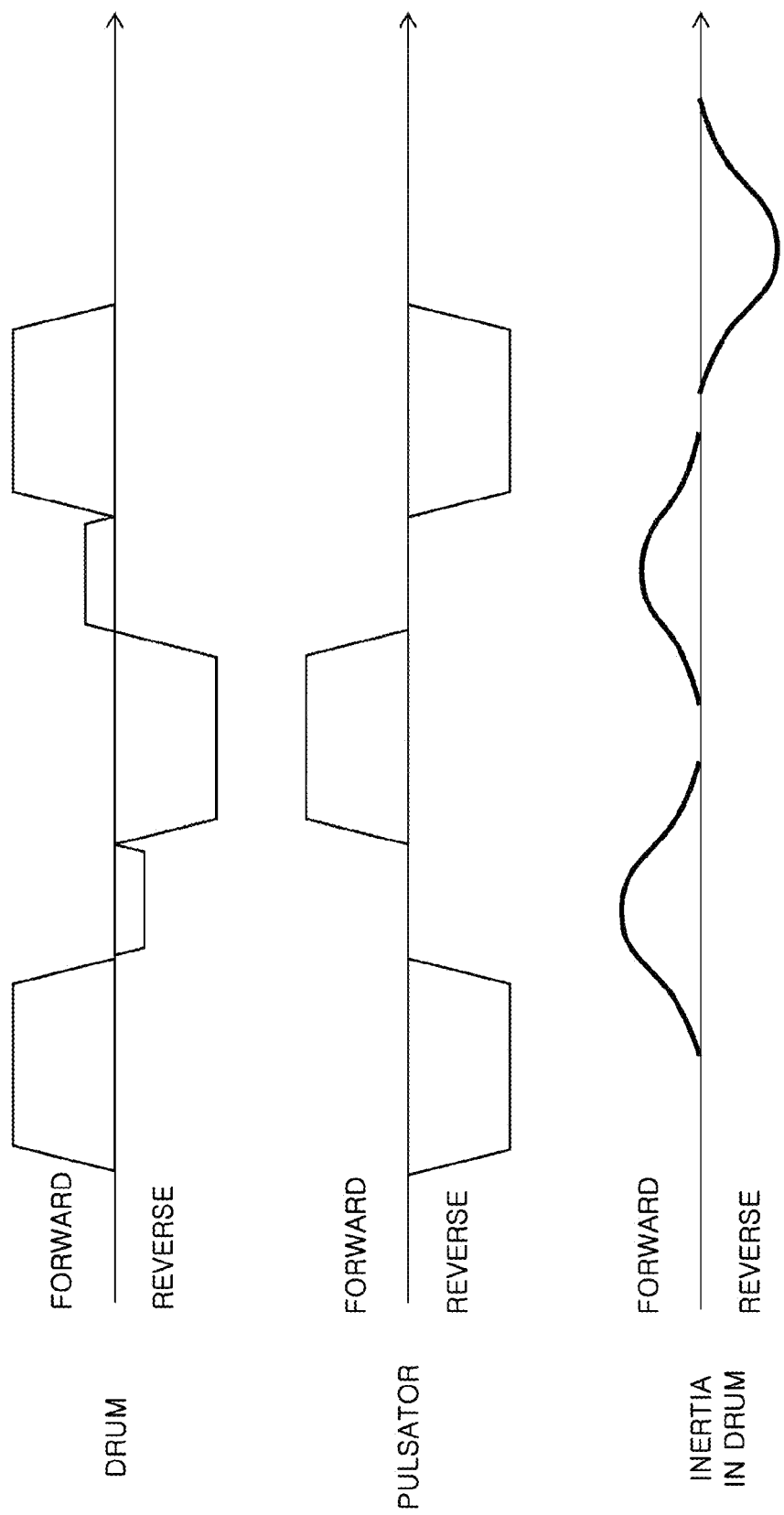
FIG. 62 is a graph illustrating electric signals given to the motor when the drum and pulsator are driven at the time of execution of the third adjustment control in the washing machine according to the embodiment 2 in relation to the washing machine according to the sixth embodiment.

FIG. 62 illustrates electric signals transmitted to the motor 12 when executing the third adjustment control. As described above, the third adjustment control is a control for decelerating and stopping the rotation of the drum 11 during the stop period between the first opposite drive mode and the second opposite drive mode and turning on the next first or second opposite drive mode after the drum 11 is stopped.

The third adjustment control is executed when the laundry in the drum 11 is rotated along the rotational direction of the drum 11, not the pulsator 13, due to, for example, the laundry sticking to the drum 11. Whether or not the laundry is rotated along the rotational direction of the drum 11 may be detected by the load detectors 113a and 113b as in the embodiment 1.

Referring to FIG. 62, first, the controller 15 turns on the first opposite drive mode, and rotates the drum 11 forward and rotates the pulsator 13 in reverse.

Next, the controller 15 turns off the first opposite drive mode, and stops the motor 12 during the stop period. In the stop period, the load detectors 113a and 113b (particularly, the position sensor) detects the direction in which the laundry in the drum 11 is rotating.

When the rotational direction of the laundry is the same as the rotational direction of the drum 11, the controller 15 identifies the an excessive load is applied to the motor 12 when reversing the rotational direction of the drum 11, and executes the third adjustment control so that the rotation of the drum 11 is decelerated and stopped during the stop period.

Specifically, so-called electromagnetic brake control is performed to apply a reverse-phase pulse signal to the motor 12, thereby generating a brake against the rotation of the drum 11. The magnitude of the pulse signal is such that the rotation of the drum 11 can be stopped during the stop period. Alternately, the brake may be generated by applying a plurality of short pulses of reverse phases.

After the stop period has elapsed, the controller 15 turns on the second opposite drive mode to rotate the drum 11 in reverse and rotate the pulsator 13 forward. Since the inertia force in the forward rotation direction is not generated in the drum by stopping the rotation of the drum 11 by the third adjustment control, the starting load applied to the motor 12 becomes small when rotating the drum 11 in reverse.

Further, even if the drum 11 is stopped, as illustrated in FIG. 62, the inertia force in the forward rotation direction remains in the laundry in the drum 11, so that when the rotational direction of the pulsator 13 is reversed in the forward rotation direction, the laundry is easily rotated along the rotational direction of the pulsator 13. When the laundry is rotated along the rotational direction of the pulsator 13, as illustrated in FIG. 62, the inertia force of the laundry acts in the rotational direction of the pulsator 13, so that the inertia force of the drum 11 is reduced by the inertia force of the laundry in the stop period after the second opposite drive mode is turned off.

As a result, the starting load applied to the motor 12 may be reduced when turning on the next first opposite drive mode and reversing the rotational direction of the drum 11. Also, since only a small load is applied to the motor 12 as compared with the case where the rotational direction of the drum 11 is reversed when the rotation of the drum 11 is merely decelerated, an excessive load is not applied to the motor 12 by the third adjustment control.

Further, in the embodiment 2, when the stop period is set to be longer than the reference time, the controller 15 identifies that the inertia force of the drum 11 is sufficiently lowered during the stop period and does not execute the third adjustment control.

(Modifications)

For example, one motor 12 has an inner rotor 30 and an outer rotor 20, the drum 11 is driven by the inner rotor 30, and the pulsator 13 is driven by the pulsator 13. However, the present disclosure is not limited to this. Two motors may be provided and connected the drum 11 and the pulsator 13, respectively.

At this time, one inverter may be provided for each of the two motors, or one inverter may be provided for two motors. When one inverter is used, a variable magnetic pole motor may be used as the motor.

Also, the first or the second adjustment control is executed when the detected load detected by the load detectors 113a and 113b becomes larger than the target load, but the present disclosure is not limited thereto. For example, during the washing process, the first or second adjustment control may be always executed.

Further, when the stop period is longer than the reference time, the first to third adjustment controls are not executed. However, the present disclosure is not limited thereto. The first to third adjustment controls may be executed regardless of the length of the stop period.

In addition, the first to third adjustment controls may be combined with each other. For example, the first adjustment control and the second adjustment control are combined so that the timing of turning on the drum 11 is quickened and the timing of turning off the pulsator 13 is delayed. As described above, by combining the first to third adjustment controls, the inertia force of the laundry in the drum 11 may be more easily used, and the load of the motor 12 may be further reduced.

Seventh Embodiment

The seventh embodiment relates to a washing machine capable of independently driving the washing tub and the pulsator.

Figure 63:
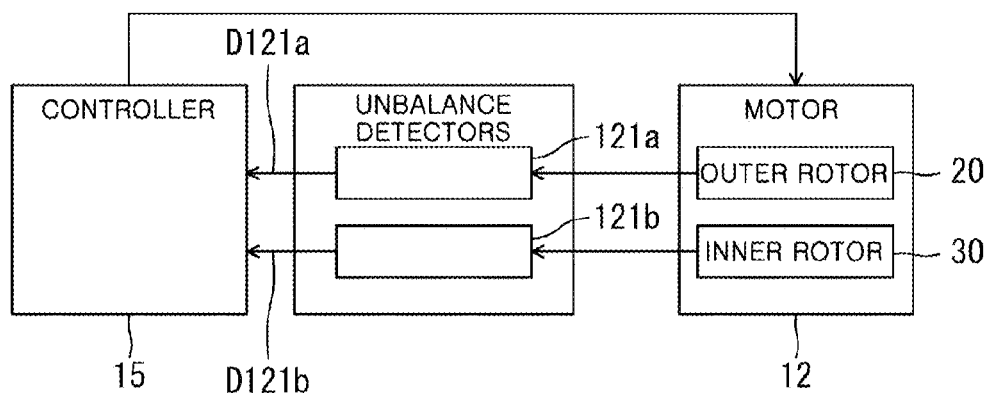
FIG. 63 is a block diagram illustrating the configuration of a motor and a controller in relation to the washing machine according to the seventh embodiment.

As illustrated in FIG. 63, the motor 12 is connected to unbalance detectors 121a and 121b for detecting the amount of unbalance of the pulsator 13 driven by the outer rotor 20 and the drum 11 driven by the inner rotor 30. The detector 121a detects the unbalance amount of the pulsator 13 and the detector 121b detects the unbalance amount of the drum 11.

The unbalance detectors 121a and 121b are not particularly limited as long as they can detect the unbalance amount of the pulsator 13 and the drum 11. For example, a current sensor, a vibration sensor, a velocity sensor, or the like may be used. The unbalance amount detected by the unbalance detectors 121a and 121b is transmitted to the controller 15 as detection signals D121a and D121b. D121a is a detection signal of the unbalance detector 121a, and D121b is a detection signal of the unbalance detector 121b.

(Control of the Rotational Motion of the Motor)

Since this washing machine 1 is capable of independently driving each of the rotors 20 and 30, other types of operation may be realized.

=Motor Control During Washing Operation=

In the washing operation, a normal washing in which only the outer rotor 20 (pulsator 13) is driven, a reverse water stream in which the inner rotor 30 (drum 11) and the outer rotor 20 are driven in opposite directions, a weak water stream in which only the inner rotor 30 is driven or the like may be provided.

=Motor Control During Dewatering Operation=

In the dewatering operation, both the rotors 20 and 30 may be simultaneously driven in the same direction. As a result, at a low speed, a large torque may be obtained and the starting may be faster. Further, in this embodiment, the controller 15 performs the motor control at the time of the dewatering operation so that unbalance may be reduced.

Hereinafter, the motor control for the unbalance reduction during the dewatering operation will be described in detail with reference to FIGS. 64 to 70.

Control Example 1

Figure 64:
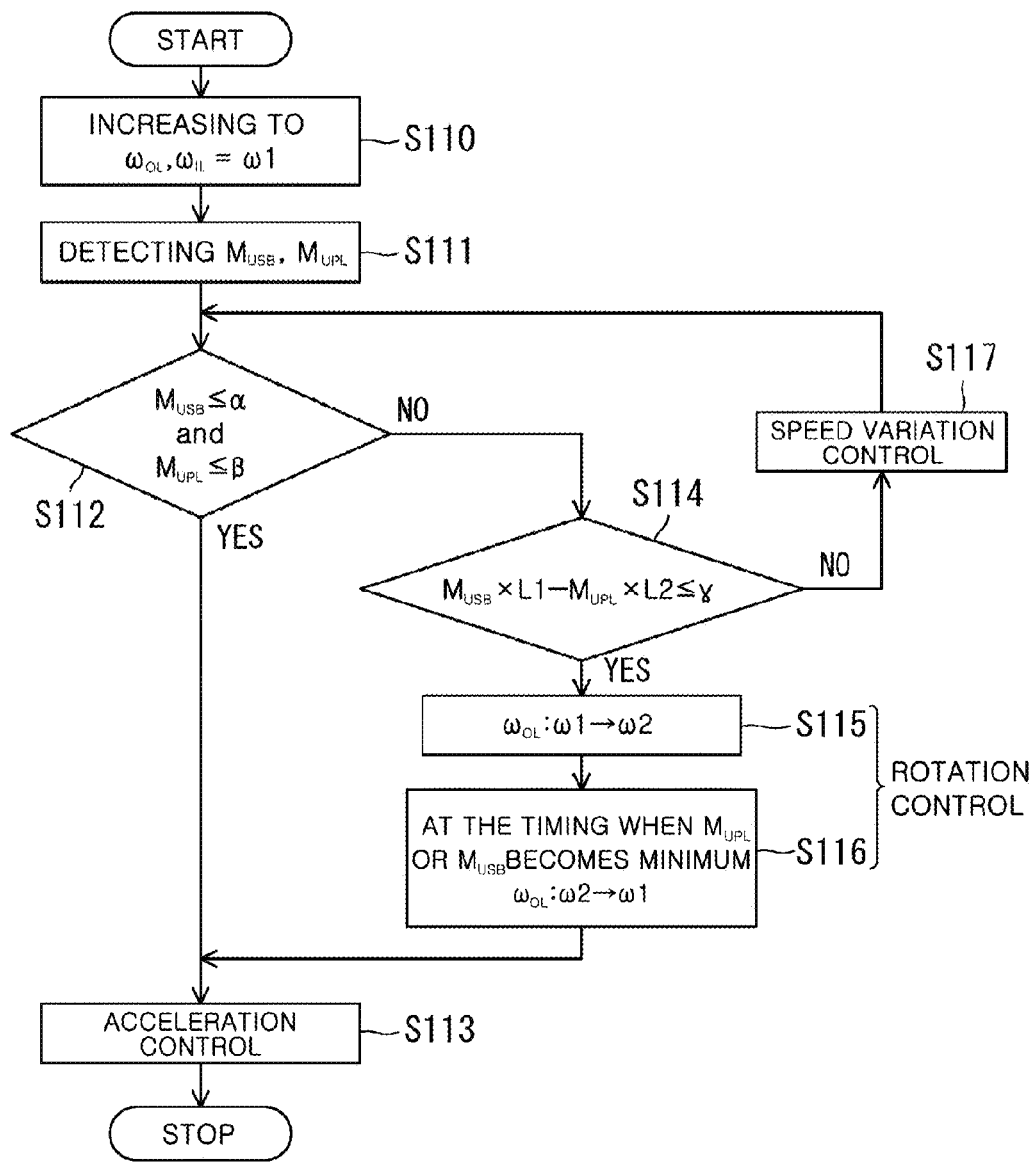
FIG. 64 is a flowchart illustrating a procedure for controlling the rotation operation of the motor in relation to the washing machine according to the seventh embodiment.

As illustrated in FIG. 64, first, in operation S 110, both the rotors 20 and 30 are rotationally driven in the same direction so that the number of rotations (rotational speed) ωIL of the inner rotor 30 and the rotational speed ωOL of the outer rotor 20 are increased to the predetermined rotational speed ω1 (ω1<ωC). Accordingly, the drum 11 and the pulsator 13 rotate at the same rotational speed ω1. Further, in this disclosure, the same is a concept including substantially the same range. ωC is a resonant rotational speed of the washing machine 1 (drum 11).

After the rotational speeds of the outer rotor 20 and the inner rotor 30 become ω1, in operation S 111, the unbalance detectors 121a and 121b detect the unbalance amount of the drum 11 and the pulsator 13, and the process proceeds to operation S 112.

In operation S 112, when the detected value $M_{USB}$ of the unbalance amount of the drum 11 is equal to or less than a predetermined value α and the detected value $M_{UPL}$ of the unbalance amount of the pulsator 13 is equal to or less than a predetermined value β (YES in operation S 112), the process proceeds to operation S 113.

In operation S 113, the outer and inner rotors 20 and 30 are raised at the same speed gradient to a predetermined rotational speed equal to or higher than the resonant rotational speed while keeping the rotational speeds of the outer rotor 20 and the inner rotor 30, and the dewatering operation is terminated after a predetermined time elapses.

Figure 65:
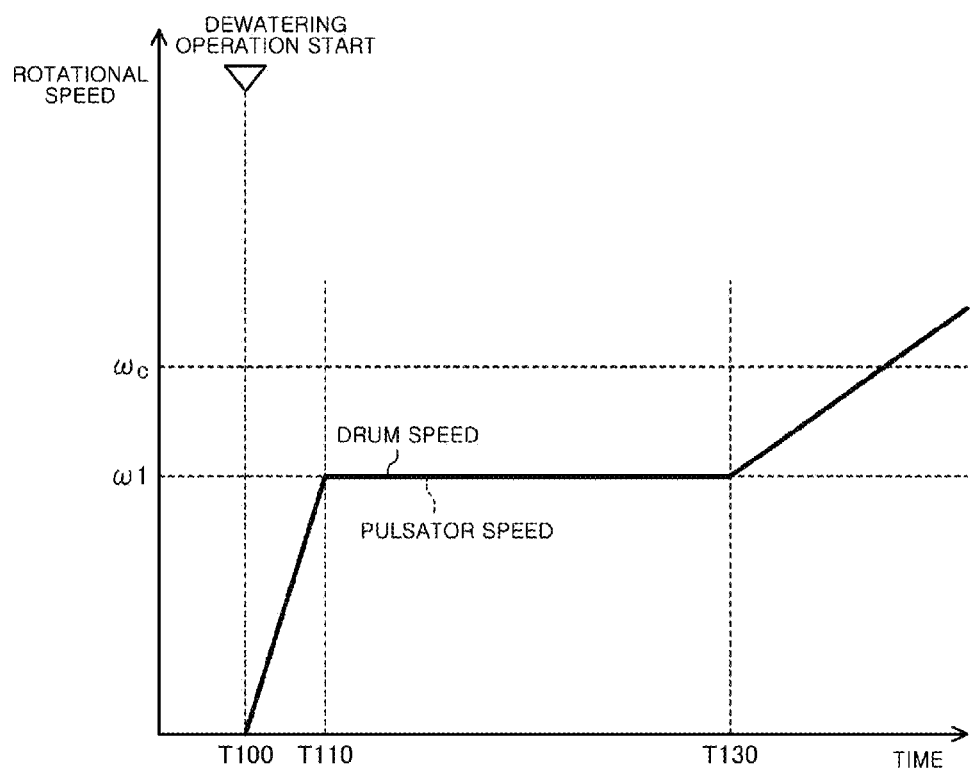
FIG. 65 is a graph illustrating changes with time in the rotational speeds of the drum and pulsator in relation to the washing machine according to the seventh embodiment.

FIG. 65 is a graph illustrating changes over time in the number of rotations of the rotors 20 and 30 (drum speed and pulsator speed in FIG. 65, and the same in FIGS. 66 and 70) according to the control example 1. As illustrated in FIG. 65, when the detected values $M_{USB}$ and $M_{UPL}$ of the unbalance amount of the drum 11 and pulsator 13 are equal to or less than the predetermined values, that is, when the vibration amount is estimated to be equal to or lower than the predetermined value even if accelerated, the rotational speeds of the two rotors 20 and 30 are increased to the rotational speed equal to or greater than the resonant rotational speed ωC at the same speed gradient (see the time T130 or later in FIG. 65). As a result, the dewatering operation may be terminated in a shorter time.

Control Example 2

On the other hand, in operation S 112, when the detected value $M_{USB}$ of the unbalance amount of the drum 11 is larger than the predetermined value α and the detected value $M_{UPL}$ of the unbalance amount of the pulsator 13 is larger than the predetermined value β (NO in S 112), the process proceeds to operation S 114.

In operation S 114, when the condition of the following formula (1) is satisfied (YES in operation S 114), the process proceeds to the rotation control. Specifically, the process proceeds to operations S 115 and S116.

$$|(M_{USB} \times L1) - (M_{UPL} \times L2)| \leq \gamma \quad (1)$$

Figure 68:
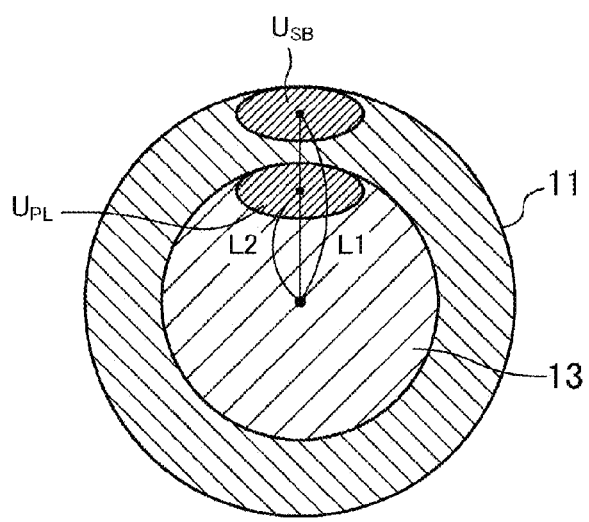
FIG. 68 is a view schematically illustrating the positions of unbalance of the drum and pulsator at point A in FIG. 67.
Figure 69:
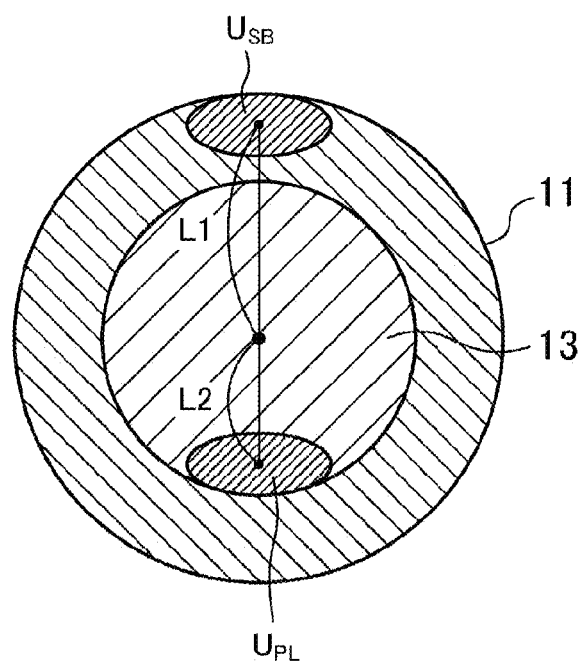
FIG. 69 is a view schematically illustrating the positions of unbalance of the drum and pulsator at point B in FIG. 67.

Here, as illustrated in FIGS. 68 and 69, L1 is the radius of rotation of the unbalance USB of the drum 11, and L2 is the radius of rotation of the unbalance UPL of the pulsator 13.

In other words, '$M_{USB} \times L1$' is the moment amount $P_{USB}$ due to the unbalance of the drum 11 side, and '$M_{UPL} \times L2$' is the moment amount $P_{UPL}$ due to the unbalance of the pulsator 13. Further, γ is a predetermined moment amount that can be arbitrarily set. The radius of the drum 11 and the radius of the pulsator 13 may be used as L1 and L2 in the above formula (1), respectively. The same applies to the following formula (2).

Figure 66:
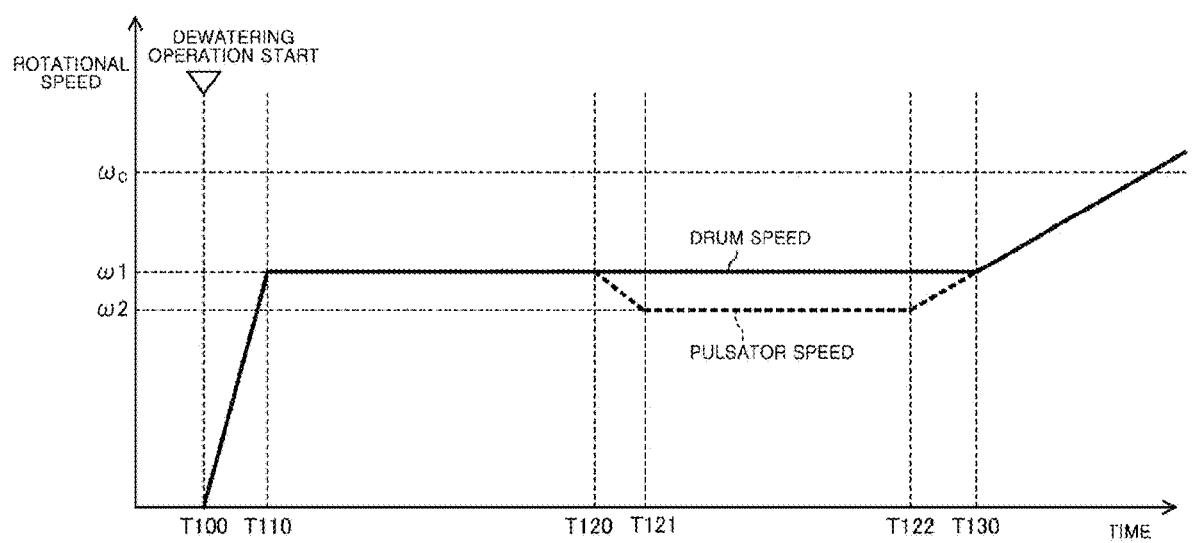
FIG. 66 is a graph illustrating changes with time in the rotational speeds of the drum and pulsator in relation to the washing machine according to the seventh embodiment.

In operation S 115, the rotational speed ωOL of the outer rotor 20 is changed from ω1 to ω2 (ω2<ω1) while the rotational speed ωIL of the inner rotor 30 is maintained at ω1. FIG. 66 is a graph illustrating changes over time in the number of rotations of the two rotors 20 and 30 according to the control example 2, and the change in speed in operation S 115 is illustrated from time T120 to time T121.

As described above, the drum 11 and the pulsator 13 are rotated in a state where a predetermined speed difference (rotational speed difference: ω1−ω2) is given between the outer rotor 20 and the inner rotor 30, so that the positional relationship between the position of the unbalance USB of the drum 11 and the position of the unbalance UPL of the pulsator 13 may be periodically changed. As a result, the unbalance amount UT, which is the sum of the drum 11 and the pulsator 13, periodically changes.

Figure 67:
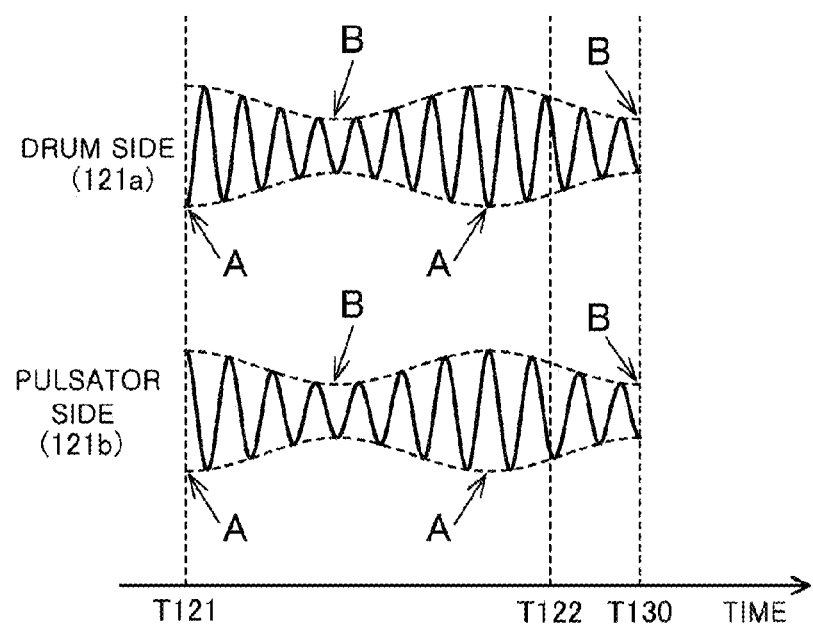
FIG. 67 is a waveform diagram illustrating a detection signal of an unbalance detector in relation to the washing machine according to the seventh embodiment.

FIG. 67 illustrates a result of detecting a periodic change in the unbalance amount by using current sensors as the unbalance detectors 121a and 121b. In FIG. 67, the solid lines show the q-axis current waveforms which are the detection signals D121a and D121b of the unbalance detectors 121a and 121b. FIG. 68 is a view illustrating the position of unbalance in the point A (when the amplitudes of the detection signals D121a and D121b are the maximum) in FIG. 67. FIG. 69 is a view illustrating the position of unbalance in the point B (when the amplitudes of the detection signals D121a and D121b are minimum) in FIG. 67.

As illustrated in FIG. 67, the periods of the detection signals of the unbalance detectors 121a and 121b are different on the pulsator side and the drum side, while the amplitude (broken lines in FIG. 67) showing the unbalance amount changes in the same period. Therefore, the controller 15 may detect the periodic change of the unbalance amount UT by checking the detection signal D121a and D121b from the unbalance detector 121a and 121b on either the pulsator side or the drum side.

Thus, in operation S 116, based on any one of the detection signals D121a and D121b, the rotational speed ωOL of the outer rotor 20 is linearly changed from ω2 to ω1 in accordance with the timing at which the detected value $M_{USB}$ or $M_{UPL}$ of the unbalance amount becomes minimum, and the process proceeds to operation S 113. The change in the rotational speed corresponding to operation S 116 is illustrated from time T122 to time T130 in FIG. 66. Further, the controller 15 may identify the timing at which the unbalance amount becomes the minimum based on both the detection signals D121a and D121b.

Accordingly, the drum 11 and the pulsator 13 are rotated at the same rotational speed when the unbalances USB and UPL of the drum 11 and the pulsator 13 face each other in a plan view as illustrated in FIG. 69. Due to the rotation at the opposed positions, the respective unbalance amounts cancel each other, so that the sum value (total unbalance amount) of the unbalance amounts of the drum 11 and the pulsator 13 is minimized.

Thereafter, in operation S 113, the rotational speeds ωIL and ωOL of both the rotors 20 and 30 are raised from ω1 to the predetermined rotational speed equal to or greater than the resonant rotational speed ωC at the same speed gradient, and the dewatering operation is terminated after the predetermined time elapsed (see time T130 or later in FIG. 66). Thus, the drum 11 may be accelerated while maintaining the unbalance amount minimized in operation S 116, so that the vibration of the drum 11 may be prevented. Further, since the unbalance amount is positively controlled, when the washing machine 1 is continuously used, the deviation of the vibration of the drum 11 may be reduced during the dewatering operation.

Further, in this disclosure, the same speed gradient is a concept including substantially the same range. For example, it is a concept that includes a speed gradient difference (time difference) in a range where the relative positions of the unbalance USB and the unbalance UPL do not substantially change.

Control Example 3

On the other hand, in operation S 114, when the condition of the following formula (2) is satisfied (NO in operation S 114), the process proceeds to a speed variation control.

$$|(M_{USB} \times L1) - (M_{UPL} \times L2)| > \gamma \qquad (2)$$

In operation S 117, the moment amount $P_{USB}$ corresponding to the unbalance of the drum 11 is compared with the moment amount $P_{UPL}$ corresponding to the unbalance of the pulsator 13, a predetermined speed variation is given to the side having a larger amount of the moment.

Figure 70:
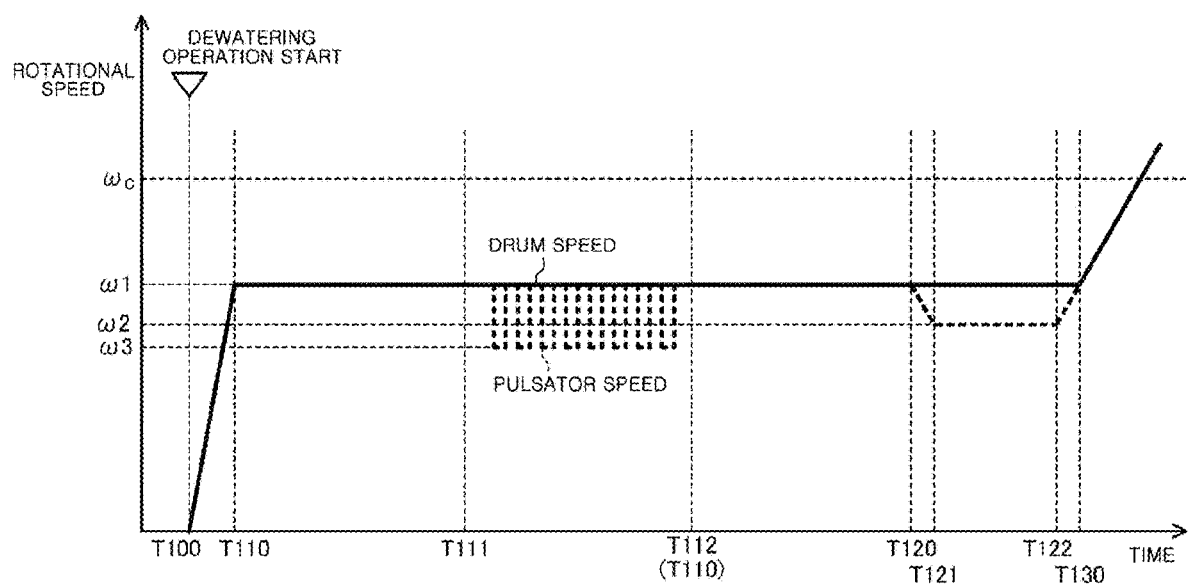
FIG. 70 is a graph illustrating changes with time in the rotational speeds of the drum and pulsator in relation to the washing machine according to the seventh embodiment.

Specifically, for example, when the moment amount $P_{UPL}$ of the pulsator 13 is large, the rotational speed ωOL of the outer rotor 20 is decelerated with a rectangular waveform (predetermined cycle). In other words, the speed is varied in the rectangular waveform between ω1 and ω3 (ω3<ω1). At this time, the rotational speed of the inner rotor 30 is maintained at ω1. FIG. 70 is a view illustrating the change over time in the number of rotations of the rotors 20 and 30 according to the control example 3, and an example of the speed change in the operation S 117 is illustrated from time T111 to time T112.

As described above, by giving a predetermined speed variation to the side having the larger amount of the moment, the state of unbalance may be changed. Further, the speed variation is not limited to decelerate in the rectangular waveform, and may be set arbitrarily. For example, it may be accelerated in the rectangular waveform, or accelerated or decelerated in a triangular waveform or trapezoidal waveform, or in a combination thereof. However, it is preferable to decelerate from the viewpoint of burden due to the motor torque and heat generation.

After the predetermined speed variation control is performed, the process returns to S112, and the identification of the detected values $M_{USB}$ and $M_{UPL}$ of the unbalance amount of the drum 11 and pulsator 13 is performed. In the subsequent flow, one among the control example 1, the control example 2, and the speed variation control is performed depending on the unbalance amount or the moment amount.

FIG. 70 illustrates an example in which the rotation control described in the control example 2 is performed after time T112. When the speed variation control is repeatedly executed, the variation speed of the speed variation control may be increased or decreased and the mode (shape, etc.) of the variation waveform may be changed at each execution. Further, the upper limit value may be set to the repetition number of the speed variation control.

As described above, according to the washing machine 1 of the present embodiment, since the drum 11 and the pulsator 13 are rotated at a predetermined speed difference, and the drum and the pulsator are at the same speed at the timing at which the unbalance is minimized, and then accelerated in this state, so that the occurrence of unbalance may be prevented.

More specifically, the total unbalance (sum value of the unbalances) of the drum 11 and the pulsator 13 is minimized because the unbalance moments cancel each other when the unbalances thereof are at opposite positions.

Therefore, in this embodiment, the positions of the unbalances are periodically changed by giving a predetermined speed difference between the drum 11 and the pulsator 13, and in accordance with the timing at which the unbalance is minimized, that is, when the unbalances is at the opposite position, the drum 11 and the pulsator 13 are controlled to rotate at the same speed, and then are accelerated together at the same speed gradient while maintaining the same speed. The timing at which this unbalance is minimized may be identified by checking the detection signal D121a and D121b from any one of the unbalance detectors 121a and 121b.

As a result, the drum 11 and the pulsator 13 can be accelerated in a state where the unbalances are at the opposite positions, so that the occurrence of unbalance may be prevented more effectively and stably. As described above, since the occurrence of unbalance may be prevented, the vibration of the drum, and the dewatering time may be shortened. Further, since the unbalance positions are positively controlled to come to the opposite positions, the vibration deviation of the drum during the dewatering operation may be reduced when continuously used.

In operation S 112 in FIG. 64, when the unbalance amount is equal to or less than the predetermined reference value, the drum 11 and the pulsator 13 are simultaneously accelerated at the same speed gradient without performing the rotation control based on that the dewatering operation can be performed under a predetermined variation when accelerated. As a result, the dewatering operation may be terminated in a shorter time. Further, since the drum 11 and the pulsator 13 are accelerated at the same time, a large torque may be easily obtained at a low speed, the starting speed may be increased, and the dewatering time may be shortened.

In operation S114 in FIG. 64, when the difference between the unbalance moments of the drum 11 and the pulsator 13 is greater than the predetermined value, the predetermined speed variation control is performed in operation S117. When the unbalance moment difference between the drum 11 and the pulsator 13 is large, even if the rotation control is performed, the occurrence of unbalance may not be sufficiently prevented. Therefore, the unbalance state is changed so that the rotation control or the acceleration control may be effectively performed by the speed variation control. By performing such speed variation control, the unbalance may be reduced without stopping the drum 11 and the pulsator 13, so that the dewatering time may be greatly shortened.

(Modifications)

In operation S 115 in FIG. 64, the rotational speed ωOL of the outer rotor 20 is decelerated from ω1 to ω2 (ω2<ω1), but the rotational speed ωOL may be increased from ω1 to ω4 (ωc>ω4>ω1). Also, in operation S 115 in FIG. 64, the rotational speed ωIL of the inner rotor 30 may be changed from ω1 to ω2 or ω4 while the rotational speed of the outer rotor 20 is maintained at ω1.

In any of the above cases, in operation S 116, the rotational speeds ωOL and ωIL of the two rotors 20 and 30 are made equal at the timing when the detected value $M_{USB}$ or $M_{UPL}$ of the unbalance amount becomes minimum, and the process proceed to operation S 113. The same rotational speed is not limited to ω1, but may be another rotational speed. For example, the same rotational speed may be ω2 or ω4.

In FIGS. 66 and 70, the rotation control is performed at the rotational speed equal to or less than the resonant rotational speed ωC, but the present disclosure is not limited thereto. For example, in operation S 113, the rotation control may be performed to adjust the unbalance after having been raised to the predetermined rotational speed equal to or greater than the resonant rotational speed ωC. In this case, as in operations S115 and S116, the drum and pulsator are rotated at a predetermined speed difference, and then the drum and pulsator are returned at the same speed at the timing when the unbalance is minimized.

Eighth Embodiment

The eighth embodiment relates to the dewatering operation of the washing machine.
(Control of the Rotational Motion of the Motor)

Figure 71:
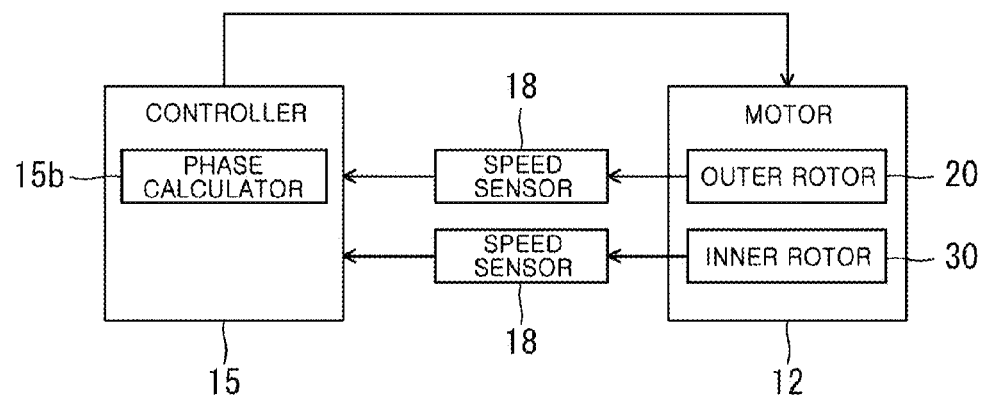
FIG. 71 is a block diagram illustrating the configuration of a motor and a controller in relation to the washing machine according to an eighth embodiment.

As illustrated in FIG. 71, the motor 12 is connected to speed sensors 18 as a speed detecting portion for detecting the rotational speeds of the outer rotor 20 and the inner rotor 30. The signals indicating the rotational speeds of the outer rotor 20 and the inner rotor 30 detected by the speed sensors 18 are transmitted to the controller 15.

During the dewatering operation of the drum 11, the controller 15 sets the rotational speed of the inner rotor 30 detected by the speed sensor 18 as the target speed and controls the rotational operation of the outer rotor 20 so that the rotational speed of the outer rotor 20 substantially coincides with the target speed. In other words, in this embodiment, control is performed so that the outer rotor 20 that rotates the pulsator 13 follows the inner rotor 30 that rotates the drum 11. As described above, during the dewatering operation, the outer rotor 20 and the inner rotor 30 are operated in synchronism with each other, thereby suppressing the speed fluctuation, so that the damage of the laundry may be reduced.

When the speed difference is generated between the rotational speed of the outer rotor 20 and the rotational speed of the inner rotor 30, the phase difference between the outer rotor 20 and the inner rotor 30 is generated as the speed difference is accumulated.

For example, when the speed difference between the rotational speed of the outer rotor 20 and the rotational speed of the inner rotor 30 is 5 rpm and the rotation is continued while the speed difference remains constant, a phase difference of 30 degrees is generated after 1 second. When such a phase difference is generated, the laundry is pulled between the drum 11 and the pulsator 13 during the dewatering operation of the drum 11, and the fabric is damaged, which is not preferable.

Thus, in the present embodiment, such a phase difference may be solved at the time of the dewatering operation of the drum 11.

Specifically, as illustrated in FIG. 71, the controller 15 includes a phase calculator 15b. The phase calculator 15b calculates the phases of the outer rotor 20 and the inner rotor 30 by adding up the rotational speeds of the outer rotor 20 and the inner rotor 30 transmitted from the speed sensors 18. Further, the phase calculator 15b calculates the phase difference of the outer rotor 20 with respect to the inner rotor 30 based on the phases of the outer rotor 20 and the inner rotor 30. The controller 15 controls the rotational operation of the outer rotor 20 to reduce the phase difference calculated by the phase calculator 15b.
(Operation of Motor During Dewatering Operation)

Figure 72:
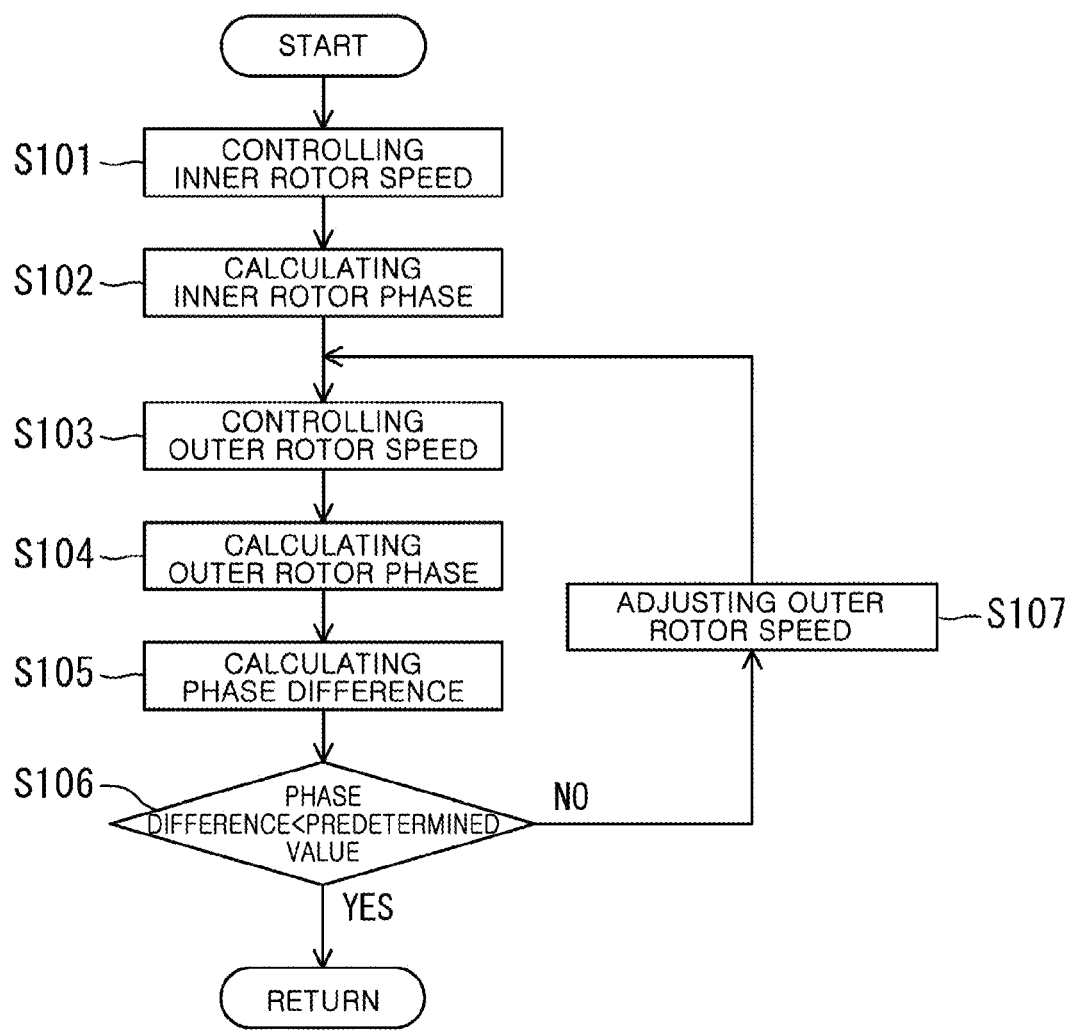
FIG. 72 is a flowchart illustrating a procedure for controlling the rotation operation of the motor in relation to the washing machine according to the eighth embodiment.

Hereinafter, the operation of the motor during the dewatering operation will be described with reference to FIG. 72. As illustrated in FIG. 72, first, in operation S 101, the rotational operation of the inner rotor 30 is controlled so that the rotational speed of the inner rotor 30 becomes a target rotational speed, and the process proceeds to operation S 102. In the example shown in FIG. 73, the inner rotor 30 has a target speed of 1000 rpm.

In operation S 102, the phase calculator 15b calculates the phase of the inner rotor 30 based on the rotational speed of the inner rotor 30, and the process proceeds to operation S 103.

In operation S 103, the rotational speed of the inner rotor 30 is set to the target speed, the rotational operation of the outer rotor 20 is controlled so that the rotational speed of the outer rotor 20 substantially matches the target speed, and the process proceeds to operation S104.

In operation S 104, the phase calculator 15b calculates the phase of the outer rotor 20 based on the rotational speed of the outer rotor 20, and the process proceeds to operation S 105.

In operation S 105, the phase calculator 15b calculates the phase difference of the outer rotor 20 with respect to the inner rotor 30, and the process proceeds to operation S 106. In the example shown in FIG. 73, the phase difference of about 10 degrees occurs to 0.5 seconds.

In operation S 106, the controller 15 identifies whether the phase difference between the outer rotor 20 and the inner rotor 30 is smaller than a predetermined value. When the identification in operation S106 is 'YES', the process returns to operation S 101 and repeats the process. When the identification in operation S106 is 'NO', the process branches to operation S 107. In the example shown in FIG. 73, the predetermined value is set so that phase difference is 0 degree.

In operation S 107, the target speed of the outer rotor 20 is adjusted so that the phase difference becomes smaller than the predetermined value, and the process proceeds to operation S104.

Figure 73:
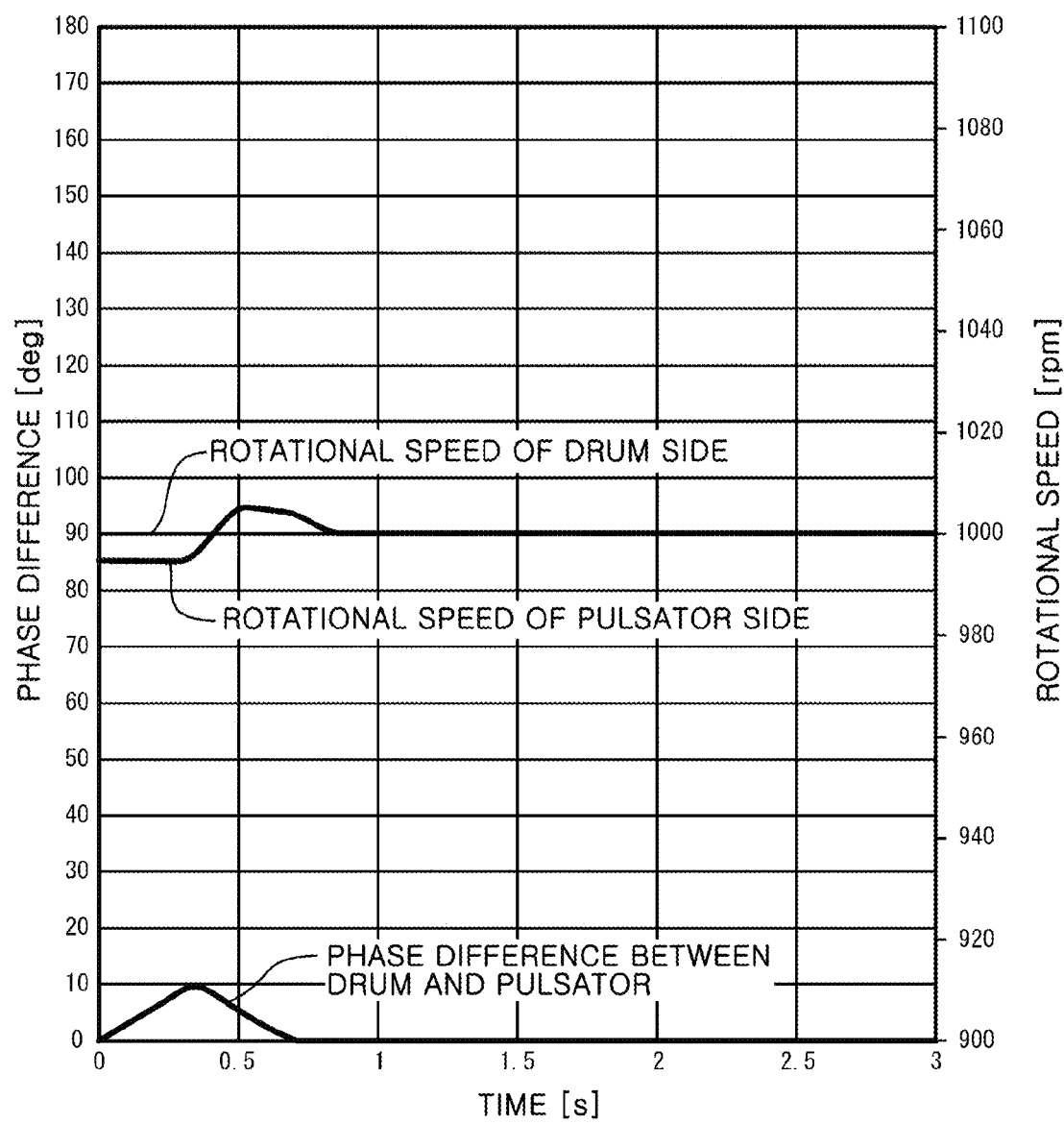
FIG. 73 is a graph illustrating the relationship between the phase difference of the drum and pulsator and the rotational speeds of the drum and pulsator in relation to the washing machine according to the eighth embodiment.

Here, in the example shown in FIG. 73, since the rotational speed of the outer rotor 20 is lower than the rotational speed of the inner rotor 30 from 0 to about 0.4 seconds, the target speed is adjusted to accelerate the outer rotor 20. On the other hand, since the rotational speed of the outer rotor 20 exceeds the rotational speed of the inner rotor 30 from about 0.4 to about 0.9 seconds, the target speed is adjusted to decelerate the outer rotor 20.

As described above, according to the washing machine 1 according to the present embodiment, the inner rotor 30 is accelerated up to the target rotational speed and the outer rotor 20 is controlled to follow the rotational speed of the inner rotor 30 serving as the reference as the target speed, so that the speed difference between the outer rotor 20 and the inner rotor 30 may be reduced.

When the phase difference of the outer rotor 20 with respect to the inner rotor 30 is larger than the predetermined value, the rotational operation of the outer rotor 20 is controlled to reduce the phase difference. Therefore, before the laundry laid across the drum 11 and the pulsator 13 is pulled out due to the positional deviation between the drum 11 and the pulsator 13, the positional deviation is reduced, so that the damage of the laundry may be reduced.

Ninth Embodiment

The ninth embodiment relates to a dewatering operation of a washing machine as in the eighth embodiment.
(Control of the Rotational Motion of the Motor)

Figure 74:
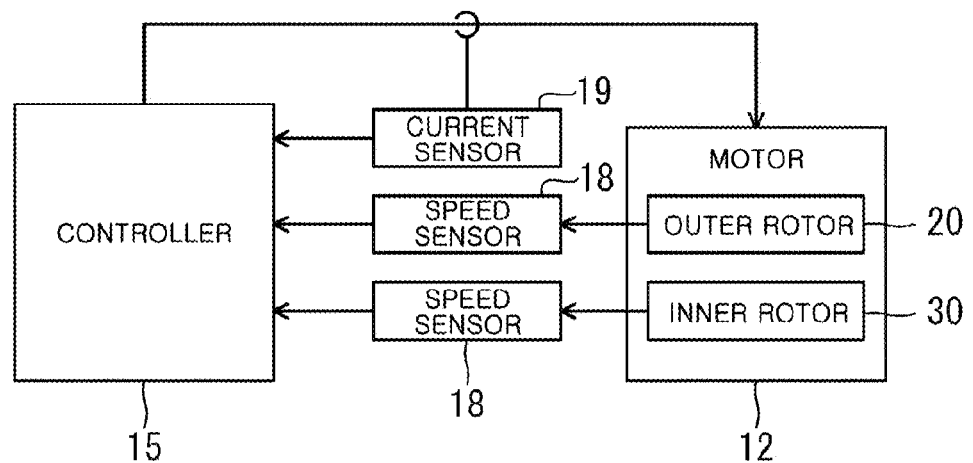
FIG. 74 is a block diagram illustrating the configuration of a motor and a controller in relation to the washing machine according to a ninth embodiment.

As illustrated in FIG. 74, the motor 12 is connected to the speed sensors 18 as in the eighth embodiment. Further, in the ninth embodiment, a current sensor 19 for detecting a current supplied to the coil 63 provided in the stator 60 of the motor 12 is provided.

The rotational speed of each of the outer rotor 20 and the inner rotor 30 detected by the speed sensors 18 and the current value of the motor 12 detected by the current sensor 19 are fed back to the controller 15, and the controller 15 rotates the outer rotor 20 and the inner rotor 30 at target rotational speed.

Particularly, during the dewatering operation of the drum 11, the controller 15 sets the rotational speed of the inner rotor 30 detected by the speed sensors 18 as the target speed, and controls the rotational speed of the outer rotor 20 so that the rotational speed of the outer rotor 20 subsidiary connecting body 82 matches the target speed. In other words, in this embodiment, the control is performed so that the outer rotor 20 that rotates the pulsator 13 follows the inner rotor 30 that rotates the drum 11. As described above, during the dewatering operation, the outer rotor 20 and the inner rotor 30 are operated in synchronism with each other, thereby suppressing the speed fluctuation, so that the damage of the laundry may be reduced.

During the dewatering operation, when the controller 15 identifies that the phenomenon that the pulsator 13 follows and rotates with the drum 11 caused by the laundry is lost while accelerating the rotational speed by synchronizing the outer rotor 20 and the inner rotor 30, the controller 15 stops the supply of electric power to the motor 12 for rotating the outer rotor 20, and makes the pulsator 13 free to rotate. In other words, in this embodiment, at the timing at which the following rotation of pulsator 13 disappears, only the outer rotor 20 is set in the rotation free-state, and the acceleration control of the rotational speed of the inner rotor 30 is continued. As a result, the pulsator 13 may be freely rotated at an appropriate timing according to the weight, state, kind, etc. of the laundry, so that the damage of the laundry may be reduced and power may be saved by stopping supplying power to the motor 12.

Figure 75:
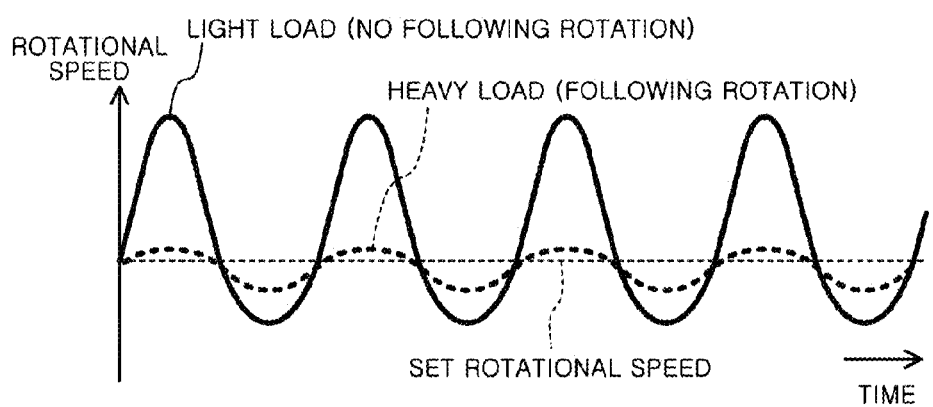
FIG. 75 is a graph illustrating variation in rotational speed of the outer rotor when load is heavy load and when the load is light in relation to the washing machine according to ninth embodiment.

Whether or not the phenomenon that the pulsator 13 follows and rotates with the drum 11 caused by the laundry disappears may be identified by the instability of the rotational speed of the outer rotor 20. FIG. 75 is a graph illustrating variations in rotational speed of the outer rotor 20 when load is heavy load and when the load is light. In the graph of FIG. 75, for the sake of convenience, the rotational speed variation cycles of the outer rotor 20 when the load is heavy and when the load is light are equal to each other, but the present disclosure is not limited thereto. The rotational operation of the outer rotor 20 is controlled by the controller 15 to rotate at the predetermined rotational speed.

Here, when the load is heavy, that is, when the laundry rubs against the pulsator 13 so as to generate the following rotation of the outer rotor, the variation of the actual rotational speed (rotational speed detected by the speed sensors 18) with respect to the set rotational speed of the outer rotor 20 is small. However, when the load is light, that is, when there is no following rotation of the outer rotor 20 due to the laundry, the variation of the actual rotational speed with respect to the set rotational speed of the outer rotor 20 is large.

At the start of dewatering, the laundry is uniformly dispersed inside the drum 11 and accumulated on the bottom of the drum 11 due to gravity. When the synchronous operation of the outer rotor 20 and the inner rotor 30 is started from this initial state, the outer rotor 20 operates under a heavy load. Therefore, the variation of the actual rotational speed with respect to the set rotational speed of the outer rotor 20 is small. The laundry is adhered to the inner wall surface of the drum 11 due to the centrifugal force in accordance with the acceleration of the rotational speed of the outer rotor 20 and the inner rotor 30. Therefore, the amount of laundry that rubs against the outer rotor 20 is reduced, and the load of the outer rotor 20 is gradually reduced.

In other words, the variation of the actual rotational speed with respect to the set rotational speed of the outer rotor 20 gradually increases. Therefore, when the variation of the rotational speed of the outer rotor 20 detected by the speed sensors 18 with respect to the set rotational speed of the outer rotor 20 is greater than the predetermined amount, the controller 15 may identify that the phenomenon that the pulsator 13 follows and rotates with the drum 11 caused by the laundry disappears.

Figure 76:
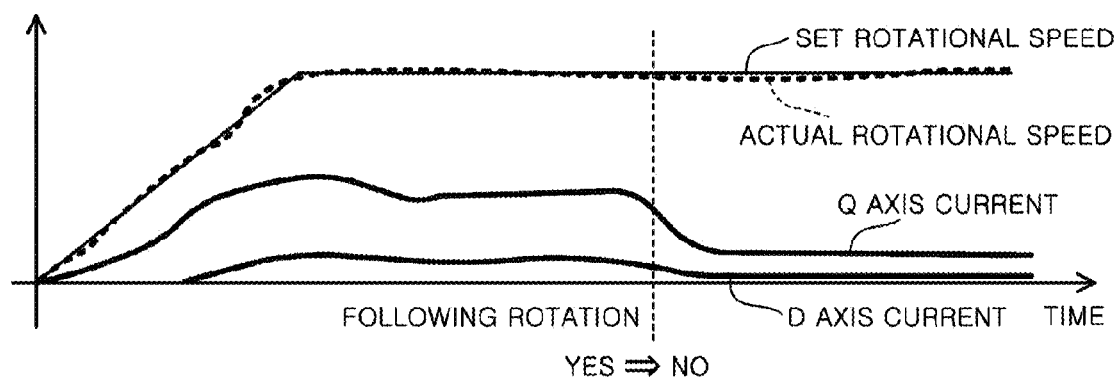
FIG. 76 is a graph illustrating changes with time in rotational speed of the outer rotor and motor current in relation to the washing machine according to the ninth embodiment.

Whether or not the phenomenon that the pulsator 13 follows and rotates with the drum 11 caused by the laundry is eliminated may be identified from the current detected by the current sensor 19. FIG. 76 is a graph illustrating changes in the rotational speed of the outer rotor 20 and the motor current with time. When the dewatering operation is started, the q-axis current of the motor 12 is increased, and the outer rotor 20 gradually increases the rotational speed and reaches the set rotational speed.

When the voltage is saturated during the rotational acceleration of the outer rotor 20, the d-axis current of the motor 12 is increased to advance the phase. When the laundry rubs against the pulsator 13 and the following rotation of the outer rotor 20 occurs, the load on the motor 12 is heavy so that both the d-axis current and the q-axis current are large. However, when the following rotation of the outer rotor 20 disappears, the load on the motor 12 becomes light so that both the d-axis current and the q-axis current becomes small.

Therefore, the controller 15 may identify that the phenomenon that the pulsator 13 follows and rotates with the drum 11 caused by the laundry is eliminated when the rotational coordinate system current obtained by converting the current detected by the current sensor 19 into the rotational coordinate system, specifically, at least one of the d-axis current, the q-axis current, and the vector amount synthesized therefrom is smaller than a predetermined amount. Alternatively, the following rotation of the pulsator 13 may be identified from the advance angle of the combined current of the d-axis current and the q-axis current.
(Operation of Motor During Dewatering Operation)

Figure 77:
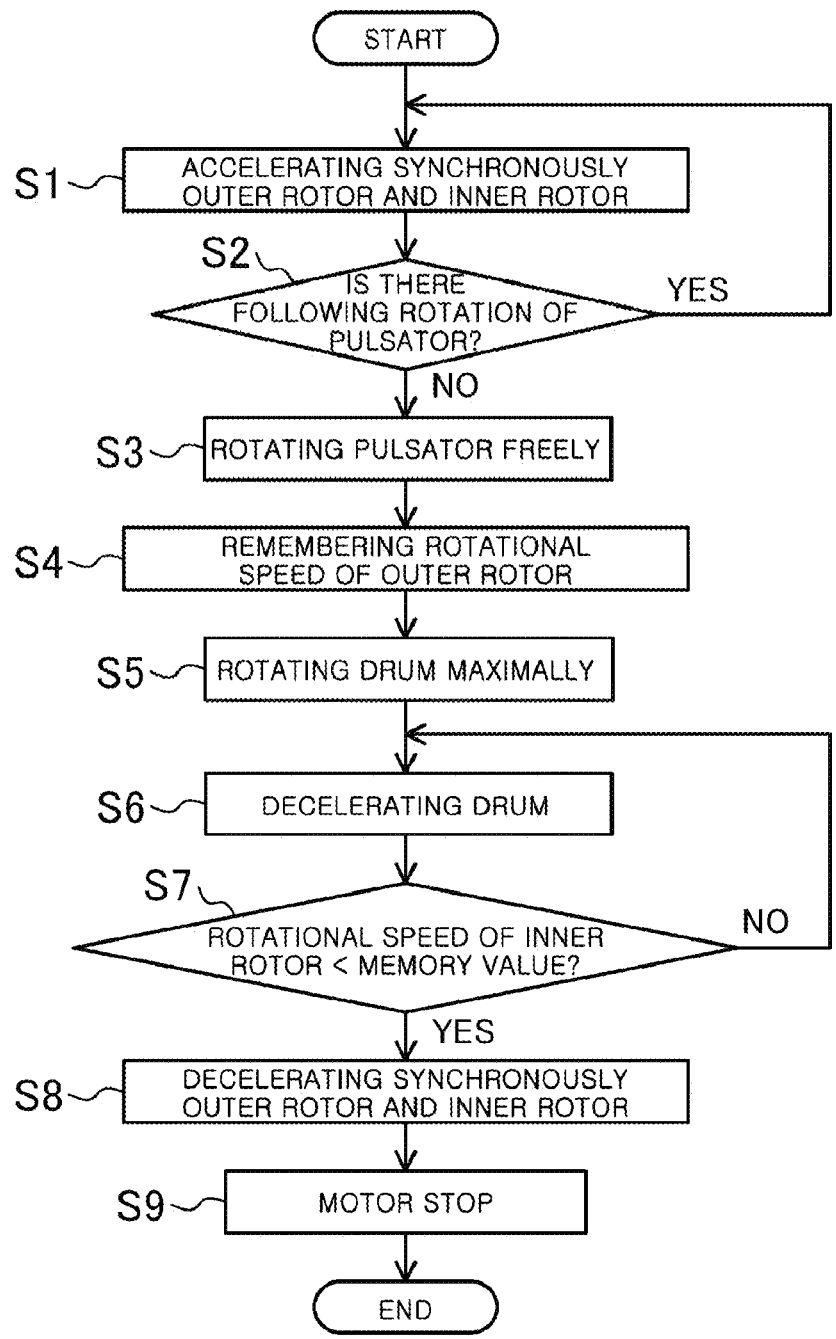
FIG. 77 is a flowchart illustrating a procedure for controlling the rotation operation of the motor in relation to the washing machine according to the ninth embodiment.

Hereinafter, the operation of the motor during the dewatering operation will be described with reference to FIG. 77. As illustrated in FIG. 77, first, in operation S 1, the controller 15 starts synchronous operation of the outer rotor 20 and the inner rotor 30 to accelerate the rotational speed, and the process proceeds to operation S 2.

In operation S 2, the controller 15 identifies whether or not there is the following rotation of the pulsator 13 caused by the laundry. Whether or not there is the following rotation of the pulsator 13 may be identified from the rotational speed variation of the outer rotor 20 or the amount of current of the motor 12 as described above. When it is identified that there is the following rotation of the pulsator 13, the process returns to operation S 1. On the other hand, when it is identified that there is no following rotation of the pulsator 13, the process returns to operation S 3.

In operation S 3, the controller 15 stops supplying the electric power to the motor 12 that rotates the outer rotor 20 to make the pulsator 13 free to rotate, and then proceeds to operation S 4.

In operation S 4, the controller 15 stores the rotational speed of the outer rotor 20 when the pulsator 13 is made free to rotate, that is, when it is determined that the phenomenon that the pulsator 13 follows and rotates with the drum 11 caused by the laundry is eliminated, and then proceeds to operation S5.

In operation S 5, the controller 15 rotates the drum 11 at the maximum rotational speed by maximizing the rotational speed of the inner rotor 30, and proceeds to operation S 6.

In operation S 6, the controller 15 decreases the rotational speed of the inner rotor 30 to decelerate the drum 11, and proceeds to operation S 7.

In operation S 7, the controller 15 identifies whether the rotational speed of the inner rotor 30 is smaller than the rotational speed of the outer rotor 20 when the pulsator 13 is made free to rotate. When the rotational speed of the inner rotor 30 is greater than the stored rotational speed, the process returns to operation S6. On the other hand, when the rotational speed of the inner rotor 30 is smaller than the stored rotational speed, the process proceeds to operation S 8.

In operation S 8, the controller 15 resumes supplying the electric power to the motor 12 that rotates the outer rotor 20, thereby resuming the synchronous operation of the outer rotor 20 and the inner rotor 30 so as to gradually decrease the rotational speed, and then proceeds to operation S 9.

In operation S 9, the controller 15 stops supplying the electric power to the motor 12, thereby setting the rotational speed of the outer rotor 20 and the inner rotor 30 to zero.

As described above, by starting to rotate the pulsator 13 again at the rotational speed at which the pulsator 13 is made to rotate freely, the rotation of the pulsator 13 may be restarted at an appropriate timing according to the weight, state, kind, etc. of the laundry, so that the damage of the laundry may be reduced.

Further, the pulsator 13 may be started to rotate again when the rotational speed of the outer rotor 20 reaches a predetermined rotational speed. In this case, the operation S 4 may be omitted. However, it is preferable that several values are prepared as the predetermined rotational speed so that the user may arbitrarily change the set value according to the weight, state, kind, etc. of the laundry.

As described above, according to the washing machine 1 according to the present embodiment, when it is identified that the following rotation of the pulsator 13 caused by the laundry disappears during the dewatering operation of the drum 11, the pulsator 13 is made free to rotate, so that the laundry rotating with the drum 11 rubs against the pulsator 13 which is free to rotate to cause the pulsator 13 to be rotated with the drum 11 so that the laundry is not damaged. Power consumption may be reduced by stopping supplying the electric power to the motor 12 for rotating the outer rotor 20.

In addition, whether or not there is the following rotation of the pulsator 13 may be easily identified from the variation of the rotational speed of the outer rotor 20 or the current supplied to the motor 12.

Also, at the end of the dewatering operation, the laundry rotating with the drum 11 rubs against the rotation-free pulsator 13 to cause the pulsator 13 to be rotated with the drum 11, thereby preventing the laundry from being damaged.

In addition, since the rotation of the pulsator 13 can be restarted at an appropriate timing according to the weight, state, kind, etc. of the laundry, the damage of the laundry may be reduced.

Tenth Embodiment

The tenth embodiment also relates to the dewatering operation of the washing machine as in the eighth and ninth embodiments.

=Motor Control During Dewatering Operation=

During the dewatering operation, the two rotors 20 and 30 may be simultaneously driven in the same direction. As a result, a large torque may be easily obtained at a low speed, and it is possible to obtain an effect that the start-up is accelerated.

It is also possible to control the rotation of the drum 11 in a state in which the pulsator 13 is rotated freely in order to increase the energy efficiency in the dewatering operation, that is, to reduce the total energy consumption of the washing machine.

Figure 78:
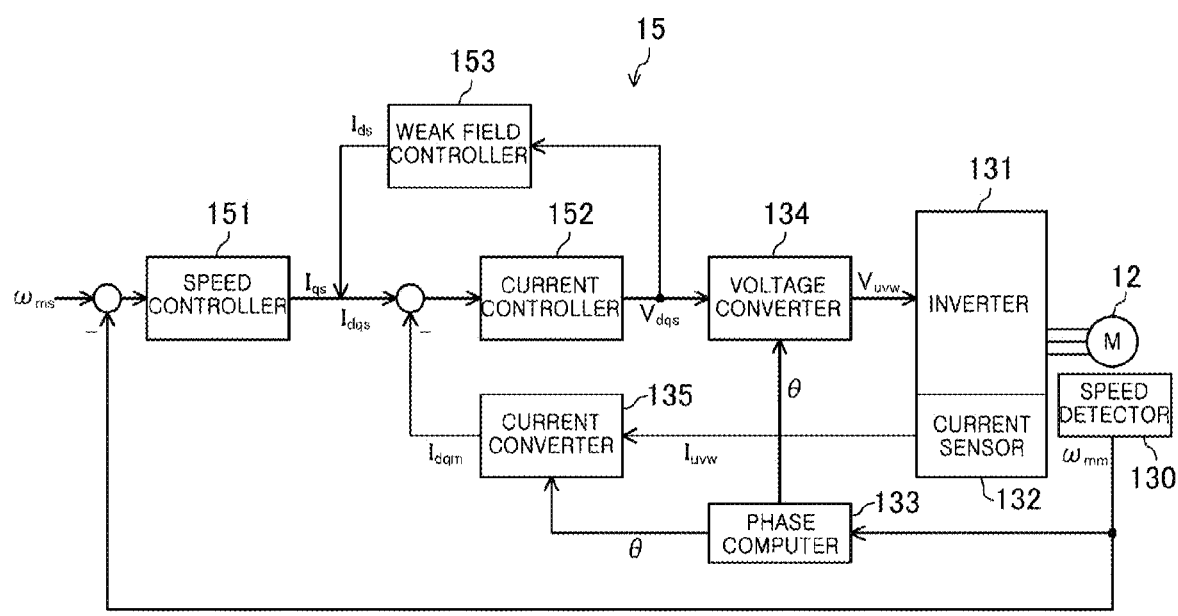
FIG. 78 is a block diagram illustrating the configuration of a motor and a controller in relation to the washing machine according to a tenth embodiment.
Figure 79:
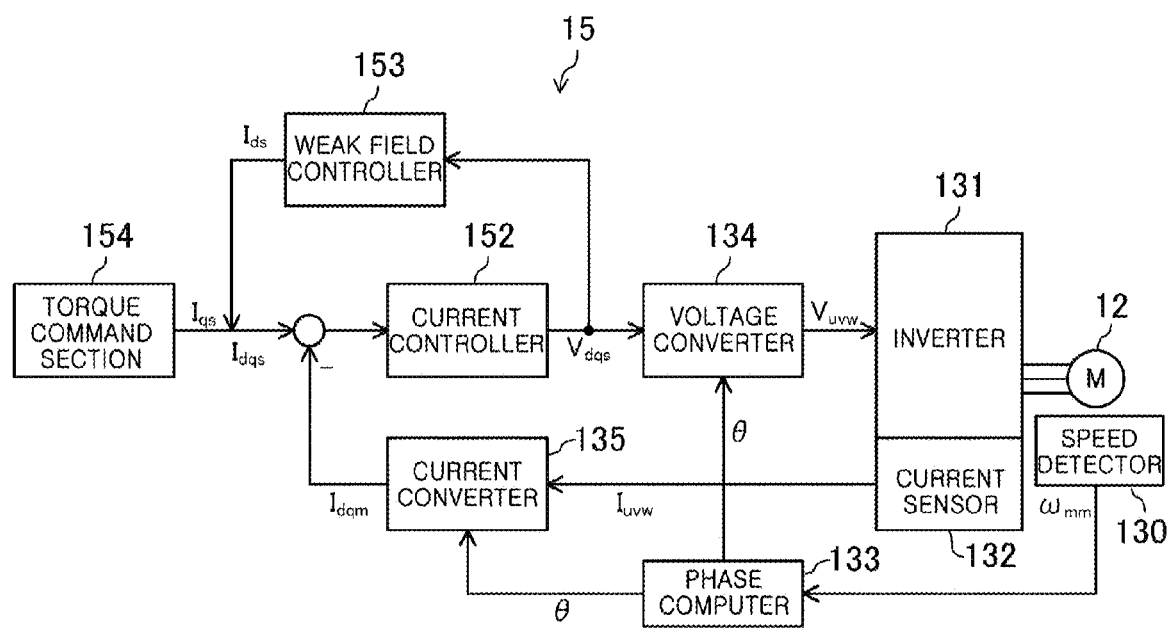
FIG. 79 is a block diagram illustrating the configuration of a motor and a controller in relation to the washing machine according to a tenth embodiment.

FIGS. 78 and 79 are block diagram illustrating the configurations of the motor 12 and the controller 15 (some extracted).

—Motor Control According to Normal Condition—

FIG. 78 is a block diagram mainly illustrating blocks that operate when the pulsator 13 is set in the rotation-free-state among the components of the motor 12 and the controller 15. In this embodiment, both the motor 12 and the pulsator 13 are controlled by the controller 15 illustrated in FIG. 78.

As illustrated in FIG. 78, an inverter 131 for driving the motor 12 is connected to the motor 12. Further, the motor 12 is provided with a speed detector 130 for detecting the rotational speed of each of the pulsator 13 drivenly connected to the outer rotor 20 and the drum 11 drivenly connected to the inner rotor 30.

The speed detector 130 is not particularly limited as long as it can detect the rotational speed of the pulsator 13, and for example, a speed sensor such as a hall sensor or the like may be used. The speed $\omega_{mm}$ detected by the speed detector 130 is transmitted to the phase computer 133 and the controller 15.

A current sensor 132 is connected to the inverter 131 and detects the phase current Iuvw flowing in each phase of the inverter 131.

The phase computer 133 has a function of converting the detected speed $\omega_{mm}$ into an angle θ, and may be realized by, for example, an integrator. The voltage converter 134 receives the voltage command Vdqs from the current controller 152 to be described later, coverts it into a three-phase voltage, and outputs it to the inverter 131.

The current converter 135 receives the phase current Iuvw detected by the current sensor 132, converts it into Idqm, which is a composite current of the q-axis current Iq and the d-axis current Id, and feeds it back to the controller 15. The angle θ output from the phase computer 133 is used for the rotation conversion performed by the voltage converter 134 and the current converter 135 in the process of converting the voltage and the current.

In FIG. 78, the controller 15 further includes a speed controller 151, a current controller 152, a weak field controller 153, and a torque command section 154.

The torque command section 154 receives the difference between the speed command value ωms according to the speed profile during the dewatering and the detected speed ωmm received from the speed detector 130, and outputs a torque command value Iqs for causing the rotational speeds of the drum 11 and the pulsator 13 to become the speed command value ωms.

The current controller 152 receives the difference between the current command value Idqs obtained by combining the torque command value Iqs output from the speed controller 151 and the d-axis current command value Ids output from the weak field controller 153 and the composite current Idqm of the q-axis current and the d-axis current received from the current converter 135, and outputs a voltage command value Vdqs at which the q-axis current and the d-axis current of the motor 12 become the current command value Idqs.

Figure 80:
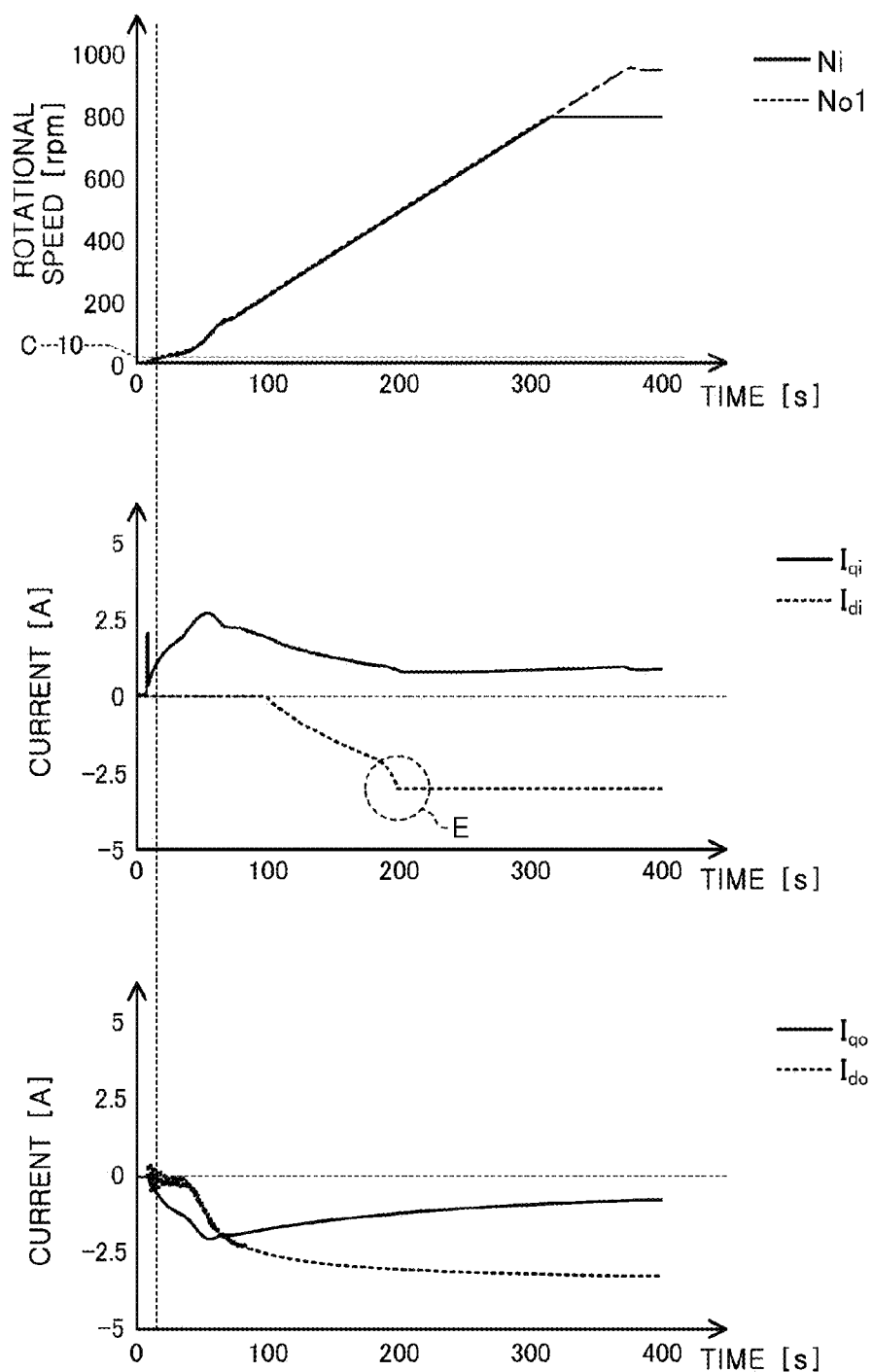
FIG. 80 is a graph illustrating changes with time in the rotational speeds, lq, and ld of the drum and pulsator in the rotation-free state in relation to the washing machine according to the tenth embodiment.

FIG. 80 is graphs illustrating changes in the rotational speed, Iq, and Id of the drum and pulsator with time in the rotation free state.

Further, in FIG. 80, the upper diagram illustrates the changes with time of the rotational speed No1 of the pulsator 13 (outer rotor 20) and the rotational speed Ni of the drum 11 (inner rotor 30). The middle diagram illustrates the changes with time of the q-axis current Iqi and the d-axis current Idi due to the motor driving of the drum 11. The lower diagram illustrates the changes with time of the q-axis current Iqo and the d-axis current Ido (hereinafter, simply referred to as a q-axis current Iqo and a d-axis current Ido) due to the motor driving of the pulsator 13. Hereinafter, the same is applied to FIG. 81.

In the embodiment of FIG. 80, it is assumed that the rotational speed No1 of the pulsator 13 follows the rotational speed Ni of the drum 11 at the same speed in the entire time range as illustrated in the upper diagram. The same is applied to the rotational speed No1 of the pulsator 13 in FIG. 81. For example, when the dewatering operation is performed in a state in which a large amount of laundry is pushed in, such a state may be obtained.

First, as illustrated in the middle diagram in FIG. 80, the controller 15 sets the speed command value ωms of the drum 11 to 1000 rpm, so that the q-axis current Iqi of the drum 11 rises. Thereafter, the resistive force due to the counter electromotive force induced by the rise of the rotational speed of the drum 11 is increased.

For this reason, the controller 15 performs a weak field control to reduce the resistive force. The weak field controller 153 outputs the reverse d-axis current in which the absolute value increases with time to the current controller 152 of the drum 11. In addition, the weak field control may employ the known technique.

Since the pulsator 13 follows and is rotated with the rotation of the drum 11, a reverse q-axis current Iqo in which the absolute value increases with time is generated with respect to the pulsator 13. Also, the resistive force due to the counter electromotive force induced by the increase of the rotational speed of the pulsator 13 is increased. Therefore, the controller 15 performs a weak field control to reduce the resistive force. The weak field controller 153 outputs the reverse d-axis current Idi in which the absolute value increases with time to the current controller 152 of the pulsator 13.

The q-axis current of the pulsator 13 and the induced counter electromotive force increase the resistive force of the drum 11 rotating about the same axis as the pulsator 13, so that the d-axis current of the drum 11 diverges and reaches the saturation current. Therefore, loss of synchronism or control failure occurs (see E in the middle diagram of FIG. 80.

As a result, as illustrated in the upper diagram of FIG. 80, the rotational speed of the drum 11 does not reach 100 rpm, which is the speed command value ωms, even after a predetermined time has elapsed, and the speed increase sometimes reaches the limit. In other words, stable operation (control) up to the high-speed range may not be possible. Further, the upper diagram of FIG. 80 illustrates an example in which the speed increase is ideally performed by the one-dot chain line.

—Motor Control According to Torque Control Mode—

FIG. 79 is a block diagram mainly illustrating blocks that operate in the torque control mode among the components of the motor 12 and the controller 15. In this embodiment, it is assumed that the drum 11 is operated in the block diagram as illustrated in FIG. 78, and the pulsator 13 is operated in the block diagram as illustrated in FIG. 79.

In the embodiment of FIG. 79, a torque command section 154 for outputting a predetermined torque command value Iqs to the current controller 152 is provided instead of the speed controller 151 of FIG. 78. When the pulsator 13 is operated by the block diagram of FIG. 79, the controller 15 of FIG. 78 may be provided with the torque command section 154 in parallel with the speed controller 151, and for example, the control program may switch between the speed controller 151 and the torque command section 154 by using a switch.

The torque command value Iqs may be set to an arbitrary value so that a stable operation up to a desired high speed range may be achieved even when a phenomenon that the pulsator 13 follows and is rotated with the drum 11 occurs. In addition, the predetermined torque command value Iqs may be set to an arbitrary value so that the energy consumption of the entire washing machine is reduced as compared with the case where the pulsator 13 follows and is rotated with the drum 11 in a state in which the pulsator 13 is rotated freely.

For example, the predetermined torque command value Iqs may be set to Iqs=0. Here, when the phenomenon that the pulsator 13 follows and is rotated with the drum 11 occurs, the torque for rotating the pulsator 13 is unnecessary, so that the torque command value Iqs is set to Iqs=0 as described above.

Figure 81:
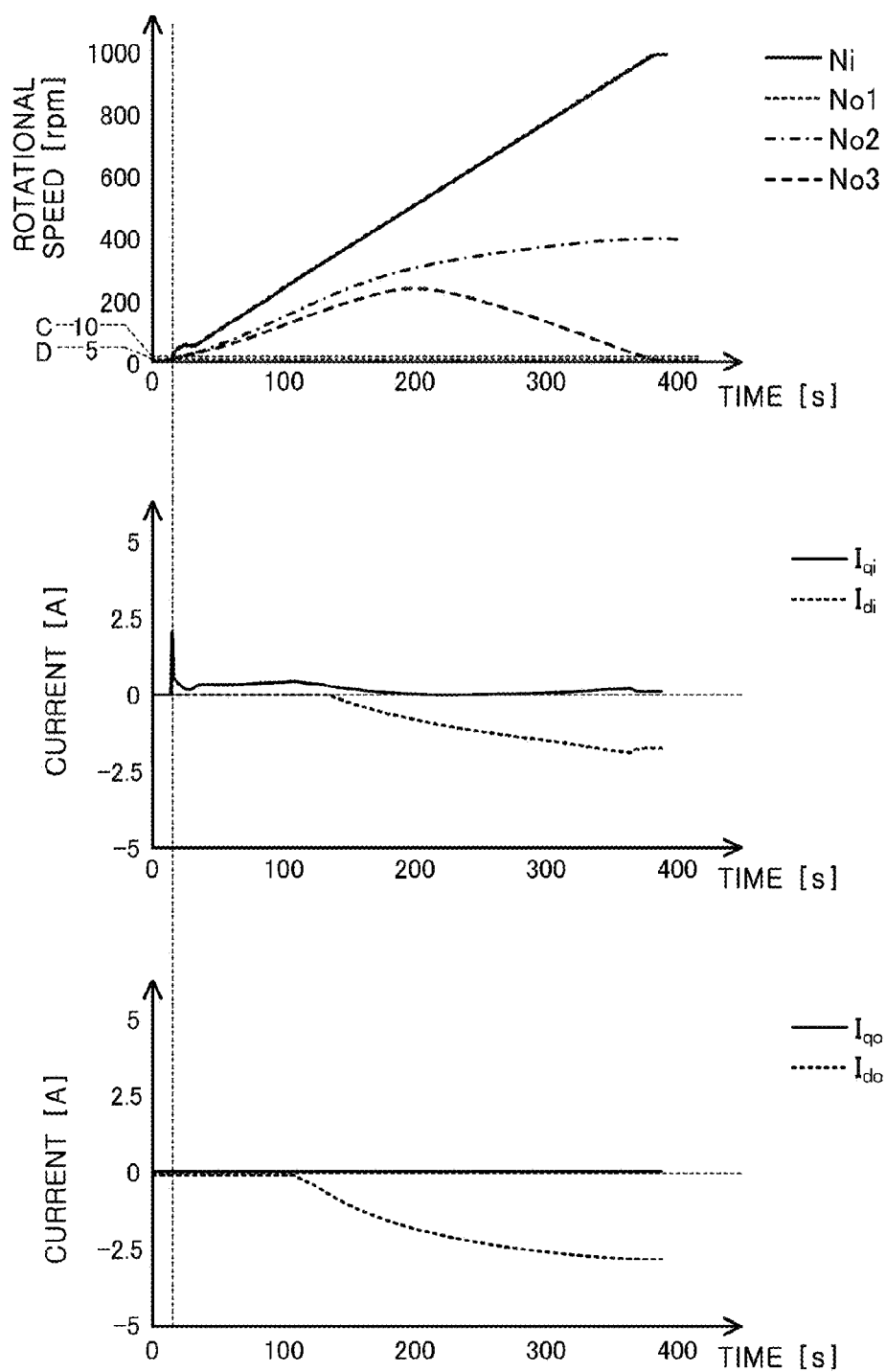
FIG. 81 is a graph illustrating changes with time in the rotational speeds, lq, and ld of the drum and pulsator in the torque control mode in relation to the washing machine according to the tenth embodiment.

FIG. 81 illustrates an example in which the rotational speeds of the drum 11 and the pulsator 13 are 0 rpm, that is, the controller 15 performs the dewatering operation in the torque control mode from the start of the dewatering operation. For example, the controller 15 may drive the drum 11 immediately before the start of the dewatering operation and, if it is possible to detect whether or not the following rotation occurs, may perform the dewatering operation in the torque control mode from the start of the dewatering operation depending on the result.

Like the case of FIG. 80, first, as illustrated in the middle diagram of FIG. 81, the controller 15 sets the speed command value ωms of the drum 11 to 1000 rpm, so that the q-axis current Iqi of the drum 11 increases. Thereafter, in order to reduce the resistive force due to the counter electromotive force induced by the increase of the rotational speed of the drum 11, weak field control is performed, and the reverse d-axis current Idi in which the absolute value increases with time is given to the drum 11.

As illustrated in the upper diagram of FIG. 81, a state in which the pulsator 13 follows and is rotated with the rotation of the drum 11 occurs. However, since the controller 15 outputs the torque command value Iqs=0 from the torque command section 154 to perform the torque control of the pulsator 13, as illustrated in the lower diagram of FIG. 81, the q-axis current Iqo of the pulsator 13 becomes approximately "zero (0)".

On the other hand, the resistive force due to the counter electromotive force induced by the increase of the rotational speed of the pulsator 13 is increased so that the weak field controller 153 of the controller 15 outputs the reverse d-axis current Ido in which the absolute value increases with time to the current controller 152 of the pulsator 13.

In FIG. 81, the q-axis current Iqo of the pulsator 13 and the induced counter electromotive force are reduced due to the torque control of the pulsator 13 as described later, so that, as illustrated in the middle diagram of FIG. 81, the rise of the q-axis current of the drum 11 at the initial state of the dewatering process may increase at least the rotational speed of the drum 11. Further, as illustrated in the upper diagram of FIG. 81, the motor 12 may be rotated at a higher speed, and a stable operation may be realized up to the high-speed range during the dewatering operation.

Figure 82:
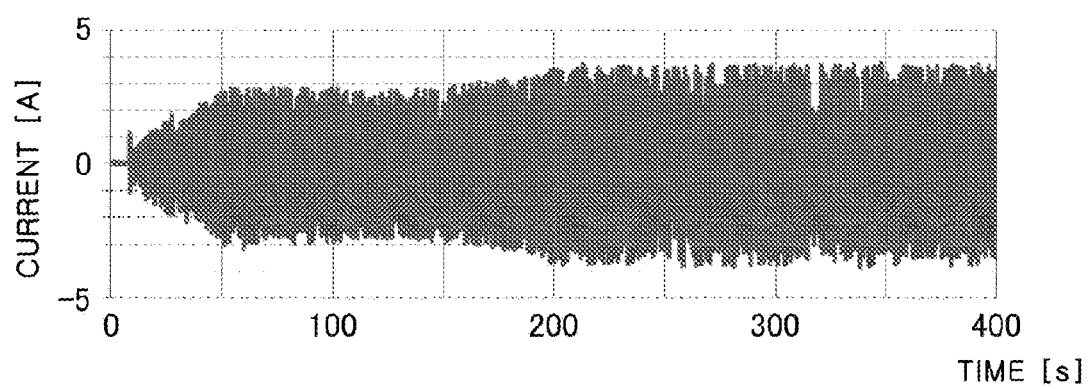
FIG. 82 is a graph illustrating a change with time in the phase current of the inverter in the rotation-free state in relation to the washing machine according to the tenth embodiment.
Figure 83:
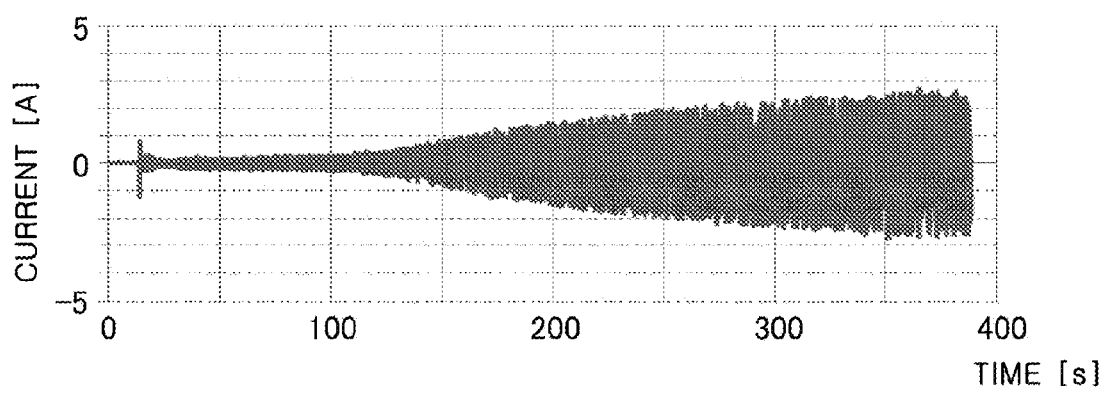
FIG. 83 is a graph illustrating a change with time in the phase current of the inverter in the torque control mode in relation to the washing machine according to the tenth embodiment.

FIGS. 82 and 83 illustrate the changes of the phase current of the inverter with time in the rotation free-state and the torque control mode. FIG. 82 is a graph in the rotation free-state, and FIG. 83 is a graph in the torque control mode.

As illustrated in FIGS. 82 and 83 and the following Table 1, the q-axis current and the d-axis current of the drum 11 and the q-axis current and the d-axis current of the pulsator 13 may be drastically reduced by performing the torque control of the pulsator 13.

TABLE 1

|  | At 1000 rpm | | | |
| --- | --- | --- | --- | --- |
|  | Idi | Ido | Iqi | Iqo |
| No torque control | −3 A | −3.26 A | 0.85 A | −0.83 A |
| With torque control | −1.8 A | −2.8 A | 0.13 A | −0.07 A |

As described above, according to the present embodiment, by setting the torque command value Iqs to "0", the resistive force generated by the influence of the counter electromotive force of the pulsator and the control current of the drum is eliminated, thereby reducing the load of the drum side motor and greatly reducing the consumption energy.

(Modifications)

The controller 15 has performed the dewatering operation in the torque control mode from the start stage of the dewatering operation, but the present disclosure is not limited thereto. For example, when the speed of the pulsator 13 detected by the speed detector 130 reaches a predetermined threshold value C, it may be identified that the phenomenon that the pulsator 13 follows and is rotated with the drum 11 occurs. The upper diagram in FIG. 81 illustrates an example in which the threshold value C is set to 10 rpm.

In this case, when the speed of the pulsator 13 is less than 10 rpm, the pulsator 13 is controlled by the block diagram of FIG. 78, and when the speed of the pulsator 13 reaches the predetermined speed of 10 rpm, the pulsator 13 is controlled by the block diagram of FIG. 79. Since the detailed control by the controller 15 is the same as in the above-described embodiment, detailed description thereof is omitted here.

The predetermined threshold value C may be set arbitrarily, but it is preferably set on the basis of, for example, the following criteria. The speed sensor used in the washing machine is generally a hall sensor, but in the case of the hall sensor, it is not preferable to control the hall sensor at less than 10 rpm because of a problem of resolution.

In other words, for a system in which it is difficult to sense an accurate speed (magnetic pole position) due to the problem of the resolution, or the like, as in the case of using the hall sensor, it is preferable to set the threshold value C to a rotational speed higher than the resolution. Thus, in this description, an example in which 10 rpm is set as the threshold value C is shown.

The case where the rotational speed No1 of the pulsator 13 follows the rotational speed Ni of the drum 11 at the same speed in the entire time region has been described. However, the present disclosure is not limited to the case.

For example, when the amount of the laundry is small, the state of the pulsator 13 that follows and is rotated with the drum 11 changes. For example, the rotational speed of the pulsator 13 may become the rotational speed No2 or No3 in the upper diagram of FIG. 81. The rotational speed No2 shows an example in which the rotation of the pulsator 13 is stabilized at about 400 rpm, and the rotational speed No3 shows an example in which the following rotation of the pulsator 13 is released in the middle of the dewatering operation. Even in such a case, the controller 15 may perform the torque control based on a predetermined criterion, and the same effect may be obtained.

Further, as illustrated as the rotational speed No3, when the rotational speed of the pulsator 13 decreases to be equal to or lower than a predetermined speed (for example, equal to or smaller than the threshold value D) during the dewatering operation, the controller 15 may control the pulsator 13 to return to the rotation free-state.

Thus, the consumption energy for driving the pulsator 13 may be optimized according to the state of the pulsator 13. The threshold value D is preferably set to a value smaller than the threshold value C in consideration of hysteresis. In the upper diagram of FIG. 81, an example in which the threshold D is set to 5 rpm is shown.

The invention claimed is:

1. A washing machine motor comprising:
   an inner rotor that includes a plurality of inner magnets;
   an outer rotor provided in an outer peripheral side of the inner rotor and includes a plurality of outer magnets; and
   a stator provided between the inner rotor and the outer rotor and formed in an annular shape, and comprises a plurality of coils and a plurality of core components,
   wherein a first current drives the inner rotor and a second current drives the outer rotor, the first current is different than the second current,
   wherein the plurality of coils and the plurality of core components are configured to generate a rotating magnetic field that independently drives the inner rotor and the outer rotor when a composite current is supplied to the plurality of coils, wherein the composite current corresponds to the first current overlapping the second current,
   wherein the plurality of inner magnets circumferentially arranged to correspond to an inner circumferential surface of the stator,
   wherein the plurality of outer magnets circumferentially arranged to face an outer circumferential surface of the stator, and
   wherein an inner tooth width of each of the plurality of core components of the stator faces the inner rotor and is greater than a width of one of the plurality of inner magnets, wherein a number of slots of the stator is based on:

$$S=12n$$

$$P1=(6\pm1)\cdot 2n,$$

$$P2=(6\pm2)\cdot 2n$$

where, S is the number of slots of the stator, P1 is a number of magnetic poles of any one of the inner rotor and the outer rotor, P2 is a number of magnetic poles of another rotor, and n is an integer of 1 or more.

2. The washing machine motor of claim 1, wherein:
an outer tooth width of one of the plurality of core components of the stator faces the outer rotor and is greater than the width one of the plurality of outer magnets.

3. The washing machine motor of claim 1, wherein:
a winding factor of the plurality of coils with respect to a fundamental wave of magnetic flux distribution of the inner rotor and the outer rotor is greater than 0.5 in both the inner rotor and the outer rotor.

4. The washing machine motor of claim 1, wherein:
the rotating magnetic field is one of a number of rotating magnetic fields generated by the stator; and
the number of the rotating magnetic fields is different than a number of magnetic poles of the inner rotor and a number of magnetic poles of the outer rotor.

5. The washing machine motor of claim 1, wherein a short pitch factor of the plurality of coils with respect to harmonics of a magnetic flux distribution of the inner rotor and the outer rotor is less than 1 in any one of the inner rotor and the outer rotor.

6. The washing machine motor of claim 1, wherein:
the plurality of core components are arranged independently at regular intervals in a circumferential direction,
one of the plurality of coils is wound around one of the plurality of core components,
the plurality of core components includes an inner tooth facing the inner rotor and an outer tooth facing the outer rotor,
a number of magnetic poles of the inner rotor is different than a number of magnetic poles of the outer rotor and the plurality of core components include a number less than any one of the number of magnetic poles of the inner rotor and the number of magnetic poles of the outer rotor, and
one of the inner tooth and the outer tooth facing the inner rotor and the outer rotor includes a large number of magnetic poles among the inner rotor and the outer rotor, and has a tooth opening angle set to a range of 180°/Nc to 257°/Nc, where, Nc is a number of the plurality of core components.

7. The washing machine motor of claim 6, wherein the plurality of core components includes another tooth facing the inner rotor and the outer rotor and includes a small number of magnetic poles among the inner rotor and the outer rotor, and has a tooth opening angle set to a range of 96°/Nc to 342°/Nc, where, Nc is the number of the plurality of core components.

8. The washing machine motor of claim 6, wherein:
inner core surface portions and outer core surface portions in which the plurality of core components are exposed are provided on an inner circumferential surface and an outer circumferential surface of a core holding structure formed by connecting a pair of annular connecting bodies, and
the inner core surface portions are located inside an inner circumferential surface of an insulator and the outer core surface portions are located outside an outer circumferential surface of the insulator.

9. The washing machine motor of claim 1, wherein:
the washing machine motor is based on:

$$Nc=12n,$$

$$P1=(6\pm1)\cdot 2n,$$

$$P2=(6\pm2)\cdot 2n,$$

where, P1 is a number of magnetic poles of a rotor having a small number of magnetic poles among the inner rotor and the outer rotor, P2 is a number of magnetic poles of another rotor having a large number of magnetic poles, and n is an integer of 1 or more.

10. The washing machine motor of claim 1, wherein:
the plurality of core components are disposed separately and independently within the stator;
the stator further comprises:
an insulator that accommodates the plurality of core components;
the plurality of coils are formed by winding wires around the plurality of core components, wherein the insulator is sandwiched between the plurality of coils and the plurality of core components; and
a resin molded body in which the plurality of core components, the plurality of coils, and the insulator are embedded,
the insulator is formed as a pair of annular connecting bodies which are axially connected to each other in a state of sandwiching the plurality of core components, and
a plurality of core inserting portions into which the plurality of core components are inserted are provided in the pair of annular connecting bodies at regular intervals in a circumferential direction.

11. The washing machine motor of claim 10, wherein:
the pair of annular connecting bodies include:
a main connecting body formed in a single body and in an annular shape; and
a subsidiary connecting body formed by connecting a plurality of arc-shaped connecting elements.

12. A washing machine comprising:
a washing machine motor comprising:
an inner rotor that includes a plurality of inner magnets,
an outer rotor that is provided in an outer peripheral side of the inner rotor and includes a plurality of outer magnets, and
a stator provided between the inner rotor and the outer rotor and formed in an annular shape, and comprises a plurality of coils and a plurality of core components,
a drum connected to the inner rotor of the washing machine motor and configured to receive laundry, and
a pulsator connected to the outer rotor of the washing machine motor and configured to stir the laundry inside the drum,
wherein a first current drives the inner rotor and a second current drives the outer rotor of the washing machine motor, the first current is different than the second current,
wherein the plurality of coils and the plurality of core components are configured to generate a rotating magnetic field that independently drives the inner rotor and the outer rotor when a composite current is supplied to the plurality of coils, wherein the composite current corresponds to the first current overlapping the second current, wherein the plurality of inner magnets circumferentially arranged to correspond to an inner circumferential surface of the stator, wherein the plurality of outer magnets circumferentially arranged to face an outer circumferential surface of the stator, and wherein an inner tooth width of each of the plurality of core components of the stator is greater than a width of one of the plurality of inner magnets, wherein a number of slots of the stator is based on:

$S=12n$ $P1=(6\pm1)\cdot 2n$ $P2=(6\pm2)\cdot 2n,$ where, S is the number of slots of the stator, P1 is a number of magnetic poles of any one of the inner rotor and the outer rotor, P2 is a number of magnetic poles of another rotor and n is an integer of 1 or more.

13. The washing machine of claim 12, wherein:
the rotating magnetic field is one of a number of rotating magnetic fields generated by the stator,
the number of the rotating magnetic fields is different than a number of magnetic poles of the inner rotor and a number of magnetic poles of the outer rotor, and
a winding factor of the plurality of coils with respect to a fundamental wave of magnetic flux distribution of the inner rotor and the outer rotor is greater than 0.5 in both the inner rotor and the outer rotor.

14. The washing machine of claim 12, wherein:
an outer tooth width of one of the plurality of core components of the stator faces the outer rotor and is greater than the width one of the plurality of outer magnets.

15. The washing machine of claim 12, wherein:
a winding factor of the plurality of coils with respect to a fundamental wave of magnetic flux distribution of the inner rotor and the outer rotor is greater than 0.5 in both the inner rotor and the outer rotor.

16. The washing machine of claim 12, wherein a short pitch factor of the plurality of coils with respect to harmonics of a magnetic flux distribution of the inner rotor and the outer rotor is less than 1 in any one of the inner rotor and the outer rotor.

17. The washing machine of claim 12, wherein:
the plurality of core components are arranged independently at regular intervals in a circumferential direction,
one of the plurality of coils is wound around one of the plurality of core components,
the plurality of core components includes an inner tooth facing the inner rotor and an outer tooth facing the outer rotor,
a number of magnetic poles of the inner rotor is different than a number of magnetic poles of the outer rotor and the plurality of core components include a number less than any one of the number of magnetic poles of the inner rotor and the number of magnetic poles of the outer rotor, and
one of the inner tooth and the outer tooth facing the inner rotor and the outer rotor includes a large number of magnetic poles among the inner rotor and the outer rotor, and has a tooth opening angle set to a range of 180°/Nc to 257°/Nc, where, Nc is a number of the plurality of core components.

18. The washing machine of claim 12, wherein:
the washing machine motor is based on:

$Nc=12n$ $P1=(6\pm1)\cdot 2n$ $P2=(6\pm2)\cdot 2n,$ where, P1 is a number of magnetic poles of a rotor having a small number of magnetic poles among the inner rotor and the outer rotor, P2 is a number of magnetic poles of another rotor having a large number of magnetic poles, and n is an integer of 1 or more.

* * * * *

UNITED STATES PATENT AND TRADEMARK OFFICE
CERTIFICATE OF CORRECTION

PATENT NO.         : 10,753,031 B2
APPLICATION NO.    : 15/746802
DATED              : August 25, 2020
INVENTOR(S)        : Hiroyuki Miyake et al.

Page 1 of 1

It is certified that error appears in the above-identified patent and that said Letters Patent is hereby corrected as shown below:

On the Title Page

Add item (30), the Foreign Application Priority Data:
--Jul. 21, 2015 (JP) ..........2015-143829;
Jul. 30, 2015 (JP) ..........2015-150366;
Sep. 30, 2015 (JP) .........2015-194604;
Oct. 29, 2015 (JP) .........2015-212474;
Nov. 5, 2015 (JP) .........2015-217670;
Nov. 24, 2015 (JP) .........2015-228660;
Dec. 2, 2015 (JP) .........2015-235657;
Dec. 13, 2015 (JP) ........2015-247407;
Dec. 24, 2015 (JP) ........2015-252475;
Jan. 5, 2016 (JP) ..........2016-000683;
Apr. 11, 2016 (JP) .........2016-079089;
Jun. 14, 2016 (KR) ........10-2016-0073834--.

Signed and Sealed this
Thirtieth Day of November, 2021

Drew Hirshfeld
*Performing the Functions and Duties of the*
*Under Secretary of Commerce for Intellectual Property and*
*Director of the United States Patent and Trademark Office*